(12) United States Patent
Hagen et al.

(10) Patent No.: US 7,523,603 B2
(45) Date of Patent: Apr. 28, 2009

(54) TRIFLUID REACTOR

(75) Inventors: David L. Hagen, Goshen, IN (US); Gary Ginter, Chicago, IL (US); Bill Goheen, Goshen, IN (US); Allan McGuire, Elkhart, IN (US); Janet Rankin, Shawano, WI (US)

(73) Assignee: Vast Power Portfolio, LLC, Elkhart, IN (US)

( * ) Notice: Subject to any disclaimer, the term of this patent is extended or adjusted under 35 U.S.C. 154(b) by 709 days.

(21) Appl. No.: 10/763,047

(22) Filed: Jan. 22, 2004

(65) Prior Publication Data

US 2004/0219079 A1    Nov. 4, 2004

Related U.S. Application Data

(60) Provisional application No. 60/442,096, filed on Jan. 22, 2003, provisional application No. 60/442,844, filed on Jan. 24, 2003.

(51) Int. Cl.
*F20C 7/00* (2006.01)
*B01J 12/00* (2006.01)
*F23M 3/02* (2006.01)

(52) U.S. Cl. .................. 60/39.55; 422/194; 422/195; 430/9

(58) Field of Classification Search .................. None
See application file for complete search history.

(56) References Cited

U.S. PATENT DOCUMENTS

| 2,678,531 | A | 5/1954 | Miller |
| 2,678,532 | A | 5/1954 | Miller |
| 2,869,324 | A | 1/1959 | Foote |
| 3,238,719 | A | 3/1966 | Harslem |
| 3,651,641 | A | 3/1972 | Ginter |
| 3,657,879 | A | 4/1972 | Ewbank et al. |
| 3,696,795 | A | 10/1972 | Smith et al. |
| 4,128,994 | A | 12/1978 | Cheng |

(Continued)

FOREIGN PATENT DOCUMENTS

EP    0444013 A1    8/1991

(Continued)

OTHER PUBLICATIONS

Blanco et al., "Water Recovery Systems for Steam Injected Gas Turbines: An Economic Analysisi", Proceedings of ECOS 2002, Jul. 3-5, Berlin, Germany.

(Continued)

*Primary Examiner*—Glenn Caldarola
*Assistant Examiner*—Randy Boyer
(74) *Attorney, Agent, or Firm*—Ostrolenk, Faber, Gerb & Soffen, LLP

(57) ABSTRACT

A thermally diluted exothermic reactor system is comprised of numerous orifices distributed within a combustor by distributed perforated contactor tubes or ducts. The perforated contactors deliver and mix diluent fluid and one or more reactant fluids with an oxidant fluid. Numerous micro-jets about the perforated tubes deliver, mix and control the composition of reactant fluid, oxidant fluid and diluent fluid. The reactor controls one or more of composition profiles, composition ratio profiles and temperature profiles in one or more of the axial direction and one or two transverse directions, reduces temperature gradients and improves power, efficiency and emissions.

30 Claims, 31 Drawing Sheets

U.S. PATENT DOCUMENTS

| | | | |
|---|---|---|---|
| 4,176,637 A * | 12/1979 | Cole | 60/752 |
| 4,248,039 A | 2/1981 | Cheng | |
| 4,273,527 A * | 6/1981 | Meenan | 431/177 |
| 4,341,218 A | 7/1982 | U | |
| 4,353,207 A | 10/1982 | Lee | |
| 4,364,392 A | 12/1982 | Strother et al. | |
| 4,432,336 A | 2/1984 | Black | |
| 4,483,137 A * | 11/1984 | Faulkner | 60/748 |
| 4,491,093 A | 1/1985 | Hoekstra | |
| 4,509,324 A | 4/1985 | Urbach et al. | |
| 4,522,024 A | 6/1985 | Zaugg | |
| 4,753,068 A | 6/1988 | El-Masri | |
| 4,841,721 A | 6/1989 | Patton et al. | |
| 4,896,500 A | 1/1990 | Pavel et al. | |
| 4,928,478 A | 5/1990 | Maslak | |
| 5,050,375 A | 9/1991 | Dickinson | |
| 5,175,995 A | 1/1993 | Pak et al. | |
| 5,222,970 A | 6/1993 | Reeves | |
| 5,271,215 A | 12/1993 | Guillet | |
| 5,349,811 A * | 9/1994 | Stickler et al. | 60/776 |
| 5,571,189 A | 11/1996 | Kuslich | |
| 5,617,716 A | 4/1997 | Schreiber | |
| 5,627,719 A | 5/1997 | Gaston | |
| 5,680,764 A | 10/1997 | Viteri | |
| 5,690,039 A | 11/1997 | Monro et al. | |
| 5,743,080 A | 4/1998 | Ginter | |
| 5,771,678 A | 6/1998 | Shouman | |
| 5,799,481 A | 9/1998 | Fetescu | |
| 5,925,223 A | 7/1999 | Simpson et al. | |
| 6,085,513 A | 7/2000 | Hamill et al. | |
| 6,089,024 A | 7/2000 | Hatanaka | |
| 6,158,962 A | 12/2000 | Lee et al. | |
| 6,183,240 B1 | 2/2001 | Dobbeling et al. | |
| 6,289,666 B1 | 9/2001 | Ginter | |
| 6,293,086 B1 | 9/2001 | Reynolds | |
| 6,370,862 B1 | 4/2002 | Cheng | |
| 6,418,724 B1 | 7/2002 | Cheng | |
| 6,564,556 B2 | 5/2003 | Ginter | |
| 6,663,011 B1 | 12/2003 | Entleutner | |

FOREIGN PATENT DOCUMENTS

| | | | |
|---|---|---|---|
| EP | 0505263 A1 | 9/1992 | |
| IT | 1256878 | 12/1995 | |
| WO | WO 0190548 A1 | 11/2001 | |

OTHER PUBLICATIONS

Bathie, W., "Fundamentals of Gas Turbines", 1996, p. 139.

Boyce, M., "Handbook for Cogeneration and Combine Cycle Power Plants", 2002, p. 62.

Granovski et al., "Simulation of Temperature Field Redistribution through multistage cooled turbines", Paper 2001-GT-0576, ASME Turbo Expo. 2001 Jun. 4-7, 2001, New Orleans.

Lefebvre, A., "Gas Turbine Combustion", 1998, section 5-7-3 (pp. 150-151); p. 337 (on CO vs. NOx).

Malecki et al., "Application of and Advanced CFD-Based Analysis System to the PW600 Combustor to Optimize Exit Temperature Distribution—Part 1: Description and Validation of the Analysis Tool", 2001.

Pavri et al., "GE Power Systems; Gas Turbine Emissions and Control", 2001, p. 18.

Travers, A., "Thermoeconomic Analysis of STIG, RWO and HAT Cycles with Carbon Dioxide (CO2) Emission Penalty", Masters Thesis of Thermochemical Power Group of the University of Genoa Faculty of Engineering, 2000.

Agren, N., "Advanced Gas Turbine Cycles with Water-Air Mixtures as Working Fluid", Doctoral Thesis Deparyment of Chemical Engineering and Technology, Energy Processes, Royal Institute of Technology, Stockholm, 2000.

Agren et al., "First Experiments on an Evaporative Gas Turbine Pilot Power Plant—Water Circuit Chemistry and Himidification Evaluation", The American Society of Mechanical Engineers, 2000.

Aagren et al., "New Humidification Concept for Evaporative Gas Turbine Cycles Applied to a Modern Aeroderivative Gas Turbine", Proceedings for the ASME, AES-vol. 37, 1997.

Lindquist, T., "Evaluation, Experience and Potential fo Gas Turbine Based Cycles with Humidification", Doctoral Thesis, Division of Therrmal Power Engineering, Dept. of Heat and Power Engineering, Lund University, Sweden, Sep. 6, 2002, p. 85.

International Search Report issued Oct. 22, 2008 in corresponding PCT Application No. PCT/US07/21508.

Written Opinion issued Oct. 22, 2008 in corresponding PCT Application No. PCT/US07/21508.

* cited by examiner

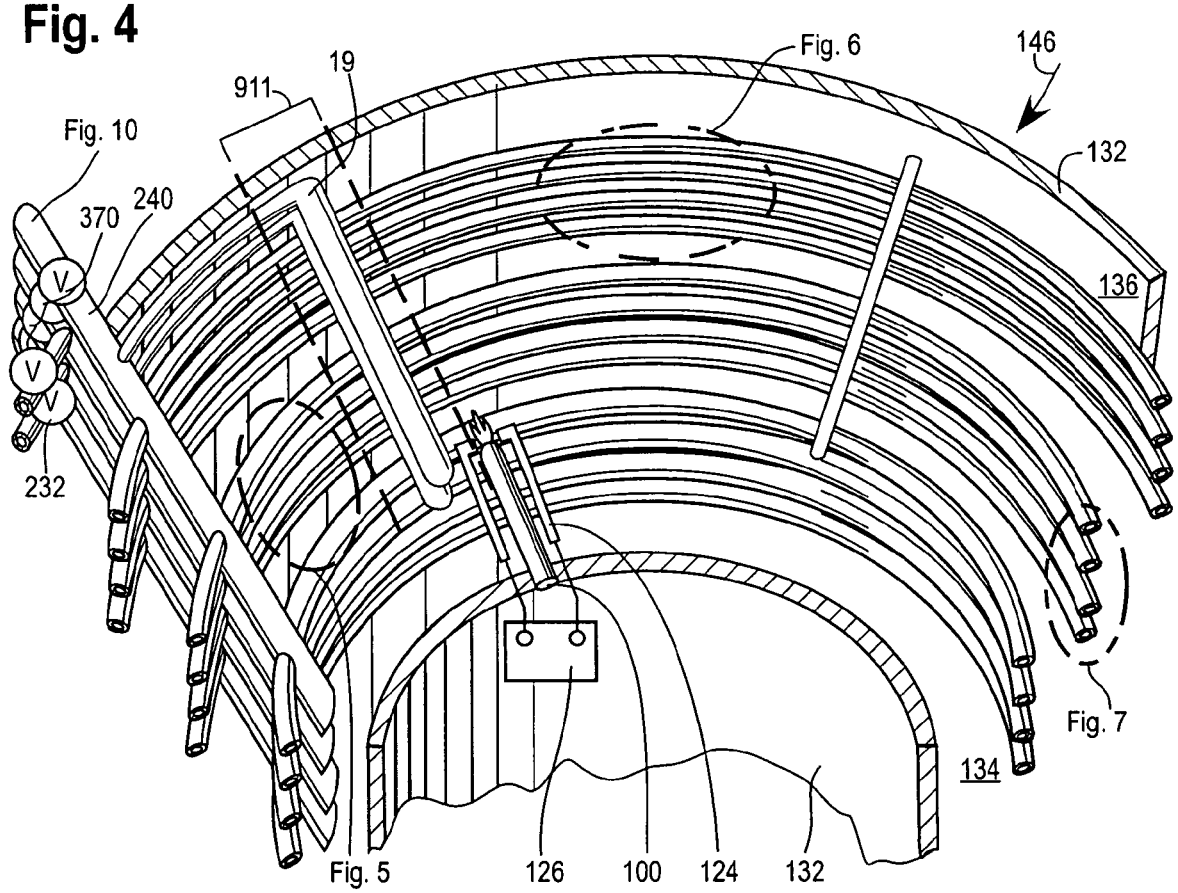
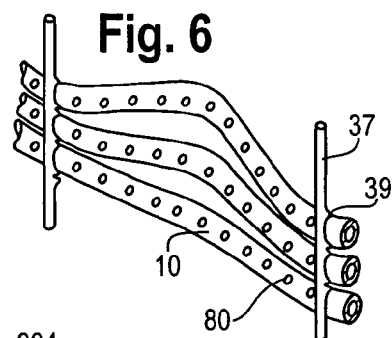
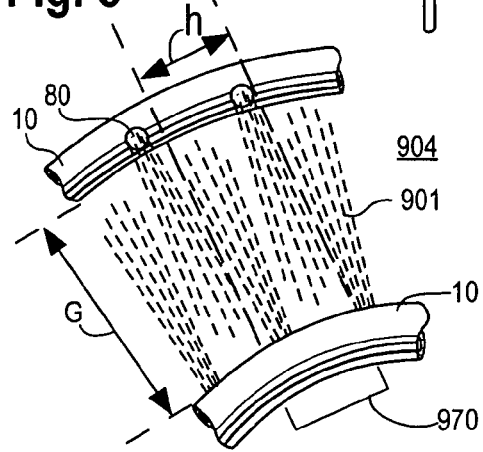
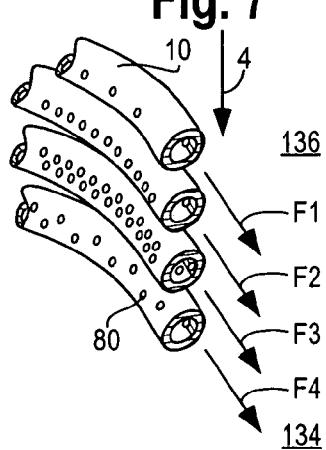

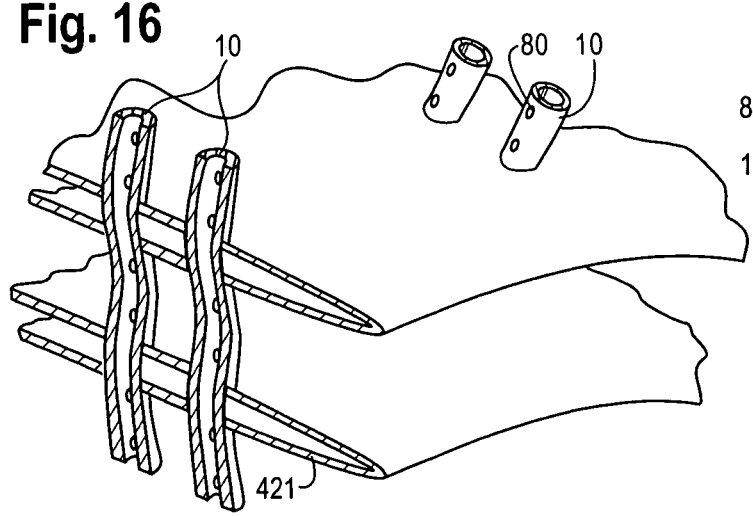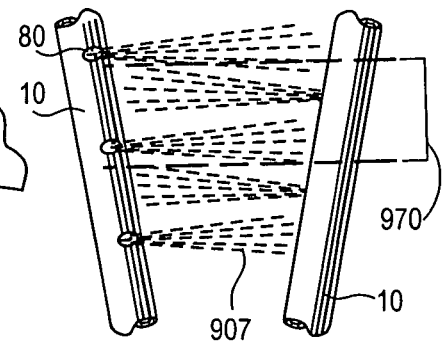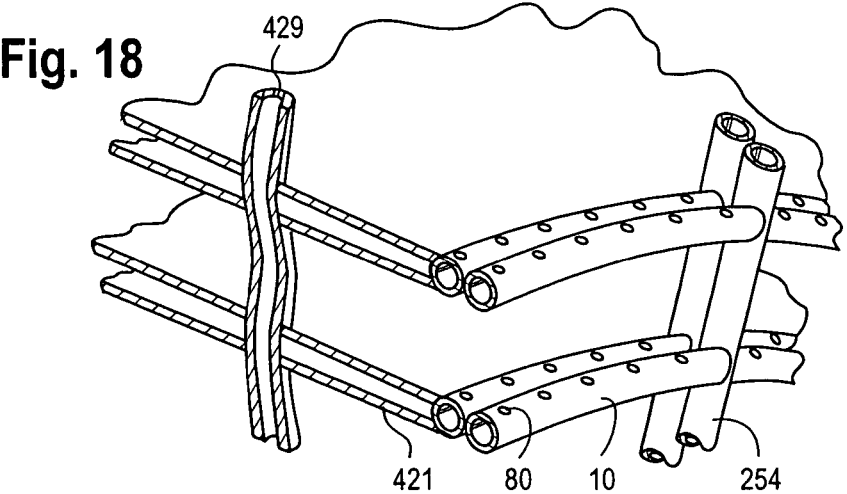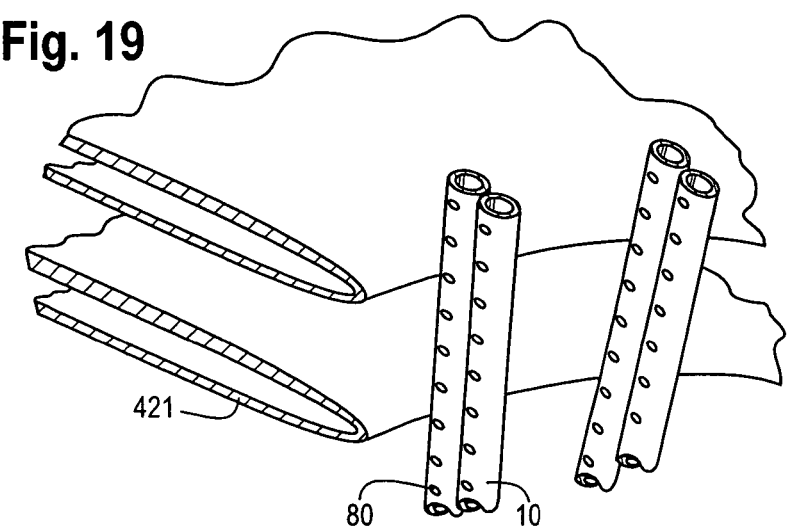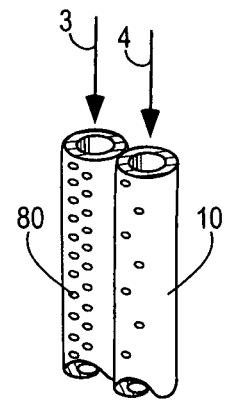

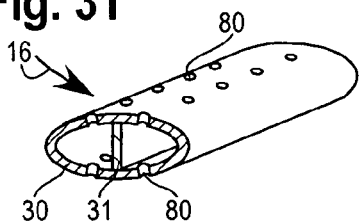
Fig. 31
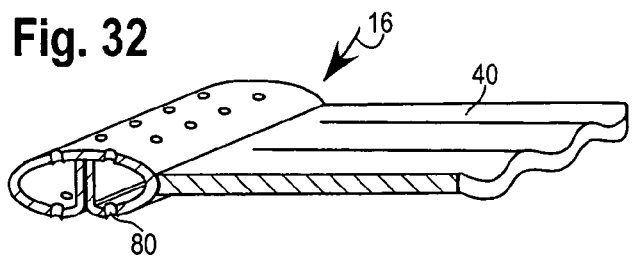
Fig. 32
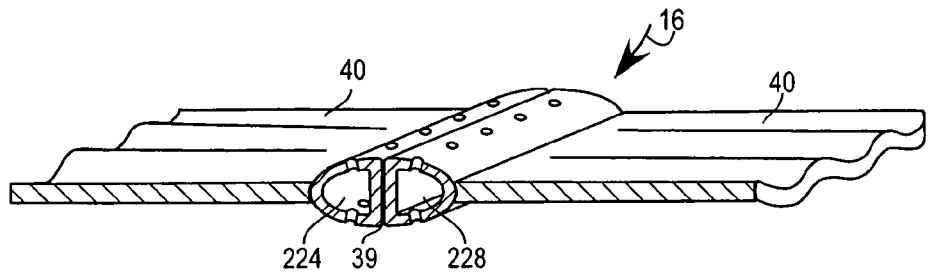
Fig. 33
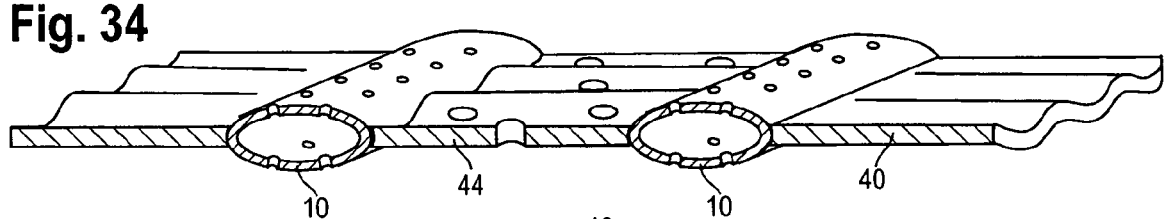
Fig. 34
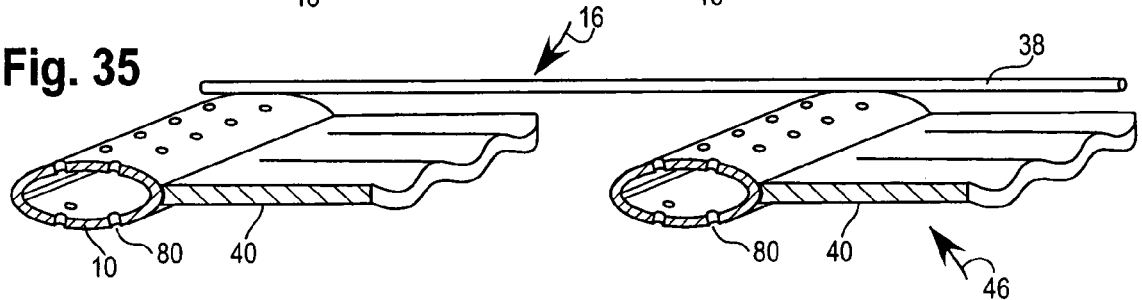
Fig. 35
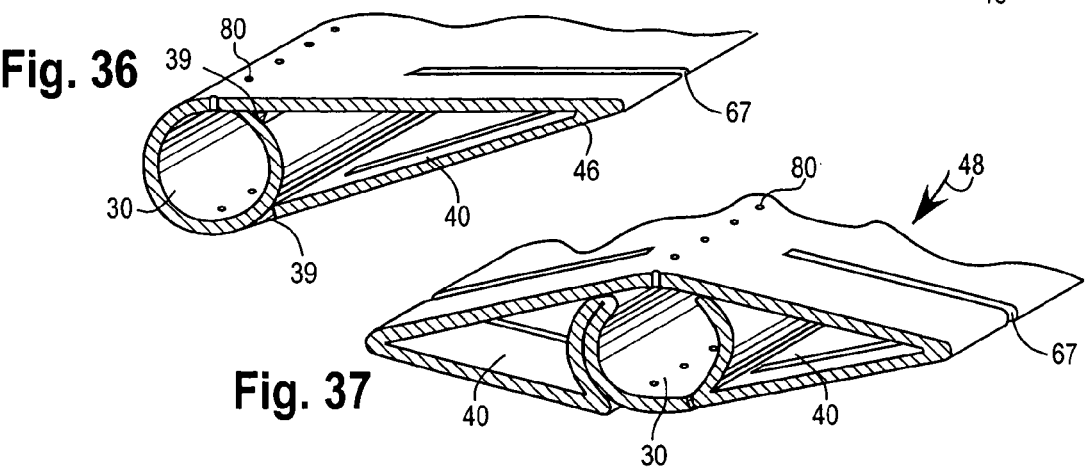
Fig. 36
Fig. 37

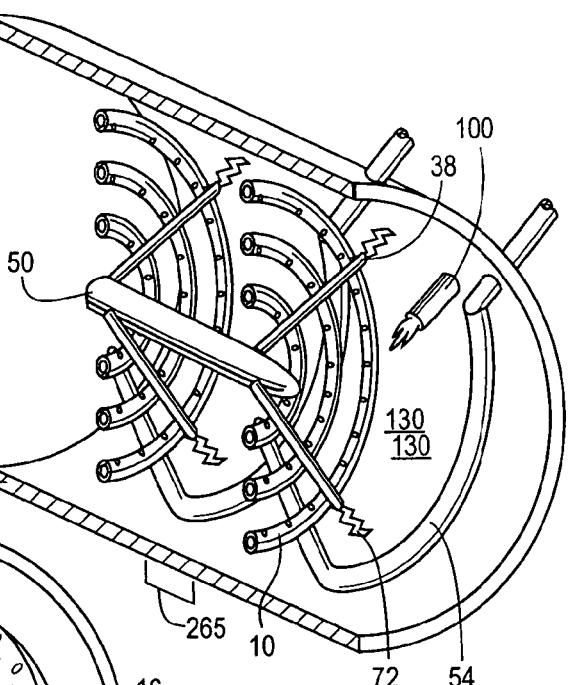
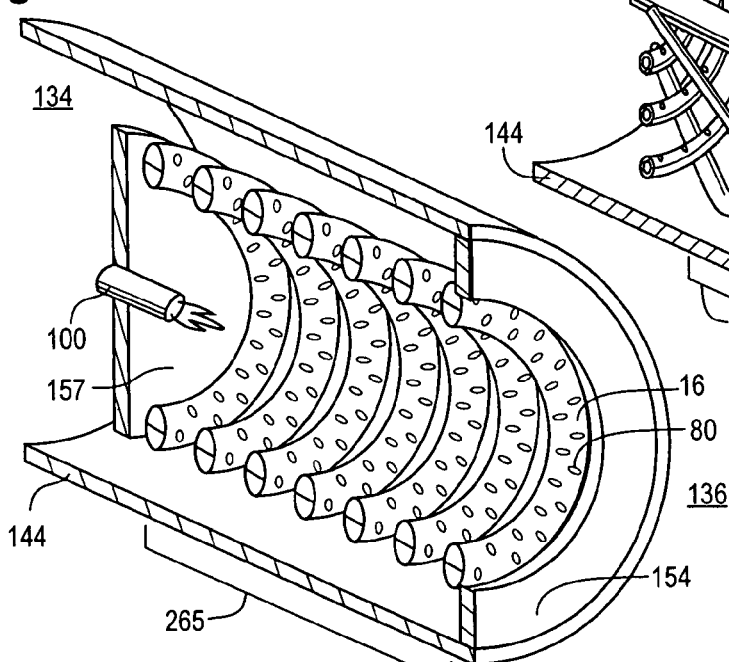
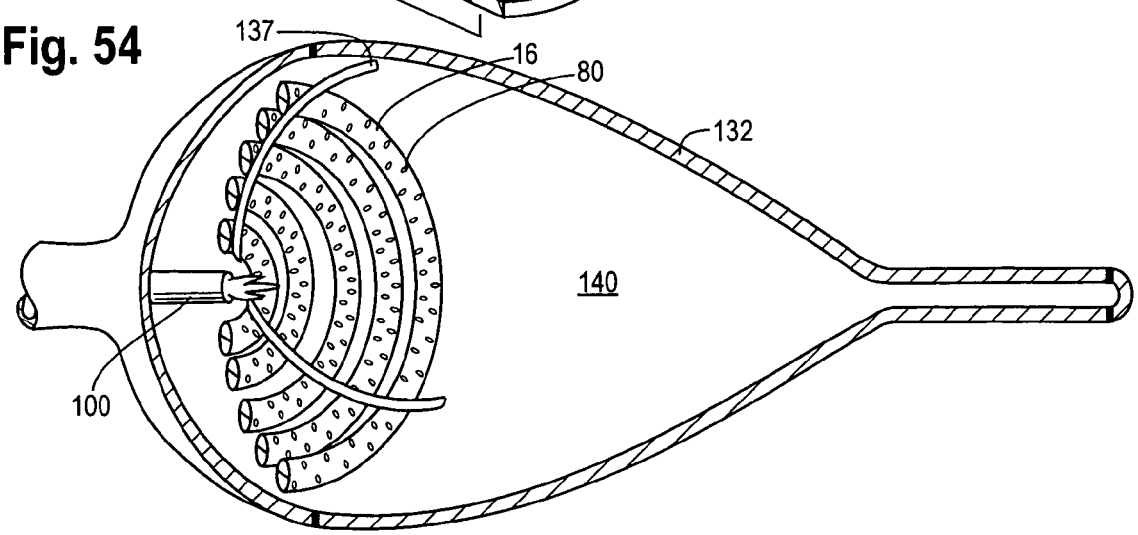

TRIFLUID REACTOR

PRIORITY INFORMATION

This application claims the priority benefit under 35 U.S.C. § 119(e) of Provisional Application 60/442,096, filed Jan. 22, 2003 and Provisional Application 60/442,844 filed Jan. 24, 2003.

BACKGROUND OF THE INVENTION

1. Field of the Invention

The invention relates in general to methods of controlled mixing of several fluids together, and to methods of generally conducting and controlling chemical reactions and/or physical changes in those fluids.

2. Description of the Related Art

Many physical and chemical processes require the delivery of a first fluid, and of mixing of two or more fluids together. The effectiveness of the mixing in such processes is dependent upon many physical phenomena. Mixing may depend upon the surface area of a liquid or the interfacial area between the fluids (e.g., a liquid, a vapor, and/or a gas) that are to be mixed. For heat exchange between two fluids in direct contact, the process depends in part on the interfacial area between the two fluids and thus on the specific interfacial area (surface area per mass). In another example, chemical reactions between a liquid and a gaseous fluid typically occur between the vapor evaporated from the liquid, and the surrounding gaseous fluid.

Traditional methods for mixing two fluids together rely on relatively few injection nozzles, which are arranged to inject a first fluid into a second fluid. Such methods produce areas where local concentrations may be higher or lower than the desired average concentration. Such discontinuities may adversely effect the desired physical or chemical processes. There is a general need for an apparatus and method for improving the mixing of two or more fluids together.

Some relevant combustors use a few injectors to spray or inject liquid or gaseous fuel and/or liquid or vapor diluent into the combustor to create small droplets and distribute them into the oxidant containing fluid or "oxidant fluid." E.g., spraying diesel fuel and water or steam into compressed air. Swirl, thin cones or air assist with high-speed injection are variously used to form droplets smaller than the injector orifices. With such measures it is difficult to obtain desired transverse distributions of fluid delivery of any given fluid. Correspondingly it is difficult to obtain desired compositions or ratios of a second to first fluid, particularly spatially desired compositions.

With exothermic reactions such as combustion, adiabatic "flame" or reaction temperatures for fuel and oxidant are often high, so diluents are often used. However, conventional practice finds it difficult to control the spatial or transverse distributions of the temperature of the energetic fluid exiting the combustor and of the oxidant composition. Correspondingly there is difficulty in emissions such as oxides of nitrogen that are formed from locally high temperatures. Similarly it is often difficult to control emissions of unburned hydrocarbons that are left from cooler portions and from lack of oxygen in relevant art combustors.

SUMMARY OF THE INVENTION

Accordingly, one embodiment of the present invention involves a combustor or exothermic reactor system comprising spatial distributions of numerous orifices to deliver and mix fuel containing fluid, oxidant containing fluid and diluent containing fluid. These distributed orifices deliver, mix and control one or more fluid delivery distributions of one or more fuel, oxidant, and diluent fluids. The distributed orifices may be positioned along and about passages in one or more perforated contactor tubes. The combustor controls one or more desired fluid composition ratio distribution(s), temperature profile(s), and temperature gradient(s), reduces uncertainties in flow, composition and temperature, and reduces one or more byproducts or pollutants.

Certain embodiments of this invention may include one or more of the following advantages: Improve fluid composition, mixing and temperature spatial distributions. Improve the degree of mixing and spatial distribution of the ratio of two or more fluids, thereby improving the effective rate, uniformity and degree of reaction(s) between at least two fluids, especially for exothermic reactions. E.g., combustion of natural gas or diesel fuel in air or oxygen enriched air. Improve the uniformity of introduction of, degree of mixing of, and spatial distribution of a diluent fluid relative to one or more of the reacting fluids within an exothermic reactor. E.g., delivering water into a mixture of fuel fluid and air or oxygen enriched air. Increase the temperature of reacting fluids that are below the mean reactor exit temperature, thereby reducing products of partial reaction. E.g., increase the temperature of combusting gases that are below the mean Combustor Exit Temperature, thereby improving uniformity of reaction rates, thereby reducing byproducts such as emissions of Unburned Hydrocarbons and Carbon Monoxide. Deliver energetic fluids with diluent fluid concentrations greater than the concentrations causing the premixed combustion stability limit or rapid reaction limit. Reduce the temperature and residence time of the energetic fluid within the reactor which is above the mean reactor exit temperature, thereby reducing formation of byproducts. E.g., reduce the temperature and residence time of combusting gases that are above the mean Combustor Exit Temperature (Turbine Inlet Temperature), thereby reducing NOx formation and emissions. Cool the reacting fluids and reaction products using total ratios of liquid and/or gaseous diluent fluid to reactant fluid(s) that exceed the ratio at which the reaction becomes inactive, and/or the reaction extinction ("quenching") ratio, thereby providing greater cooling and lower reacting fluid and/or product temperatures than the relevant art using these fluids. Reduce the gaseous thermal diluent injected into an exothermic reactor for a given thermal reaction power, thereby reducing the energy loss from the pressure drop of the reacting fluids across the reactor and increasing system thermodynamic efficiency. E.g., reduce diluent air to a combustor. Reduce the need for cooling fluid for combustor integrity for a given power, thereby reducing the pressure drop and energy loss of the energetic fluids across the combustor, reducing the corresponding compression power, pressure and pumping losses, and thus increasing system thermodynamic efficiency. Reduce the variation in energetic fluid temperature across the Combustor Exit (reduce the "pattern factor" for Turbine Inlet Temperature), reducing the peak combustor exit temperature for a given mean combustor exit temperature, thereby reducing turbine component damage. Increase the ratio of mean to peak combustor exit, increasing the mean Turbine Inlet Temperature relative to the maximum operating spatial peak Turbine Inlet Temperature (TIT), thereby increasing and the system thermodynamic efficiency. (I.e., reducing the Pattern Factor.) Improve the precision in temperature control and reduce the uncertainty in the Combustor Exit Temperature (Turbine Inlet Temperature) with time, thereby improving control over turbine blade and vane temperature, thus improving component life, reducing repair and replacement costs, and improving the present value of net revenue.

Other embodiments may provide one or more of the following advantages: Configuring the combustor exit energetic fluid temperature profile closer to the desired working temperature profile of turbine vanes and blades, thereby increasing mean Turbine Inlet Temperature and system thermodynamic efficiency. Reduce the peak magnitude and distribution of heat flux to the walls of the combustor, thus reducing the cooling of the combustor walls, the temperature distribution about and along the combustor walls, and the temporal rates of those fluxes, temperatures and distributions, thereby reducing combustor stress, fatigue, oxidation, capital cost, and operating and maintenance costs, and improving the thermodynamic efficiency. Increase the mean enthalpy of the energetic fluid per unit volume, and thus the tolerable heat flow rate through a combustor for a given Combustor Exit Temperature (CET) and Turbine Inlet Temperature, and thereby increasing gross turbine power. Reduce excess gaseous oxidant fluid used as a diluent fluid, thereby reducing compressor power, size, capital costs and maintenance costs, and increasing system net power and efficiency. Provide electrostatic methods to charge jets and mix fluids. Provide a method of effectively fuel and oxidant with a barrier to hinder or prevent a flame or explosion from progressing upstream of a water delivery system, into a premixed or fine droplet fuel region, thereby improving system safety. Eliminate diluent fluid delivery into the combustor directly through combustor and transition zone walls, eliminating thermal wall stresses and hole stress concentrations. Reduce the parasitic pumping losses needed to pump the coolant needed to cool the combustor walls, thereby increasing system net power and thermal efficiency. Recover and recycle most or all injected diluent fluid, thereby reducing costs of purchasing and treating the diluent fluid (e.g., water). Reduce the pressure drop and/or parasitic pumping losses required to recover the injected diluent fluid. Reduce and/or control spatial and temporal distribution and variations in the temperature and/or heat transfer properties of the energetic fluid exiting the combustor. Reduce and/or control the spatial and temporal distribution and/or variations in downstream heating of turbine blades and vanes, and correspondingly reduce their creep, low cycle fatigue, high cycle fatigue, oxidation and corrosion, and thus reduce component maintenance and replacement costs. Reduce combustor, transition and turbine component replacement and maintenance costs. Provide a spatially distributed combustion source capable of coherent acoustic excitation of at least 10 Hz. Reduce the occurrence and degree of pressure oscillation within an exothermic reactor, thereby reducing equipment fatigue, maintenance and replacement costs and acoustic emissions.

Other advantages of certain embodiments may include one or more of the following: Reduce and control pressure oscillations within a combustor, thereby reducing fatigue of combustor, transition piece, and/or turbine components and related component maintenance and replacement costs. Reduce combined energetic fluid expansion and heat recovery equipment size and footprint, thereby reducing total power system capital costs. Provide a flame holder able to stabilize a flame at higher flow velocities, while achieving lower pumping losses and lower emissions at comparable flows compared to relevant flame holders used with lean combustors. Provide methods to eject hot jet(s) from a flame igniter into a fuel oxidant mixture to improve ignition. Provide methods of bridging incombustible mixtures within the combustor. Control the combustion and heat rate in flame holders to reduce thermal stresses and emissions. Provide a method to acoustically modulate combustion gases with greater linearity, wider frequency response and higher efficiency than conventional systems. Generate controlled high pressure oscillations at a precisely controlled temperature within an acoustic reactor and residence chamber to rapidly melt, react and/or mix materials.

Certain embodiments may have the objects or advantages which include one or more of the following: Provide precise timely control over the delivery of two or more fluids, thereby improving flow rate uniformity and control. Precisely quantify the flow rates of one or more mixing fluids. Precisely monitor downstream parameters varying with fluid reaction. Evaluate a precise mass ratio of reactants derived from downstream fluid reaction parameters. Precisely control the mass flow ratio of a second poorly determined reactant fluid flow rate relative to a first precisely controlled reactant delivery rate by monitoring the mass ratio of reactants, whereby improving the reaction. Precisely control delivery of a second fluid reactant relative to a first precisely controlled fluid reactant flow in response to the derived mass ratio of reactants, whereby substantially improving control over the reaction, improving quality and reducing byproducts. Improve precision and accuracy of pump speed, thereby improving the uncertainty in measuring flow rates. Improve the uncertainty in temperature control and/or density whereby improving uncertainty in volume and mass flow rates. Improve accuracy of control of fluid flow rates. Manage spatial fluid ratio control in directions transverse to the flow direction, thereby improving overall fluid ratio control. Provide uniform mixing elements across the flow, reducing large fluid oscillations and improving the uniformity of mixing. Provide more rapid precise fluid control, thereby reducing the variation in fluid ratio with time. Dynamically control fluid flow rates including their fluctuations. Accurately quantify fluid flow rates and their uncertainty. Dynamically control liquid flows to better than 500 Hz. Dynamically control fluid flow rates to better than +/−2%. Evaluate dynamic flow rate uncertainty to better than +/−4%. Dynamically control mean fluid flow rates to better than +/−1%. Evaluate mean flow rate uncertainty to better than +/−2%. Reduce the energy required to deliver and uniformly mix the fluids. Provide higher uniformity in spatial and temporal delivery of fluid ratios.

It should be noted that certain objects and advantages of embodiments of the invention have been described above for the purpose of describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or increases one advantage or group of advantages as taught herein without necessarily achieving other objects or advantages as may be taught or suggested herein.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, each having features and advantages in accordance with one embodiment of the invention, of which:

FIG. 4 depicts an annular combustor with multiple controlled azimuthal fuel and diluent contactors within an annular duct with an ignited flame holder and bridging contactor;

FIG. 5 depicts an expanded view of orifices and inter-contactor sprays into regions between two fluid contactors;

FIG. 6 depicts axial convolutions in connected fluid contactors;

FIG. 7 is an expanded view of multiple differing azimuthal fluid delivery contactors;

FIG. 16 is an expanded view of an annular multi-passage diffuser with radial fluid perforated contactors;

FIG. 17 depicts an expanded view of micro-sprays between radial perforated contactors.

FIG. 18 is an expanded view of an annular multi-passage diffuser with radial fluid manifolds and azimuthal contactors parallel to and downstream of the diffuser splitter vanes;

FIG. 19 is an expanded view of an annular multi-passage diffuser with radial contactors transverse to and downstream of the diffuser splitter vanes;

FIG. 20 is an expanded view of multiple fluid contactors with orifices;

FIG. 27 schematically depicts transverse upstream pressure profiles, the desired downstream pressure constraint and transverse profile of diluent kinetic energy to achieve that.

FIG. 31 is a schematic view of a distributed fluid contactor tube with two fluid passages;

FIG. 32 is a schematic view of a distributed fluid contactor tube with two fluid passages and a fluted fin-stiffener;

FIG. 33 is a schematic view of a distributed fluid contactor tube with two fluid passages and two fluted fin-stiffeners;

FIG. 34 is a schematic view of two distribution fluid contactor tubes with a web-stiffener and two fluted fin-stiffeners;

FIG. 35 is a schematic view of two distribution tubes with a tube rib and downstream fin-stiffeners;

FIG. 36 is a schematic view of a distribution tube with a split fin-stiffener;

FIG. 37 is a schematic view of a distribution tube with two split fin-stiffeners;

FIG. 52 conceptually depicts a distributed combustor with planar fuel and diluent contactors and a inner flame holder;

FIG. 53 conceptually depicts a "cylindrical" distributed combustor with dual-passage contactors, a flame holder and flow barriers;

FIG. 54 conceptually depicts a "focusing" concave distributed combustor with dual-passage contactors, a central flame holder and a downstream mixing chamber;

DETAILED DESCRIPTION OF THE PREFERRED EMBODIMENTS

Selected Component & Nomenclature Lists

Figure 1:
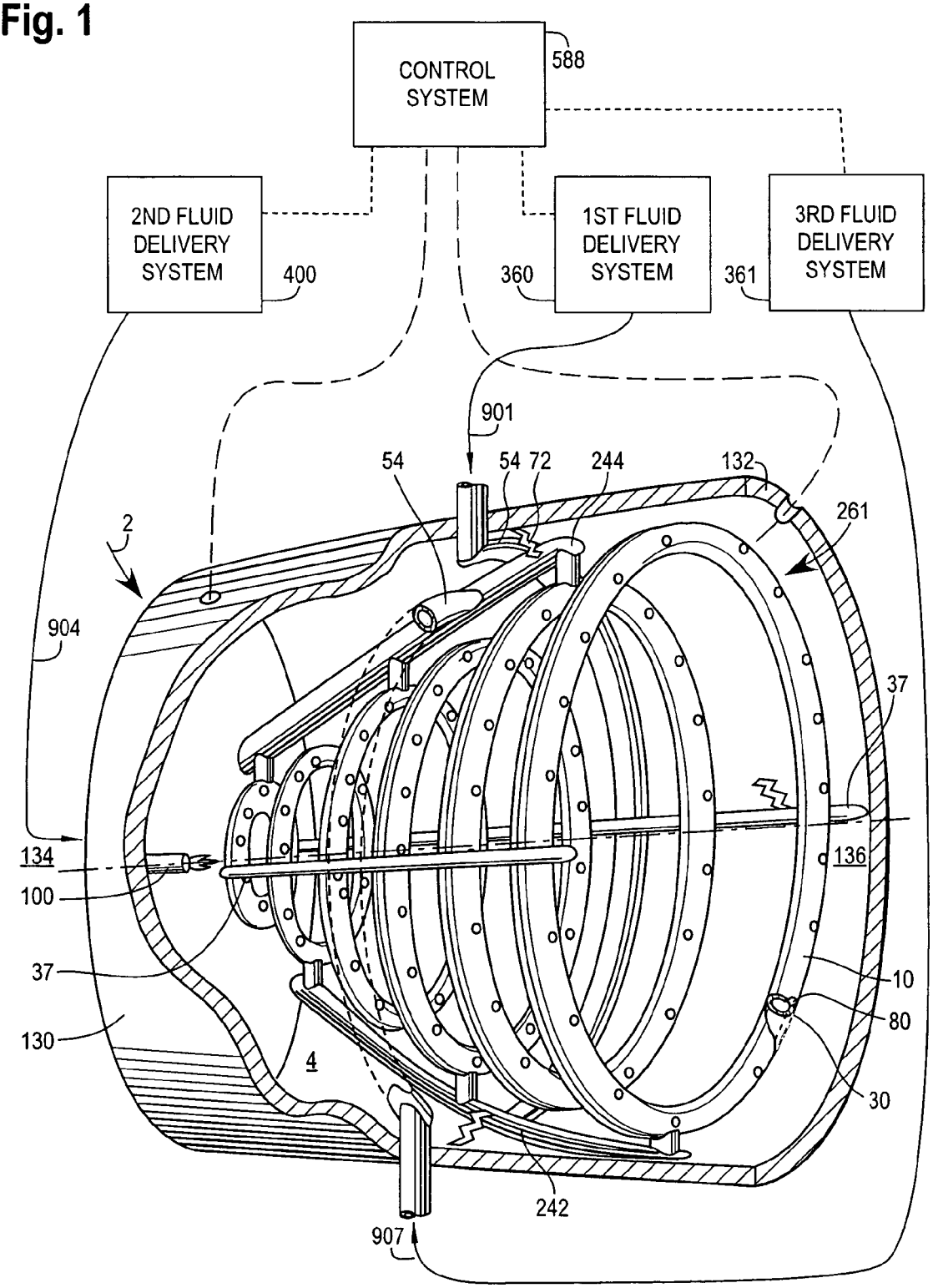
FIG. 1 is a schematic perspective of a trifluid combustor, with a control system, and delivery systems for the 1st fluid (fuel), 2nd fluid (oxidant), 3rd fluid (diluent) containing fluids.

A list of some components and certain nomenclature utilized in describing and explaining some embodiments of the invention follows:

2 Distributed Reactor System or Distributed Contactor System
3 First Flow Path
4 Second Flow Path
5 Third Flow Path
6 Tube Inner Surface
7 Tube Outer Surface
8 Tube
9 Tube axis
10 Distributed Orifices about Fluid Passage, Perforated Contactor Tube or Member
11 First or Fuel Fluid Distributed Orifice Passage, Fuel Fluid Perforated Contactor Tube
12 Liquid Fuel Distributed Orifice Passage, Liquid Fuel Perforated Contactor Tube
13 Gaseous Fuel Distributed Orifice Passage, Gaseous Fuel Perforated Contactor Tube
14 Thermal Diluent Fluid Distributed Orifice Passage, Diluent Perforated Contactor Tube
15 Fuel Fluid Passage
16 Dual Passage Contactor Perforated Tube
17 Thermal Diluent Passage
18 Compound Dual Passage Contactor Perforated Tube
19 Bridging Fluid Contactor Perforated Tube
20 Concentric Passage Contactor Perforated Tube
21 Curvilinear Perforated Tube Section or Arc
22 Insulated Diluent Contactor Perforated Tube
24 Insulated Diluent Spray Contactor Perforated Tube
26 Streamlined Triple Passage Contactor Perforated Tube
28 Cusped Triple Passage Contactor Perforated Tube
30 Tube Wall
31 Intra-tube wall
32 Thin Tube Wall Section
33 Tube Side Wall
34 Thermal Barrier Coating
35 Mechanically Protective Coating, Abrasion or Erosion Barrier Coating
36 Internal Tube Stiffener or Tube Structural Section
37 External Tube Support
38 Tube Structural Rib -continued 39 Bond
40 Fin-stiffener, or Thermal Fin
42 Web-stiffener
44 Perforated Web
46 Fin-stiffener Tube
48 Dual Fin-stiffener Tube
50 Tube Vibrator
54 Curvilinear flexible supply tube
56 Combustor
57 Inner combustor mount
58 Outer combustor mount
59 Combustor wall
60 Combustor liner
61 Tube-fin liner
62 Tube-fin coolant passage
64 Plane fin
66 Fluted fin
67 Fin expansion Gap
69 Compound wrapped liner
70 Tube-fin Stiffening Rib
72 Flexible array structural support
74 Tube connecting hole
80 Orifice (may comprise non-circular openings)
82 Fuel Fluid Orifice or Fuel Orifice
83 Thermal Diluent Orifice or Diluent Orifice
84 Axial Orifice, Orifice with predominantly axial component
85 Radial Orifice, Orifice with predominantly radial component
86 Angled Orifice, Orifice with angle significantly off perpendicular to flow
87 Larger Orifice Opening
88 Orifice Entrance
89 Smaller Orifice Opening
90 Orifice Exit
91 Hexagonal Orifice Array
92 Cartesian or Rectangular Orifice Array
93 Columnar Array
94 Fluid Sampler Tube
96 Sampler-Diluent Contactor Tube
100 Flame Holder, Ignition Authority, Igniter, Pilot Light, or Pilot Flame
102 Modified Toroidal Chamber
103 Internally Concave Redirector
104 Fuel fluid Tube/Passage
106 Thermal Diluent Tube/Passage, Diluent Tube Passage, Duct or Member
107 Oxidant Intake Port
108 Main Oxidant Tube/Passage
110 Pilot Oxidant Tube/Passage
111 Circumferential Passage
112 Mixture Delivery Port
114 Hot Gas Intake Port
116 Hot Gas Delivery Flame Tube
118 Flame Holder Structural Support
120 Insulation/Thermal Barrier Coating
121 Thermal Barrier "Finger"
122 Streamlined Shroud
124 Igniter
126 Igniter Excitation Source
130 Fluid Duct
132 Fluid Duct Wall
134 Fluid Duct Entrance Combustor Inlet, Evaporator Inlet, Saturator Inlet
136 Fluid Duct/Combustor Exit Combustor Outlet, Evaporator Outlet, Saturator Outlet
140 Focusing Resonant Duct
142 Spring-Fin Coolant Duct
144 Circular Duct Elliptical Duct, Cylindrical Duct
145 Rectangular Duct
146 Annular Duct
148 Diluent Fluid Duct
150 Insulation
152 Insulation Wedge
154 Insulation Ring
156 Insulation Tile
158 Radial Insulation Spring
160 Axial Insulation Spring
168 Combustor External Enclosure
170 Pressure vessel
172 Pressure Vessel Wall -continued 176 Pressure Vessel Feed-Through
178 Pressure Vessel Cooling System
180 Varying Thermal Barrier
182 Varying Radiation Shield, Varying Perforated Thermal Shield, Varying Number of Shields
184 Varying Insulation Thermal Barrier, Varying Thickness, Varying Insulation Coverage
188 Varying Heat Transfer Surface, Varying Depth Fin, Varying Number of Fins
192 Combustion Cylinder
194 Duct Slide Port, Cylinder Slot Port
196 Duct Side Port, Cylinder Side Port
220 Multi-passage compound contactor tube
222 Tube Passage or Tube Duct
224 First Fluid Tube Duct e.g., Fuel Fluid Tube Passage
228 Third Fluid Tube Duct e.g., Thermal Diluent Tube Passage, Diluent Tube Passage
229 Streamlining Extension or Cap
230 Flow control valve
231 Sub-duct Valve
240 Manifold
242 Fuel fluid Manifold
244 Thermal Diluent Manifold, Diluent Manifold
246 Multi-passage Manifold
247 Central Manifold Header
249 Manifold Wall
250 Manifold Connecting Hole
254 Secondary Manifold or Sub-Manifold
255 Tube-Duct Junction
256 Mounting Indent/Ridge
257 Inter-tube duct
258 Bond layer
259 Compound Secondary Manifold
260 Direct Contactor Orifice Array, or Perforated Tube Array
261 Downstream Increasing "Horn" Concave Orifice Array, or Concave Perforated Tube Array
262 "Horn" Conical Orifice Array, or "Horn" Conical Perforated Tube Array
263 Downstream Decreasing "Funnel" Convex Orifice Array, or Convex Perforated Tube Array
264 "Funnel" Conical Orifice Array, or Conical Perforated Tube Array
265 Elliptical Planar Orifice Array, Elliptical, Pseudo-Elliptical or Circular Perforated Tube Array
266 Rectangular or Trapezoidal Planar Orifice Array or Perforated Tube Array
267 Annular Planar Orifice Array or Annular Planar Perforated Tube Array or Section
268 Rectangular Tent or Pyramidal Orifice Array or Perforated Tube Array
269 Annular Tent Orifice Array or Annular Tent Perforated Tube Section or Array
270 Elliptical or Cylindrical Orifice Array or Perforated Tube Array
271 Can or "Top Hat" Orifice Array or Perforated Tube Array
272 Cusped Orifice Array or Perforated Tube Array
274 Orifice Sub-Array or Perforated Contactor Tube Array Module or Array Section
276 Heater Tube
277 Interior Heater Tube Wall
278 Exterior Heater Tube Wall
279 Bank or Wall of Heater Tubes
280 Structural support
290 Micro-swirler
291 Over tube "Striding" "saddle" airfoil micro-swirler
292 "Sitting" saddle airfoil micro-swirler
293 Between Tube "Striding" "T-shirt" vane micro-swirler
294 "Sitting" T-shirt micro-swirler
296 Micro-swirler rib
297 Micro-swirler airfoil
298 Micro-swirler vane
299 Mini-swirler
300 High Voltage Power Supply
302 Ground electrode
304 Positive Electrode
306 Negative Electrode
308 First voltage electrode
310 Second voltage electrode
312 Third voltage electrode
314 Support Insulator
316 High Voltage Feed-through -continued 320 Combustor Electrode, distributor electrode
322 Fuel fluid Array Electrode
324 Diluent Array Electrode
326 Grid Electrode
328 Cooled Tubular Electrode
330 Axial Electrode
332 Peripheral Electrode
334 Mid-duct Electrode
340 Conductive-Liquid Isolator
342 Grounded supply pump
343 Perforated liquid distributor
344 Isolated liquid drop tower
346 Diluent collector, Liquid diluent or droplet collector
348 Insulating supports
350 Elevated voltage supply pump
360 First Fluid Delivery System or Fuel Delivery System
361 Third Fluid Delivery System or Diluent Delivery System
370 Pressure/Flow Modulator
372 Pilot Flame/Flame Holder Fuel Delivery System
373 Pilot Flame/Flame Holder Thermal Diluent Delivery System
374 Rotary Actuator
376 Rotary Pump Head
377 Pump Rotor
378 Linear Actuator
379 Solenoid
390 Fluid Filter, Gas Filter or Air Filter
392 Spray Direct Contact Filter
394 Flow homogenizer/straightener
400 Second Fluid Delivery System also termed Oxidant Delivery System
404 Distributed Contactor Precooler
406 Blower
407 Compressor
408 First/Low Pressure Compressor
409 Blower/Compressor intake/entrance
410 First Intercooler
412 Second/Intermediate Pressure Compressor
414 Second Intercooler
416 Third/High Pressure Compressor
417 After cooler
418 Pilot/Flame Holder Oxidant Delivery System
420 Diffuser
421 Diffuser Vanes or Splitter Vanes
422 Mixing Region or Connecting Duct
424 Combustion Chamber
426 Equilibration Zone or Transition Zone/Piece
429 Diffuser Vane Support
440 Expander (Turbine or engine)
444 Low Pressure Turbine
446 Turbine Stage
448 Turbine Vane ("Nozzle")
450 Turbine Blade ("Bucket")
466 Gear Train
468 Variable speed drive
470 Heat Exchanger or Heat Recovery System
480 Condenser
484 Direct Contact Condenser
485 Cooling heat exchanger, cooling jacket
500 Generator
502 Recompressor
550 Physical Parameter Sensors or Transducers
552 Pressure Sensor or Transducer
554 Differential Pressure Sensor or Transducer
558 Temperature Sensor or Transducer
560 First Fluid Flow Sensor or Transducer e.g., Fuel Fluid Flow Sensor
562 Second Fluid Flow Sensor or Transducer e.g., Oxidant Fluid Flow Sensor
564 Third Fluid Flow Sensor or Transducer e.g., Thermal Diluent Fluid Flow Sensor
570 Composition Sensor or Transducer
572 Oxygen Sensor or Transducer
574 NOx Sensor or Transducer
576 Carbon Monoxide Sensor or Transducer (CO)
580 Motion Sensor/Speed Meter
582 Pump Position Sensor or Transducer or Speed Meter, or Rotary Encoder
584 Compressor/Blower Position or Speed Meter or Transducer
586 Flow Modulator Control Sensor or Transducer (e.g., position/motion sensor)

-continued

588 Control System
590 Controller
592 First Fluid Controller e.g., Fuel Fluid Controller
594 Second Fluid Controller e.g., Oxidant Fluid Controller
596 Third Fluid Controller e.g., Thermal Diluent Fluid Controller
600 Motor
602 Rotor
604 Strengthening Wrap
606 Rotor Shaft
608 Stator
612 Hollow Core Bearing
901 First Fluid, commonly comprising one or more of a First Reactant containing Fluid, or a Fuel containing Fluid, optionally comprising a Thermal Diluent, herein also generically called a "Fuel Fluid". (e.g., a gaseous, liquid or fluidized powdered fuel or a mixture comprising fuel and thermal diluent typically passing through a Fuel Perforated Tube or Duct and moving out Orifices.)
902 Diluted First Fluid, commonly a first fluid or fuel fluid comprising a thermal diluent fluid. (E.g., a producer gas as a mixture of hydrogen, carbon monoxide, nitrogen and excess air, and water dissolved in ethanol.)
903 Pilot First Fluid, a small portion of the First Fluid flow commonly comprising one or more of the First Reactant or Fuel fluid herein also generically called a Pilot Fuel (typically a smaller fuel flow, e.g., a portion of the first fluid or a smaller more combustible fuel fluid flow.)
904 Second Fluid, commonly a Fluid comprising a second Reactant or an Oxidant, optionally comprising a thermal diluent fluid, herein also generically called an "Oxidant Fluid" and may comprise a "Humid Oxidant". (e.g., humid air or oxygen enriched air optionally mixed with steam or water, typically passing through a Fluid Duct across one or more perforated tubes, or else passing through an Oxidant Perforated Tube)
906 Pilot Second Fluid, a fluid flow smaller than the Second Fluid, commonly comprising one or more of the Second Reactant or Oxidant herein generically referred to as a Pilot Oxidant
907 Third Fluid, commonly a "Thermal Diluent" or "Diluent Fluid" comprising an inert fluid or fluid with low reactivity such as a mild oxidant, capable of absorbing or giving off heat and changing enthalpy and temperature, herein also generically called a "Thermal Diluent" "Diluent Fluid" or "Cooling Diluent", sometimes distinguished as "Vapor Diluent" and "Liquid Diluent" when the diluent fluid is vaporizable. (e.g., water, steam, excess air, carbon dioxide, or recirculated products of combustion, typically passing through a Thermal Diluent Perforated Tube and out Orifices)
908 Pilot Third Fluid, a fluid flow smaller than the Third Fluid flow, commonly comprising one or more of the thermal diluent and sometimes excess oxidant fluid, herein referred to as a Pilot Diluent.
909 Diluted Fuel Mixture, a fuel containing fluid diluted sufficiently to be non-combustible at inlet conditions and possibly combustible when heated.
911 Reactible Mixture, a fluid capable of relatively rapid reaction commonly a fluid comprising a first fluid or fuel fluid and a second fluid or oxidant fluid, optionally comprising a third fluid or thermal diluent, herein also generically referred to as a combustible mixture (E.g., a mixture of humid air and gaseous fuel, or liquid fuel, or a steam fuel mixture, within the lean and rich combustible limits.)
912 Reacting Fluid, a fluid undergoing chemical reaction, commonly comprising two or more reactant fluids
920 Energetic Fluid, a fluid capable of delivering energy, commonly a hot pressurized fluid comprising products of reaction and residual portions of the First Fluid and Second Fluid, and commonly comprising Thermal Diluent (e.g., a hot pressurized fluid formed by combusting a fuel fluid with oxidant fluid such as compressed air and diluted with steam and excess air)
924 Expanded Fluid, fluid downstream of an expander or work engine such as a turbine or reciprocating engine, may also be termed Exhaust Fluid or Spent Fluid
960 Sprays, Jets & Drops
962 Jet, spray, micro-jet or micro-spray of first fluid
966 Jet, spray or micro-jet of third fluid
970 Regions
972 Fuel richer subregion, diluent leaner subregion
973 Fuel leaner subregion, diluent richer subregion Selected Parameters Tube Smallest Inner Diameter Di
Tube Smallest Outer Diameter Do
Tube Inner Area Ao
Tube Wall Thickness $T=(Do-Di)/2$
Thin Tube Wall Thickness t
Tube Center to Center Spacing H
Tube to Tube gap G
Orifice Inner Diameter di
Orifice Outer Diameter do
Orifice Area ao
Orifice Inner Pressure at Inner Opening pi
Orifice Outer Pressure at Outer Opening po
Orifice Center to Center Spacing h
Orifice to Orifice gap g
Orifice axial angle alpha (a)
Orifice transverse orientation angle theta (?)
Orifice Array Width W
Profiles in the First Transverse Direction
  Radial Pressure Distribution Pr)
  Radial Velocity Distribution Vpr
  Radial Temperature Distribution Tpr
  Radial Density Distribution Rhopr
  Radial Mass Flow Distribution Mdpr
Profiles in the Second or Circumferential Transverse Direction
  Circumferential Pressure Distribution Ppc
  Circumferential Velocity Distribution Vpc
  Circumferential Temperature Distribution Tpc
  Circumferential Density Distribution Rhopc
  Circumferential Mass Flow Distribution Mdpc
  Diffluser vane to vane angle beta β
  Tube Smallest Inner Diameter Di
  Tube Smallest Outer Diameter Do
  Tube Inner Area Ao
  Tube Wall Thickness $T=(Do-Di)/2$
  Thin Tube Wall Thickness t
  Tube Center to Center Spacing H
  Tube to Tube gap G
  Orifice Inner Diameter di
  Orifice Outer Diameter do
  Orifice Area ao
  Orifice Inner Pressure at Inner Opening pi
  Orifice Outer Pressure at Outer Opening po
  Orifice Center to Center Spacing h
  Orifice to Orifice gap g
  Orifice axial angle alpha (a)
  Orifice transverse orientation angle theta (?)
  Pressure Distribution P®)
  Velocity Distribution V®)
  Temperature Distribution T®),
  Density Distribution
  Mass Flow Distribution Some Exemplary Definitions The following detailed description of the preferred embodiments uses many technical terms. In an effort to improve clarity, several of these terms will be first described in this section. It should be appreciated that the these technical terms are broad terms and are also used in their ordinary sense in addition to the definitions provided below. The following definitions of certain features and components are exemplary and are not to be considered limiting in any way:

Orifice—a mouth or aperture of a tube, cavity etc.; opening
Opening—open place or part; hole; gap; aperture
Aperture—(1) an opening; hole; gap (2) the opening, or the diameter of the opening, in a camera, telescope, etc. through which light passes into the lens
Hole—an opening in or through a solid body, a fabric, etc.; a perforation; a rent; a fissure; a hollow place or cavity; an excavation; a pit; Webster 1913 rearranged
Duct—(1) a tube, channel, or canal through which a gas or liquid moves; . . . (4) a pipe or conduit through which wires or cables are run, air is circulated or exhausted etc.
1 micro-meter or micrometer (μm)=1 micron=one millionth of a meter.
1 nano-meter or nanometer (nm)=one billionth of a meter.
1 mil=one thousandth or an inch=0.001"=25.4 μm
1 micro-inch or microinch=0.000,001"=25.4 nm
Prescribed—herein generally refers to a parameter that is desired or needed, prescribed, predetermined, pre-selected or otherwise selected.
Curvilinear—the shape of a generic line comprising one or more linear and/or curvaceous sections as desired. E.g., comprising linear, polynomial and/or transcendent functions comprising conic sections, parabolic, elliptical, hyperbolic, sinusoidal, logarithmic, exponential curves.
Coordinate system—system used to configure planar or spatial ducts or other fluid delivery system, comprising Cartesian, cylindrical, spherical, annular, or other suitable curvilinear co-ordinate systems or combinations thereof.
All Orifice Differential Fluid Pressure Poda—the differential pressure across an array of orifices sufficient to eject fluid from all the orifices, including the smallest orifices 80.
Equivalence Ratio or Phi—the ratio of first reactant flow to second reactant flow or fuel fluid flow to oxidant fluid flow relative to the stoichiometric ratio of first reactant to second reactant or fuel fluid to oxidant fluid. I.e., the inverse of Lambda (E.g., diesel fuel to air ratio relative to stoichiometric diesel fuel to air ratio.)
Excess Oxidant Ratio, Lambda, or excess air ratio—the ratio of the second reactant or oxidant fluid flow to first reactant or fuel fluid flow relative to the stoichiometric ratio of second reactant to first reactant or stoichiometric oxidant fluid to fuel fluid. I.e., the inverse of Phi.
Lambda Distribution—the distribution of Lambda or relative stoichiometric ratio of oxidant fluid to fuel fluid (e.g., oxygen to fuel ratio relative to the stoichiometric ratio of oxygen to fuel.)
Rich mixture or composition—a fluid comprising more fuel (or less oxidant) than the stoichiometric ratio i.e., Lambda less than one or Phi greater than one.
Lean mixture or composition—a fluid comprising less fuel (or more oxidant) then the stoichiometric ratio. I.e., Lambda greater than one or Phi less than one.
Diluent enthalpy change—the change in enthalpy of a diluent between two states, including one or more of change due to heat capacity, latent heat of vaporization, and chemical dissociation.
Specific diluent enthalpy change—the change in enthalpy per unit mass between two states.
Total diluent enthalpy change—the enthalpy change of all diluent fluid components from the respective inlet conditions to the desired combustor mean outlet temperature, excluding the fuel and oxidant and related products of combustion, and including thermal diluent vapor, thermal diluent liquid, excess oxidant fluid (in lean mixtures), excess fuel fluid (in rich mixtures), and any other non reacting constituents including non-oxidant components in the oxidant containing fluid such as nitrogen, argon and carbon dioxide in air.

Excess heat generation—heat of combustion in excess of the heat required to increase temperature of the combustion products to the desired temperature of the energetic gas at the combustor outlet.

Combustion cooling—the reduction in enthalpy of hot combustion gases equal to the excess heat generation and equal to the total increase in enthalpy of the total thermal diluent components.

Profile—a function or distribution describing the variation of a parameter along a direction, such as in a radial direction in a cylindrical or annular duct. Herein may also be used for other transverse or axial directions, or to describe a "pattern" along a direction such as a circumferential direction.

Jet Discharge Cross Area—net cross sectional area of the fluid jet as it exits the orifice.

Orifice Flow Factor—ratio of jet discharge cross sectional area to total orifice discharge cross sectional area Fluid flow—the rate of flow of fluid on a mass basis, or the mol or volumetric rate if so stated.

Fluid flow direction—fluid flow directions "upstream" and "downstream" generally refer to the primary flow direction within the fluid duct 130. I.e., the general flow direction of the oxidant containing fluid 904 and of the energetic fluid 920.

Fluid flow profile—the distribution of the fluid flow along a transverse direction, or along an axial direction or curvilinear line if so specified.

Fluid flow ratio—the ratio of two fluid flows along a transverse direction or along an axial direction or curvilinear line if so specified.

Fluid flow ratio profile—the distribution of the ratio of two fluids along a transverse direction or along an axial direction or curvilinear line if so specified.

Fluid Flow Ratio Profile Range—the distribution of the range of upper and lower fluid flow ratios along a transverse direction or along an axial direction or curvilinear line if so specified.

Minimum Orifice Differential Pressure Podm—the differential pressure across an array of orifices sufficient to eject fluid from the largest orifices 80.

Partial Orifice Differential Fluid Pressure Podp—the differential pressure across an array of orifices sufficient to eject fluid from some of the larger orifices 80 but not from the smallest orifices.

Temperature—the thermodynamic temperature of a fluid at a point or the mean temperature of the fluid, Temperature profile—the distribution of temperatures in a fluid along a transverse direction or along an axial direction or curvilinear line if so specified.

Temperature profile range—the upper temperature profile and lower temperature profile along a transverse direction or along an axial direction or curvilinear line if so specified.

Uncertainty—the uncertainty evaluated according to international definitions. Eg See NISTTN 1287.

Temperature uncertainty—the uncertainty in the temperature of the fluid or component.

Flow uncertainty—the uncertainty in fluid flow rate.

Ratio uncertainty—the uncertainty in ratio of fluid flow rates.

Turn Down—the ratio of minimum to maximum fluid flow rates, or described as reduction in flow divided by the maximum to minimum flow rates. E.g., 10% minimum to maximum flow ratio; 90% turn down; or a turn down of 10:1.

Introduction

The goal and object of fluid mixing and controlling combustion or reaction in certain embodiments are: Goal: A clean efficient multi-fluid exothermic chemical reactor or combustor. Object: An efficient multi-fuel combustor that thoroughly mixes and combusts fuel fluid, oxidant fluid and thermal diluent fluid with low emissions and low pumping and parasitic losses.

The preferred method is to use one or more Distributed Direct Fluid Contactors or combinations thereof to form Exothermic Reactors or Combustors. E.g., a combustor burning one or both diesel fuel or natural gas with compressed air while delivering one or both of water and steam to cool the air, the combustion and/or energetic fluid. Embodiments of the invention comprise one or more of the following summary steps to achieve the objects.

Control fluid delivery composition in numerous sub-regions by delivering and introducing fuel fluid, oxidant fluid and diluent fluid in close proximity to each other through a large number of small holes distributed along and about direct contactor perforated fluid ducts or tubes.

Configure the orifice size, spacing and orientation, and diffuser passage outlets versus inlets to control spatial distributions of fuel, diluent and oxidant fluid delivery in one or more directions.

Adjust the relative size, frequency, temperatures and differential pressures of diluent drops relative to fuel drops and air passages to adjust the relative evaporation rates, achieve desired evaporation and improve the combustion and gas temperature profiles and residence times.

Create spatially distributed turbulent mixing by generating vortices with each of the numerous fluid jets, with each of numerous fuel and water tubes, and optionally by turbulence generating vanes mounted about the distribution tubes.

Apply electrical fields to improve mixing and/or reduce drop size.

Use near stoichiometric combustion, composition and pump speed sensors, and rapid pump excitation to control the energetic fluid composition and properties.

Distributing Fluids through Numerous Orifices in Reactors

Some preferred embodiments of the present invention relate to apparatus and methods for delivering a first fluid and third fluid with desired spatial distributions, mixing those fluids with a second fluid within a reactor, reacting a first within the first fluid with a second reactant within the second fluid within the reactor, and using the third fluid to affect or control that reaction. As will be described below, some embodiments configure, orient and distribute orifices spatially within the reactor to deliver third fluid within the reactor. Some embodiments similarly configure fluid orifices spatially within the reactor to delivery the first fluid. These fluids are delivered and mixed within numerous sub-regions within the reactor with desired or required distributions of compositions. The first and second reactants are reacted within the reactor with the third fluid affecting the reaction, the reaction products and remaining fluids forming an energetic fluid.

The first fluid orifices operable to deliver the first fluid are distributed about at least one first distribution member configured along a curvilinear surface comprising a fluid passage and which is positioned within a second fluid passage or duct forming a flow path. For example, the distribution member may comprise a perforated tube comprising a large number of small orifices. The numerous orifices deliver numerous small drops or micro-jets of the first reactant containing fluid in a controlled manner into the second reactant or oxidant containing fluid.

Similarly, third fluid orifices operable to deliver the third fluid are similarly distributed about at least one third distribution member comprising a third fluid passage configured along a third curvilinear surface. The third distribution member may similarly comprise another perforated tube comprising another large number of similarly small orifices that deliver small drops or micro-jets of the third reactant.

Users preferably configure a large number of regions and subregions within the combustor duct where two or more fluids are mixed and/or reacted. Each mixing region is typically configured to include at least one distribution orifice for one of the first fluid or third fluid together with a flow of the second fluid. The regions preferably comprise at least one distribution orifice for each of the first and third fluids together with a second fluid flow.

By configuring the numerous regions comprising numerous orifices and fluid passages within the fluid duct, users preferably obtain effective controlled mixing of the first, second and third fluids and reaction between at least two of them. Configuring further numerous small orifices to deliver and mix at least two fluids in other regions within the fluid duct further improves mixing and control of the reaction.

Mixing Exothermic Reactants

With reference to FIG. 1, users preferably provide numerous orifices 80 spatially distributed within the reactor about one or more Distributed Direct Fluid Contactors 10 to deliver and mix two or more reactants. These improve control over the spatial delivery, mixing and reaction of those reactants. This is especially important when mixing and reacting two or more fluids that react exothermically (i.e., with release of heat.) The direct fluid contactors 10 provide numerous orifices 80 that deliver drops and/or micro-jets of one or more fluids through a tube wall 30 in a well defined method across the second fluid.

In various embodiments, the second fluid is delivered to the upstream opening of the distributed direct fluid contactor 10 through a fluid duct 130. This second fluid is commonly an oxidant containing gas such as compressed air, but can be any of a wide variety of fluid reactants. In various embodiments, this fluid duct 130 is extended downstream past some or all of the distributed direct fluid contactor(s) 10.

This method generally avoids the problems of thermal shock in relevant art fuel distributor systems caused by mixing and reacting exothermic reactants within porous media, especially in or through porous ceramics, while achieving comparable or better mixing.

Mixing Thermal Diluent Fluid

With reference to FIG. 1, users preferably provide one or more Distributed Direct Fluid Contactors 10 to deliver one or more thermal diluent containing fluids 907 into one or more of the fuel containing fluid 901, the oxidant containing fluid 904, and the reacting fluids 912, or mixtures of those fluid in various embodiments. Such diluent fluids are preferably used to better constrain the temperature in exothermically reacting fluids 912 (i.e., with release of heat) or the heated products. The diluent direct fluid contactors 14 provide numerous orifices that deliver drops and/or micro-jets of one or more fluids in a well defined method across the second fluid.

Distributed Reactor

FIG. 1 illustrates one embodiment of a distributed reactor system 2, which can be used to mix a first fluid 901, a second fluid 904 and a third fluid 907. The first fluid is delivered to the intake of a first fluid manifold 242 by a first fluid delivery system 360. The second fluid is delivered to the inlet 134 of a fluid duct 130 by a second fluid delivery system 400. The third fluid is delivered to the intake of a third fluid manifold 244 by a third fluid delivery system 361.

Fluid delivery is controlled by a control system 588 which may include monitoring the fluid parameters at the inlet and outlet of the duct 130 using physical or composition fluid property transducers comprising one or more of fluid pressure, fluid temperature and fluid composition. The distributed reactor system 2 includes a distributed perforated contactor 10 for the first fluid which is positioned within a fluid duct 130 along a curvilinear path. The reactor system 2 further includes another distributed perforated contactor 10 for the third fluid which is also positioned within a fluid duct 130 along another curvilinear path. External tube supports 37 may be used to support the individual tubes 10 as needed. Array supports 72 are used to support the distributed contactor arrays 260 with sufficient flexibility to accommodate differential thermal expansion without causing undue stress.

Figure 2:
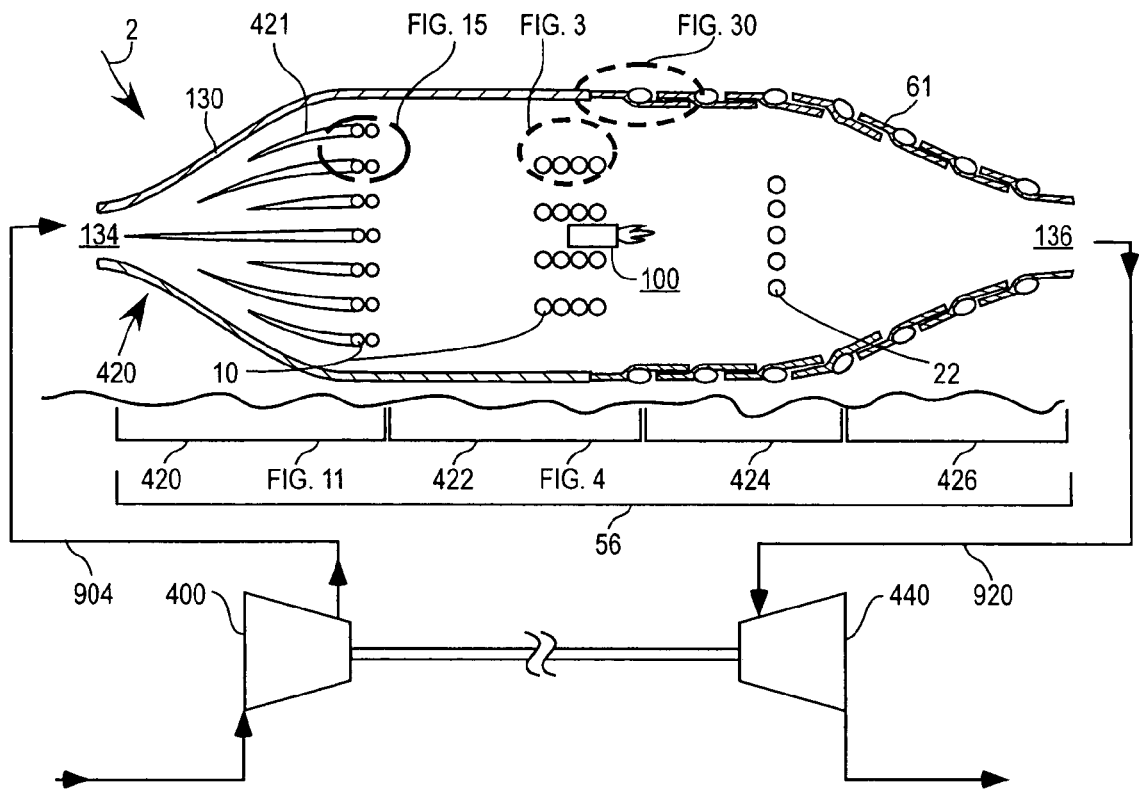
FIG. 2 is a schematic view of a multi-zone combustor with a multi-vane diffuser, distributed diluent & fuel delivery and mixing, combustion, and equilibration.

As shown in the combustor elevation view FIG. 2, the distributed fluid delivery member or contactor 10 that delivers the first fluid may be formed in part from an elongated or tubular fluid delivery duct or tube by forming numerous orifices 80 through a tube wall 30 of the tube. The tube wall 30 has an inner surface 6 that defines a first flow path 3 for a first fluid 901, and an outer surface 7 which is encompassed by a duct 130. The first fluid path 3 is shown perpendicular to the cross section of the tube wall 30.

Figure 3:
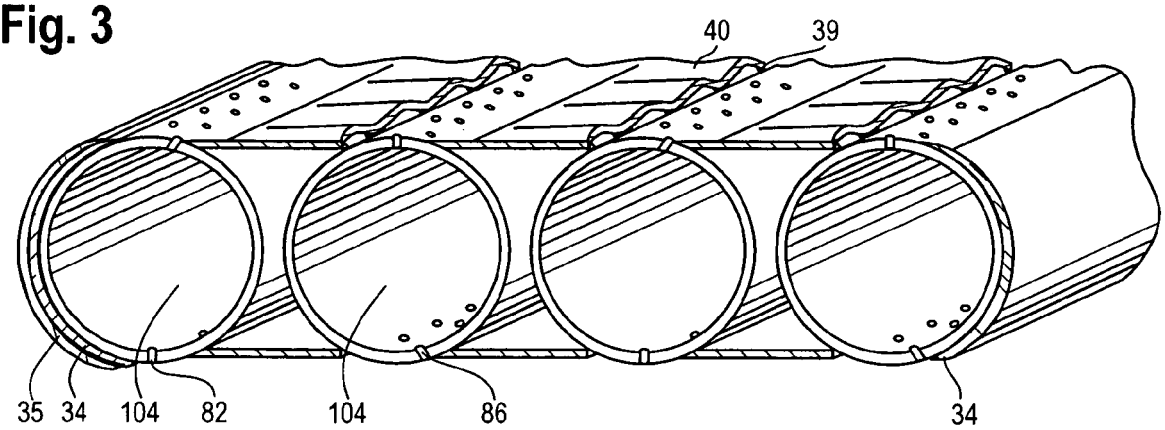
FIG. 3 is a perspective depiction of an insulated multi-fuel and diluent fluid delivery tube bank.

With reference to FIG. 1 and FIG. 3, the tube wall 30 is provided with a large number of small orifices 80 (i.e., holes or openings) distributed along and about a contactor tube 10. As will be explained in more detail below, the first fluid 901 is directed to flow along the first flow path 3 through the tube 10 and then through a third flow path 5 formed by the orifices 80, out into the second flow path 4, which is defined by the fluid duct 130. A second fluid 904 is directed through the duct 130 along the second flow path 4 such that the first fluid 901 and second fluid 904 are mixed together within the duct 130. The second fluid path 4 is shown as nominally parallel to the cross section of the transverse tube 10, though it may be at any angle to that tube.

As will be explained in more detail, below, in some embodiments, users create a differential ejection pressure between within and without the perforated tube 10 sufficient to force the first fluid 901 through orifices 80 and form microsprays, micro-jets, drops (or bubbles) 960 of the first fluid 901 in the second fluid 904. In some embodiments, the second fluid 904 flows across the orifices 80 to entrain the microflows, micro-jets, drops or bubbles of the first fluid 901 delivered with a desired differential ejection pressure into that second fluid 904.

It should be appreciated that although dictionary definitions of "tube" refer to a "cylindrically walled member," applicants do not intend for the distribution member to have such a limited definition. Instead, Applicant has used "tube" herein to refer to a distributed member which has an inner surface forming a passage that defines a first flow path to deliver a first fluid. The distributed member is often an elongated walled member. It may have a variety of cross-sectional shapes as will be apparent from the description below. The distributed member comprises orifices which are often round but which may be elongated, conical, in the form of slots, or holes of one or more other shapes.

The first fluid is commonly a fuel containing fluid such as natural gas or diesel fuel, while the second fluid is commonly an oxidant containing fluid such as air, or oxygen enriched air. However it should be appreciated that the first and second fluids may refer to any two fluids comprising two or more reacting components. The third fluid is commonly a diluent containing fluid, such as water, steam which affects the reaction between the first and second reactants and the properties of the resultant energetic fluid. The third fluid may similarly refer to any diluent containing fluid which is used to affect the reaction, which may include one of the reaction-products such as water or carbon dioxide, or exhaust gas, or one of the reactants such as air or nitrogen, or noble gases such as argon.

Multi-Zone Combustor

With reference to FIG. 2, the distributed reactor system 2 may further be configured with a reactor or combustor 56 comprising multiple regions within the duct 130. These may include a mixing region or mixing zone 422 to deliver and mix a first fluid or fuel containing fluid 901 with a second fluid or oxidant containing fluid 904 and a third fluid or diluent containing fluid 907 and a combustion chamber 424 to react or combust the fuel and oxidant.

The combustor 56 preferably includes a fuel and diluent delivery and mixing region 422 comprising numerous diluent orifices positioned to deliver diluent containing fluid, and numerous fuel orifices positioned to deliver fuel containing fluid. These fluid delivery orifices are configured about one or more distributed contactors 10. The mixing zone is configured to mix one or both of the fuel containing fluid 901 and diluent containing fluid 907 with the oxidant containing fluid 907 in numerous sub-regions within the combustor.

The mixing zone 422 may include multiple distributed contactors 10 configured in one or more direct contactor tube arrays 260. These tube arrays may be positioned in multiple locations, such as upstream near the outlet of the diffuser, as well as further downstream. They may be configured to deliver one or both of a vapor diluent containing fluid such as steam, and a liquid diluent containing fluid such as water.

One or more contactor arrays 260 may similarly be configured to deliver and mix one or both of a portion of the fuel as gaseous fuel containing fluid such as natural gas, and a portion as liquid fuel containing fluid such as diesel fuel within the mixing region 422. This fluid delivery and mixing region is preferably configured to enable evaporation of one or both of liquid fuel or diluent fluids to a desired degree when these are provided.

The combustor 56 is typically configured to contain a combustion chamber 424 downstream of the delivery and mixing region 422. An igniter 100 is typically configured near the upstream end of the combustion chamber. The combustor 56 may contain an equilibration chamber 426 downstream of the combustion chamber 424 and upstream of the reactor outlet 136. The combustor 56 may include further diluent delivery contactors 10 in the downstream portion of the combustion chamber 424 or the upstream region of the equilibration region 426. These are usually configured to deliver liquid diluent. The hotter walls 60 of the combustor 56 may be cooled to tolerate higher temperatures in the combustion chamber 424 and the equilibration zone 426. A tube-fin liner 61 may be used to line and cool these hot sections.

In pressurized reactor configurations such as combustors in power systems, the reactor system 2 comprises an oxidant delivery system 400 to deliver the oxidant containing fluid 904 to the inlet 134 to the combustor 56. The upstream portion of the combustor may be configured as a diffuser zone 420 to reduce the velocity of the incoming oxidant containing fluid. The diffuser 420 is preferably configured to include a number of second fluid passages to achieve a more desired distribution of the velocity of the second fluid flow distribution within the fluid duct 130. These passages may be configured as a diffuser 420 with multiple diffuser vanes 421 in an upstream diffuser region to deliver pressurized air or oxygen enriched air to the mixing region 422.

Distributed Fluid Reactor

With reference to FIG. 1, the Distributed Fluid Reactor System 2 described herein effectively mixes two or more reacting fluids coupled with one or more diluent fluids, in a prescribed manner using numerous spatially distributed orifices. In some embodiments of this invention, users preferably use one or more Distributed Direct Fluid Contactors 10 to distribute a first reactant containing fluid into a complimentary second reactant containing fluid. E.g., distributing fuel into compressed air. Users may align two or more fuel tubes and diluent tubes about parallel with each other upstream and downstream about along the axis of the fluid duct 130.

With reference to FIG. 3, the contactors 10 may include transverse orifices 82 and angled orifices 86. The upstream and/or downstream tubes may be protected by a layer of insulation or thermal barrier coating 34. These may be further protected by an erosion coating 35, particularly on the upstream side. These preferably contain one or more flows of diluent to control the temperature of fuel usually delivered through the central fuel delivery tubes. They may also use protective thermal fins 40. These may be provided to protect the central one or two fuel tubes from hot oxidant containing fluid flowing by the fuel tubes. The thermal fins 40 may be fluted to accommodate differential thermal expansion. These fins may be fluted along the other axis as needed.

These methods are further exemplified in FIG. 4 where multiple azimuthal orifices arrays distributed about azimuthal tubes 10 are configured about an azimuthal array within an combustor within an of an annular duct 146 with duct walls 132. The numerous orifices deliver numerous small micro-sprays, micro-jets or drops of the first reactant containing fluid in a controlled manner into the second reactant or oxidant containing fluid. This method creates a controlled distribution of the first reactant in the second reactant containing fluid. This results in a well controlled spatial distribution of the ratio of first reactant to second reactant across the reactor. E.g., a more controlled spatial distribution.

Multiple fluids may be distributed through these orifices and contactors. For example, with reference to the expanded perspective view of the orifices and contactors in FIG. 7, fluids F1, F2, F3, and F4 may be distributed through orifices 80 distributed about contactor tubes 10 relative to a transverse fluid flow F5 going from the inlet 134 to the outlet 136. As shown, the orifice configuration may differ for each fluid including the orifice spatial density of the number of orifices per cross sectional area, and/or the orifice orientation.

Numerous Mixing Regions

In various embodiments, users apply these methods and may further configure the tube to tube gap G and control the control one or more differential fluid delivery pressures. With reference to the expanded view of FIG. 5 looking along the combustor axis, these methods generate numerous small uniform micro-jets or drops of the first reactant fluid 901 ejected from orifices 80 in the contactor tubes 10.

These micro-jets in turn break up into swirls or droplets of the first reactant with a fairly narrow spatial or size distribution. In such configurations, the gap G between distributed tubes 10, size of the orifices 80 and differential pressure across the orifices 80 are preferably adjusted to form micro-jets that penetrate into the gap between tubes.

In some configurations, users preferably configure the jet penetration intermediate distances across the gap G the between adjacent tubes. E.g., preferably about 90% of the tube to tube gap G, ranging from 5% to 200%. In other configurations the microjet is arranged to impinge on and splash off the adjacent tube to increase drop formation.

With further reference to FIG. 5, these fluid jets are distributed across the second reactant containing fluid flow 904 in a region 970 within the reactor. These regions 970 are typically about the orifice transverse spacing h along the distribution tubes and the tube to tube gap in the direction transverse to the flow of oxidant containing fluid 904. These regions have a cross sectional area typically equal to about h*G. E.g., of the order of 1 mm×10 mm or 10 mm2 or smaller. By contrast the combustor duct 130 may have a radius of about 100 mm, with a net cross sectional area of about 30,000 mm2. In this example, users configure about 3000 regions within a cross section of the duct. Users preferably configure the fluid delivery and composition of the fluids mixing within each region. They further control the fluid flows to distributors 10.

By configuring and controlling the fluid flows, this method may provide control of about 100 regions within a duct cross section. Users preferably control about 330 regions, and more preferably control 1000 regions or more.

Igniting Mixtures

With further reference to FIG. 4, a flame holder 100 is preferably provided near the upstream end of the combustor array. An igniter 124 may also be provided. Users may provide a bridging contactor 19 to deliver further fuel configured across the other contactors. They may include a second bridging contactor 19 to deliver diluent containing fluid. These and form a bridging region 972 with a combustible mixture to improve the combustion transfer from fuel richer regions across fuel leaner regions to other fuel richer regions within the combustor.

The fluids are supplied by manifolds 240 to the contactors 10. The fluid flows are controlled by valves 370. Separate purge flows may be provided through manifolds connected through purge valves 232.

Thermal Diluent Direct Fluid Contactor

In combustion and other highly exothermic reactions, diluent fluids are added to reduce the flame temperature and the temperature of the combustion gases, particularly to protect the combustor components and to limit or reduce the formation of oxides of nitrogen (NOx). However, conventional methods of adding excess air or other compressed gaseous thermal diluent results in high compression power and pumping and parasitic power losses. In energy conversion systems such as gas turbines, the power needed to compress the oxidant fluid consumes a major fraction of the gross power produced by the expander.

In some embodiments, users preferably use the distributed Direct Fluid Contactor system 2 to distribute a fluid thermal diluent into the oxidant fluid or mixture of fuel fluid and oxidant fluid. (See, for example, FIG. 1) Users preferably use these direct distributed contactor methods to uniformly distribute a liquid and/or gaseous thermal diluent into the oxidant fluid. E.g., water or steam into compressed air. As with the fuel distributed contactor, the distributed diluent contactor provides much more controlled or uniform diluent/fuel ratios across the combustor or reactor fluid duct.

Tube and Orifice Configurations

User configure orifices about distribution passages or tubes, including the methods taught by Hagen et al. in U.S. patent application Ser. No. 10/686,191, entitled "Method and Apparatus for Mixing Fluid", Filed Oct. 15, 2003, hereinafter referred to as the "'191 patent application". Some embodiments are described as follows.

Orifice Array Configurations

In some embodiments, users preferably use a substantially hexagonal array of orifices 80 of diameter "d" with orifice centers spaced at intervals of about "h". Users preferably position orifice centers with a spacing that is at least about three times the orifice diameter (3*d). Then the ratio of perforated tube surface area to orifice area is about 31.5*h2/p*d2 or about 9.92. Similarly, they may use a Cartesian array, where the ratio of perforated tube surface area to orifice area is about 4*h2/p*d2 or about 11.5.

The orifices 80 are preferably sized to form small drops or micro-jets with liquid fuels. By using a large number of orifices 80 in perforated distribution tubes 10, as described herein, users preferably provide a cumulative cross sectional area of orifices 80 with a desired or needed ratio to the net cross sectional area of the oxidant fluid. E.g., they may use perforated sheet with arrays of orifices 80 of about 2 µm in diameter on at least about a 6 µm hexagonal spacing on either side of the tube 10, 11, 12 or 13. An array width of about 3.5 mm wide would give about 0.000,105 cm2 of orifice area per linear cm of perforated tube length per line of orifices 80.

Users may provide secondary methods to reduce drop size as described herein. With such measures, users may use a common orifice size for both gaseous and liquid fuels. With gaseous fuel fluids at lower delivery pressures and lower densities, the cumulative cross sectional area of gaseous fuel orifices is preferably greater than with liquid fuels. The large number of orifices 80 provides some area to deliver gaseous fuels while the small orifices 80 enable small drop sizes and lower delivery pressures for liquid fuels.

Tube to Tube Gap

In some array configurations, users preferably adjust the area between tubes relative to the net orifice area to achieve desired or needed net specific orifice area or orifice area per net cross-sectional flow gap between the tubes. This is adjusted with the respective differential pressures to obtain desired oxidant/fuel ratios. E.g., users adjust the tube to tube spacing H, the number of orifices and/or orifice size, and the differential pressure of first or third fluid across the orifices, and pressure drop in the second or oxidant containing fluid flow across the tubes. Users preferably adjust these parameters to achieve oxidant to fuel ratios lambda in the range of about 100% to about 120% of the stoichiometric ratio as desired or needed in some embodiments. In other configurations, users adjust the relative oxidant/fuel ratio lambda generally from about 25% to 700% of the stoichiometric ratio as desired or needed.

For example, in some configurations, users provide a flow gap G between distribution tubes of about 7 mm. They may set total width of these perforated distribution arrays around each tube to about the same width as the tube to tube gap spacing. E.g., 2*3.5 mm or 7 mm. The orifice hole spacing h from one orifice 80 to the next orifice 80 may be set to at least about 3*d. Then the ratio of area between tubes to total orifice area for hexagonal or Cartesian arrays is about 3.93% and 20% excess oxidant respectively assuming standard air.

Users vary the tube to tube gap G relative to orifice size, spatial density, fluid flow and drop size distribution to adjust this base ratio for the desired fuel/oxidant fluid pressure ratio in some configurations. E.g., with a tube to tube gap of about G=7.41 mm or 8.08 mm users obtain a tube to tube oxidant flow area to area of fuel orifice 82 ratio of about 110% or 120% of the equivalent ratio for natural gas (assuming a hexagonal array with orifice 80 to orifice intervals h of about three times the orifice diameter d).

Relative Positions of Fuel and Diluent Orifices & Tubes

In various embodiments, users configure the positions of the perforated fuel and diluent distribution tubes relative to the second fluid flow. Users may arrange the distribution tubes to achieve one or more of relative liquid evaporation, multiple fuels, multiple diluent phases and/or temperatures, desired shielding of fuel tubes, to preheat fuel, and/or to protect fuel tubes to avoid polymerization, coking and fuel buildup.

With reference to FIG. 3, two fuel tubes are preferably provided. E.g., such a combination may be used for multi-fuel capability by providing one fuel tube for a gaseous fuel like natural gas, and another fuel tube for a liquid fuel like diesel fuel. Similarly one tube may provide a high volatility fuel like diesel fuel and the other a lower volatility fuel like bunker C. The gaseous fuel tube may be positioned on the side with the greater heat flux to help protect the liquid fuel tube from coking.

Such tube sets can be configured to provide fairly prescribed mixing across the fluid duct 130. This configuration is convenient to assemble with relatively low costs. For example they may be configured to provide fairly uniform ratio of diluent to fuel across the duct.

In some configurations, users orient the fuel fluid distribution tubes at some angle to the diluent fluid distribution tubes. These orientations provide greater mixing by generating vortices in the second distribution array at a different angle to the first distribution array. Configurations with fuel fluid and diluent distribution arrays perpendicular to each other provides the greatest degree of such vortex cross mixing. Users may also use intermediate orientations as desired.

With further reference to FIG. 3, users preferably position a perforated diluent distribution tube downstream of one or more perforated fuel distribution tube. Such configurations provide more time for the fuel fluid to evaporate before it reaches the flame front than for the diluent. Similarly, liquid diluent can be delivered near fuel where it evaporates downstream of the start of combustion. The higher fuel fluid evaporation relative to diluent evaporation increases combustion stability relative to mixtures with fully evaporated diluent. It also enabled users to deliver more diluent upstream than the would form a combustible mixture if the fuel and diluent were fully premixed and atomized.

Positioning a diluent tube downstream is further used to provide thermal shielding between the hot combusting gases and downstream radiation and the upstream fuel distribution tube(s). Users may adjust the temperature of the downstream diluent flow to control the temperature rise of the fuel in the adjacent fuel tube. E.g., they preferably control the temperature of liquid fuel to below 100° C. to reduce the probability of fuel polymerizing or coking and blocking the fuel orifices 82.

Similarly, compressed oxidant containing fluid may be compressed to pressures resulting in temperatures greater than 100° C. Accordingly, users may provide another diluent tube upstream of one or more fuel tubes to control the fuel temperature. See, for example FIG. 3 where diluent tubes may be positioned upstream and/or downstream of fuel tubes.

Alternating Fuel and Diluent Orifices & Tubes

Figure 11:
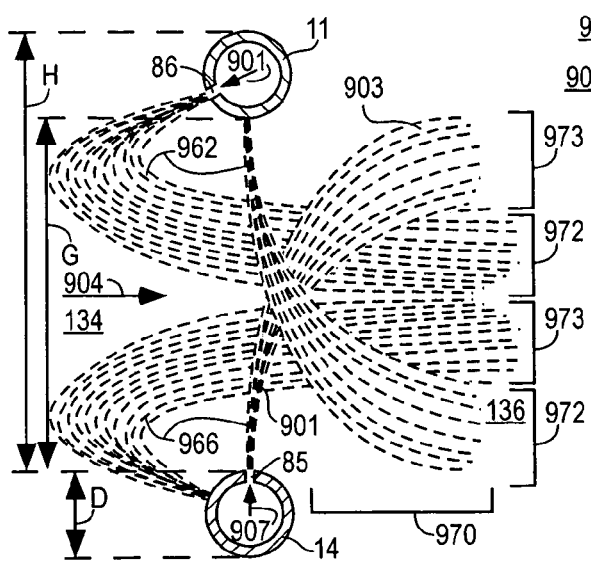
FIG. 11 shows alternating fuel and diluent orifices about respective fuel and diluent contactor tubes forming with richer and leaner mixture sub-regions between the tubes.

With reference to FIG. 11, in some embodiments, users position fuel and diluent orifices about fuel and diluent distribution tubes delivering fluid sprays or jets across and into the second (oxidant) fluid flowing through the fluid duct. These fuel and diluent tubes may be configured to alternate across the duct. Users may configure the fluid delivery into a large number of regions using one or more of the orifice configuration and orientation methods and fluid control methods described herein and in the '191 patent application. For example, with reference to FIG. 11, fuel jets 962 and diluent jets 966 may be ejected upstream into the oxidant containing fluid flow 904 from respective angled orifices 86. Such orifices 86 may similarly be configured to eject fluid downstream into the oxidant fluid. Similarly such jets may be delivered about perpendicular to the oxidant flow from transverse orifices 85. The tubes of diameter D are spaced at distances H across the duct providing a gap G between tubes as desired to configure the respective fluid delivery and mixing.

With further reference to FIG. 11, one or more fluid jets, such as those ejected from orifices 85 oriented perpendicular to the oxidant flow 904, may be configured to penetrate across a major portion of the gap to a subregion near to the next distribution tube. Similarly one or more fluid sprays or jets, such as those ejected from upstream-oriented angled orifices 86, may be configured to penetrate a smaller portion of the distance across the tube gap G. Such jets with smaller penetrations may also be formed using angled orifices 86 oriented downstream.

By combining at least one each of such fuel jets and such diluent jets, users may form regions 970 comprising at least one fuel richer (diluent leaner) subregion 972 and at least one fuel leaner (diluent richer) subregion 973. In some configurations, users may to form regions 970 comprising combinations of subregions 972 and 973. In at least one of the regions 970, at least one of the fuel richer regions 972 is preferably configured to form a combustible mixture at the fluid inlet conditions. A flame holder is preferably configured near such a region 972 having a combustible mixture.

Similarly by applying this orifice configuration method, users preferably form more than two subregions within a region 970. By using diluent jets that penetrate further across the gap than fuel jets (or less than fuel jets), users may form some subregions 973 with mixtures leaner in fuel (richer in diluent), such as nearer the tubes. Similarly they may form some subregions 972 with mixtures richer in fuel, such as nearer the middle of the tube to tube gap.

Similarly, the micro-sprays may be configured to provide fairly uniform mixtures of fuel and diluent by configuring both fuel and diluent jets to penetrate about respective complementary distances into the region 970 within the gap.

Users preferably configure regions 970 to alternate between subregions 972 richer in fuel and subregions 973 leaner in fuel. For example, combinations of fuel and diluent orifices may be configured to deliver jets which form fuel richer subregions 972 nearer the tubes 10 and diluent richer subregions 973 nearer the center.

By forming fuel richer subregions 972, users may achieve stable combustion while having overall diluent content greater than the premixed combustible boundary which would quench the ignition. The diluent richer mixtures will progressively mix with the combusting fuel downstream of combustion. With such measures, the diluent delivery within the subregions 972 and 973 combined may be configured to provide more diluent than could form a combustible mixture if the fuel, diluent and oxidant fluids were uniformly premixed.

Users configure sprays or jets to preferably penetrate a major distance across the gap, and/or spraying upstream when they desire to adjust penetration distance into the gap, to increase mixing, and/or to more effectively break up drops into droplets. They preferably use radial orifices when they seek high penetration across a gap. Shorter sprays may be used to need smaller pumping work as well as less mixing. Subregions may be configured with higher diluent nearer the tubes to assist in keeping the tubes cool. Configuring subregions 973 leaner in fuel (richer in diluent) adjacent to the fuel tube may be used to assist in configuring combustion further away from the fuel tube, thereby reducing the heat flux to the fuel tubes.

In some circumstances, users may configure fuel distribution tubes parallel to or possibly downstream of diluent distribution tubes. This may avoid or reduce condensing fuel on downstream cooler surfaces.

Sets of Fuel and Diluent Tubes

Figure 12:
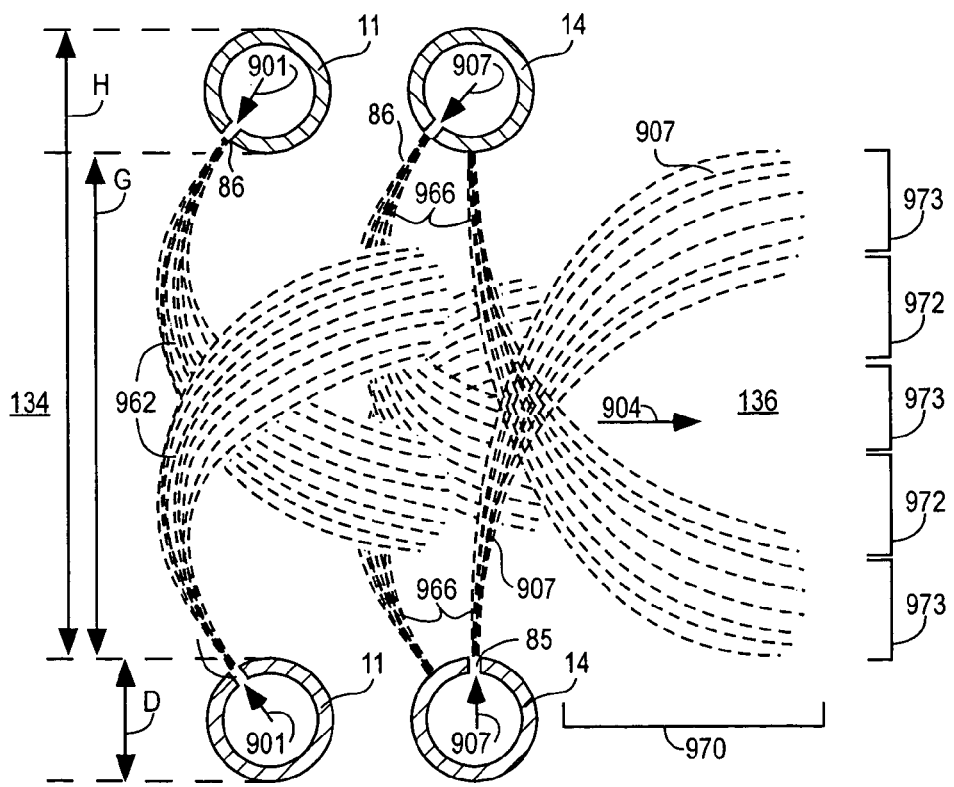
FIG. 12 shows parallel sets of fuel and diluent orifices about respective contactor tubes configured to form multiple richer and leaner mixture sub-regions between them.

With reference to FIG. 12, similar effects of fuel richer (diluent leaner) sub regions 972 and fuel leaner subregions 973 (diluent richer) or more uniform mixtures of fuel and diluent may be achieved in another embodiment, using combinations of fuel and diluent orifices comprising one or both of radial orifices 85 and angled orifices 86, configured about two or more respective fuel tubes 11 and diluent tubes 14 positioned upstream and downstream of each other. The tube sets are then configured across the duct in radial or circumferential configurations as described herein.

In the embodiment shown in FIG. 12, the angled orifices 86 on fuel tubes 11 are configured with upstream oriented jets penetrating part way across the tube to tube gap G. In this embodiment, the orifices 86 are shown as being oriented so that the fuel jets penetrate to about two thirds of the distance across the gap from each side. With such an embodiment, the fuel forms a fuel richer mixture in two locations 972 about one third and two thirds of the distance across the gap G.

Figure 26:
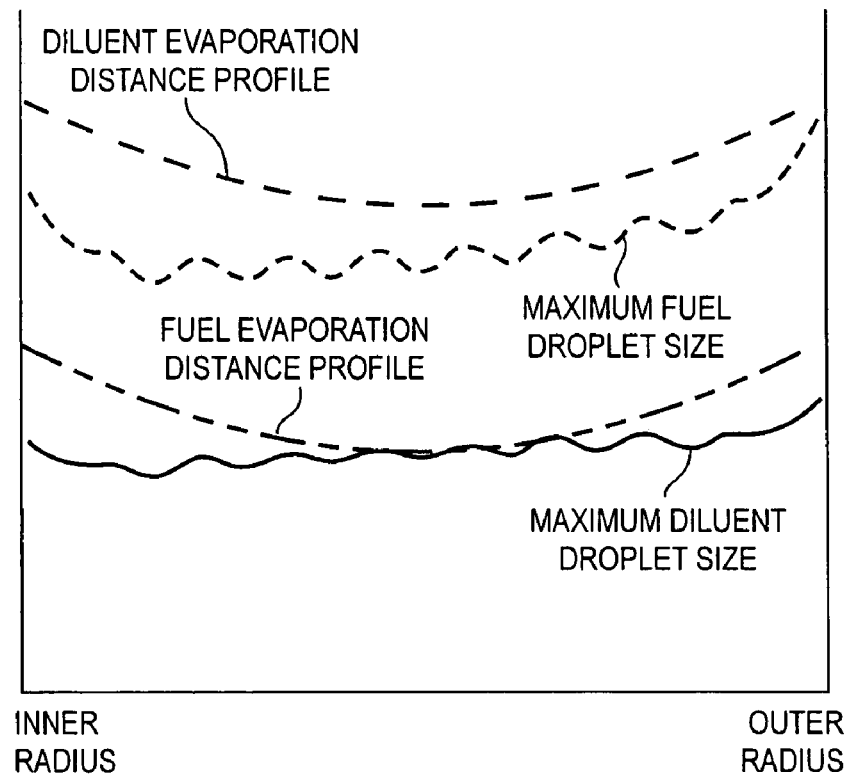
FIG. 26 depicts transverse diluent and fuel evaporation distance distribution constraints with consequent desired drop size transverse distributions.
Figure 27:
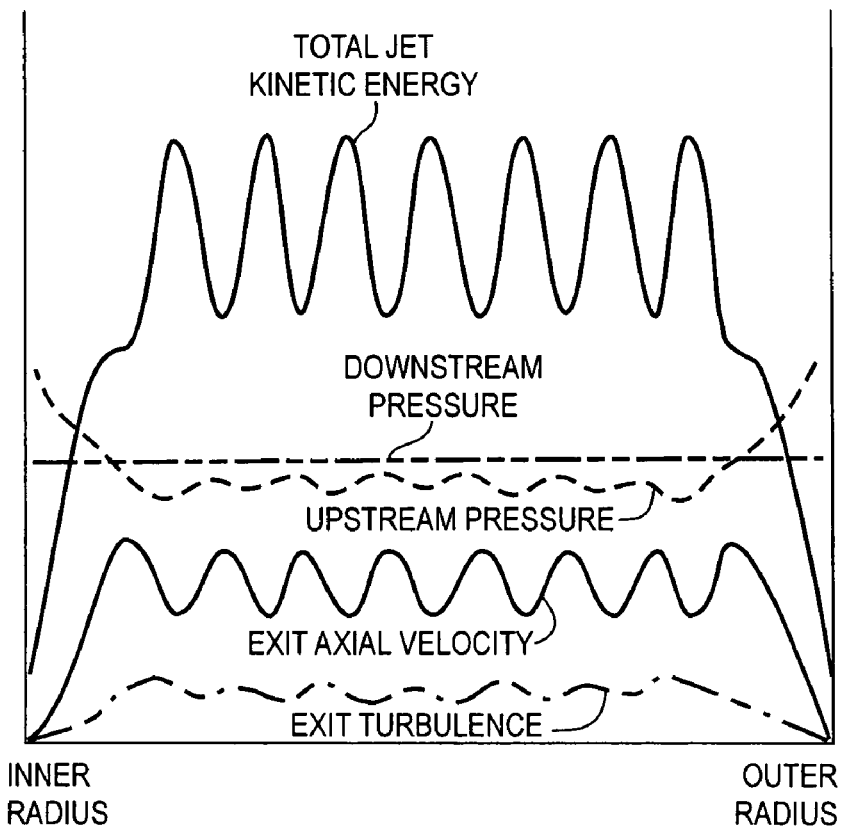

In the configuration shown, the orifices in the diluent tubes may be configured similarly to those shown in FIG. 26 and FIG. 27 of the '191 patent application. In this embodiment, one set of diluent orifices are shown to be configured such that the diluent jets 966 from diluent tubes 14 penetrate across most of the gap G to form a fuel leaner subregion 973 near the next tube 14. Other orifices may be configured so that the diluent jet penetrates to about the middle of the gap G, or more preferably into the third quarter of the space between the tubes.

The fuel and diluent sprays preferably overlap to assist in mixing fuel with diluent while providing fuel richer subregions 972 and fuel leaner subregions 973 as desired.

Thus by configuring orifices and controlling the fluid pressures, users may configure the penetration and orientation of the respective fuel and diluent sprays jets, and form one, two or more fuel richer subregions 972 across the gap. They similarly may form at least one and preferably two or more fuel leaner (diluent richer) subregions 973 across the gap.

The relative combustibility in the respective fuel richer and diluent richer subregions may be adjusted by the relative fuel and diluent flows along with the amount of diluent mixed in with the oxidant containing fluid upstream of these tubes. The fuel richer regions 972 are preferably configured to form combustible mixtures, while the diluent richer regions preferably have greater concentrations of diluent that rapidly mixes in with the combustion or energetic fluid. This method provides a fairly stable flame, rapidly cooling the flame to reduce NOx formation while effectively mixing in the oxidant to achieve high fuel and CO burn off.

Figure 28:
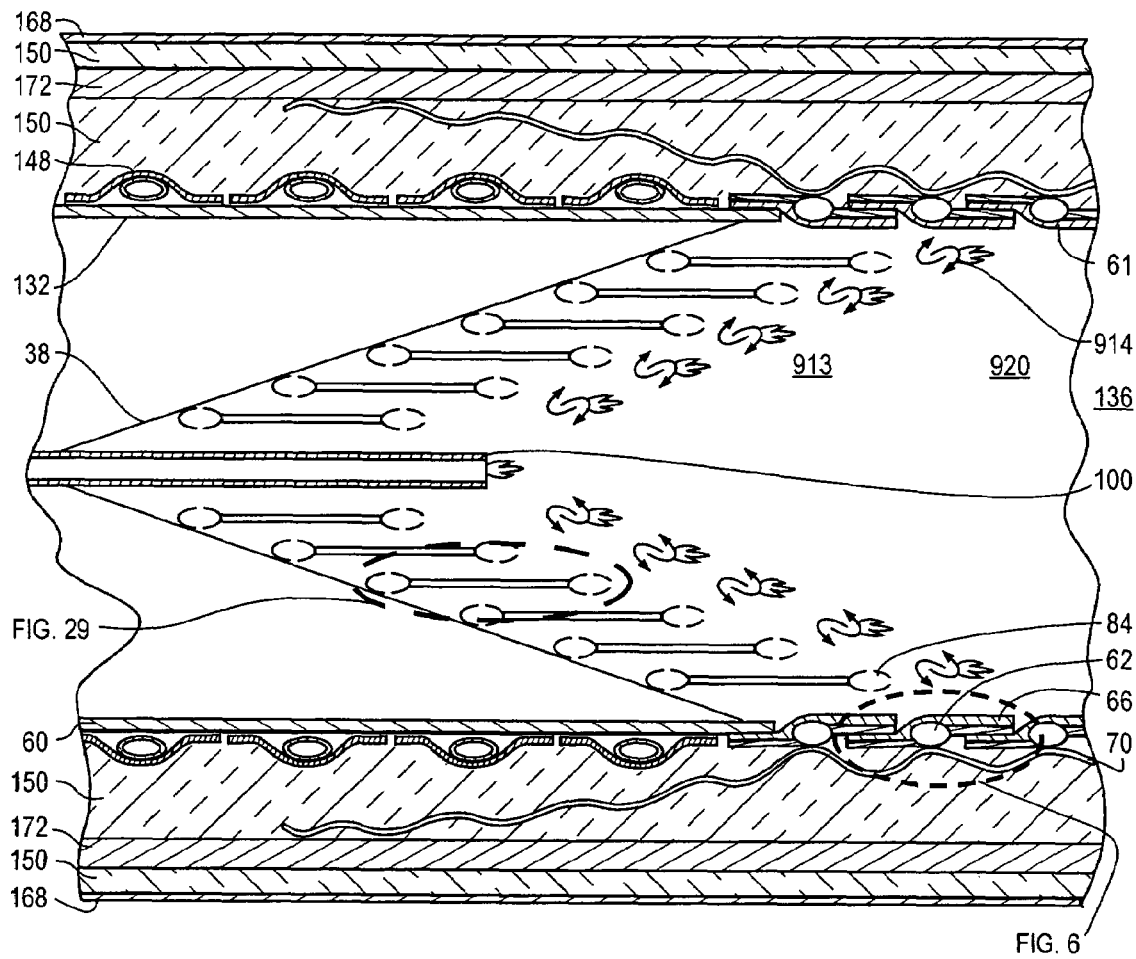
FIG. 28 depicts a "horn" shaped concave trifluid combustor with an inner flame holder, a fuel and diluent contactors, a cooled combustor liner and an insulated pressure vessel.
Figure 29:
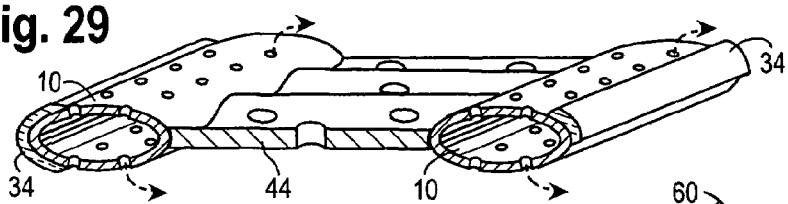
FIG. 29 is a perspective view of two distributed fluid contactor tubes separated by a perforated fluted web-stiffener.

In a similar fashion, users may configure regions 970 using methods similar those forming the orifices and jets shown in FIG. 28 and FIG. 29 of that application, where the jets penetrate a portion of the gap distance.

Mixing Sub-Region Configurations

Figure 13:
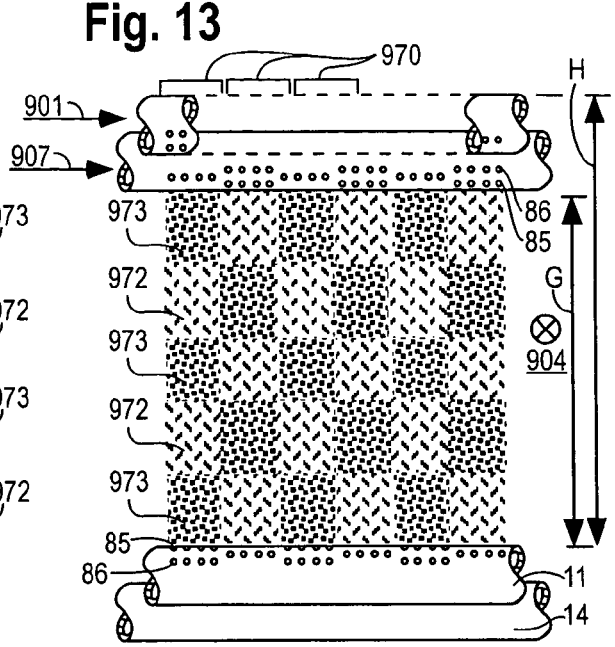
FIG. 13 depicts on the right fuel and diluent jets penetrating a gap between contactors, and on the left the multiple richer and leaner mixture sub-regions formed between them.

With reference to FIG. 13, fluid regions 970 maybe configured into fuel richer subregions 972 and fuel leaner (diluent richer) subregions 973 by configuring fuel jets and diluent jets. E.g., using sets of two, four, or six fuel and diluent jets or other combinations. The fuel richer regions 972 may be bracketed or interspersed with complementary fuel leaner (diluent richer) subregions 973 within the larger regions 970 as described above.

Differing regions 970 may be configured along distribution tubes. These are preferably configured into sets of subregions such that richer subregions 972 are often positioned next to fuel leaner subregions 973 in the direction along the tube axis. This provides effective mixing while providing fuel richer regions to begin combustion interspersed with diluent richer regions alongside that rapidly mix in with the combustion. This helps achieve greater mixing of fuel and diluent within the combustion region while increasing combustion stability by using fuel richer regions 972.

With reference to the left of FIG. 13, for example, users may configure at least one region 970 with fuel leaner subregions 973 in the middle of the gap and near the tubes. These may be configured with fuel richer subregions 972 interspersed about one third and two thirds of the distance across the gap (such as shown in FIG. 12).

Correspondingly, users may configure the orifices on the respective fuel and diluent tubes to form at least another region 970 with complementary locations of fuel richer regions 972 and fuel leaner subregions 973 as shown in the next region 970 to the right in FIG. 13. These may use complementary configurations of radial orifices 85 and angled orifices 86 as schematically depicted about the fuel tubes 11 and diluent tubes 14 as shown in FIG. 13. I.e., the second region 970 shows fuel leaner subregions 972 about one third and two thirds of the distance across the gap and fuel richer subregions 973 in the middle of the gap and near the tubes.

Users may similarly configure regions with more asymmetric concentrations of fuel richer and diluent richer subregions, following the methods taught in the '191 patent application. These methods may be used to provide a temperature gradient across the tube gap as well as along the tubes using the methods described herein.

Joint Wound Fuel and Diluent Distribution Tubes

With reference to FIG. 53, users may provide fuel fluid and diluent fluid passages comprising orifices 80 within a common perforated distribution tube 16. e.g., to form a cylindrical array 265. Users may similarly wind fuel fluid and diluent distribution tubes together or form an equivalent multi-passage distribution tube. In some configurations, the fuel fluid and diluent tubes are wound back to back with gaps G between alternating pairs of tubes. In other configurations, the fuel fluid and diluent distribution tubes are wound together upstream/downstream of each other or vice versa. Gaps G may be provided between each pair of tubes.

Curvilinear Distribution Tubes

Users commonly form fuel fluid and diluent distribution tubes in parallel arcs, circles, helices or similar curvilinear forms. This provides a convenient means of filling the cross section of circular ducts 144, rectangular ducts 145, annular ducts 146, annular section or other curvilinear fluid ducts 130. In such configurations, users preferably orient the fuel fluid and diluent tubes in parallel arrays upstream/downstream of each other as described herein. These curvilinear tubes are preferably connected to one or more radial manifolds 240.

Alternatively users may configure the distribution tubes in a continuous helix or similar space filling array. Users preferably configure each of the fuel fluid and diluent distributed contactor arrays into "horn" configurations 262 and position these upstream/downstream of each other. (See, for example, FIG. 28.) In other configurations, users orient the fuel fluid and diluent tubes parallel and adjacent to each other.

Parallel Linear Orifice Distribution Passage or Contactor Tube Arrays

In some configurations, users configure parallel arrays 260 of fuel fluid and diluent passages with distribution orifices or contactor tubes. They may arrange these in alternating parallel arrays, preferably upstream/downstream of each other. Such configurations are preferable in rectangular fluid ducts 145.

Angled distribution tube arrays

In other configurations, users configure fuel fluid and diluent contactor tubes at an angle to each other. E.g., liquid fuel tubes at right angles and upstream (or downstream) of water distribution tubes. Such perpendicular arrays create vortices in the second array transverse to the first array. This improves downstream mixing compared to parallel arrays.

Narrow Thermal Diluent Fluid Gaps

When premixing a gaseous fuel with an oxidant fluid, there is often danger for flashback from the combustion back to the premix region. Regions between the fuel direct contactors 13 and diluent direct contactors 14 can act as premixing regions that form combustible mixtures of fuel and oxidant. Users may use the narrow gaps G between the diluent fluid tubes to provide a barrier to combustion flashback into this premixing zone. This can significantly reduce the risk of explosion and destruction of the combustor.

Thus, with fuel-oxidant mixtures capable of explosions, users may configure the oxidant fluid flow gaps G between adjacent perforated diluent fluid tubes 14 downstream of the fuel fluid delivery tubes 13, to less than the Maximum Experimental Safe Gap (MESG) for the fuel-oxidant fluid mixture formed. E.g., in configuring the combustor for methane-air combustion, users preferably configure the diluent gaps G between adjacent perforated diluent delivery tubes 14 downstream of methane-air premixing to be less than the accepted MESG for methane—air (i.e., variously reported as being about 1.12 mm depending on boundary conditions.)

Correspondingly, users preferably configure the gap between the diluent distributed contactor 14 and the oxidant fluid duct wall 132 to be less than this MESG. This provides the benefit of the direct contactor providing flame propagation or explosion protection that is provided by separate components in the relevant art. In other embodiments, the tube to tube gap G is adjusted to be less than the MESG corresponding to whatever fuel fluid and oxidant fluid mixture is used.

Where contactor tubes provide marginal heat capacity, users may further reinforce the diluent delivery tubes 14 with thermally conductive strips upstream or downstream of the delivery tubes, and configure the gap between the conductive strips to be less than the respective MESG. To further ensure the effectiveness of this flash-back barrier, users may further require a flow of diluent prior to delivering and mixing fuel with oxidant.

Quick Replacement Mountings

In some configurations, users preferably provide an inner quick replacement mounting 57 on the upstream end of the combustor to readily remove and install one or both of the flame holder 100 and igniter 124. Users preferably further configure an outer quick replacement mounting 58 on the upstream end of combustor 56 to be readily attached and removed with an opening sufficient to conveniently and rapidly remove and replace the distributed contactor arrays 260.

Delivering and Mixing Fuel & Oxidant

Fuel Direct Fluid Contactor

Combustion is a major class of exothermic reactions. With reference to FIG. 28, in some embodiments, the distributed Direct Fluid Contactor system 2 is used to distribute a fluid fuel into an oxidant fluid (oxidant containing fluid.) These methods are used to uniformly distribute a fluid fuel such as liquid or gaseous hydrocarbon fuel or other fluid fuels containing carbon and/or hydrogen. They preferably distribute these fuel fluids into an oxidant fluid such as compressed air, oxygen enriched air, or oxygen, etc.

This method provides relatively small drops with fairly narrow distributions of fuel fluid distributed in a desired distribution across the oxidant fluid. E.g., in a fairly uniform distribution. Alternatively a Direct Fluid Contactor is used to provide numerous uniform micro-jets of fuel fluid distributed across the flow of oxidant fluid within the combustor. These generate micro-vortices, turbulence and/or swirls and break up into fuel fluid droplets with a fairly narrow spatial or size distribution. This distributed contactor method avoids the thermal shock caused by mixing and burning fuel fluids within porous media while achieving comparable or better mixing.

In some embodiments, users preferably use the fuel distribution methods described herein to provide very small substantially mono-disperse drops of fuel fluid and diluent fluid distributed uniformly across the oxidant fluid. Alternatively they use it to provide numerous uniform micro-jets of fuel fluid distributed across the flow of the oxidant fluid within the combustor.

The micro-jets generate micro-swirls and break up into fuel fluid droplets with a narrow spatial or size distribution. This distributed contactor method avoids the thermal shock caused by mixing and burning fuel fluids within porous media while achieving comparable or better mixing, and maintaining sufficient oxidant to oxidize unoxidized or partially oxidized fuel components.

These distributed fluid contactor methods create a much more uniform distribution of fuel fluid in the oxidant fluid than relevant art fuel fluid sprays or gaseous or fuel fluid distributors. This results in a more uniform distribution of oxidant/fuel ratio lambda across the combustor.

Delivering Fuel Fluid through a Distributed Direct Fuel Contactor

Users preferably deliver or inject the fuel fluid (or reactant) through the Direct Fluid Contactor 11 into the combustor and mix it with the oxidant fluid as described herein. Users preferably preheat viscous liquid fuels, to reduce the fuel fluid viscosity. This enables users to deliver the fuel fluid with lower pressures and/or with smaller drops.

When the preheated fuel containing fluid is superheated with respect to at least one of the constituent components, it will rapidly nucleate vapor bubbles on entering the lower pressure oxidant containing fluid. The bubbles within the drops then rapidly expand and shatter ("explode" or "flash") the drop. Similarly, users may deliver liquid fuels containing superheated liquid thermal diluents. Entrained superheated diluent liquid droplets will rapidly nucleate bubbles and expand, shattering the surrounding fuel fluid. This combined method of preheating and distributed delivery creates more controlled and effective mixing of the fuel fluid with oxidant and fluid diluents then by conventional injectors as described above.

Orifice Size with Flashing Superheated Fuel fluid

In configurations where users superheat fuel fluid, bubbles nucleate within the fuel fluid and shatter ("explode" or "flash") the drops into smaller droplets. Users thereby obtain droplets of smaller size than the orifices 80. This permits use of larger orifices 80 than the droplet size achieved. E.g., some embodiments may use orifices 80 about 15 μm to 30 μm in diameter to achieve droplets about 4 μm in diameter or smaller, depending on the degree of superheat of the fluid being distributed.

Preheating Fuel Fluid Without Coking

Users preferably preheat the fuel fluid using a heat exchanger drawing heat from expanded fluid downstream of the expander. E.g., in a "spent" fluid or exhaust gas to improve thermal efficiency in some configurations. In heating hydrocarbons of four carbon chains or longer, users preferably constrain temperatures to outside (less than or greater than) the temperature range that causes significant coking or polymerization. E.g., such as those described in ASTM STP 1138 Edited by Kirkin and David, 1992. Thus, for jet fuel, users preferably constrain fuel fluid temperatures to about less than about 373 K (about 100° C. or about 212° F.) or greater than about 573K, (about 300° C. or about 527° F.)

The fuel fluid is preferably heated through a surface heat exchanger to near this limit. In some configurations, the fuel fluid is preferably superheated to temperatures below where such heating would cause polymerization or coking sufficient to partially or fully block the fuel orifices. I.e., until the fuel fluid reaches a temperature where the vapor pressure of at least some of the fuel fluid is greater than the pressure of at least part of the fluid within the combustor into which it is being delivered.

Users preferably use a hot fluid on the other side of the heat exchanger from the fuel fluid. They preferably control the temperature of the hot fluid to keep the fuel fluid below the pyrolysis, coking or polymerizing temperature to avoid or control fuel fluid polymerization and coking. They preferably control the temperature of the hot fluid to less than the highest temperature tolerable by the fuel fluid plus any temperature drop across the walls of a heat exchanger.

Direct Hot Fluid Heating

In some configurations, users mix hot diluent containing fluid with the fuel fluid using a direct contact heat exchanger. In such configurations, they preferably use one or more direct contactors to intimately mix the hot diluent fluid with the fuel fluid. The fluid with the larger volume is generally delivered through the duct and the smaller volume through the direct contactor. In similar configurations, users use a direct contactor to mix a fluid with a fluidized flow of hot solid particles to heat the fuel fluid, either directly or indirectly.

Flashing Superheated Liquids & Orifice Size

Users may superheat the fuel fluid and/or liquid thermal diluent fluid so that bubbles nucleate within the drops emitted and shatter the drops into much smaller droplets within delivered into the combustor. E.g., preferably with neat fuels such as methanol or ethanol that are not very susceptible to polymerization and coking. In such configurations, users provide larger orifice sizes in distributed contactors than the drop size desired, while achieving small drop sizes by bubble nucleation and drop shattering, compared to liquids that are not superheated.

Distributed Direct Dual Fluid Contactors

In some configurations, users may configure two passages within a direct fluid contactor. For example, they may seek to provide diluent and fuel through adjacent fluid passages.

To reduce risks of fuel availability and fluctuating prices, users preferably use one or more Distributed Direct Contactors 11 to distribute two or more fuel fluids in the combustor. They may provide one or both of liquid or gaseous fuel through one or both passages of a dual fuel contactor 11. e.g., distribute either or both natural gas and diesel fuel.

Joint Direct Dual Fuel Contactor

The fuel discharge area required for gaseous fuels in a gaseous fuel contactor 13 is commonly much larger than the areas of the orifices 80 required in a liquid fuel contactor 12, because of the difference in fluid density, viscosity, oxidant/fuel ratio lambda and discharge coefficient and especially the different injection pressures. To provide sufficient area for the gaseous fuel, users preferably adjust the number and size of orifices 80 so that the ratio of net flow area in the transverse cross section without orifices to the net fuel orifice area is less than the desired or needed volume ratio of oxidant fluid to gaseous fuel.

Using the design principles described herein, users may use the same Distributed Direct Fuel Contactor 11 for both gaseous and liquid fuel. They further provide a separate gaseous fuel contactor. This combination reduces the contactor area needed for the gaseous fuel. They preferably adjust the oxidant to fuel ratio as desired or needed. E.g., generally within the range of 50% to 800% of the stoichiometric ratio lambda, and preferably from about 100% to about 120% of the stoichiometric ratio.

Dual Distributed Direct Fuel Contactors

In some configurations, users provide two fuel distributed direct contactors 11, one gaseous fuel contactor 13, the other a liquid fuel contactor 12. These may use differing sizes of orifices 80. E.g., larger orifices 80 for gaseous fuels and smaller orifices 80 for liquid fuels. The gaseous fuel is preferably ducted to both gaseous fuel contactors 13 and liquid fuel contactors 12 with a variable valve. This reduces the orifice area required for gaseous fuel compared to a separate gaseous fuel contactor 13.

Dual Distributed Fuel Contactor Positions

The gaseous fuel contactor 13 may be located upstream of the liquid fuel contactor 12. This has a benefit of avoiding coating downstream tubes with liquid fuel. The helps increase the gaseous mixing of gaseous and liquid fuels with oxidant fuels, effected by the downstream fuel tubes 12 and by the downstream liquid fuel jets.

However, when using fuel such as methanol, for which polymerization is not a problem, the liquid fuel distribution tubes 12 may advantageously be placed upstream from the gaseous fuel distribution tubes 13. By placing the downstream tubes in an offset position, they could breakup larger liquid fuel drops.

Orifice Size & Spacing for Distributed Direct Dual Fuel Contactor

In some embodiments, users configure a dual passage fluid contactor 16 with two fuel fluid passages 15, one for liquid fuels and the other nominally for gaseous fuels. When liquid fuels are used, a diluent fluid and/or oxidant fluid may be delivered through the nominally gaseous fuel passage. The gaseous fuel passage may be positioned downstream of the liquid fuel passage to help insulate the liquid fuel from combustion heat and possible polymerization or coking. The tube cross-section may be streamlined to reduce drag.

The number and sizes of the orifices 80 for the respective passages in the distributed direct fuel contactor are configured according to the desired pressure ratio, relative differential tube to duct pressures across the orifices, fluid viscosities, specific heat of combustion per unit volume, and corresponding volume flow requirements.

Fuel Contactor Configuration

The velocity of the incoming oxidant fluid typically varies across the combustor. Users preferably measure this intake velocity profile with the distribution contactor arrays in place in the design phase. They then account for this fluid velocity distribution in the design by varying the spatial density of fuel orifices 82 to achieve the desired or needed oxidant/fuel ratio lambda across the combustor fluid duct 130 in some embodiments.

Variations in oxidant fluid position, orientation and velocity affect the relative penetration and downstream entrainment of the fluid micro-jets. Users preferably adjust the position, orientation and size of orifices 80 about the distribution tube to position the average asymptotic location of droplets across the flow from the corresponding microjet. E.g., users orient upstream orifices more transverse to the flow so the micro-jets reach to about the middle of the tube-tube gap G. Orifices further downstream around the distribution tube are oriented closer to the duct axis to position asymptotic droplet trajectories across the transverse fluid flow.

In some configurations, users preferably adjust the orifice 86 orientation or downstream angle more upstream/downstream to increase/decrease transverse momentum component. This varies the degree of fluid penetration into the transverse flow.

In modified configurations, users make larger orifices 80 to increase fluid injection mass and momentum to increase the corresponding penetration into the transverse flowing fluid.

Fuel Differential Pressure

Users preferably adjust the design differential fuel pressure 554 across the distribution fuel fluid (pi-po) such that the most transverse micro-jets reach about midway across the tube-tube gap G at the highest oxidant fluid pressure and flow velocity. Users preferably adjust the minimum differential fuel pressure at the maximum oxidant fluid pressure such that the most downstream or axially oriented microjet clears the fuel tube (before mixing in the downstream turbulence.)

Users preferably adjust the fluid differential pressure across the orifices 80 to compensate for variations in the pressure and/or velocities of the oxidant fluid.

Users preferably provide one or more variable speed electrical or mechanical drives 468 to actuate one or more fluid pumps, and/or actuate the oxidant fluid compressor(s) 407 (or blower 406 or pump) in some embodiments. The oxidant compressor(s) 406 are driven by a expander 440 directly or through a gear train 466 in some configurations.

Users preferably provide at least one motion meter 580 for one or more of the pump, compressor/blower 406, 407, 408, 412, 416 or corresponding rotary actuator 374 to deliver two or more fuel fluid, diluent fluid and oxidant fluids. Eg a high resolution optical rotary encoder 582 may be used for one or both of the fuel pump, and the diluent pump, and a similar high resolution optical rotary encoder 584 for the compressor/blower 406/407. They further preferably provide absolute or differential pressure sensors 554 to monitor pressures across one or more of the compressor 407, expander 440, and recompressor 502 in some embodiments. These components and sensors enable users to precisely control the ratio of the delivery pressure of oxidant fluid to that of fuel fluid, and correspondingly to control the relative flow rates of oxidant fluid and fuel fluid.

Multi-Passage Compound Contactor Tubes

Users may take the multiple tubes shown in FIG. 3, and configure two, three or more passages within the distributed contactor tubes to form one or more multi-passage compound contactor tubes for some embodiments. These multi-passage compound tubes 220 may be used to deliver multiple fluids similar to the methods of configuring the fluids for the multiple fluid contactors shown in FIG. 40 and FIG. 42. These passages may be used as fuel fluid passages 104 and diluent fluid passages 106 for example.

Figure 38:
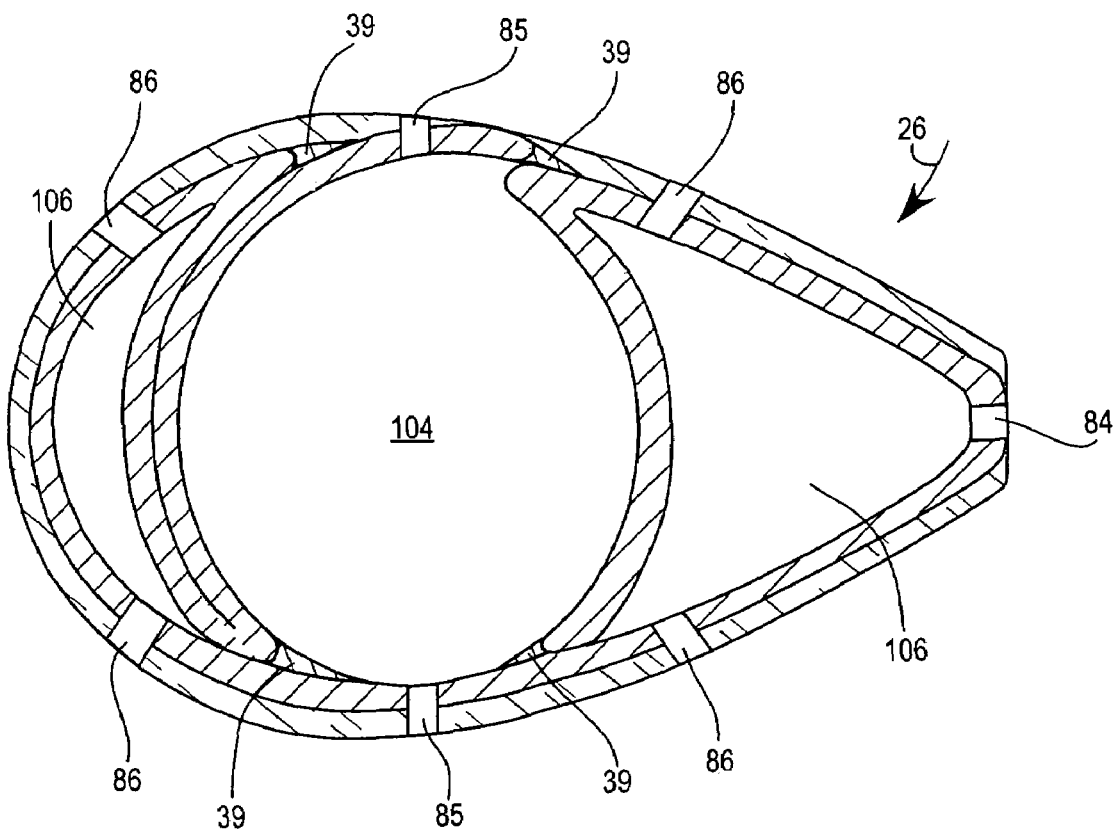
FIG. 38 is a schematic cross-sectional view of an insulated streamlined tri-passage perforated contactor tube with a fuel fluid passage and two adjoining diluent fluid passages.

With further reference to FIG. 38, in some embodiments, users form a multi-passage direct contactor perforated tube 26 with three adjoining fluid passages. These multiple passages are preferably oriented upstream/downstream within a multi-passage contactor tube to reduce drag and the pressure drop in the 2nd oxidant fluid.

A fuel passage 104 is preferably configured near the middle of the multi-passage tube 26. Diluent fluid is preferably delivered through a diluent passage 106 upstream of the fuel passage 104. Similarly, further diluent fluid is preferably delivered through a diluent fluid passage 106 downstream of the fuel passage 104. The upstream diluent fluid passages 106 advantageously protect the fuel fluid from being over heated by hot oxidant fluid flowing around and across the fuel passage 104. Downstream diluent passages 106 preferably protect the fuel fluid in the fuel passage 104 from being overheated by the downstream combustion heat.

Users preferably adjust the number, location and orientation of the fuel fluid orifices and/or diluent orifices as specified herein as needed or desired. These preferably utilize radial orifices 85 oriented to eject fluid about perpendicular to the oxidant fluid flow. Similarly, angled orifices 86 may be configured to eject fluid upstream or downstream at an angle into the oxidant flow. Orifices 84 may be configured to eject fluid generally upstream or downstream into or with the oxidant flow.

The passage cross section to upstream/downstream dimensions are similarly adjusted to achieve the desired streamlining and pressure drop while providing the fluid passage cross sections needed and strength to withstand the fluid drag bending forces etc. The tube wall(s) and the degree of non-circularity of the tube are preferably adjusted to withstand the desired ejection pressures. The tube walls may be protected with a thermal barrier coating 34.

Users preferably connect these multi-passage compound contactor tubes 220 to corresponding multi-passage manifolds 246. In modified embodiments, these adjoining passages are formed by butting or joining tubes together. In some embodiments users provide a cooling diluent passage upstream or downstream of an adjacent fuel tube depending on the degree of cooling desired or needed. (E.g., water coolant passage.) In modified configurations, users provide back to back D tubes or dual passage tubes 16 for fuel fluid and diluent fluid. (See, for example, FIG. 31, FIG. 32, and FIG. 36.)

In modified configurations, users close the fuel passages or tubes at one end of the multi-passage contactor tube 220 or joint tube, and close the diluent passages at the other end of the multi-passage tube 220. The open end of the fuel fluid passage is preferably connected to a fuel manifold 242 while the diluent passage at the other end of the multi-passage contactor tube 220 is connected to a diluent manifold. In other configurations, users connect both fuel fluid and diluent passages to a multi-passage manifold 246 at one or more ends of the multi-passage tube 220.

Figure 39:
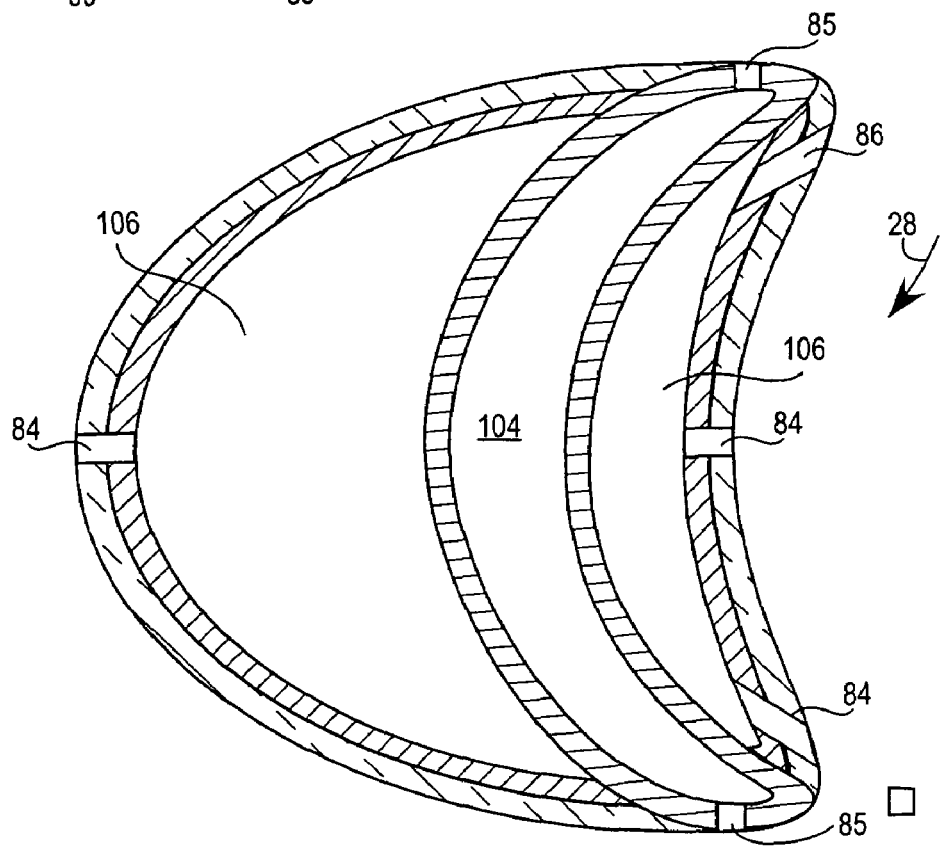
FIG. 39 is a schematic cross-sectional view of an insulated cusped tri-passage perforated contactor tube with a fuel fluid passage and two adjoining diluent fluid passages.

FIG. 39 illustrates an embodiment with triple passage contactor tube 28 formed with curvilinear and perforated contactor ("tube") walls. Diluent passages are provided adjacent to one or both upstream and/or downstream sides of the fuel passage to insulate and protect the fuel fluid from being excessively heated by the hot oxidant fluid and combustion heat. Diluent orifices are provided to deliver diluent near the fuel, and to jet diluent through the nearby flame front.

At least one outer wall may be formed into one or more concave or "crescent moon" shaped "cusps". E.g., the apex may be pointed upstream with two other vertices pointing downstream to form a streamlined shape. This enables fuel to be more easily delivered without wetting the contactor walls and reducing the tendency to "coke".

In this cusped configuration, fuel delivery orifices 86 are preferably formed at an angle to the flow near the outer downstream portion of the fuel passage 15 within the tri-fluid passage contactor tube. This helps keep fuel fluid from "dribbling" down the side of the tube and being heated in ways that might cause coke buildup on downstream surfaces nearer the combustion.

Users correspondingly provide diluent fluid orifices 83 in one or more of the downstream walls of the diluent fluid passage 17. These axially oriented diluent orifices 84 may be oriented more downstream than the transverse contactor axis and predominantly towards the axis of the oxidant fluid flow, and about in line with the duct axis. Axial orifices 84 may be used to deliver the diluent fluid through a downstream flame front where the liquid diluent evaporates within the combusting gases. They further help reduce the possibility for recirculating vortices near the tri-passage contactor tips from carrying fuel fluid back to the downstream side of the tri-passage contactor and forming coke there. The outer downstream diluent orifices 83 may be angled outward.

Users preferably insulate the fuel passage 15 to protect the fuel fluid from heat from the upstream hot air and from downstream combustion heat. This insulation may be provided by coating the fuel passage 15 with a thermal barrier coating 34 except over the orifices 82. This thermal barrier coating 34 may also cover the outer surfaces of the diluent fluid passages 17 except for the diluent orifices 83. The thermal barrier coating 34 may cover the downstream facing surfaces that receive radiation from the combustion and sometimes recirculating hot gas.

In some embodiments, users preferably coat the tubes 10 with the thermal barrier coatings 34 and then laser drill the orifices 32 through both thermal barrier coating 34 and the underlying tube walls 30 into the fluid passages 15, 17. Where users desire or need narrow orifices 82, they preferably form them in a two step process of drilling a larger diameter orifice through the thermal barrier coating (TBC) and part of the wall, forming a thinned wall section 32. Users then laser drill the final fine orifice through the thinned wall 32. In other methods, users form and protect orifices with resist coatings, coat the TBC around the tube, and then remove the resist coatings.

Users particularly apply such thermal barrier coatings 34 to protect at high compression ratios where the incoming oxidant fluid (e.g., compressed air) is heated by compression above the fuel fluid coking or polymerizing temperature. They are also preferably apply such thermal preferred where fluid passages, especially fuel tubes are exposed to the combustion radiation and hot circulating gases.

Users preferably adjust the coolant flows and temperatures to maintain the temperature of the fuel fluid below the temperature range that causes significant coking and/or polymerization in the fuel fluid susceptible to such reactions. I.e., generally for fuel fluids with hydrocarbon chains of four carbons or more. (E.g., less than about about less than about 373 K or about 100° C. or 212° F. or greater than about 573K or 300° C. or 527° F. for jet fuel.) These measures help protect the orifices 80 and tri-passage contactor surfaces from being clogged by coke formation or fuel polymerization. Users preferably maintain the fuel fluid below these temperatures until it is delivered through the orifices.

This "cusped" configuration may be assembled by forming a thin strip into a larger convex arc and a smaller concave arc about the strip axis, folding the two arcs over towards each other, and bonding the facing arc tips to form a fuel distribution passage 15. A second thin strip is preferably formed into an upstream larger concave arc downstream facing with the two arc tips being bonded with bonds 39 to the fuel passage 15 near its tips to form an upstream diluent fluid passage 17. A third thin strip is preferably formed into a downstream smaller concave downstream facing arc and bonded to the downstream side of the fuel passage 15 near its tips with bonds 39 to form a downstream diluent fluid passage 17.

In some configurations, streamlined tri-passage contactors (See, for example, FIG. 38, FIG. 39) may be formed by extrusion, or by solidifying from a melt using a similarly shaped die, or by using similar methods to form the three passages. In other configurations, these contactors are formed by folding thin strip into the requisite shapes similar to methods of forming the shapes shown in FIG. 36, FIG. 37, and FIG. 38. In further modified configurations, users form such configurations using the arc forming and bonding methods such as shown in FIG. 39.

Oxidant Fluid System

In some embodiments, the 2nd reactant containing fluid (e.g., the oxidant containing fluid or oxidant fluid) is preferably delivered through a duct 130 to the distributed contactors 10. In other configurations, the oxidant is drawn through distributed contactors 10 into the duct 130 extending downstream from the distributed contactor. E.g., by positioning distributed contactors across the base of a chimney.

With reference to FIG. 28, users preferably surround the duct 130 and distributed contactor(s) 10 by a pressure vessel 172 in some embodiments. They configure the pressure vessel to sustain the differential pressures needed to deliver and react fluids at substantially higher pressures than the ambient pressure and the differential pressures that are desired or needed across the fluid duct 130. Users preferably deliver the fuel and/or thermal diluent containing fluids into the combustor through pressure vessel via one or more pressure vessel feed-throughs 176 or equivalent passages through a wall of the pressure vessel 172.

Users preferably cool the compressed oxidant fluid, (e.g., hot compressed air) especially at high compression ratios when the temperature is above the fuel polymerizing or coking temperature, in some embodiments. Users preferably use surface heat exchanger intercooler(s) 410, 414 between low pressure compressor(s) 408 and high pressure compressor(s) 412, 416 to cool the hot 2nd fluid with cool diluent fluid. The heated diluent is then preferably delivered to the combustor as described herein.

In some embodiments, users deliver diluent fluid through diluent contactors 14 or nozzles into one or more compressor(s) 407, 408, 412, and/or 416. In further modifications, users use a distributed direct contactor precooler 404 to entrain fluid into the blower/compressor entrance 409 to cool the compressing gases. In such configurations, users preferably use streamlined diluent fluid contactors 14 as described in herein to form the direct contactor precooler 404.

These cooling measures reduce the compression energy below that required for adiabatic compression and closer to iso-thermal compression. (i.e., they provide "quasi-isothermal" compression.)

As needed or desired to further reduce coking or polymerizing problems, the hot compressed oxidant fluid is further cooled by an after cooler 417 in some configurations. The heated diluent is preferably delivered downstream into the combustor.

Diffusers

Figure 14:
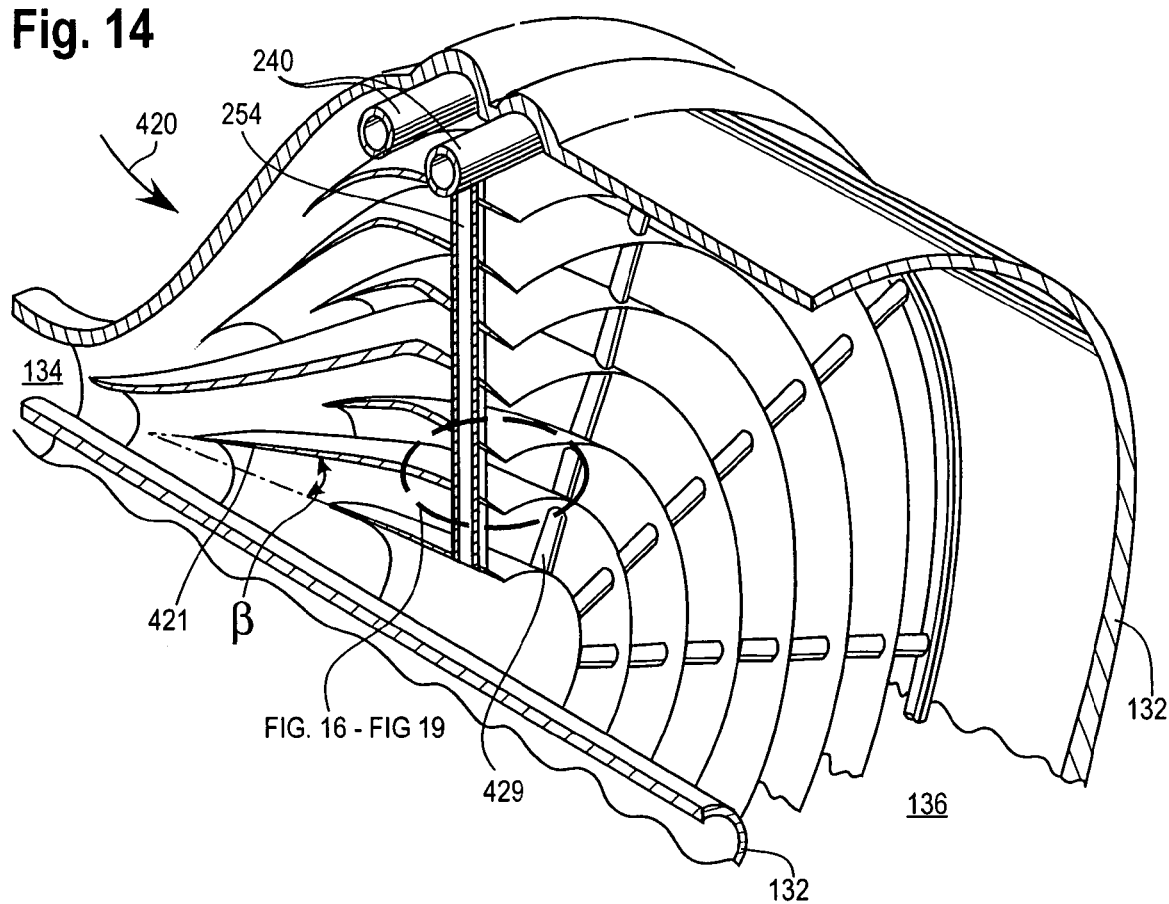
FIG. 14 depicts an annular multi-passage diffuser with multiple fluid manifolds and azimuthal fluid delivery contactors.

Diffusers are used in relevant art to reduce the high fluid speed exiting the oxidant delivery system (e.g., a compressor.) However the relevant art does not effectively utilize the capabilities of diffusers to control the transverse distribution of oxidant fluid axial flows evaluated along a transverse direction. With reference to FIG. 14, a multi-passage diffuser 420 is preferably configured with an inlet 134 receiving the compressed oxidant containing fluid, and the lower speed fluid being delivered out the outlet 136. The diffuser has multiple vanes 421 to more efficiently reduce the velocity. Manifolds 240 are used to deliver fluid such as diluent to the diffuser near the outlet. Diffuser vane supports 429 are provided as needed to support the diffuser vanes relative to the diffuser duct wall 132. Secondary manifolds 254 may further distribute the fluids to the contactor tubes. Detail of the contactor distributors and diffuser vanes are shown in expanded views of FIG. 15, FIG. 16, FIG. 18 and FIG. 19.

As described herein, in some configurations users preferably use a multipassage diffuser 420 with numerous splitter vanes 421 to reduce the spatial variability in the spatial or transverse distribution of the axial velocity of oxidant flows within a combustor. These measures in turn enable users to increase the tolerable mean fluid flow velocity without reaching blowout conditions.

By preferably replacing most excess gaseous thermal diluent (e.g., compressed air) with vaporizable thermal diluent (e.g., water and steam), users achieve a major reduction in the size of the compressor(s) 407. (E.g., about 65% smaller than with lean combustion.) With such reduced oxidant fluid flow configurations, users preferably configure the diffuser 420 between the compressor 407 and combustor 56 to accommodate this major change in oxidant fluid flow. With such smaller flows, diffuser pumping losses correspondingly drop.

With reference to FIG. 14, a large number of diffuser splitter vanes 421 are preferably used to control the oxidant fluid expansion. E.g., Users may provide at least four splitter vanes 421, preferably six or more splitter vanes, and most preferably seven to seventeen splitter vanes. These vanes provide at least five fluid passages, preferably seven or more passages, and most preferably eight to eighteen passages. This significantly improves velocity profiles over common relevant art which commonly uses none to three splitter vanes.

With further reference to FIG. 14, the axial length of the splitter vanes 421 is preferably adjusted to allow for finite vane thickness and boundary formation near the intake. Thus the diffuser inlet may first be split with one vane. Some distance downstream, the two resultant flow passages may then be further split by two more splitter vanes. Then the four diffuser air passages are preferably further split by four more splitter vanes to form eight diffuser fluid passages.

Where more uniform flow distribution is required, these further split to form sixteen passages. Similarly the diffuser inlet may be first split with two diffuser vanes followed by three vanes and six vanes to form twelve passages with eleven splitter vanes.

With reference to FIG. 14, users preferably adjust the vane to vane angle beta $\beta$ between adjacent splitter vanes 421 and the corresponding axial length of the diffuser, to reduce the net present costs of pumping work, capital costs and maintenance costs. They preferably account for skin friction increasing with vane surface area, diffuser or turbulence losses decreasing with reduced vane to vane angle beta, capital costs increasing with the number of vanes and their surface area, and pumping work and cleaning costs increasing with time and the number of vanes as vanes foul with operation.

Users preferably select vane to vane angle beta near the region of minimum pumping work. They preferably configure the vane to vane angle beta a little higher than the angle of minimum pumping work to account for higher capital and maintenance costs of additional vanes. Correspondingly the vane to vane angle beta is preferably configured to be less than the angle for minimum capital costs.

The angle is preferably adjusted to reduce the net present value of capital costs of increased number of vanes against the fluid pumping costs from diffuser expansion turbulence losses and skin friction losses. For example, the included splitter vane to vane angle is generally configured in the range of about four to sixteen degrees, preferably within the range of about six to thirteen degrees, and most preferably in the range of about eight to ten degrees.

Users preferably evaluate the variation in the mass flow distributions transverse to the intake of the inlet of the diffuser. E.g., with reference to FIG. 22, the velocity and mass flow of compressed gas exiting an axial compressor has a strongly varying transverse velocity profile in the radial direction. This is similar to an inverted skewed parabola with lower velocities near the hub and the outer wall and peak velocities near the middle, but more than half way out. With the centripetal fluid acceleration, there is a corresponding transverse pressure profile in the radial direction increasing towards the outside. Cooling near the walls and hub also results in a similar transverse temperature profile in the radial direction that is lower at the edges than near the middle.

Users may combine these pressure and temperature transverse distributions to calculate a radial fluid density profile at a given axial location such as the exit. (Or they use mean values and respective profiles). They may combine this transverse density profile with the transverse velocity profile to obtain a transverse mass flow profile in the radial direction. They may then take and integrate the radial mass flow profile, to obtain a cumulative transverse mass flow distribution from hub to outer wall.

With reference to FIG. 14, users preferably configure the transverse distribution of the outlet versus inlet of the diffuser fluid passages to approach a desirable spatial oxidant fluid flow distribution. E.g., the transverse or radial mass flow distribution in a annular combustor.

With further reference to FIG. 14, for example, users generally desire to configure fairly uniform mass flow per unit area transverse to the combustor axis. To facilitate design of direct contactors and orifice distributions, users preferably configure the outlets of the splitter vanes to have fairly uniform spacing transverse to the flow. E.g., With fairly uniform radial spacing in annular diffusers.

They preferably adjust the respective vane to vane spacing and area of the splitter vane 421 spacing at the upstream end of the respective diffuser splitter vanes relative to the spacing and area at the vane exits to accept appropriate fluid flows to deliver about uniform mass flows per unit area at the vane exits. E.g., they take the cumulative mass flow distribution and divide it into about equal mass flow increments. From those mass flow divisions, they obtain the radial spacings and positions with which to position the inlet ends of the respective splitter vanes 421.

Users further desire to control the spatial mass flow distribution and velocity distributions exiting the combustor. E.g., as desired for a turbine inlet flow. Generally users desire a fairly uniform mass flow distribution and velocity distribution. However the combustor wall, between the exit of the splitter vanes and the entrance to the downstream utilization device, provides a drag that forms a boundary layer and substantially reduces the flow along the wall.

To compensate for this drag, in some configurations users increase the vane to vane inlet spacings next to the outer and inner diffuser walls relative to the other inlet vane to vane spacings nearer the middle of the duct. This increases the velocity near the walls relative to the middle of the annular combustor chamber. However by the time the flow reaches the combustor exit, this velocity increase is damped down by the wall, leaving a more uniform velocity profile across the combustor than would otherwise be obtained.

Figure 22:
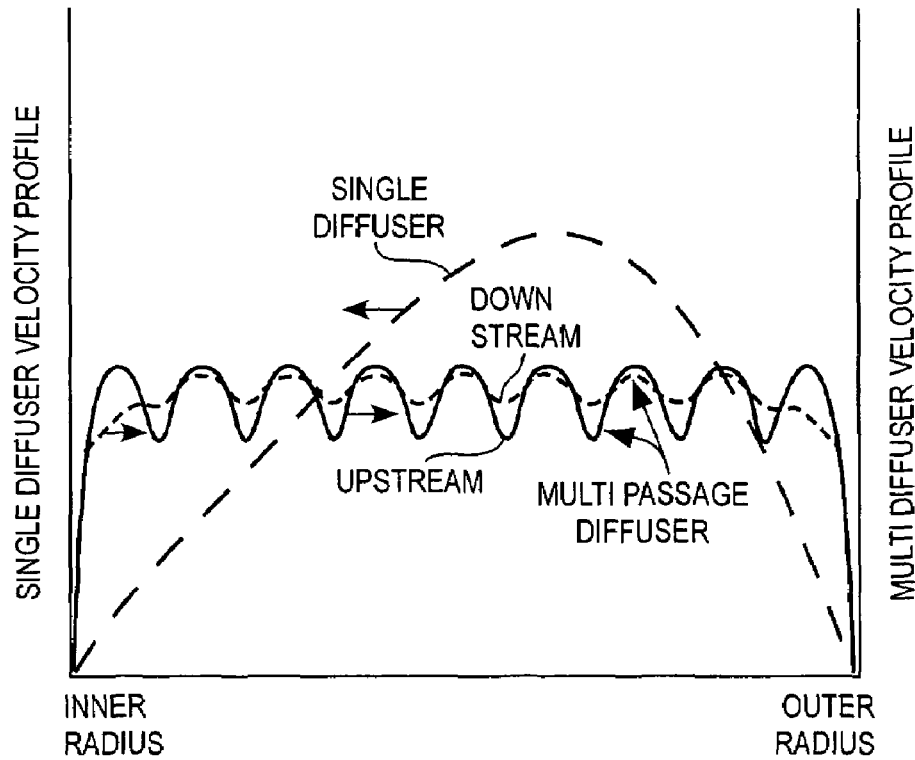
FIG. 22 schematically depicts typical velocity profiles from an annular single passage diffuser and a multi passage diffuser upstream near the diffuser exit and further downstream.

With reference to FIG. 22, the multi passage diffuser provides variations in the velocity profile across the exit of the diffuser with maximums corresponding to the middle of the diffuser passages and minimums corresponding to the ends of the splitter vanes 421. These "Upstream" velocity variations are substantially smaller than the diffuser velocity profile for a single diffuser without the diffuser splitter vanes 421.

To further smooth the velocity profile, users preferably provide a mixing region between the diffuser vanes and the combustion region where the velocity fluctuations can settle down. Turbulence in the gas provides exponential velocity damping with distance. Users may select the distance between the splitter vanes 421 and the downstream fuel and diluent distribution contactor tubes to achieve the desired degree of damping in the transverse velocity profile(s). As shown by the "downstream multi-passage diffuser" curve in FIG. 22, this combination of many diffuser vanes with a settling distance provides smaller fluctuations than the "upstream" velocity profile, and much more uniform fluid velocity than a conventional flow exiting a diffuser without vanes.

By such measures, users preferably adjust one or more spatial distributions of flow rates of the energetic fluid exiting the combustor. This provides flow rate distribution profile substantially closer to one or more transverse distribution profiles desired by utilization device designers. E.g., turbine inlet pattern factors and pattern profiles. For instance, these configurations can provide substantially more uniform pressure and velocity distributions radially across the combustor duct compared to the relevant art. These factors in turn substantially improve the mechanical efficiency of work extraction by downstream expanders such as turbines.

In some configurations, users may configure the transverse fluid distributions in the circumferential direction. Generally a uniform circumferential fluid flow distribution is desired. However this can be adjusted as desired or needed for special applications.

Flow & Composition Distribution Profiles

In various configurations, users preferably configure the orifices in one or more direct contactors to deliver fluid with a desired delivery profile in relation to one or more fluid flows. These are adjusted to provide one or more desired composition profiles, or temperature profiles. More preferably, users configure two or more fuel fluid delivery tubes to provide multi-fuel capabilities. See, for example FIG. 3. With such embodiments, the orifice diameters, orientation and spacing, and the tube to tube spacing are configured to provide the desired spatial fuel delivery distribution in one or more directions for each of the fuels, and to provide desired spatial distributions of the oxidant/fuel ratios.

Diluent Delivery into Oxidant Fluid

In some reactor systems, more heat can be recovered by heating liquid diluent from downstream energetic fluid flows than can be recovered by just vaporizing diluent such as by boiling water. Thus in some configurations, users preferably provide one or both of heated liquid diluent and saturated or superheated diluent vapor into the oxidant containing fluid flow to form a diluted oxidant fluid. E.g., by delivering both hot water and steam to mix with compressed air. By preferably combining distributed diluent delivery with multi-passage diffusers, users achieve a large number of regions where diluent containing fluid can be mixed with oxidant containing fluid in a highly controlled manner. These can be configured to achieve desired spatial distributions of diluent containing fludi and oxidant containing fluid.

Users often desire to deliver an evaporated liquid as diluent, and preferably a superheated vapor. E.g., evaporated water and preferably superheated steam may be available as diluent fluid, such as formed with a heat recovery steam generator extracting heat from the expanded fluid downstream of an expander. With reference to FIG. 14, users preferably introduce the diluent vapor near the outlet of the diffuser through arrays of contactor tubes 10. This configuration provides the benefit of increasing the heat available to evaporate liquid diluent and liquid fuel and more time for the diluent and oxidant to premix. They also preferably distribute and mix a substantial portion of the desired diluent upstream near the diffuser. This provides more time for liquid diluent to evaporate and mix with the oxidant fluid. Some fuel may also be provided near the diffuser outlet, within constraints of flashback or control of flashback through downstream components.

Figure 15:
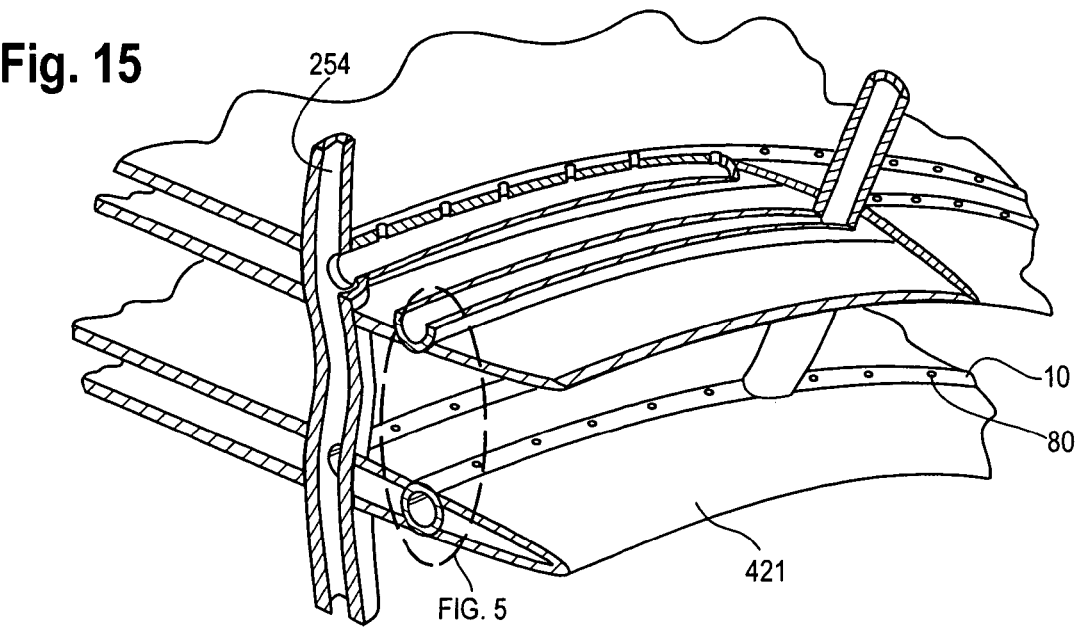
FIG. 15 is an expanded cutaway view of azimuthal perforated fluid contactors within diffuser vanes and sub-manifolds near the diffuser outlet.

With reference to FIG. 15, users preferably deliver these heated diluent liquid and vapor flows through direct contactors located near the downstream end of the diffuser. They preferably provide an evaporation and/or mixing region downstream of this diluent delivery region. This may be sized with sufficient residence time so that a desired portion of the liquid diluent evaporates and mixes with the oxident fluid before reaching the fuel delivery section. Liquid diluent is preferably delivered through transverse orifices 80 about perforated distribution tubes 10 downstream of superheated diluent orifices 80 delivered through similar perforated distribution tubes 10 to improve mixing of the diluent vapor with the oxidant containing fluid.

In FIG. 15, the contactor tubes 10 are shown within the diffuser vanes near the downstream end of the diffuser. For example users deliver saturated or superheated steam 907 through distributed contactor downstream of the diffuser followed by a hot water distributed contactor and then a mixing/evaporation region. Referring to FIG. 18, these distribution tubes 10 may also be aligned with the downstream end of the diffuser splitter vanes 421. Here the vanes may be configured to about the same transverse width as the diameter of the diffuser tubes and be butt connected to the tubes. The orifices 80 are preferably oriented perpendicular to the transverse oxidant fluid flow.

In other configurations, with reference to FIG. 16, users preferably configure the diluent contactor tubes 10 to run about perpendicular to the diffuser vanes near the diffuser exit. Here contactor tubes 10 also provide a support function for the diffuser vanes 421 (similar to the diffuser support ribs 429 in FIG. 14.) The contactor tubes 10 may be convoluted to better accommodate thermal expansion.

With reference to FIG. 19, the contactor tubes 10 may be configured downstream of and perpendicular to the diffuser vanes 421 near the diffuser outlet. The contactor orifices 80 may now be configured perpendicular the contactor tubes 10 as well as oriented transverse to the oxidant fluid flow. This provides the greatest resolution for varying the net spatial density of orifices per cross sectional flow area.

With reference to FIG. 16, and FIG. 19, contactor tubes 10 may be configured perpendicular to the diffuser vanes 421 near the downstream end of the vanes. In such configurations, users obtain higher resolution in delivering diluent fluid (or fuel fluid) relative to the variations in oxidant fluid flow rate, than when the contactor tubes are oriented parallel to the diffuser vanes (as in FIG. 15 and FIG. 18).

With reference to FIG. 16 users may provide diluent contactors transverse to the diffuser vanes upstream of the diffuser vane end. Similarly, with reference to FIG. 19, they may provide radial contactor tubes 10 downstream of and perpendicular to the end of the splitter vane 421.

For example, they configure the diluent delivery rate in proportion to the oxidant mass flow profile transverse to the diffluser exit vanes. By delivering diluent in proportion to the mass flow rate, users preferably provide much tighter control over the transverse profile of the composition of the diluted oxidant. E.g., the total excess diluent/oxidant transverse distribution. This improves control over the temperature uniformity in the downstream combustion and in the energetic fluid. The diluent injection also helps moderate the transverse velocity profile fluctuations.

Conversely, the transverse sprays and drag from the diluent fluid delivered through contactors parallel to the diffuser vanes (as in FIG. 15 and FIG. 18) reduce the transverse oxidant fluid velocity profile perturbations downstream of the diffuser passages more effectively than when the contactors are perpendicular to the diffuser vanes 421. As needed or desired, the microswirlers described herein may further be configured about the contactor tubes near the diffuser exit, or be positioned along the diffuser vane exits to assist in further moderating the velocity fluctuations. Users expect such measures to provide substantially lower perturbations in the transverse velocity profile across the combustor at less cost and in a more compact configuration than with conventional diffusers.

Similarly users preferably evaluate the oxidant mass flow delivery profiles transverse to the combustor near where one or more fuel fluids are being delivered. They correspondingly configure the fuel fluid contactor delivery orifices to achieve a desired fuel fluid delivery profile to achieve one or more desired oxidant to fuel distribution profiles across the combustor. For example, users commonly desire to achieve an oxidant to fuel ratio within a desired range of relative oxidant to fuel ratios lambda.

Accordingly, users seek to configure the fuel fluid delivery profile delivered through the fuel contactors to achieve the desired oxidant to fuel ratio profile within a desired range of an upper oxidant to fuel profile and a lower oxidant to fuel profile. E.g., they may control the local oxidant to fuel ratio lambda between 1.0 and 2.0, more preferably between 1.01 and 1.49, and most preferably between 1.02 and 1.24. Consequently the mean lambda values may be controlled in the range about 1.0 to 1.5, more preferably between 1.01 and 1.24, and most preferably between the range 1.01 and 1.12.

Users further preferably configure one or more diluent delivery profiles through one or more diluent delivery contactors to achieve a desired diluent to fuel profile. They preferably adjust this desired diluent to fuel profile to achieve a correspondingly desired temperature profile across the combustor. Correspondingly users more preferably arrive at a desired upper temperature profile and a desired lower temperature profile. They then configure and control one or more diluent delivery contactors to deliver diluent with an enthalpy and temperature relative to the existing diluent enthalpy and fluid temperature to modify the temperature profile as desired. They preferably control the delivery profile and the diluent flow rates to achieve one or more diluent to fuel ratio profiles and/or equivalent temperature profiles within the desired upper and lower temperature profiles or upper and lower diluent to fuel fluid profiles.

In some configurations, users consider one or more desired temperature distribution profiles in the energetic fluid near and transverse to the combustor exit. They then evaluate one or more upstream temperature profiles to achieve those desired downstream temperature profiles. They preferably account for one or more of turbulence, diffusive mixing, combustion, nozzle contraction, wall drag, wall cooling, and radiation within the combustor in evaluating these transformation in temperature profiles. Similarly they may use experimental methods to arrive at the desired transformations.

Maximum Flow Control

Compressors 407 and expanders 440 (e.g., turbines), have a maximum back pressure and speed for a given fluid composition beyond which the system surges, and/or becomes unstable, and the compressor can self destruct. In some embodiments, users preferably select safety margins as desired and establish safe operating bounds on flow rates for the range of mixtures and combination of pressures anticipated. In conventional systems, the flow of oxidant fluid (E.g., air) forms this upper limit.

However, in some embodiments of the VAST thermodynamic cycle, the oxidant flow is preferably much lower than the flow of oxygen containing fluid in conventional turbines with very lean combustion. VAST cycles preferably use oxidant fluid flows at least 35% lower and preferably 65% lower than conventional oxidant fluid flows of power systems where high temperature combustors and turbines operate near the lean combustion limit to control emissions and/or hot section temperatures. (E.g., the compressor power in a VAST cycle is about 35% of the gross turbine power or lower, compared to 65% for conventional turbines, with cooled blades operating at about 1290° C. to about 1525° C.)

When providing gaseous oxidant without the associated gaseous thermal diluent, an oxygen VAST cycle cooled by liquid thermal diluent requires a small compressor sized at about only 7% of the compressor(s) used in conventional lean combustion power systems using compressed air. When delivering liquid oxygen to the combustion or reaction system, users provide a correspondingly smaller liquid pump.

For lower temperature turbines 444, the VAST thermodynamic cycle requires a much small fraction of compressed air compared to conventional simple cycle or recuperated Brayton cycle systems operating with uncooled blades. E.g using water as diluent with only about 15% of the compressed air flow required by conventional systems which use about 667% excess air to cool the energetic fluid in microturbines 444 to operate with uncooled blades at about 950° C.

Accordingly, users preferably establish the operating limits on thermal diluent flow rates (E.g., water) for such fuel fluid and oxidant flow rates to keep pressure within the combustor to within the compressor surge boundaries above which pressure would cause the oxidant compressor to go into surge. More preferably they control the delivery of liquid diluent and liquid fuel to control the reactor pressure and temperature. This has the benefit of faster pressure control.

Equivalently, users preferably form operating regions for the combination of compressor surge boundaries and desired turbine temperature for thermal diluent and fuel fluid flow rates and oxidant/fuel ratios as a function of combustor operating pressures and energetic fluid temperatures adjusted for intake humidity. Preferably, users control both the diluent and the fuel to control both the reactor pressure to within the compressor surge boundaries and to control the temperature of the energetic fluid to a specified temperature or to within a specified temperature range. Preferably, they control the delivery of at least a portion of diluent and fluid fuel as liquid diluent and liquid fuel to rapidly control the reactor pressure and the temperature of the energetic fluid.

More preferably, they control the fuel and diluent together to control the temperature of the energetic fluid fairly uniformly while controlling the reactor pressure to below the compressor surge limits. This reduces thermal fatigue while controlling compressor surge. Users preferably use distributed contactors to control the distribution of fuel and diluent to control the spatial distributions of the reactor pressure and the temperature of the energetic fluid in at least one transverse direction.

Broad Turndown with Staged Fluid Delivery to Combustor Arrays

To increase effective turndown ratios, users preferably combine fluid distribution arrays each of which has a moderate turndown ratio. For example, with reference to FIG. 9, users preferably provide multiple sets of fuel distribution contactor tubes (e.g., 12 and 13) and diluent distribution contactor perforated tubes 14. These sets of fuel fluid and/or diluent contactor arrays are preferably scaled and actuated in sequence to provide greater turndown ratios. They may also provide shutoff valves to each orifice array set to further increase the overall effective turndown ratios. The arrays are preferably aligned axially with each other. This helps reduce drag on the oxidant fluid flow across the arrays.

Figure 9:
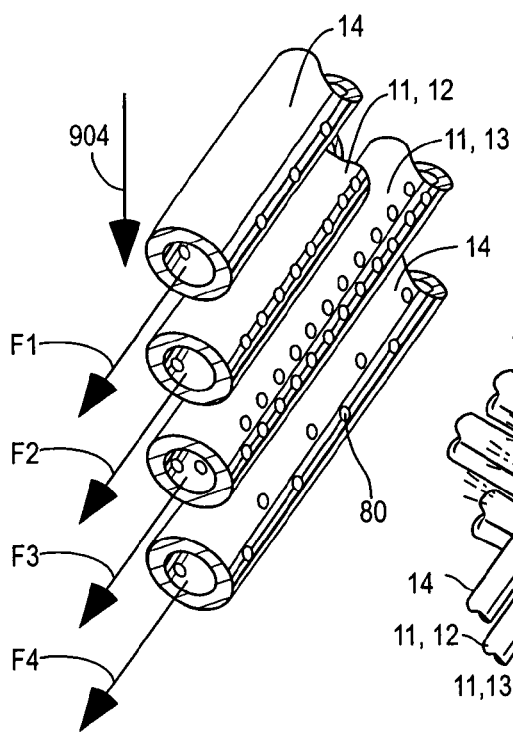
FIG. 9 is an expanded view of multiple differing radial fluid delivery contactors.

With reference to FIG. 9, in a similar fashion to the bank of aligned distribution tubes shown (e.g., 12, 13, and 14), users may provide two or more distribution tubes for one or both of fuel and diluent to provide capability for increasing the turndown ratio. In doing so, they preferably configure the net orifice areas per each set of distribution tubes in about the cumulative product of the turn down ratio for each set. Users preferably provide separate fuel fluid and diluent pumps to each set of diluent and fuel fluid distribution tubes to provide full ratio of control over each set. In modified configurations, users provide flow control valves 230 to one or more sets. E.g., needle valves. Alternatively users provide on/off control valves to one or more sets.

For example, with a five fold turndown ratio on each orifice array (distribution tube) set, users preferably configure the second orifice array set as about five times the orifice area of the first set. E.g., the equivalent of tube 12 vs tube 13. When coupled with a shutoff valve on the larger array, this combination will give a combined flow turndown ratio of twenty five. Using the first set, the second set or both sets together provides a ratio of twenty six to one. These ranges may be adjusted to provide some overlap between set and flow range combinations.

Flow ratio typically goes as the square root of the pressure ratio. By using two tube sets with an area ratio of 5:1, and a five to one turn down ratio in flow, users achieve at least about a 25:1 overall turn down ratio in flow. I.e., from 4% to 100% of design flow. They do so while maintaining about a 25:1 range of excess differential pressure across the orifices in each tube set compared to a 625:1 pressure range that would otherwise be required without combining multiple ranges.

For example, with combustors operating at about 40 times atmospheric pressure ratio, users may use an excess (gauge) fluid pressure range of about 25. They may select a 25 fold fluid delivery differential pressure range from about 4 bar gauge to about 100 bar gauge to achieve about a 5 to 1 turn down ratio in flow in each set. (i.e., about 44 bar to about 140 bar absolute or about 647 psi to about 2,058 psi absolute). In some variations, users reduce the lower differential fluid pressure in each set to within the absolute pressure of the combustor Pc plus the pressure required to overcome the liquid surface tension in each orifice. This provides the further benefit of a fluid shutoff phenomena without requiring a separate shutoff valve. E.g., when using liquid diluent such as water with small orifices.

As desired or needed, users may extend the differential fluid delivery pressures to those typical of conventional high pressure diesel injection systems to further extend the turndown ratio. (E.g., to about 2,600 bar or 39,000 psi).

Users preferably adjust these parameters between the diluent contactor tubes 14 and fuel fluid contactor tubes 11 accounting for the relative fluid densities and flow rates, relative surface tension, viscosities, temperatures, heat capacities, and the liquid latent heats of the respective fluids to achieve the desired spray penetration, drop sizes, evaporation rates and emissions etc.

Figure 8:
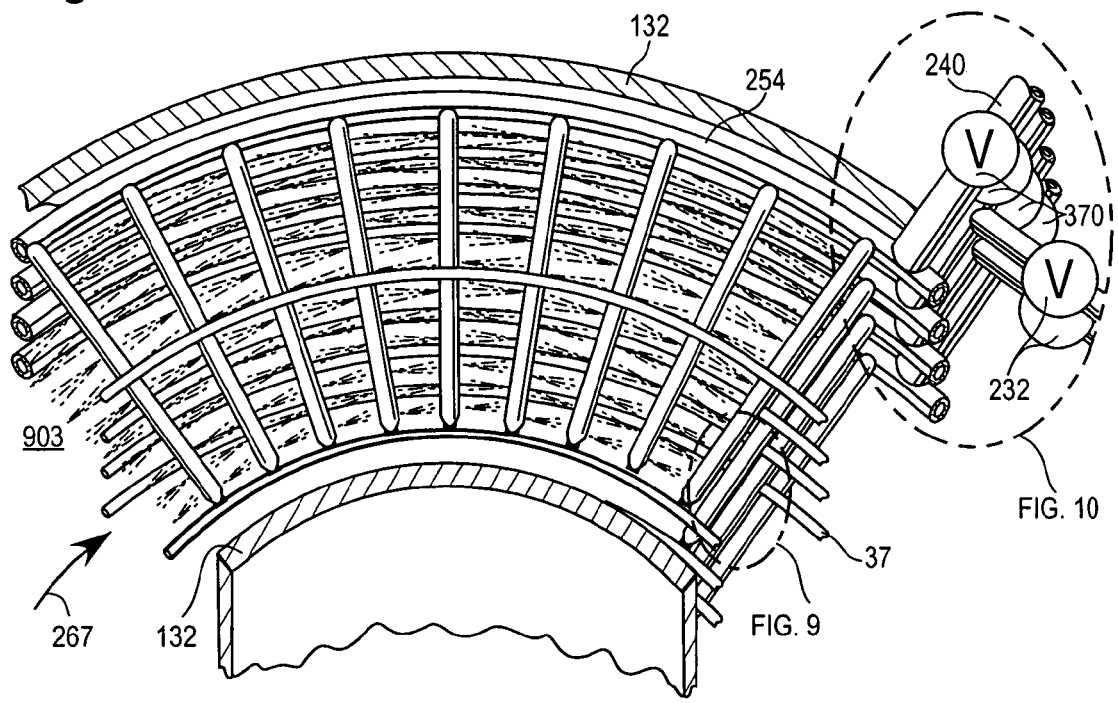
FIG. 8 depicts an annular combustor with multiple radial fuel and diluent contactors within an annular duct with purge ducts and valves.
Figure 60:
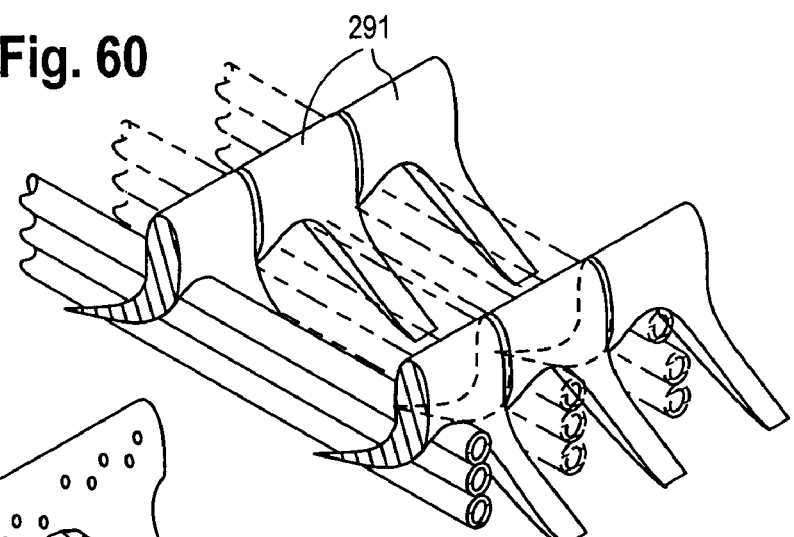
FIG. 60 is a conceptual perspective view of aligned "striding" "Saddle" micro-swirlers distributed across multiple fluid contactors.
Figure 61:
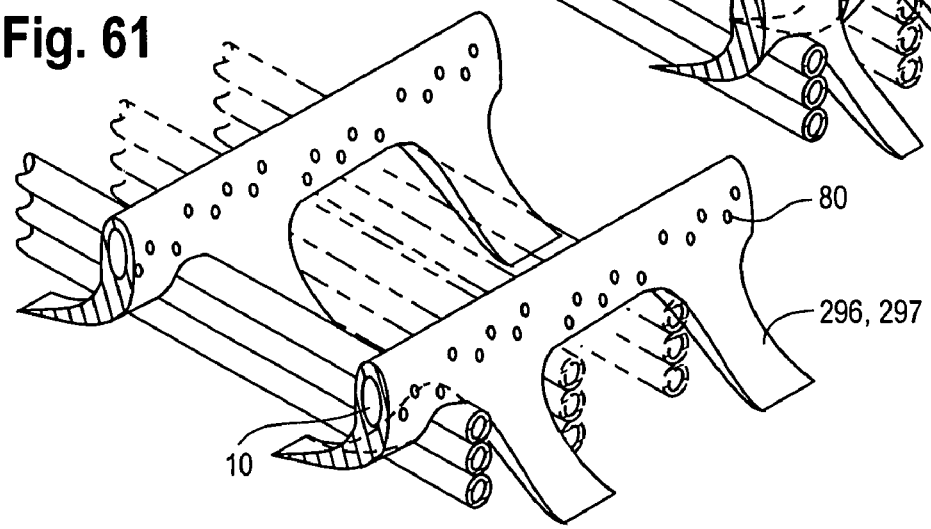
FIG. 61 is a perspective view of alternating micro-swirlers about perforated tubes distributed across multiple fluid contactors.

With reference to FIG. 60 in the '191 patent application, users may arrange direct contactor arrays in a radial orientation and align them axially within an annular combustor duct. They may configure contactor arrays which include manifolds 240, valves 370, sub-manifolds 254 and contactor tubes. With reference to FIG. 8 in the present application, together with FIG. 60 in the '191 patent. application, users may combine these configurations and assemble multiple sets of contactor arrays with separate valves to deliver one or more fuel containing fluids and one or more diluent containing fluids. Such fuel and diluent contactor tubes are preferably aligned parallel to the fluid duct axis to minimize drag.

Users may use multiple sets of fuel contactor tubes, and diluent contactor tubes connected to corresponding sub-manifolds and shutoff valves. For example these contactor array sets may be adjusted to about a binary range with some overlap. E.g., nominally in a ratio of 1 to 2 to 4 or a combination of 1:1:2:4 to give a seven or eight fold turndown ratio with digital control for either or both of the fuel and diluent. These in turn are connected to circumferential manifolds around one or both of the outer circumference near the outer wall or inner wall of the annular combustion chamber. The radial contactors are preferably connected in an interleaved format. E.g., every second contactor for the largest array, every fourth one for the second largest, and every eighth for the two smallest arrays.

With a constant flow of oxygen containing fluid across such an array, such a configuration of arrays may form combustible mixtures near the respective fuel and diluent radial contactors. With these methods, users may achieve turn down ratios exceeding 3:1, such as 4:1, 6:1, 7:1 or 8:1.

Such multiple turn down ranges may be combined with the analog ranges described to provide even greater flexibility and range in controlling the fuel and/or diluent or in providing multi-fuel capabilities.

In some configurations, users preferably provide similar turndown ranges for the flame holder. They correspondingly preferably adjust the design the diluent and fuel fluid flows through the flame holder in about similar proportion to the larger and smaller diluent-fuel distribution tube sets.

For example, with the previous example, users preferably size the flame holder design flows as 5 times smaller than those of the smallest diluent-fuel tube area set. Such combinations of two diluent-fuel sets with a flame holder in ratio of about 125:25:5 where each has about a 5:1 turn down flow ratio, provide an overall flow turn down ratio of about 125 to 1. This is accomplished while controlling the pressure ratio in each component over ranges of only about 25:1 (compared to a pressure ratio of 15625 nominally require for just pressure control through one set of contactors.)

Where users desire or need greater control over oxidant flow, they preferably configure the oxidant delivery system to more effectively control the flow of oxidant containing fluid. As with fuel fluid and diluent distribution, users preferably provide multiple blowers 406 or compressors 407 of different sizes to increase the turn down ratio and improve control. They preferably use positive displacement compressors 407 that provide a wide linear range for at least one of the compressors 407. For example they may use a screw compressor such as have a fairly linear range to below 10% of full scale. This is preferably used to provide faster high resolution in conjunction with another larger compressor in the range of three to twenty times larger.

With such measures, users preferably provide generally uniform oxidant/fuel and diluent/fuel ratios across the combustor across wide turndown ranges.

Users preferably configure the combustor into multiple segments with multiple sets of diluent tubes and fuel fluid tubes in some configurations. Users preferably form circumferential ("pie shaped") segments. In modified configurations users provide radially increasing segments.

For example, users provide annular combustors 56 configured into multiple circumferential segments. In the above example, users set up the smaller and larger area sets in a angular ratios of about 5:1. This provides uniform temperatures and flows radially across the combustor exit 136 while varying the portion of flow in the circumferential direction.

With reference to FIG. 4 and FIG. 14, users may configure a multi-passage diffuser to have ducts providing oxidant containing fluid in relation to the segmented diluent-fuel tube sets. With reference to FIG. 8, these diffuser passages may be configured into segmented ducts for the oxidant fluids to change the oxidant flows to correspond with the segmented diluent-fuel tube sets. As needed, these segmented ducts may be configured with one or more valves to assist in controlling the combustion and oxidant flow turndown.

With reference to FIG. 8, and to the '191 patent FIG. 60, in some configurations, users intersperse diluent tubes and fuel fluid tubes from smaller sets amongst the diluent and fuel fluid tubes of one or more larger sets. E.g., for about a 5:1 ratio of segment areas in an annular segment combustor, users provide one middle fuel fluid and diluent tube surrounded by about four (or five) outer fuel fluid and diluent tubes (i.e., about two on either side). With the increased circumference, users adjust the inter-tube gap areas so that composite area covered by four outer diluent and tube rings can form about five times the area covered by the middle diluent and tube rings.

Distribution Tube Configuration

The distribution tubes may be streamlined and arranged to promote flow of the oxidant fluid. This can reduce the pressure loss across the combustor, and improve system thermodynamic efficiency.

Non-Circular Distribution Tubes

In some embodiments, users preferably reduce the pressure drop or drag coefficient across the tube bank by shaping the fluid tubes to a non-circular shape with narrower cross section facing into the oxidant fluid flow. Users preferably adjust the degree of tube streamlining (e.g., drag coefficient Cd0) and inter-tube gaps G to achieve the desired balance between the parasitic pumping losses and degree of downstream mixing of the fluids.

In some embodiments, users preferably form streamlined or aerodynamically shaped distribution tubes by forming the tube where the downstream portion of the tube is pressed narrower crosswise to the flow than the upstream portion. Users may use multiple forming rollers, or guides or other methods as needed to form these shapes. The streamlined shape is preferably similar to very low drag struts or symmetric airfoils designed to have the lowest drag for a given cross section. (See, e.g., the Airfoil Comparison Tool shows Selig's S6063 airfoil with a drag coefficient Cd0 of about 0.005.)

In some embodiments, users form elliptical or oval distribution tubes by pressing a circular tube flatter from side to side to form the tube into an elliptical or oval shape. These have lower drag than circular tubes, thus lowering the fluid pressure drop and pumping losses.

Multi-Passage Distribution Tubes

In some embodiments, users provide and configure passages for both fuel fluid and cooling diluents within a multi-passage distribution tube. Users preferably orient the two fluid passages within the dual passage contactor perforated tube to be inline with the flow so that one fluid is ejected upstream and the other downstream of each other. Alternatively, users orient these passages transversely to the flow so that fuel fluid is emitted on one side and cooling diluent fluid on the other side of the joint passages.

Dual Passage Direct Contactor Tubes

With reference to FIG. 31, when users desire to deliver both fuel fluid and diluent fluid through adjacent perforated tubes, they may provide dual passage contactor tubes 16 with two banks of orifices 80. For example, two joint perforated tubes for fuel fluid and diluent fluid. The fuel fluid is preferably delivered upstream of the diluent to protect the fuel from being overheated by downstream heat.

Users may similarly form the dual passage contactor distribution tube 16 by extruding the tube to contain multiple tube passages 222. E.g., with a fuel passage 224 and a diluent fluid passage 228 connected together and separated by an intra-tube wall 31. Users may provide a streamlined shape while incorporating two tube passages 222 with thin tube walls 30 to reduce drag and the pressure drop for the oxidant fluid flow across the fuel and diluent distribution tube array.

With reference to FIG. 33, users may form a dual passage contactor distribution tube 16 with multiple fluid passages. E.g., users may form tubes into D shapes and bond two tubes together back to back with two or more bonds 39. Users preferably orient the joining wall between the two D tubes to be perpendicular to the transverse flow of the second fluid (i.e., approximately transverse to the combustor axis.) Users may form the dual passage contactor distribution tube from two thin walled distribution tubes such as described in the '191 patent application. This requires only a single wall thickness on the edge of the thin walled tube facilitating formation of uniform orifices.

A fuel tube passage 224 may be used to deliver fuel fluid. The fuel tube passage is preferably configured on the upstream side of the dual passage contactor distribution tube 16. Similarly diluent fluid may be delivered through a diluent fluid tube passage 228 which is preferably oriented on the downstream side of the dual passage contactor distribution tube 16. In modified configurations, users orient the joining wall in line with the second fluid flow direction to enhance spatial separation of fuel fluid and diluent (see below).

With reference to FIG. 32, users may form the streamlined dual passage contactor distribution tube 16 by wrapping both edges of a thin sheet up and over like a staple. Users may bond the sheet ends to each other and to the central portion of the sheet. In modified embodiments, users further bend the edges of the thin sheet to form a strip separating an elliptical outer duct shape into two passages. In some configurations, users form the distribution tube with one or two passages from a single strip. A stiffener or radiation shield 40 may be added to the tube.

In some embodiments, users preferably form the dual passage contactor distribution tube by first flattening a thin walled tube into an elliptical shape. Users then further indent the elliptical tube across the narrow axis of the ellipse to form an hour glass shaped tube. By further forming the tube in this manner, users form a "Figure 8" shaped tube where the tube walls 30 are joined in the middle. These are then bonded together with bonds 39 using suitable means such as by welding, soldering, brazing or glueing etc.

With reference to FIG. 34, users position two fluid passages separated by a web-stiffener spacer 44. This stiffener is shown as perforated to allow fluid to flow through it. The stiffener is shown as fluted to accommodate differential expansion between the two adjoining tubes.

This may also be formed by pressing a larger tube in the center to form a "Figure 8" shaped tube and then to form a "dumbbell" shaped tube. The elongated shape provides flexural strength and stiffness about the short axis transverse to the two passages. This enhanced strength and stiffness is greater than the strength of separate individual tubes.

Fuel-Diluent Configuration

Users desire to configure a combustor to achieve reliable combustion and efficiently combust the fuel while avoiding formation of substantial nitrogen oxides. They preferably mix in diluent upstream of combustion while delivering further diluent to evaporate downstream of the start of combustion.

Users preferably configure the fuel orifices to achieve a combustible mixture of fuel, diluent and oxidant to initiate reliable burning and raise temperature of the combusting fluid to achieve efficient combustion in some embodiments. They preferably mix in more diluent fluid to constrain or cool the ongoing combustion and prevent or reduce the degree that the temperature rises above a desired upper limit, thereby reducing the formation of oxides of nitrogen.

Users further preferably adjust the relative spatial density of orifices along the distribution tubes to adjust the relative ratio of the diluent fluid flow to fuel fluid flow.

In addition to adjusting the spatial density of orifices 80 along the distribution tubes, users preferably separately distribute the fuel orifices 82 and cooling diluent orifices 83 axially relative to the second fluid flow to vary the average fuel fluid and/or cooling diluent evaporation rate profiles to achieve the desired combustor temperature profile. Users preferably locate the major portion of cooling diluent evaporation after the commencement of combustion to increase combustion limits and combustion stability while still rapidly cooling the flame.

Accordingly, users preferably orient the fuel fluid and diluent fluid passages of a dual fluid contactor to eject the fuel fluid upstream and eject the diluent fluid downstream. This gives the fuel fluid a head start to begin evaporating and burning before being cooled by the diluent fluid as the diluent evaporates and/or mixes in with the fuel fluid and oxidant fluid.

Users further preferably adjust the axial velocity and drop size to adjust the major portion of cooling diluent evaporation relative to fuel fluid evaporation and combustion so that the evaporation occurs about or shortly after the peak rate of combustion. I.e., after the largest heat release rate. This permits the combustion temperature to initially increase rapidly to about the mean combustion exit temperature. This method constrains (preferably limits, or clamps) and rapidly cools the combustion temperature, preventing or reducing the major increase in combustion temperature above this mean temperature. This reduces the variations in temperature across the combustor 56. (I.e reduces the Pattern Factor and the Turbine Profile Factor towards unity.) These measures reduce the peak combustion temperature and duration or residence time of high temperature, thereby reducing NOx formation.

With liquid fuels and/or cooling diluents (such as diesel fuel and/or water), the drop evaporation rate is about proportional to the surface area (or about proportional to the $\frac{2}{3}$rds power of the volume or mass.) In modified embodiments, users preferably tune the evaporation rate of one liquid relative to the other by adjusted the relative orifice sizes ao vs the number of orifices 80 for each liquid. By so doing users adjust the relative drop diameters and drop numbers. They may thus adjust the total liquid surface areas and relative evaporation rates for each of the liquids. Users use these measures to independently control the relative drop size and the relative mass flow rates of the fuel fluid and thermal diluent fluid.

To adjust the relative axial delivery of the fuel fluid and diluent fluid, users may adjust the axial location and separation of one or more fuel orifices 82, oriented diluent fluid orifices 83 and axial orifices 84. This adjusts the relative transit residence times and evaporation regions of the relevant sprays. This also enables adjusting the relative amounts of evaporation and the evaporation profiles of fuel fluid versus evaporation profiles of diluent fluid relative to the combustion region. Users may accomplish this by changing the separation between fuel fluid and cooling diluent tubes. They may also adjust the axial length of a web-stiffener or perforated web separating the fuel fluid from cooling diluent passages within a joint tube. Similarly they may adjust the relative location of orifices 80 about each fluid passage in the individual or joint tubes. Using the methods described in the '191 patent application, they may orient the orifices to adjust the axial orientation of micro-jets and consequently the relative axial distribution of fuel and diluent. They may further combine two or more of these measures to adjust fuel to diluent axial delivery.

Trifluid Reactor Configuration Method

Figure 21:
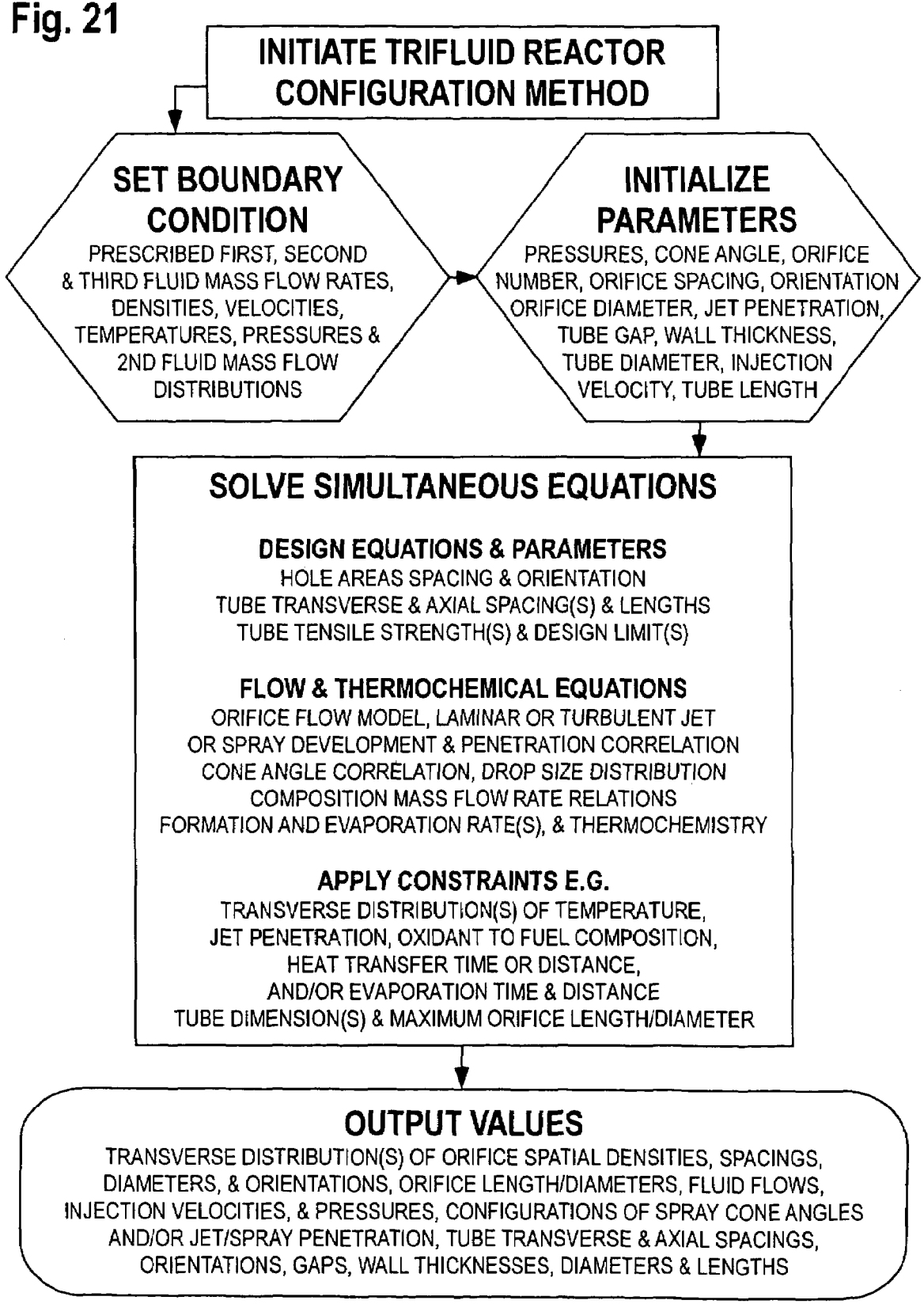
FIG. 21 schematically shows the trifluid reactor configuration method.

With reference to the trifluid reactor or combustor configuration method depicted in FIG. 21 users preferably model and configure the contactor tubes to deliver, mix and react first and third fluid flows with a second fluid flow. E.g., to deliver, mix and react a fuel containing fluid and diluent containing fluid with an oxidant containing fluid. The trifluid reactor configuration method models the system, incorporates design constraints and derives the corresponding spatial distributions and configurations of orifices needed to deliver the respective reacting and diluent fluids with the needed transverse flow rate distributions. For example, two or more distributions of fuel orifices and diluent orifices are configured in one or more fuel contactors and diluent contactors to deliver fuel containing fluid and diluent containing fluid into a flow of oxidant containing fluid.

In this configuration method, users set up and solve a set of simultaneous equations that model the design, fluid, mechanical and thermochemical components and processes, and the design constraints on the system. Users provide the boundary conditions for the system. They initialize parameters including providing "initial guesses" as needed by the equations and software tools used. They further specify the desired or prescribed spatial profile constraints on the solution system. Users then solve the system of equations. The solution of these equations gives the required or consequent configuration that gives the desired or prescribed spatial profiles of various properties of the reacting fluid system.

Depending on system model, various solution techniques may be used. For example, when approximating the reactor as a linear system, a matrix-based linear solution procedure may be utilized. Where the accuracy desired requires incorporating non-linear properties and parameters, an iteration-based non-linear solution method may be used to converge on a solution, using initial guesses for desired parameters.

Setting Boundary Conditions

With continued reference to FIG. 21, users typically set base boundary conditions using the gross properties of the fluids delivered to the reacting system. These may include the fluid mass flow rates, densities, temperatures, pressures, and species concentrations for each of the incoming fluids. More preferably, users include transverse distributions of fluid properties where these are substantial. E.g., the transverse distributions of velocity, density and mass flow of the oxidant containing fluid entering the combustor from the compressor, especially in the radial direction within an annular combustor. These properties may be further based on the overall operational parameters of the process, such as the loading and the nature of the fuel, oxidant and diluent feeds for typical exothermic processes.

Initialize Parameters

With continued reference to FIG. 21, users initialize parameters and variables as required by the solution method and/or software program used. For example, where initial guesses are required based on the solution technique, users preferably provide preliminary estimates of the values of the outputs of the solution system. These guesses may correspond to the would-be required or consequent configuration that results in the desired or prescribed spatial profiles of various properties of the reacting fluid system.

Eg., where one goal of the configuration method might be to determine the transverse distributions of orifice spatial densities and diameters, the solution method might require an initial guess for these parameters such as 0.1 mm for the orifice diameter, 1.0 mm for the orifice spacing and 10 mm for the tube to tube gap G. For cases in which the desired output is a non-uniform distribution of a property, users may opt to provide a uniform profile (i.e., a single value), or a linearly varying profile, for the initial guess.

In a given configuring process, the number of initialized parameters or constraints is usually less that the number of output values to provide for independent variables to be solved. Generally speaking, the parameters initialized may be any of the distributed or bulk properties of the system, including thermochemical properties of the fluid flows (such compressor pressure, fuel flow rates, oxidant to fuel ratio, combustion velocity, and the desired combustor exit velocity, and temperature). These may be the flow properties such as spray or jet penetration, velocity and cone angle. Similarly they may be physical properties of the reactor apparatus, typically spatial dimensions (such as tube length, tube to tube gap G, orifice number, orifice spacing h, orifice diameter and orientation). Users may need to prescribe spatial distributions for some properties depending on the solution method and desired parameters. Some parameters may need to be initialized to solve the system of equations in accordance with the configuration or the solution method or software utilized.

Solve Simultaneous Equations

With continued reference to FIG. 21, users determine the relationships between different properties of the reactor system and formulate these relationships in terms of mathematical expressions or equations. They then solve these simultaneous equations.

With continued reference to FIG. 21, users preferably account for relationships within the systems that describe the reactor's structure, components and configuration. For example, they may include the relationship between tensile strength, tube dimensions and tolerable tube differential pressure. Similarly they account for the relationship between orifice areas (diameters), spacing and orientation, and the tube to tube transverse and axial spacing (gaps) and lengths in establishing fluid deliveries and the desired mass flow rates for the fluids.

With continued reference to FIG. 21, users include the equations which relate the properties of the various interacting fluids that comprise the reactor system. These sets of equations may include relations specific to issues of fluid mechanics, thermodynamics, chemical kinetics, or other foundational physical and chemical areas.

In regard to fluid mechanical relations, users may exploit the law of conservation of momentum of fluid systems (captured in the continuity equation) to determine relations applicable to various flow scenarios within the reactor system. These may include correlations covering laminar or turbulent jet and spray development, penetration and cone angle. These may include the various drop development regimes based on respective velocities and densities. Similarly, drop distribution, drop or fluid entrainment, and viscous dissipation may be included. Shear and viscous drag within distribution tubes, especially within orifices may need to be considered. These may further include the differential pressure across tube walls/orifices and various velocity profile developments.

Users may use empirical data to complement fundamental relationships in modeling these systems. One dimensional model may be used initially preferably followed by full CFD models using multidimensional modeling techniques such as are used to model diesel engines.

The laws of energy conservation are preferably applied, linking fluid mechanical and thermodynamic properties of the fluid system and accounting for energy in bulk motion (such as net axial velocity), small scale or random motion (such as turbulence), dissipated modes (represented by the temperature of the system), or chemical modes (organized within the bonds of chemical species within the system).

Relations accounting for heat transfer and other transport phenomena, based on the chemical kinetics, fluid mechanical and thermodynamic properties of the system, are preferably incorporated into the configuration equation system. These include the combustion including the fuel and oxidant flows to achieve the desired power. They similarly include the diluent delivery desired to obtain the total excess diluent relative to the excess heat of combustion to control the temperature of the energetic fluid.

Such transport models allow the incorporation of additional design criteria such as the evaporation rates of fluid droplets. (E.g., by "diameter squared" laws adjusted for temperature differences.)

With continued reference to FIG. 21, to configure a combustor, the number of independent relationships that define the system is preferably chosen to equal the total number of property and spatial variables that define the configuration of the system. Users may assign values to some of these variables, establishing them as constraints or prescribed outputs. The solution values determined for the remaining variables would be the required spatial and temporal values, distributions or profiles for properties that these variables represent.

With reference to FIG. 22-FIG. 27, one embodiment of a reactor configured as a combustor with a prescribed annular cross-section and a desired oxidant fluid transverse (e.g., radial) velocity distribution or profile. The users also prescribes tube gap, diameter and inter-tube jet penetration distances. To control the reaction chemistry, the user specifies the equivalence ratio radial profile of the system. Applying all these constraints to the system, the user employs the reactor configuring model, resulting in a suggested radial profile for tube orifice diameters and spacing for the fuel fluid delivery contactors. This fuel fluid tube orifice configuration also results in a radial profile for excess heat of combustion, which would tend to increase the temperature of the system. Based on additional design limitations of the system, such as the combustor exit temperature or turbine inlet temperature, the user may desire to constrain the post-combustion temperature of the system to a prescribed radial profile. The delivery of diluent fluid to the system after fuel delivery and combustion, primarily serves to accomplish this temperature control. Applying this temperature profile constraint to the system, the user secondarily applies the reactor configuring model, resulting in a suggested radial profile for tube orifice diameters and spacing for the diluent fluid delivery contactors. Users may perform additional configuration to control the evaporation behavior and rates of liquid fluid delivered to the system in droplet form.

Oxidant Flow Velocity Profile

With reference to FIG. 22, axial velocity profiles for the oxidant fluid within the combustor are shown downstream of the diffuser. For example, the velocity profile of the oxidant flow exiting the diffuser resulting from a typical single diffuser is shown as typical of the relevant art. In this configuration, the single passage diffuser is modeled as having a fluid velocity peak at about two-thirds the distance from the inner to the outer wall of the annulus. E.g., such as might be expected from a single passage diffuser downstream of an axial compressor.

By contrast, users preferably configure a multi-vane diffuser to achieve a prescribed velocity distribution downstream of the diffuser. More preferably they prescribe a velocity profile that is more uniform across the duct. E.g., while the velocity at the walls is stationary, users preferably achieve a fairly uniform axial velocity for about 80% of the duct cross section nearer the center by the time the flow reaches the primary downstream fuel delivery area. This substantially facilitates achieving a desired fuel/oxidant ratio distribution.

To demonstrate one embodiment, the transverse velocity profile resulting from a multi-vaned diffuser with 9 passages or channels (i.e., with 8 flow splitter vanes) is shown. This vaned diffuser example is modeled as an annular duct with a diffuser outlet of approximate inner diameter of 200 mm and an approximate outer diameter of 250 mm. Note that the velocity profile downstream of the selected 9 passage splitter vane diffuser determined flow is substantially more uniform than that of the single passage diffuser. While relevant combustion diffusers typically have one to four passages, users preferably use five or more flow splitter vanes giving six or more passages to achieve a more uniform transverse velocity distribution.

With further reference to FIG. 22, in this embodiment, the velocity profile labeled "upstream" depicts the transverse or radial velocity profile of the second or oxidant containing fluid velocity at an upstream location near the exit of the multi-passage diffuser. Similarly the velocity profile labeled "downstream" depicts the transverse or radial velocity distribution of the oxidant fluid further downstream such as near where distributed contactor(s) deliver fuel fluid and further diluent fluid and mix them with the oxidant containing fluid. The amplitude of the periodic fluctuations of the oxidant fluid velocity profile is dampened as one moves from the "upstream" to "downstream" locations. For example, in the embodiment shown, the upstream velocity is modeled at approximately 5.2 cm downstream of the outlet of the diffuser splitter vanes, while the "downstream location" is modeled as approximately 42 cm downstream of the end of the vaned diffuser outlet. By these methods, users preferably achieve an transverse distribution of the axial velocity whose standard deviation is about 15% the mean axial velocity or smaller.

Transverse Property Distribution Constraints

Users may set or prescribe one or more other spatial distributions of parameters and properties as constant or with prescribed curvilinear distributions in one or more specified directions. E.g., across the transverse section of the duct. For example, these may include the pressures and temperatures of the oxidant fluid, the fuel fluid, the thermal diluent fluid as delivered to the combustor.

Primary Design Constraints

Users preferably prescribe or constrain one or more desired spatial profiles or distributions of properties and parameters that define the system. E.g., in one or more transverse directions. These constraints may include primary design constraints such as the temperature and residual oxidant composition of the energetic fluid in one or more transverse directions near the outlet of the combustor. For example, a series of typical constraints are depicted in FIG. 23.

Users may prescribe a spatial oxidant to fuel distribution lambda within the combustor (actual oxidant/fuel mass flow relative to the stoichiometric oxidant to fuel ratio). For example, FIG. 23 depicts one embodiment showing an example oxidant/fuel profile transverse distribution varying from a low value close to 1 (the stoichiometric ratio) near the inner radius of the annulus, increasing towards the outer radius.

The spatial temperature distribution from the inner to outer radius at the combustor outlet is commonly prescribed because of its major impact on the hot combustor components and especially the hot components of a downstream utilization device such as the vanes and blades of a turbine. In some embodiments, users prescribe a desired non-uniform temperature distribution in a first transverse direction, and a desired uniform temperature distribution in the second transverse direction. E.g., the radial direction and azimuthal directions respectively in an annular combustor.

Figure 23:
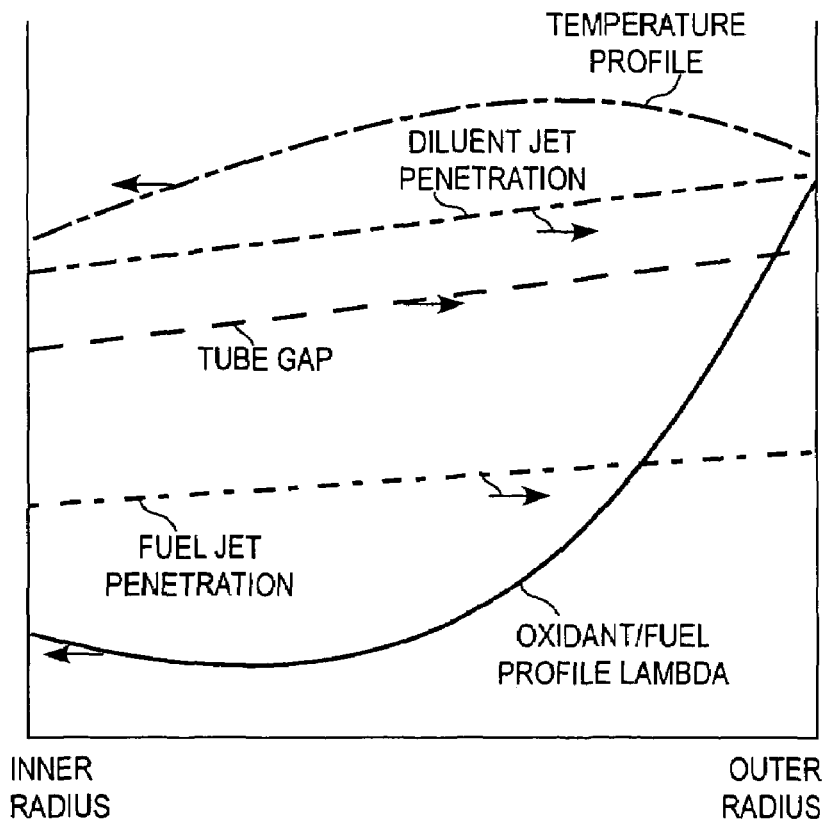
FIG. 23 depicts constraints of transverse temperature profile, oxidant/fuel profile lambda, tube gap, and fuel and diluent jet penetrations, applicable in the trifluid reactor configuration method.

For example, the embodiment depicted in FIG. 23 depicts a temperature distribution or profile in the transverse distribution from inner to outer annulus radius corresponding to a potential temperature "profile factor" desired at the inlet to a turbine. (The temperature distribution is shown as a temperature profile by scaled it by the mean temperature.) This temperature profile is shown as an inverted skewed parabola such as might be desired or required for an energetic fluid exiting a combustor and entering a turbine (i.e., "Turbine Inlet Temperature"). This is shown as peaking outward from the middle of the annulus, with cooler temperatures at the inner and outer radii. The corresponding azimuthal temperature distribution is taken as a uniform "pattern factor."

From the desired Temperature Spatial Distribution and the corresponding spatial distribution of axial velocity of the energetic fluid exiting the combustor, users obtain the spatial distribution of excess heat of combustion above that heat required to raise the oxidant and fuel and consequent products of combustion from the inlet conditions of temperature, pressure and flow, to the desired spatial temperature, pressure and velocity distributions in the energetic fluid at the combustor exit. From this excess heat of combustion, users derive the diluent containing fluid delivery required to achieve the Total Diluent Enthalpy Change from the inlet fluid conditions to the desire energetic temperature at the combustor exit. This includes all diluent fluids and components within the oxidant containing fluid and the fuel containing fluid as well as the diluent containing fluid. (Not shown.)

Secondary Design Constraints

Users may similarly apply design constraints selected to facilitate combustor assembly while achieving desired primary constraints. For example, users may specify the transverse distribution of fluid jet penetration distance, and the fluid contactor tube to tube gap for one or both of the fuel contactor tubes and the diluent contactor tubes respectively. They preferably configure the fuel jet penetration distance and diluent jet penetration distance as desired to achieve desired temperature and oxidant/fuel profiles, particularly in the first transverse direction. (e.g., to control the "profile factor".) Using the methods detailed in the '191 patent application, users more preferably configure the distribution of orifice orientation(s) along the tubes to more precisely control the distribution within the tube to tube gap typically transverse to the oxidant flow.

With reference to FIG. 23, one embodiment of the contactor tube to tube gap for fuel and diluent contactors is shown as linearly increasing from inner to outer radius, such as found for radially oriented ("spoked") fuel and diluent delivery tubes for one embodiment. In FIG. 23, the fuel jet penetration distance is selected as proportional to and less than the fuel tube to tube gap. Similarly, the diluent jet penetration is shown as also proportional to the diluent tube to tube gap. However here the diluent jet penetration distance is shown as exceeding the tube to tube gap. In this configuration using water as diluent with diesel fuel, this would give water rich bands downstream of the water distribution tubes, while delivering fuel primarily between the tubes. Such a configuration would enable delivering more diluent upstream of combustion than the premixed combustion limit.

Solve Simultaneous Equations

With continued reference to FIG. 21, users proceed to solve the simultaneous equations required to obtain the desired output values. For example, with reference to FIG. 24, users solve for the desired or required spatial distributions of orifice parameters such as the orifice size, spacing, spatial density. Depending on the solution methods, the equations may be normalized by mean values of parameters, or by dividing one size of the equation by the other. These methods may assist in finding desired numerical solutions.

Transverse Orifice Configurations

Figure 24:
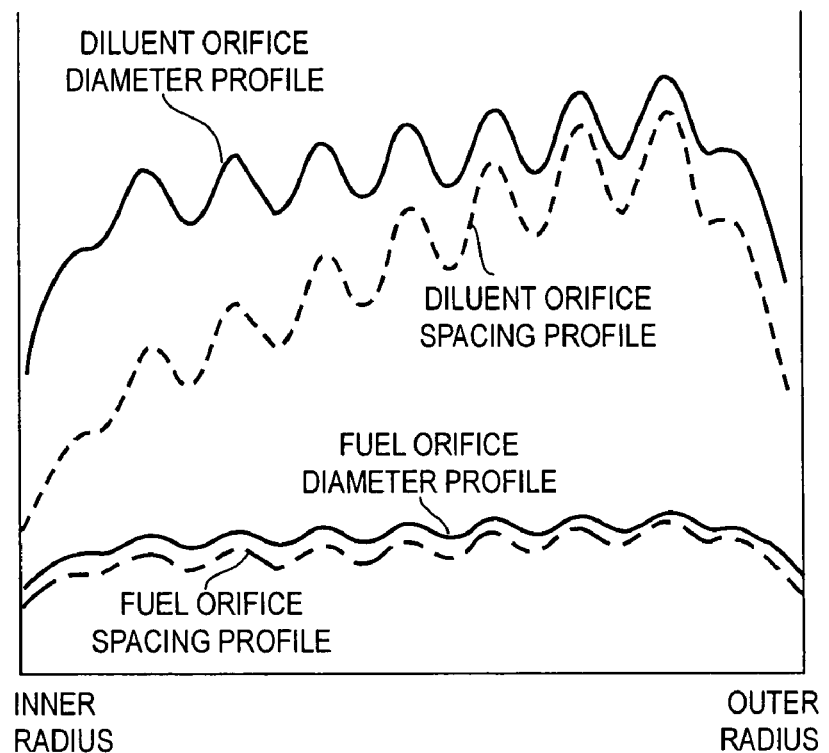
FIG. 24 depicts transverse diluent and fuel orifice diameter profiles, diluent and fuel orifice spacing profiles applicable to achieve transverse constraints in an annular reactor.

With reference to FIG. 24, users solve the simultaneous equations to achieve distributions of desired or required orifice size and orifice net specific density per unit duct cross-sectional area for perforated diluent and fuel fluid contactors. By prescribing perforated contactor tube-tube distribution for diluent and fuel, the net specific spatial density is transformed to corresponding spacing transverse orifice distributions along the fuel and diluent contactor tubes. Users apply the reactor configuring method to determine these profiles to achieve the prescribed property and parameter profiles. In the embodiment shown, the periodic axial velocity and mass flow fluctuations in oxidant containing fluid flow exiting the multi-passage diffuser are accommodated to achieve the more smoothly varying prescribed temperature and oxidant/fuel transverse distributions desired (as shown in FIG. 22 and FIG. 23).

With reference to FIG. 24, the transverse distribution of the diluent diameter and corresponding diluent orifice to orifice effective transverse spacing distribution are shown as profiles, normalized by the mean orifice diameter and spacing. FIG. 24 further depicts the corresponding fuel orifice diameter profile and fuel orifice spacing profile desired to achieve the oxidant/fuel profile shown in FIG. 23. These periodic fluid delivery rates are synchronous with the periodicity of the oxidant fluid velocity profile, resulting in the prescribed oxidant to fuel ratio, and product temperature. Thus, users may achieve desired close control over transverse distributions of temperature and oxidant/fuel composition in the energetic fluid. They may do this while avoiding the major excess air diluent and high pumping and macro circulation utilized in the relevant art.

FIG. 26 shows an additional reactor configuration to govern the evaporation rates, distances and/or times of fuel and diluent fluids delivered in droplet form to the reactor system. Users may prescribe the evaporation distances of each of the fuel fluid and diluent fluid. In applying the reactor configuring method, users are then able to determine the maximum droplet size of the fuel fluid and diluent fluid upon injection or delivery into the oxidant fluid. To the extent that other constraints on the system predetermine the orifice diameter, users may obtain the required droplet sizes by applying additional atomization techniques such as the electrical excitation described herein.

Tube Wall Thickness

Users preferably evaluate the pressure distribution within the distribution tubes and corresponding differential pressure across the orifices. From this they evaluate the tube thickness required to sustain that pressure difference. E.g., for the fuel containing fluid distribution tube and the diluent containing fluid distribution tube.

Figure 25:
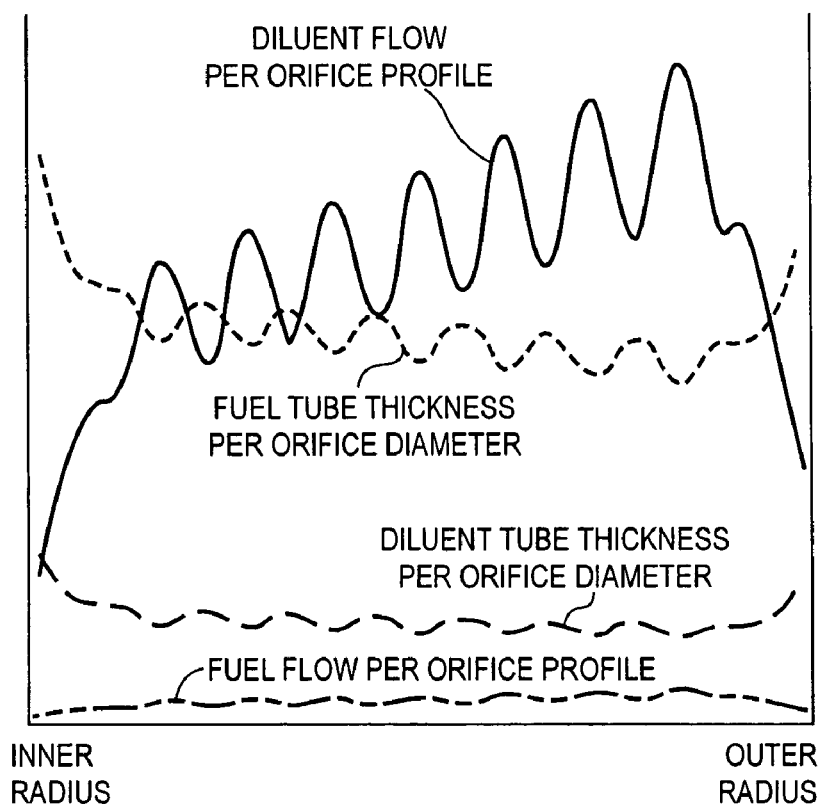
FIG. 25 depicts exemplary transverse profiles of diluent and fuel flow per orifice, and transverse profiles of the ratio of fuel or diluent tube wall thickness to orifice diameter, for a constrained trifluid annular combustor.

With reference to FIG. 25, users may evaluate the required fuel and diluent flow per orifice and corresponding distribution of delivery pressure differential across the orifices along the contactor tubes oriented in a desired transverse direction in one embodiment. E.g., from inner radius to outer radius. From these pressures users determine a suitable consequent tube wall thickness to reliably sustain the highest differential pressure respectively for fuel contactors and the diluent contactors, e.g., selecting from among tube dimensions such as are readily available.

However the wall thickness to orifice diameter ratio further affects the fluid cone angle delivered through orifices and consequent transverse fluid distribution considering jet mass distribution and the impact of overlapping jets. Where more precise control over spray cone angles is desired to achieve desired transverse fluid distributions, users may further adjust not just the orifice size, location and orientation, but also the orifice depth by preferably controlling the tube depth near the orifice as taught in the '191 patent application FIG. 5. E.g., by partially thinning the tube in the immediate area surrounding the orifice by laser drilling. They may also adjust the inward or outward orientation of the orifice to adjust spray cone angle. By adjusting the focal length of the lens used to focus a laser beam, users may further control the cone angle to which the orifices are drilled.

Similar solution methodologies may be applied to other exothermic systems or other chemically reacting fluid systems to achieve desired distributions of fluid deliveries, fluid delivery ratios, and similar fluid and reaction parameters.

Evaporation Constraints

In some embodiments, users seek to constrain the system to achieve desired evaporation parameters such as a desired degree of evaporation within one or more spatial and/or temporal constraints. Thus, users may desire to achieve a desired degree of evaporation within a transverse distribution of axial distance downstream of the fluid delivery contactors. With reference to FIG. 26, users may specify a fuel evaporation distance transverse profile and a diluent evaporation distance transverse profile in a first evaporation distance. From the evaporation distance and velocity spatial distributions, users obtain desired evaporation times to achieve the evaporation distances.

Evaporation Models

To evaluate evaporation, users may consider first order evaporation using the diameter squared law. This may be refined to consider the difference in temperature of the liquid drop to that of the surrounding fluid. From the evaporation times and boundary conditions, users may obtain the maximum drop size that can be evaporated with that desired evaporation time. From the desired probability of evaporation for that sized drop, users may then obtain a desired size measure of the liquid drop such as the Sauter mean diameter. For example, with reference to FIG. 26, they obtain a maximum fuel droplet size transverse distribution and maximum diluent droplet size transverse distribution along a first transverse direction such as the radial direction from the inside to outside annulus radius.

Generalization

As a person skilled in the art will appreciate, such spatial orifice distribution, orifice configuration and orientation methods, the fluid delivery methods, and the system configuration methods may be applied to configuring systems to the delivery and mixing of other fluids in reacting systems to achieve similar or other desired spatial constraints in one, two or three dimensions. While the method has been described with distributing orifices within the reactor using perforated tubes, other methods of distributing orifices while supplying fluid through other non-tubular ducts may similarly be used.

Diluent Control

Diluent Temperature Control

With the fuel and thermal diluent distributed contactors upstream of the combustion as described herein, users substantially increase the diluent/fuel ratios and decrease the excess air that is used as diluent compared with relevant art. They further configure and control the delivery of liquid diluent.

Delivering Vaporizable Liquid Diluent

Flame speed and flame stability is maximum near stoichiometric conditions. Flame speed and flame stability is least at the lean limit of combustion when diluted by low heat capacity gases like nitrogen and excess air. However near stoichiometric combustion in air or oxygen causes high combustion temperatures and high NOx formation.

Instead of cooling by such gaseous or oxidant containing diluents, users preferably mix numerous jets of a vaporizable liquid thermal diluent with the oxidant fluid to form a diluted oxidant fluid. E.g., Users may use a direct contactor to deliver numerous fine jets of water into air to form a fine mist which rapidly evaporate and form a diluted oxidant fluid or "humid oxidant" fluid. Users preferably use hot water, such as formed by recovering heat from the expanded fluid downstream of the expander. This helps improve thermal efficiency.

Users achieve much more precise flow control by delivering a vaporizable liquid diluent than by delivering excess oxidant containing fluid as the diluent fluid (e.g., air). Using liquid water as diluent provides much more precise temperature control and more uniform temperature conditions. At the same time, this method provides a more stable flame by igniting the flame nearer to stoichiometric conditions and then diluting and limiting the temperature of the combusting fluids.

In some embodiments, users preferably control the Combustor Exit Temperatures (or Turbine Inlet Temperatures) over the range of commercial or experimental turbines. e.g., about 846° C. (1555° F.) to about 1,719° C. (3126° F.). Accordingly, users preferably control the portion of diluent fluid to fuel fluid delivered to combustors as needed. E.g., in ratios of about 7:1 to about 1.5:1 by mass (for liquid fuels) over the range of current turbine combustors.

With the downstream diluent mixing methods as described herein users displace some or all excess air used as diluent while providing alternative thermal diluent without exceeding combustion stability limits. These measures further provide more uniform mixing achieving lower NOx and CO emissions.

Such distribution tube array configurations provide more controlled mixing and cooling of the combustion gases than the relevant art. This provides more effective mixing and better temperature control than in configurations with diluent injected through the combustor wall, particularly when using excess oxidant containing fluid as diluent. This enables lower excess oxidant and operation nearer to stoichiometric conditions. This enables higher efficiencies while reducing NOx and CO emissions.

Some relevant art indicates that a fine mist of 10 μm to 20 μm water droplets may be four times more effective in extinguishing a flame than water vapor or steam. E.g., Thomas (2002). The amount of water one might wish to deliver to thermally control the flame could extinguish it if delivered in fine sub 50 μm droplets, particularly if it were mixed uniformly and all delivered upstream prior to combustion.

In some embodiments, users preferably control the method and rate of diluent delivery to overcome such flame quenching limits. They preferably size the fluid delivery orifices and create more uniform liquid drops or a narrower drop size distribution of a size such that:

a) the total thermal diluent to excess heat of combustion, particularly the amount of liquid thermal diluent evaporated, (plus the amount of excess oxidant fluid and other fluid) prior to fuel fluid ignition is less than the flammability limits, thus avoiding having the diluent and diluent mist quench the combustion;

b) the drop size of the thermal diluent delivered prior to fuel fluid ignition is sufficiently large and/or the spatial number density of small drops small enough prior to start of combustion to avoid quenching the ignition;

c) drops larger than a prescribed, predetermined or preselected size or mass are evaporated before exiting the combustor to a desired probability) e.g., before entering an expander. In modified configurations, orifices may be stepped or graduated in size as described herein and in the '191 patent application.

More particularly, the effective total thermal diluent of gaseous thermal diluent and small diluent drops upstream of ignition is controlled to avoid quenching ignition. I.e., the total thermal diluent to excess heat capacity excluding the fraction of larger drops with insufficient effective surface area to quench or stop the ignition by preventing the temperature increasing enough or by cooling the mixture too much.

Deliver Diluent Micro-Jets through Flame Front

To deliver fine droplets of a thermal diluent sufficient to control the combustion temperature, users preferably provide distributed orifices delivering micro-jets of thermal diluent in some embodiments. Users preferably configure these jet orifices to deliver jets through the flame front. With reference to FIG. 28, orifices may further be configured in the downstream portion of fuel contactors and diluent contactors so that the delivered jets are preferably oriented perpendicular to the flame front and flow through it.

Users further preferably configure orifice size and spacing h and diluent fluid pressure in excess of the combustor pressure, such that the desired diluent delivery will result in diluent velocities that are faster than the velocity of the oxidant fluid. E.g., by liquid water jets initially flowing faster than the air. The diluent jets may also be faster than the fuel fluid velocity.

Users thus preferably form numerous micro-jets that penetrate the flame front and rapidly evaporate shortly after the flame front. The jets preferably break up into numerous droplets before the flame front and the numerous drops penetrate the flame front with significant evaporation within the flame, cooling the combustion. The jets may be configured to be laminar for more uniform drop size. Similarly droplets may be carried by the oxidant-containing fluid into the flame. In modeling jets, users preferably account for laminar vs turbulent jets, as well as the different regimes of droplet breakup based on relative drop to fluid velocity and density and the drop's surface energy and viscosity. E.g., using methods incorporated into CFD codes such as KIVA and Star CD.

By such methods, users deliver the diluent fluid with a high specific surface area (m2/kg), with a relatively low evaporation rate prior to reaching the flame front, but where the evaporation rate increases rapidly after the flame front. Users thereby achieve the high evaporation and dilution cooling within the hot combustion gases. This provides benefits of rapid cooling and avoiding substantial NOx emissions while avoiding inactivating. or quenching the flame by the presence of a concentrated fine mist of thermal diluent.

Orifice Configuration to Enhance Flame Propagation, Flammability

The relevant art describes models showing limitations of flame propagation in isotropic (uniform) fluids with drops. Users preferably position diluent droplets and fuel droplets non-isotropically (non-uniformly) to increase flame propagation speed and increase the flammability limits in some embodiments. For example, they may position fuel orifices 82 closer together in certain selected regions than in an isotropic orifice distribution. Users correspondingly position thermal diluent orifices 83 closer together than the isotropic distribution in regions complementary to the fuel fluid regions. They may orient the orifices to deliver jets in non-uniform configurations. They may also orient the fuel and diluent orifices to deliver the diluent jets differently from the fuel jets.

In such fashion users form mixtures with different compositions of fuel and diluent. These have different combustibility boundaries and result in different flame propagation rates.

With reference to FIG. 11, in some embodiments users may configure the distributed contactors with alternating fuel and diluent perforated tubes. Similarly with reference to FIG. 12, they may provide multiple tubes or multi-passage tubes delivering fuel and diluent in sets. (E.g., such as circular, helical, conical or transverse arrays).

With such orifice configurations, users may adjust the relative spray penetration or the orifice orientation to provide regions alternatively more concentrated in fuel fluid or diluent fluid. With such alternating fuel rich and lean regions, the flame will preferentially propagate along the fuel rich regions. The combusting gases and/or hot combustion gases will then mix with the adjacent diluent rich regions and cool them.

In addition to assisting the flame to preferentially propagate along combustible fuel rich bands, users preferably configure orifices and orifice orientations to provide regions with combustible fuel richer mixtures traversing the fuel-leaner subregions to assist the flame to jump from one fuel-rich band across one lean inter-band region to the next fuel-rich band. For example, with reference to FIG. 4, users preferably provide at least one bridging perforated fuel tube 19 positioned across alternating fuel and diluent distribution tube arrays 260. (E.g., radially across the circumferential or helical tubes, or transversely across parallel tubes). The fuel orifices along the bridging fuel tube 19 may be configured to deliver a distribution of fuel delivery along the bridging tube to add sufficient fuel to achieve the desired composition in the combustible mixture 911 formed by the bridging tube with the upstream flow. In addition, a diluent bridging tube 19 may also be positioned across the fuel and diluent tube arrays 260 parallel to the fuel bridging tube 19. This helps to cool the fuel in the fuel bridging tube to prevent coking. It also can delivery diluent to cool the downstream fuel combustion. E.g., water drops that evaporate within the combustion.

Further referencing FIG. 4, users preferably position the central end of the bridging fuel tube 19 near the flame holder (authority) 100. In other configurations, users position an igniter 124 near the upstream end of the end of the bridging fuel tube 19. The bridging fuel tube 19 will preferentially carry the flame from the flame holder 100 to and/or across each of the other fuel distribution tubes.(E.g., radially across the circumferential tubes). The bridging fuel tube 19 is configured to provide a combustible mixture that assists the flame to propagate along the fuel rich bridging bands 972 across the lean regions 909. Then the flame will propagate from the bridging fuel tubes 19 across the duct along the fuel rich bands 972 (E.g., around circumferential bands.) Alternatively users provide at least one bridging fuel distribution tube 19 across the fuel distribution array 260.

Correspondingly with transverse tube arrays 260, users preferentially provide the bridging perforated fuel and diluent distribution tubes 19 to traverse those fuel fluid and diluent tube arrays 260 in some embodiments. As before, users preferentially position the flame holder 100 near the center of the transverse array where the flame will be carried out across the array by the bridging fuel tubes 19. Users position at least one, and preferably two or more bridging fuel fluid distribution tubes 19 across the transverse arrays to carry the flame out across the transverse tubes.

Users preferably position these bridging fuel fluid distribution tubes 19 a little upstream of the rest of the tube arrays 260 to provide bridging fuel rich bands to facilitate carrying the flame from the flame holder 100 to those downstream tubes. Alternatively they are configured downstream. Within flammability limit constraints, users further preferably provide corresponding diluent distribution tubes downstream of these radial or cross bridging fuel distribution tubes 19 to provide the desired average diluent/fuel ratio throughout the system in some embodiments.

With larger sized drops, users preferably arrange the fuel orifices to position the drops with a desired configuration across the flow. For example, fairly uniformly. However, with very fine droplets (e.g., below about 50 μm) uniformly mixing diluent drops in with the fuel containing fluid may prevent or hinder the fuel from igniting. For example, with reference to the methods taught in the '191 patent application, users preferably concentrate the diluent orifices 83 transversely separately from fuel orifices 82 to position diluent drops spatially separate from the fuel fluid drops in some embodiments. Accordingly users preferably orient the fuel orifices 82 and diluent orifices 83 to provide transversely alternating regions of concentrated fuel and diluent fluids. With reference to FIG. 39, in some configurations, users may orient the orifices 80 more axially in line with the flow of the second fluid rather than transverse to the flow to form angled orifices 86 or axial orifices 84.

Users locate orifices transversely closer together in some configurations. By so doing, users decrease the transverse spacing of diluent orifices 83 to reduce adjoining diluent droplet spacing, and transverse spacing of fuel orifices 82 to reduce adjoining spacing between fuel fluid jets and fuel fluid droplets. In some configurations, the fuel orifices 82 and diluent orifices 83 are angled differently relative to the axis of the combustion chamber 56 so as to deliver fuel fluid drops into generally different transverse locations from diluent drops. In addition or alternatively, users provide joint pulsing of fuel fluid and diluent in their respective distribution tubes, to decrease the transverse to axial droplet spacing within the diluent or fuel fluid region while separating the fuel fluid and diluent regions.

By such measures, users reduce the diluent/fuel fluid concentrations in some regions, thereby improving the flammability limits of the fuel fluid and the flame propagation rate along the fuel fluid concentrated regions. These measures still provide diluent fluid closely positioned along with the fuel fluid, with better mixing and faster evaporation than in the relevant art.

Temporally Phasing Fuel Fluid and Diluent Delivery

As an alternative method to increase the fuel propagation rate and/or decrease the liquid thermal diluent/fuel fluid ratio for small drops, users control the timing of fuel fluid droplet release and diluent liquid droplet release such that the fuel fluid droplets and diluent liquid droplets are alternatively released as the fluids flow along the combustor. With such temporal phase control, users preferably deliver the diluent out of phase with the fuel fluid. I.e they form alternating bands or phases of higher concentrations of fuel gas or droplets, then diluent droplets etc. This method increases the flame propagation rate along fuel fluid droplets within the fuel band. Conversely it keeps the initial diluent concentration in the fuel areas low so that the fuel oxidant mixture is not prevented from combusting. Users preferably time the alternating diluent and fuel bands so that they are close together and soon mix by the turbulence created by the combustion, by diluent evaporation, by the vortices caused by the distribution tubes.

By separating concentrations of fuel fluid vs diluent with fine droplets, this method permits increasing the gross ratio of thermal diluent liquid in the form of fine droplets to fuel fluid without quenching a flame in the mixture of diluent, fuel fluid and oxidant fluid or preventing or hindering the flame from starting and propagating. However, this temporal phase control method could generate sound and excite resonances based on the rate of droplet release. Therefore users preferably adjust the rate of droplet release to avoid significant resonant frequencies within the combustor.

To increase the range of frequency control, users further issue short bursts of fuel fluid droplets or short squirts of micro-jets to adjust this delivery frequency. Users and then adjust the thermal diluent to provide corresponding bursts of diluent droplets or squirts of diluent micro-jets but with complementary phase. Users further preferably change these delivery frequencies and/or phases faster than the resonance frequency to create incoherent combustion and reduce combustor resonances.

Diluent Contactor Tube Downstream of Flame Front

With reference to FIG. 2, users may provide one or more diluent contactor tubes 22 downstream of the flame front. In some modifications, users provide at least one thermal diluent distribution tube 22 upstream and one downstream of the combustion flame front or exothermic reaction zone. The downstream distribution tubes 22 are preferably made from materials capable of handling high temperatures near the combustion and within the energetic fluid.

With further reference to FIG. 2, for example, users may form the downstream distribution tubes 22 from suitable high temperature ceramic materials such as silicon nitride, silicon carbide, mullite, single crystal sapphire, polycrystalline sapphire, aluminum oxide, or other suitable high temperature materials. Sapphire has high strength and can tolerate temperatures of about 1500° C. or higher (Sapphire's melting point is about 2053° C. It is variously reported as tolerating temperatures of about 1800° C. to about 2000° C. and is used to form the nose cones of ballistic missiles.)

Similarly, users may form the downstream contactor from high temperature alloys such as hastalloy. As needed or desired, users preferably provide a thermal barrier coating or other suitable insulation coating to protect the distribution tube from the hot combustion gases. Thermal coatings similar to those used for high temperature gas turbine vanes and blades are preferably used which provide both thermal and oxidation protection. In such configurations, users preferably orient at least some diluent orifices along the upstream portion of the diluent distribution tube so that a flow of cooler diluent fluid blankets the downstream contactor, protecting it from the high temperature combustion gases. This provides evaporation and/or film cooling of outer surface of the distribution tube from the upstream around to the downstream surface of the distribution tube.

Such downstream diluent tubes preferably distribute liquid diluent such as water to provide greater cooling and protection of the diluent tube. Evaporated and/or superheated diluent may also be used. E.g., steam formed by recovering heat from hot exhaust gases discharged from an expander 440 such as gas turbines.

Configuring Velocity, Pressure & Turbulence Distributions

In the relevant art, delivering large excesses of oxidant containing fluid through combustor liner may result in about variations in static pressure and axial velocity transversely across the combustor that are 25% of the mean pressure or velocity. Such variations in transverse distribution of pressure and axial velocity significantly affect the efficiency of the downstream expander. e.g., of the turbine vanes and blades.

Users preferably configure one or more component parameters within the combustor to adjust the spatial fluid delivery and combustor components to configure the spatial distribution of one or more of the axial velocity, the transverse velocity or turbulence, and the static pressure in one or more spatial measures of the energetic fluid exiting the combustor such as in one or both transverse directions. They may also configure them within the combustor.

These parameters may be variously selected from one or more of the multi-passage diffuser configuration, the diluent and fuel perforated contactor alignment, cross section and spacing, the orifice configuration, orientation and fluid ejection pressure, and the micro-swirler spacing, vane angle and configuration and the composition of the total excess diluent.

Configuring Spatial Distribution of Axial Velocity

With reference to FIG. 22, to configure the axial velocity distribution, users preferably configure the number of diffuser passages and the individual fluid passage configuration, including the passage outlet to inlet area ratio, within the multi-vane diffuser. By adjusting one or more of those parameters, they may configure the spatial distribution of axial velocity in at least one transverse direction near the exit of the diffuser.

With these parameters, users may adjust the orifice orientation in the range from aligning with the oxidant flow, flowing transversely to the oxidant flow, or aligning opposite with or upstream against the oxidant flow. With reference to FIG. 27, by using one or more of these parameters, users preferably adjust the transverse distribution of the axial velocity contribution of the diluent. This may be configured to adjust or compensate for at least part of the transverse distribution of the axial velocity exiting the multi-passage diffuser. This provides a more uniform transverse distribution of the axial velocity of the energetic fluid exiting the combustor. By configuring the inlet diffuser and orifice distributions, users preferably adjust the transverse distributions of velocity to more desired or required distributions.

Users may configure the tube blockage factor (tube diameter D divided by tube spacing H) across the duct. They may similarly configure the spatial distribution of the size, vane angles and effective spatial concentration of the microswirler mixing elements. These parameters affect the effective drag and back pressure and thus the axial velocity distribution.

With such measures, the variation in transverse distribution of the axial velocity may be configured to have a standard deviation generally less than 18% of the mean axial velocity, preferably less than 6%, and most preferably less than 2% change in the mean axial velocity across the combustor exit 136 in at least one transverse direction.

Configuring Transverse Pressure Distribution

With the fuel fluid and diluent distribution methods described herein, users configure one or more of the transverse distribution of oxidant containing fluid, diluent containing fluid and fuel containing fluid to control the transverse pressure distribution across the combustor exit. Users may adjust the fluid ejection pressure and velocity relative to the diameter and so adjust the kinetic energy to mass ratio of the fluid delivered into the combustor.

Gaseous diluent is commonly delivered at much lower differential delivery pressures and kinetic energy within the combustor then liquid diluent. Accordingly, users may configure one or both of the portion of liquid diluent to gaseous diluent and the respective fluid ejection pressures, orifices and delivery velocities to adjust the ratio of kinetic energy to total excess diluent enthalpy change delivered into the combustor.

Users may adjust the transverse distribution of vapor diluent to liquid diluent orifices to adjust the changes in pressure vs velocity.

In a similar method, users may configure the transverse distribution of the ratio of liquid diluent to gaseous diluent. For example, the ratio of water spray to excess air. They adjust this to configure the transverse ratio of the increase in fluid volume with combustion and diluent evaporation. This in turn affects the transverse distribution of fluid axial velocity and pressure.

Users may further configure the transverse distribution of tube to tube spacing to adjust the back pressure and thus the transverse pressure distribution. Similarly users may adjust the transverse spatial distribution of the blockage factor or tube width to cross sectional area. Furthermore, the axial configuration of the cross sectional area of the downstream equilibration or transition zone influences has some influence on both the pressure and velocity distribution.

These diffusers, fuel and diluent orifices, delivery tube parameters and equilibration zone shape are preferably configured to achieve desired or required spatial pressure and spatial axial velocity distributions across the exit in at least one transverse direction. E.g., To provide more uniform transverse pressure and velocity distributions in the radial direction in an annular combustor.

By these measures, the variation in transverse pressure distribution may be configured to have a standard deviation generally less than 18% of the mean static pressure, preferably less than 6%, and most preferably less than 2% change in the mean pressure across the combustor exit 136.

Configuring Transverse Distribution of Turbulence or Transverse Velocity

To achieve good mixing, the relevant art commonly injects high quantities of excess oxidant containing fluid (e.g., compressed air) as diluent into the combustor through the combustor walls downstream of the combustion. This may result in transverse turbulence levels in the energetic fluid exiting the combustor of 25% to 50% of the axial flow and pressure drops across the liner of 4% to 8% of the combustor inlet pressure.

As described herein, users preferably avoid the need for most such macro mixing and large pressure drops by configuring the delivery and mixing of fuel, diluent and oxidant fluids in numerous regions across the duct. They may configure the number of passages in the multi-vane diffuser by adjusting the number of splitter vanes. These vanes provide two strong shear regions on either side of each splitter vane exit as the flow ranges from stationary flow at the vane walls to the full flow about midway between the vanes. As these shear regions decay they provide downstream mixing and turbulence. As needed, users may further divide the diffuser passages in a direction generally transverse to the splitter vanes. These can further increase the number of shear regions as needed.

Users may configure micro-swirlers to provide controlled and efficient local mixing distributed across the duct. They may configure and orient orifices relative to the axis to provide various degrees of transverse mixing relative to the axial velocity imparted. Users may configure the orifice diameter and fluid delivery pressure to adjust the degree of kinetic energy delivered relative to the fluid mass flow delivered.

Each of the contactor tubes provides drag and forms downstream vortices, providing turbulence and mixing. Using the methods taught in the '191 patent application, users may configure the cross section of the contactor tubes to adjust the tube drag. They may asymmetrically configure the tubes like miniature airfoils to add transverse flow and turbulence.

Liquid diluent increases in volume much more than gaseous diluent when evaporated and heated. This evaporation provides further mixing turbulence without a mean velocity component. The liquid diluent vs gaseous diluent composition may be configured to adjust the portion of such random turbulence vs directed kinetic energy.

Users preferably utilize one or more of these mixing and turbulence adjusting methods to configure the spatial distribution of a measure of fluid turbulence towards desired spatial distributions within the combustor. E.g., in at least one transverse direction across the duct and/or to adjust the turbulence axially along the combustor. E.g., this measure may be the RMS turbulence, or mean absolute velocity along a transverse direction. Users may configure one or more of these parameters to adjust the mean turbulence in the flow exiting the combustor less than 20% of the mean axial velocity, preferably less than 10%, and more preferably less than 5% of the mean axial velocity.

They preferably configure the transverse distribution of turbulence near the combustor exit to be less than 10%, and more preferably less than 5% across the middle 80% of the combustor exit area. By so reducing the turbulence in the exit planes, users improve the efficiency of the downstream expanders.

Diluent Spray Cleaning

In modified configurations, users preferably configure the downstream diluent contactor tube to further provide major focused diluent spray into the expander 440. This downstream insulated diluent spray contactor tube 24 preferably utilizes a second diluent delivery channel with larger high pressure injection orifices. These provide strong injection sprays with larger drop sizes suitable for cleaning the expander 440 rather than small droplets to ensure evaporation.

Asymmetric Micro-Jets

In many configurations, users preferably configure the mass ratio of thermal diluent to fuel to achieve desired or needed energetic gas temperatures. E.g., preferably with a mass ratio greater than one.

In some configurations users adjust the ratio of design differential pressure across the orifice for diluent fluid and fuel fluid, to provide differing relative mass flows. Increasing the differential pressure of a fluid across an orifice generally increases its flow velocity, momentum and penetration distance, within the choke rate of the orifice.

In some configurations users change the ratio of the size of the diluent orifices to those of the fuel orifices to adjust the ratio of the diluent to mass flows. Increasing the orifice size increases the orifice exit diameter and increases the penetration distance of a jet into the surrounding fluid.

Users preferably adjust the ratio of the number of diluent orifices to fuel orifices as the primary parameter to adjust the ratio of diluent to fuel mass flows. In (most) configurations, users adjust some combination of the orifice size, number of orifices, fluid excess pressure, and fluid temperature, fluid surface tension and fluid viscosity to achieve the desired ratio of thermal diluent to fuel. Users vary this ratio along and across the direct contactors to achieve the spatial distribution of diluent to fuel and achieve the temperature profiles desired or needed.

Differing Lengths of Micro-Jets

In some embodiments, users provide two or more sets of diluent and fuel tubes where the tubes of a smaller set are interspersed with those of a larger set. In such configurations, users preferably offset the smaller set axially downstream from the larger set. Users further preferably configure the fluid pressure, orifice size, alignment of orifices, and orifice orientation to form longer micro-jets for the smaller area set than the larger area set. The longer micro-jets assist in uniformly mixing the diluent and fuel fluid from the small set in with oxidant flow across all the sets.

Configuring Orifice-Contactor Distribution Arrays

In various embodiments, users configure the contactor tubes into contactor distribution arrays. With reference to FIG. 52, in some configurations, the array of contactor tubes 10 may be configured to form a generally planar contactor array 265. In other configurations, the contactor array is configured into three dimensional spatial arrays. With reference to FIG. 1, in some embodiments, users form a spatial orifice distribution array such as into conical, elliptical, parabolic, compound parabolic, hyperbolic or other spatial orifice array as desired or needed. (See also the methods taught in the '191 patent application.) In some configurations users orient the distribution tubes at some angle to the axis of the fluid duct 130.

Array Opening Orientation

These arrays may be oriented in a downstream opening concave "horn" configuration (apex upstream), or in the opposite downstream closing convex "funnel" configuration (apex downstream).

With reference to FIG. 1, the concave orifice surfaces 261 may be oriented to face downstream (with the apex upstream). With reference to FIG. 28, this "horn" 262 array opening orientation is significant in design of exothermic reactors including combustors 56 where the reacting fluids 912 are at an elevated temperature and emit thermal or visible radiation.

Figure 44:
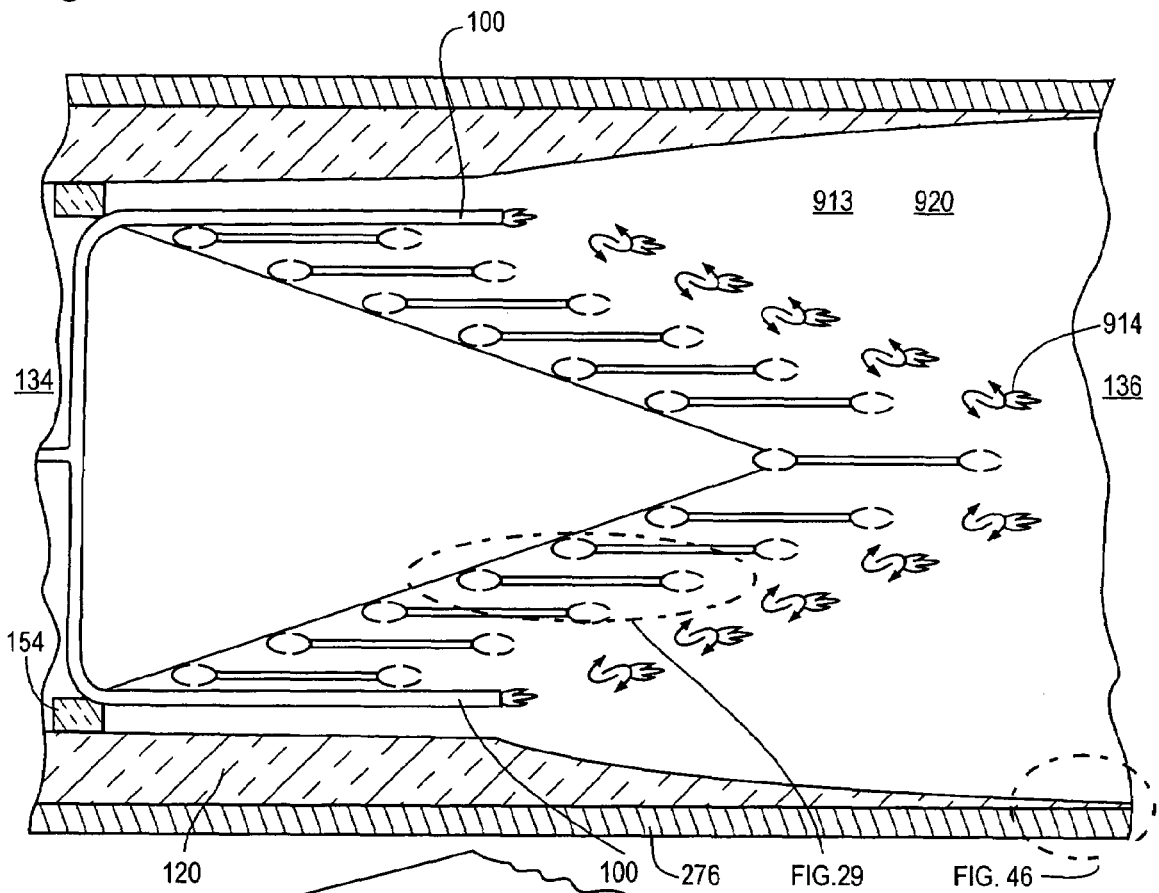
FIG. 44 is a schematic view of a "funnel" shaped convex distributed combustor with fuel and diluent contactors, peripheral flame holders, and a heater tube with a varying heat transfer rate.

The opposing "funnel" configuration 264 faces upstream (apex downstream) into the flow to form a downstream convex orifice surface with a downstream reducing surface as shown in FIG. 44. The orifice surface cone angle, or tube angle to the axis may be used to direct the oxidant fluid from the outside to the inside of long concave or "horn" distribution tube arrays 262 by using small or narrow cone angles. Similarly the fluid can be directed from inside to outside using "funnel" arrays.

With reference to FIG. 1, users may elongate or extend a generally planar orifice distribution configuration into a downstream opening concave orifice array 261. These may be connected to one or more fluid distribution manifolds 242 preferably oriented radially from the apex to the periphery of the conical array. For example, they may form arcs 10 between the manifolds, or wind contactor tubes 10 at some helical angle about a convex shape to form the concave orifice distribution array 261. They may use circular arcs to form a conical orifice array 262 as shown in FIG. 28. Such arrays fill the cross sectional space of the combustor while providing more room between adjacent tubes for oxidant fluid flow than planar arrays. This reduces the drag and associated pressure drop in the fluid flowing across the concave orifice array 261 and associated pumping losses.

In some embodiments, users may use a concave fuel distribution array 261. In such configurations, fuel fluid delivery, evaporation, diluent evaporation and combustion are spatially distributed. (E.g., conical, parabolic, elliptical or similar non-planar surface.) The axial fuel fluid distribution in turn distributes the combustion sound and feedback influence. This significantly reduces and diffuses acoustic feedback.

Conical or "Horn" Concave Array

In some embodiments users preferably select and form the "horn" downstream opening concave distribution array combustor configuration 262. (See, for example, FIG. 28 for a conical "horn" array.) Such embodiments are useful in providing fairly uniform combustion across the fluid duct 130 while reducing the pressure drop across the fluid and thermal diluent distribution arrays.

These "horn" configurations 262 are also useful when users desire or need to increase the radiation field and radiation feedback. In such embodiments, the "horn" configuration 262 will increase such thermal or visible radiation within the concave flame region. Correspondingly, this configuration shields the fluid duct 130 surrounding the distribution arrays from the central combustion.

This configuration forms a partial "black body" (or "gray" body.) The radiation from the concave flame in this concave combustor array 261 heats and evaporates fuel fluid entering the concave distributor array 261. This radiation enhances a flame holder (ignition authority) 100 near the apex of the concave distributor array 261. This provides some "feedback" upstream to where the first and second fluids are mixing and beginning to react.

When the flame is established within the "horn" conical combustor 262, the region between the flame holder 100 and the surrounding perforated distribution tubing experiences the radiation from the surrounding flame and from the flame holder 100. This region also experiences radiation from the flame and surrounding surfaces further downstream within the combustor 56.

This turbulent flame transfer and radiation enables the flame holder 100 to reliably ignite fuel—oxidant—diluent mixtures with substantially higher velocities than conventional technology. This significantly increases the fluid mass flow rate at the combustion stability limits.

These improvements in heat transfer rates and stable combustion velocities increases as the "horn" Direct Fuel Contactor's 262 cone angle narrows. For cone angles smaller than 45 degrees (less than 90 degrees included angle), the time for the flame to propagate from the center to the outer radius of the combustor compared to the time to traverse the inlet to outlet of the combustor permits operating at effective fluid flow rates that are above the flame propagation speed.

Smaller cone angles increase the length of the combustor and related costs. Suitably weighting these factors, users generally configure the "horn" Direct Fuel Contactor 262 with a cone angle between about 5 and 85 degrees, preferably about between about 15 and 60 degrees, and most preferably between about 20 and 30 degrees. (i.e., the included angle is generally between about 10° and 170°, preferably between about 20° and 160°, and most preferably between about 40° to 60°.)

Igniting High Velocity Flows

To achieve reliable combustion in relevant combustor technology, pressurized oxidant fluid flow rates are strongly reduced within the combustor to be less then the flame speed. Users may configure the trifluid combustor to sustainably ignite fluids traveling at relatively high speeds. They may especially configure fluid delivery and combustor parameters to be able achieve speeds similar to or greater than the conventional flame propagation speeds of the combustible fluid in some embodiments.

With further reference to FIG. 1 and FIG. 28, users preferably configure perforated tubing of at least one Distributed Fuel Contactor and/or one Distributed Diluent Contactor within the combustor fluid duct 130. The multiple passages in one or more distributed direct fluid contactor(s) are configured to deliver and mix fuel fluid and oxidant fluid. The distributed contactor arrays 260 are preferably configured into a downstream increasing concave tube array 261 (e.g., a downstream opening conical array 262 or a similar elliptical array in the "horn" configuration, or a rectangular 268 or annular tent array 269.)

Users then preferably locate the flame holder 100 near the upstream end of the expanding concave fluid distribution surface formed by the "horn" distributed contactor array 261. With such configurations, heat and flame flowing from the flame holder ignites the fuel-oxidant mixture delivered by the nearby section(s) of the concave distributed direct contactor 261.

The flame holder creates a flame that extends axially beyond the next downstream section of the concave contactor array 261. The radiation and convected hot gases from the flame then heat and ignite the fuel oxidant mixture delivered by the next radially outward and downstream section of the concave distributed contactors 261. By such configurations, the flame progresses downstream alongside the next portion of unburnt fuel.

Near Adiabatic Combustion Zone

With further reference to FIG. 4 and FIG. 28, heat radiated from the pilot flame and combustion to the Distributed Fuel Contactor and Distributed Diluent Contactor heats those surfaces. Those surfaces are cooled by the incoming fuel fluid, diluent fluid and oxidant fluid. The heat radiated to the distributed contactors is thus rapidly returned to the combustion zone. Furthermore almost all the heat radiated, convected and conducted from the flame holder 100 is transmitted or transferred to the surrounding fuel containing gas and distributed contactors.

Furthermore, since the combustion is within and about the interior of the concave contactor array 261, the contactor surfaces exposed to the flame experience radiation from flame around most of the rest of the interior of the concave contactor array 261. This further heats the incoming fuel fluid and oxidant fluid, helping them to ignite and combust.

By so configuring the flame holder and the contactors to form a concave array, they effectively capture and improve the heat transfer from the pilot flames and combustion. This upstream portion of the combustor 56 thus operates under near adiabatic conditions with very little net heat being removed from the combustion zone.

With further reference to FIG. 28, with such configurations, the flame effectively only has to propagate from the inner axis at the upstream end of the concave portion (e.g., a cone) to the outermost downstream edge of the concave portion (or cone) in the time the flame is carried by the flow from the upstream to downstream end of the combustor. Therefore, users preferably design the half "cone angle" of the combustor as the arctangent of the transverse flame propagation rate divided by the axial fluid velocity of the combusting gas. Here users define the half cone angle as the angle between the axis of the distributed fuel fluid contactor and the diverging surface of the concave distributed contactor array. I.e., "Horn" conical combustors 262 (downstream increasing) have half-angles between 0° and 90°. Conversely, downstream decreasing convex contactor arrays 263 such as "funnel" conical combustors 264 (downstream reducing) have half-angles between 90° and 180°.

By providing the distribution tubes, users form vortices downstream of each of the distribution tubes. These assist in mixing and convective heat transfer. In some configurations, users further increase this turbulent mixing by providing micro-swirlers along the fluid distribution tubes to create vortices axial to the flow. See description herein in Section: "MICRO-SWIRLER MIXING ENHANCERS."

Convex "Funnel" Array

In some embodiments users select the downstream closing "funnel" convex orifice array configuration 264. (See, for example, FIG. 44 for a conical "funnel" array.) Here the largest orifice array opening faces upstream and the smallest array opening faces (or "points") downstream.

In combustors, this configuration creates the flame outside the downstream convex distribution array. Heat radiates out from the array. This reduces the radiation environment and radiation feedback to the fuel fluid or fluid distribution tubes, especially with cooled outer duct walls 132. This configuration creates a more uniform thermal—mixing zone downstream and outside the distribution array.

Users may configure a downstream decreasing convex conical combustor 264 within a duct. I.e., in the "funnel" configuration. This is typically used to internally heat a heating tube. In such combustors, heat from combustion from upstream outer distributed contactor tubes is convectively carried to nearby downstream combustible mixtures formed from inward and downstream distributed contactors. Such configurations are frequently used to heat fluids in tanks such as crude petroleum, asphalt and viscous chemicals.

In "funnel" combustor configurations, some radiation transmits combustion heat to adjacent downstream inward mixtures. To compensate for lower radiation heat transfer, users preferably provide at least one flame holder 100 to ignite the combustible mixture and sustain ignition in some embodiments. Users preferably provide flame tubes 116 from at least one upstream flame holder 100 to at least one location near the outer upstream end of the "funnel" distributed combustor 264 in some embodiments. In other embodiments, users position the flame holder 100 near one location the outer upstream end of the combustor 56.

Tent & Other Arrays

Figure 58:
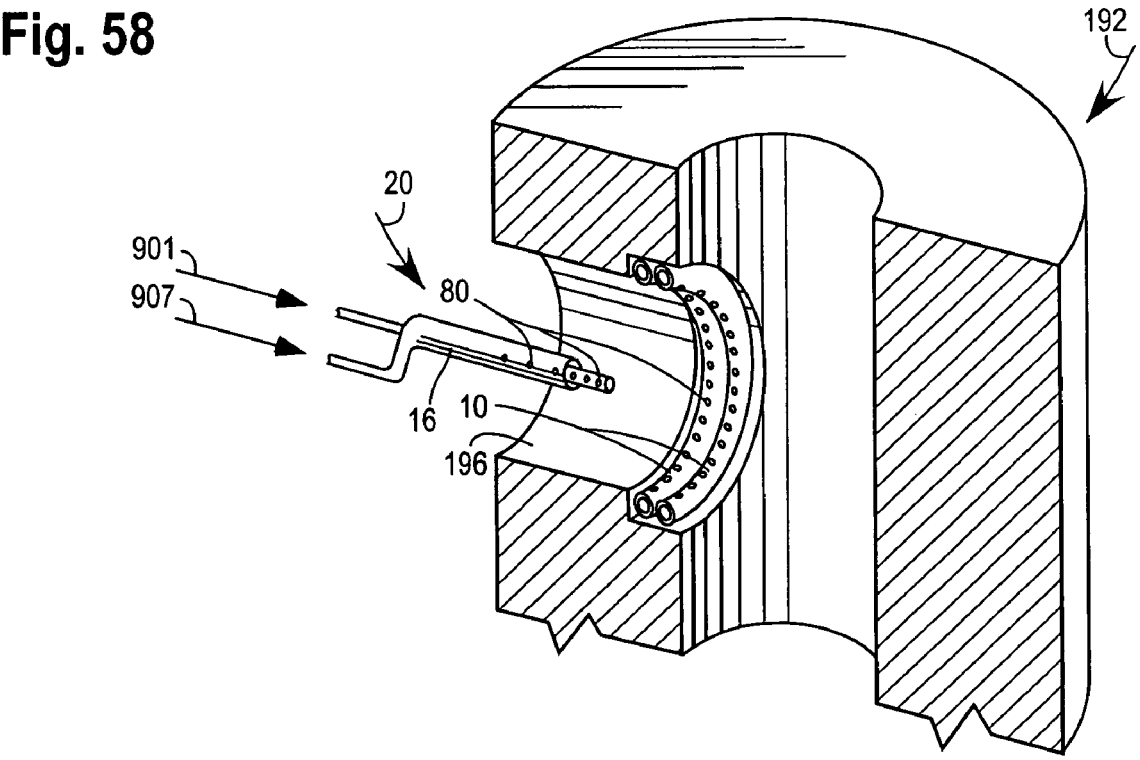
FIG. 58 is a conceptual perspective view of a radial port into a cylinder with two peripheral perforated fluid contactors, and two axial concentric perforated direct fluid contactors.
Figure 59:
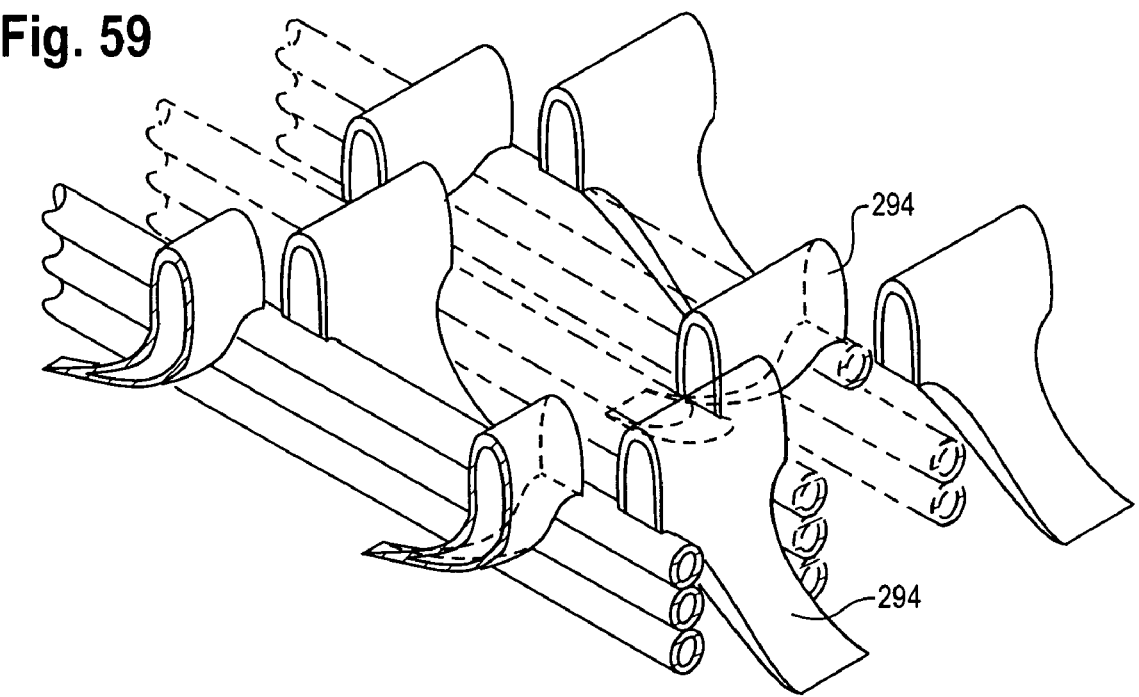
FIG. 59 is a conceptual perspective view of "sitting" "T" micro-swirlers distributed about multiple fluid contactors.

While distributed orifice surfaces or contactor tube array orientations have been described in terms of concave or convex arrays with conical examples, one trained in the art will observe that similar benefits will be obtained in orienting the pyramidal or rectangular tent shaped arrays 268, or annular tent arrays 269 similar to the methods depicted in FIG. 58 and FIG. 59 of the '191 patent application, and as described herein, and for other curvilinear three-dimensional orifice arrays.

In some embodiments, users preferably configure distributed contactors into one or more tent arrays to deliver oxidant fluid and fuel fluid into the combusting region in a spatially controlled manner. They preferably configure distributed pilot flames at the upstream vertex of a downstream concave facing tent array i.e., in the "horn" configuration. The tent array may be configured to a circular duct, annular duct, and rectangular duct, or otherwise similarly to the shape of the desired duct. (See, for example, FIG. 58 and FIG. 59 in the '191 patent application.)

Planar Arrays Normal to the Duct Axis

With reference to FIG. 52, users may configure the distributed orifices or perforated distribution tubes into fairly planar arrays oriented perpendicular ("normal") to the axis of the main combustor fluid duct. For example a circular planar array 265 in a circular duct 144. I.e., typically the duct through which flows most of the oxidant containing fluid. These planar orifice arrays may be circular planar arrays 265, rectangular planar arrays 266, annular planar arrays 267 or similar curvilinear arrays as desired or needed to fit the duct. (See, for example, FIG. 48, FIG. 49, FIG. 50, and FIG. 52). In circular fluid ducts 144, users may wrap the distribution tubes in a helical array. Similarly, they may configure the distribution tubes in circles or circular arcs connected to one or more manifolds 240, preferably configured radially radial manifolds 240. In non-circular fluid ducts 130, users may form the distribution arrays parallel to or normal to one or more sides of the fluid duct 130. They connect the distribution tubes 10 to corresponding manifolds 240 oriented parallel to the sides of the fluid duct 130. Such planar array configurations provide the benefit of an axially compact configuration.

Cylindrical Orifice Array

With reference to FIG. 53, users may form distributed orifice arrays into generally cylindrical tube configurations 265. E.g., by using dual passage contactor tubes 16. They may deliver the oxidant containing fluid radially into a fluid duct 130 outside of the cylindrical array 265. E.g., by blocking off the central end of the cylindrical tube array 265 at the inlet 134 to the duct such as by using an insulating cap 157. Similarly they may block off the portion of the duct between the cylindrical tube array 265 and the duct wall 144 near the outlet 136 of the duct. E.g., by using an insulating ring 154.

They may similarly bring the oxidant containing fluid in from a side passage or duct that is radially outward from the tubes. This cylindrical configuration is useful when a generally cylindrical combustion zone is desired or needed.

"Top Hat" Orifice Array

In further embodiments, users form fuel and diluent distribution arrays into "top hat" tube configurations 271. (See, for example FIG. 66 of the '191 patent application). They may select such arrays when fluid is brought radially into a fluid duct from an end passage or a side passage, or when a generally cylindrical combustion zone comprising an end wall combustion zone is desired or needed.

Modular or "Can" Combustors

In some configurations, users form modular combustors, commonly cylindrical combustors or "can" combustors comprising distributed contactor arrays configured to fit the modular combustor. (See, for example, the combustor configurations depicted in FIG. 1, FIG. 28, FIG. 52, FIG. 53 in the present application, and also in FIG. 65 and FIG. 66 of the '191 patent application.) E.g., they may utilize planar contactor array, concave contactor array, "horn" contactor array 262, "top hat" contactor arrays 271 or similar contactor arrays as desired to form modular combustors.

"Can Annular" Combustors

Cylindrical combustors in a "Can" or "can-annular" configuration are known in the art. In further embodiments, users form a plurality of modular combustors, each comprising a concave array of distribution orifices, configured into an annular combustor array. They preferably provide fluid communication ducts between two or more modular can combustors to form a can annular tube array (not shown.) They configure such communication ducts and arrays to assist in balancing combustion and pressures between the respective modular combustors.

Relative Distributor Array Configurations

Users may adjust the tube to tube gaps to reduce pressure drops of the oxidant fluid as it flows through the tube array and achieve more desired ratios of oxidant fluid to fuel fluid delivery area ratios. In a similar fashion, users preferably configure the axial distance between the fuel fluid distribution tubes and the diluent distribution tubes.

In some embodiments users preferably displace the tubes axially to increase the flow passages between nearby tubes. With such extended concave water and fuel fluid distribution surfaces, the net gas passage area within the fuel fluid and water tube distribution region can be similar to that downstream in the combustor. By spreading the tubes apart, users create larger passages between the tubes, reducing the pressure drop across them. This reduces the consequent pumping losses and correspondingly increases system efficiency and internal return on investment.

In other embodiments, users displace tubes axially while providing similar tube to tube gaps compared to a planar configuration. This extended configuration provides more distribution tubes within a duct, for the same net passage area between the tubes. In other embodiments, users increase or decrease the transverse gap spacing to increase or decrease the pressure drop for fluid flowing between the tubes.

By adjusting the relative axial spacing between the fuel distribution tubes to thermal diluent distribution tubes, the relative axial evaporation time and degree of the fuel fluid and diluent fluid may be adjusted. By adjusting the relative axial spacing of fuel fluid and diluent tubes, users may adjust the relative axial fuel and thermal diluent concentrations, thus affecting the ignitability and combustion stability limits.

Users may use relative axial spacing this to influence where the thermal diluent evaporates relative to the flame front. This adjustment also changes the temperature profile within the combustor and thus the NOx and CO emissions.

In some configurations, users adjust the fuel fluid tube to thermal diluent tube radial or transverse spacing to adjust the ratio of the oxidant fluid flow area to the fuel fluid flow area (I.e., the cumulative fuel orifice area) and/or the thermal diluent flow area (I.e., the cumulative diluent orifice area.) These in turn influence the oxidant/fuel and diluent/fuel ratios (in approximate proportion to the respective pressures and pressure differences across the tube arrays and the tube orifices.)

Where users desire or need to reduce drag, pressure drop and pumping losses, they may orient distribution tubes in line with the oxidant fluid flowing over them. E.g., generally in line with the duct axis. Similarly when the distributions are streamlined, the long axis of the tube cross section may be aligned with the oxidant flow path or about with the duct axis.

Figure 40:
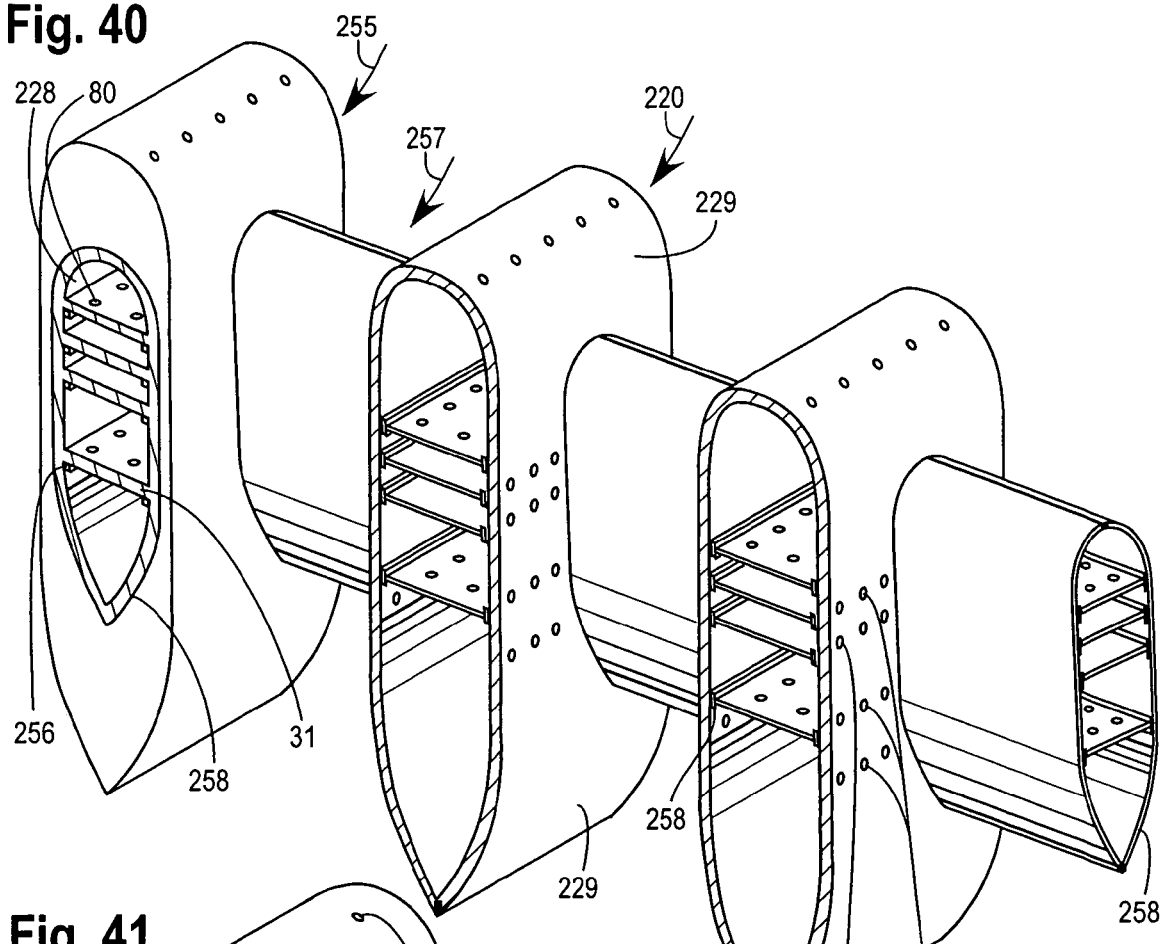
FIG. 40 is a schematic cross-sectional view of a streamlined multi-passage contactor tube with fuel and diluent fluid passages.

In other configurations, where users desire to redirect the oxidant fluid flow, they preferably orient transversely elongated distribution tubes at an angle to the fluid flow. They may similarly use tubes with aerodynamically configured cross sections to help redirect the flow, such as shown in FIG. 40 of the '191 patent application. In modified embodiments, users may direct the oxidant containing flow in one direction with an upstream tube array. They may then redirect that flow back with the downstream tube array flow.

In various embodiments, users orient the fuel fluid distribution tubes relative to the thermal diluent distribution tubes as needed or desired.

In some embodiments, users preferably configure fuel perforated tube contactors 11 and diluent fuel perforated tube contactors 14 upstream/downstream of each other. This configuration reduces the pressure drop in the second fluid flowing across those tube contactors compared to radially alternating fuel tubes 11 and diluent tubes 14. Where a minimum pressure drop is desired or needed, users preferably align tubes upstream/downstream of each other.

In other embodiments, where greater turbulence and mixing is desired or needed, users preferably stagger tubes so that downstream tubes are aligned with upstream gaps G.

Alternating Fuel Fluid and Diluent Tubes

Users may configure arrays of alternating fuel fluid and diluent fluid distribution tubes. For example, these distribution tubes may be wound as alternating helices. They may be similarly be configured into concentric circles, or in planar arrays etc.

Acoustic Coherence or Resonance

Users may configure an spatial orifice array to provide acoustic coherence. For example, to form an acoustic speaker or to provide resonance in a chamber. See for example, a planar array in FIG. 52, or a shallow concave array similar to that shown in FIG. 4 or FIG. 8.

Users may configure the direct contact fluid distribution arrays in shallow concave orifice arrays 261 or in shallow conical or planar surfaces. This enhances acoustic coherence as desired. e.g., acoustic speakers or resonant mixing of mixtures. Fluids are preferably distributed from a central apex of the orifice array through radial manifolds to the perforated distribution tubes. The axial location of the orifice surface is preferably adjusted as a function of radial distance from the center to adjust the time of a pressure pulse through the distribution array to the orifice relative to the time for the oxidant containing fluid to travel axially relative to the apex of the array. By adjusting this surface configuration, users adjust the axial fluid delivery phase surface. Users may thus adjust the configuration of the concave surface to change the acoustic feedback.

In such configurations, users preferably pulse or modulate liquid fuel pressure in fuel fluid manifolds 242 to generate coordinated fuel fluid drop ejection across the coherent distribution surface 266. They configure the frequency and amplitude of the liquid supply pressure to vary the drop delivery rates. This creates varying combustion rates. This coherently varies the rate of gas heating and expansion across the planar contactor array 266, forming a planar acoustic source. I.e., a "speaker."

In such configurations, users preferably similarly pulse or modulate liquid pressure in diluent manifolds 244. They may adjust the ejection velocity and phase such that the liquid diluent drops are formed just after the fuel fluid drops and are ejected at substantially the same velocity. This forms bands of liquid diluent drops (E.g., water) just after the fuel fluid bands. The combusting fuel band creates heat that evaporates the band of diluent drops. This causes a coherent rapid expansion within that band. This creates an acoustic source with a similar modulation to the liquid supply modulation.

In some configurations, to form larger acoustic sources, users preferably configure multiples coherent acoustic sources into a larger acoustic array. Users preferably adjust the phase relationship (or delay) between sources to focus the large acoustic source, adjust the focal length and/or steer the acoustic beam as desired.

In modified embodiments, users configure spatial contactor arrays 260 to adjust acoustic properties. The orientation and "cone angle" of concave or convex opening arrays further influence the acoustic regimes within and around these distributed arrays, particularly with reacting flows.

In some embodiments, where users desire or need to reduce the amplitude of acoustic resonance, ("pressure oscillations" or "noise") users preferably select an intermediate cone angle (intermediate between planar and cylindrical surfaces) to reduce significant acoustic resonant modes within the fluid duct 130 or associated downstream (or upstream) ducts or equipment. (See, for example, FIG. 28) This provides a passive means of controlling the acoustic resonance.

To increase longitudinal acoustic modes perpendicular to a plane through an array, (perpendicular to the longitudinal axis of the array), in some embodiments, users preferably select a generally planar tube array 266 with little or no cone angle or array opening angle. (See, for example, FIG. 52) To maximize radial acoustic modes perpendicular to the axis of the fluid duct 130 (generally perpendicular to the axis of the array), in some embodiments, users preferably select the cylindrical array 270 and configure it for a "cone angle" or array opening angle near or equal to zero or 180 degrees. (See, for example, FIG. 53.)

With reference to FIG. 54, users may excite acoustic modes within a chamber and preferably maximize acoustic feed back by using a focusing resonant duct 140 or chamber. The downstream walls are preferably configured as extended compound parabolic concentrators. E.g., as a three-dimensional compound parabolic concentrator surface obtained by rotating a compound parabolic concentrator curve about the flow axis. The upstream walls are preferably configured with an intake port opening into a generally elliptical shape. Users preferably position concave arrays 261 of fuel and diluent distribution tubes across the resonator near the upstream walls. A flame holder 100 is preferably located near the center and downstream of the distribution arrays.

Users preferably control the fuel fluid and/or diluent injection to create strong acoustic combustion oscillations in some embodiments. These are generally focused by the compound parabolic concentrator walls to a region near the combustor exit 136. This provides high resonance with hot gases in the downstream exit tube. Such configurations are useful for melting and/or mixing components that are fed in with the intake oxidant fluid. In other embodiments, users form cylindrical "Can" combustors or rectangular combustors and position suitable planar arrays across or about the combustor. They preferably adjust the combustor's Length to Diameter ratio to greater or less than two to preferably excite longitudinal or radial modes.

Internal Combustion Engines

In some embodiments, distributed arrays inject at least one fluid (such as a gaseous fuel, a liquid fuel or water) into work engines along with an oxidant containing fluid (e.g., ranging from air, to oxygen enriched air, to oxygen). In some configurations, users distribute both fuel fluid and thermal diluent through one or more direct fluid contactor arrays 260. (E.g., diesel fuel and water.)

Conventional systems inject one or a few fuel fluid jets though a few orifices into a combustion chamber using very high pressure pumps. This is often done after the air is significantly compressed. Injecting into a pressurized fluid requires high velocities to achieve substantial jet penetration.

With reference to FIG. 58, users may distribute a large number of orifices around the periphery of the chamber e.g., through a perforated distribution tube 10. They preferably inject numerous fine microjets of fuel fluid into the chamber. The perforated tube is preferably wound around the cylinder head space above the limit of piston travel. The orifices preferably point towards the center of the chamber, away from the walls. The orifices may be oriented with come tangential orientation to impart some swirl or turbulence component to the fluid which increases mixing.

This method permits the diluent and/or fuel fluid to significantly penetrate and evaporate by the time the oxygen containing fluid is compressed within the combustion chamber. This provides much smaller more uniform drops with more uniform residence time. The results in significantly improved charge uniformity.

In the relevant art, various engines are made which draw air in through openings, ports, cylinder slot ports or perforations in or around the wall of an engine cylinder or similar passages. With reference to FIG. 55, FIG. 56, FIG. 57 and FIG. 58, users preferably apply the Direct Contactor system to provide for distributing at least one fluid through perforated distribution tubes, generally either a fuel fluid or diluent in some configurations. They may place an array of streamlined perforated tubes 10 around the wall of the combustion cylinder 192, around an opening, or distributed across one or more of these openings.

In some embodiments of the present invention, users preferably deliver both fuel fluid and diluent fluid through multiple passages in one or more perforated tubes as described herein. They preferably place an array of such streamlined perforated tubes around the wall of the combustion cylinder 192 over openings into the cylinder. In some embodiments, users preferably wind thin streamlined perforated tubes around the combustion cylinder 192 over these openings in a direction tangential to the combustion cylinder wall 192. (See, for example, FIG. 55.) Users connect the fuel fluid passages to a fuel fluid supply manifold 242 and the thermal diluent passages to a diluent supply manifold 244 respectively. (E.g., diesel fuel and water.)

In other embodiments, users position the perforated tubes around the wall of the combustion cylinder 192 parallel to the cylinder axis. (See, for example, FIG. 56.) Users connect the fuel distribution passages to the fuel fluid manifold 242 and the thermal diluent passages to the diluent manifold 244 respectively.

In some embodiments, users position one or more perforated distribution tubes around one or both sides of these cylindrical wall openings to deliver fluids into the combustion cylinder 192. (See, for example, FIG. 57.) The tubes are preferably indented into the walls of the combustion cylinder 192 on either side of the cylinder slot ports 194 to reduce turbulence and drag.

One or both of the fuel fluid and diluent fluid are preferably injected into the cylindrical openings as micro-jets through numerous fine orifices. Users preferably provide multiple orifice lines as needed to provide the desired cumulative microjet orifice area in some embodiments. These numerous micro-jets provide many more micro-jets than conventional sprays from a few orifices. Users preferably adjust orifice size and fluid differential pressure to achieve the desired penetration. They preferably configure the number of orifices to achieve the flow required. E.g by adjusting the orifice linear longitudinal, and the number of orifice lines and transverse spacing.

For example, a slot 194 about 5 mm wide around the combustion cylinder 192 of about 125 mm in diameter provides an entry cross sectional area of about 1,960 mm2. The two edges of the slots 194 form about 785 mm peripheral length. Thus, users forming about 2 μm orifices about every 6 μm per line around each slot wall for each passage provide about 130,800 orifices and micro-jets per line in each of the fuel fluid and thermal diluent passages. Such a configuration of distributed orifices provides about 0.41 mm2 gross orifice area per peripheral orifice line. By providing about 100 lines of orifices about a distribution tube, users provide about 41 mm2 gross orifice area per peripheral distribution tube.

In modified embodiments, users orient the orifices to spray the micro-jets into the combustion cylinder 192. Such microjet configurations reduce the pressure drop across an array of perforated tubes.

In other embodiments, users position one or more arrays of perforated distribution tubes across one or more intake ducts or ports to deliver one or more fluids into the fluid flowing through those ducts or ports. Such embodiments use cylindrical, planar, conical or other arrays as described herein to provide features desired or needed.

With reference to FIG. 58, in some embodiments users provide perforated distribution tubes positioned peripherally around the duct or port opening. These are preferably indented into the fluid duct wall 132. The perforated tubes may be positioned upstream in the duct to adjust the residence time to adjust the amount of evaporation of the liquid in the intake air.

With further reference to FIG. 58, in some embodiments, users provide one or more perforated distribution tubes within, around, or across the fluid duct 130. For example, with reference to FIG. 90 in the '191 patent application, these perforated fuel and diluent contactors may be distributed around the periphery of an intake port to an engine upstream of the intake valve. The orifices may configured to deliver jets to different penetrations into the duct, such as shown in FIG. 85 and FIG. 86 of the '191 patent application. E.g., by providing different sized orifices and/or multiple pressure contactors.

Users may position at least one axial perforated distribution tube along the axis of a fluid duct 130, preferably as a coaxial contactor with dual passages for fuel fluid and diluent fluid. A second perforated distribution tube is preferably positioned upstream of the first distribution tube and preferably positioned concentrically about the first tube to form a Concentric Passage Contactor Perforated Tube 20. The fuel fluid and diluent fluids are respectively fed into the two perforated distribution tubes. The manifolds 240 or feed tubes are preferably used to support the perforated distribution tubes. This configuration is particularly suited for micro-jets where the spray expands as it moves outward into the fluid duct 130.

Some engines use prechambers connected to the main cylinder(s). In some embodiments, users position one or more perforated distribution tubes across or around one or more fluid ducts or ports connecting to such prechambers to deliver fluids into those prechambers. (Similar to FIG. 58.) One or both of the fuel fluid and thermal diluent fluid are preferably injected into the entry ports as micro-jets through numerous fine orifices. In modified embodiments, the orientation of the orifices is directed into the combustion cylinder.

In other embodiments, the perforated distribution tubes are positioned about or along fluid ducts leading to or from such prechambers.

Multi-Passage Contactor Tubes

Figure 41:
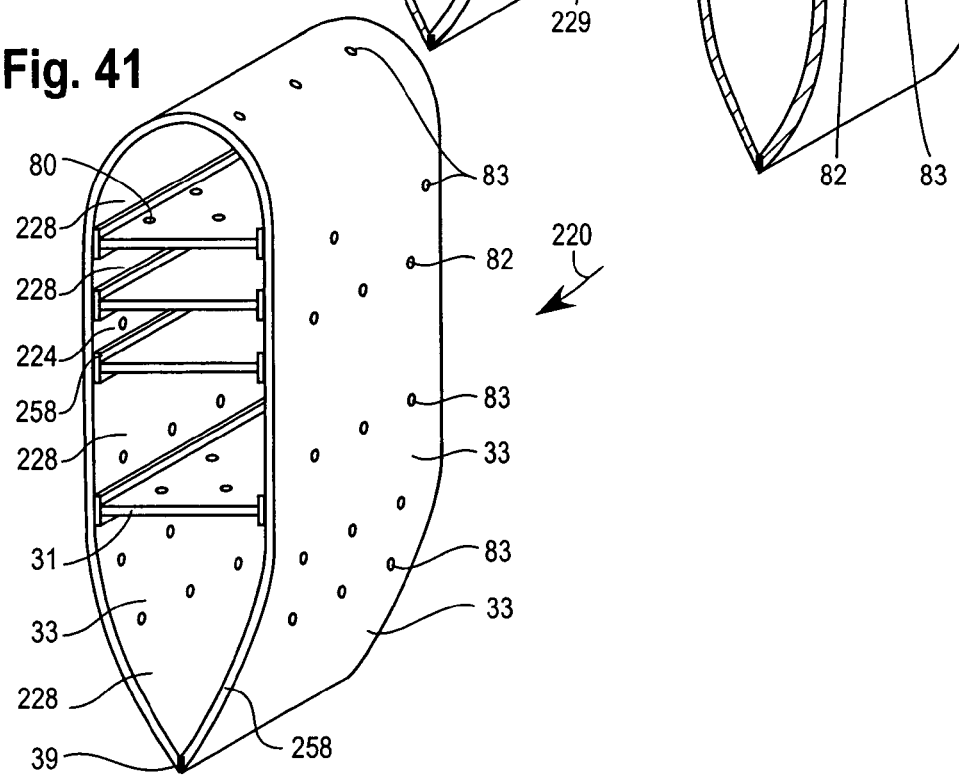
FIG. 41 is a perspective view of a streamlined multi-passage Tube-Duct Junction with a central fuel passage and adjoining diluent fluid passages.

With reference to FIG. 41, in some embodiments, users preferably configure multiple tube passages 222 in a contactor tube 10 to form multi-passage contactor tubes 220. E.g., these may have one or two fuel passages 224 for liquid fuel and gaseous fuel, or for multiple fuels. They preferably have one or more diluent fluid passages 228. These may protect the fuel passages and/or deliver diluent.

Multi-Passage Tube Components

With further reference to FIG. 41, users may form the multi-passage contactor tube by taking take one thin strip and fold it over to form the two tube side walls 33 of the multi-passage contactor tube 220. These may use extensions 229 upstream or downstream of the multi-passage contactor array. E.g., to reduce drag or strengthen them. They may configure one or more intra-tube walls 31 between the two tube side walls 33 to form two or more passages. (e.g., fuel passages 224 for fuel fluid and diluent passages 228 for diluent fluid.)

Users preferably form these intra-tube walls 31 such that they can transfer forces from one multi-passage tube 220 to another. E.g., the intra-tube walls 31 to form walls between passages are preferably configured normal to the tube axis. They preferably coat the ends of the inter-passage intra-tube walls 33 with suitable bonding material to form a bond layer 258. (e.g., layer of solder, brazing, or adhesive over the contacting surfaces). They preferably bond the downstream edges of the thin strips or contactor sides together. The bond layer 258 is preferably formed from a bonding material that retains strength at temperatures substantially higher than the temperature at which the fuel fluid begins to coke or polymerize, but lower than the construction temperatures of the materials being bonded.

In some embodiments using curvilinear contactor tubes 10, users preferably form two strips into two complementary contactor sides. They bond together at least one and preferably both of the upstream and downstream edges of the side strips. Users preferably drill the orifices in the thin strips prior to assembly for ease and speed of manufacture. Alternatively, the orifices can be formed after assembly of multi-passage tubes 220 or of larger assemblies.

Control Fuel Fluid Temperature

In some embodiments, users preheat the fuel fluid above ambient temperatures in some configurations. Conversely, users may control the temperature of the fuel fluid being delivered to less than temperatures at which fuel fluid coking or polymerization significantly increase total life cycle costs where that is of concern in some configurations. (e.g., about less than about 373 K or about 100° C. or 212° F. or greater than about 573K or 300° C. or 527° F. for jet fuel.)

Users preferably conduct diluent fluid in one or more passages adjacent to the fuel fluid passage in some embodiments. They may configure the exposed surface of the fuel fluid passages relative to the heat exchange surfaces with the adjacent thermal diluent passages as needed to control fuel coking or polymerization. They may control the temperature of the diluent fluid to control the degree of fuel preheating while avoiding coking and polymerization in some configurations. I.e., thermal diluent adjacent to the fuel tubes may be controlled below the temperature of the fuel. They may add thermal barrier coatings to reduce heat transfer to the fuel as desired or needed.

Compound Contactor Arrays

In some embodiments, users preferably configure arrays of multi-passage distributed contactor tubes to deliver both fuel fluid and diluent fluid through multiple orifices. With reference to FIG. 40 and FIG. 41, these usually include connecting multi-passage contactor tubes 220 to multi-passage manifolds 246, and joining those through tube-duct junctions 255 or inter-tube ducts 257.

In pressurized energy conversion systems, compression heats the upstream incoming air, in some cases sufficient to polymerize or coke fuel. Heat from downstream combustion can similarly heat the fuel. Users preferably duct diluent alongside fuel to protect the fuel.

Users may configure some or all of the fuel passages and orifices towards tube array sides that are not directly exposed or are less exposed to the heat of combustion or hot combustion gases. For example, in "horn" contactor arrays, users preferably configure the exposed fuel fluid passage surfaces and orifices on the radially outer portions of the multi-passage contactor tube 220 away from the central combustion within and downstream of the "horn" array. The radially inner surface may have fewer or no exposed fuel passage surfaces and orifices. Users preferably configure more thermal diluent passage surfaces and orifices on the radially inner portions that are more exposed to the radiation from the combustion.

In modified configurations, users may provide thermal diluent passages to cover a major portion or all of the fuel fluid passages that are nearer to or exposed to a high source of heat flux. E.g., typically the downstream or radially inner portions of the multi-passage contactor 220 nearer the combustion or the downstream. They preferably configure a smaller portion or none of thermal diluent passages to cover the fuel fluid passages away from the combustion. With higher combustion temperatures users preferably configure more diluent passages 228 towards the combustion (downstream) compared to away (upstream) from the combustion.

Users may provide the oxidant fluid to combustors at pressures as desired. Eg across the range of pressures from low pressure turbines such as simple microturbines to high pressure turbines. E.g., with pressure ratios across the range from about 4 or less for simple microturbines to about 60 or higher for high pressure turbines. They more preferably configure the combustor to accommodate pressure ratios in the range 20 to 45 for moderate to larger commercial turbines.

Higher pressures result in higher oxidant fluid temperatures. Users preferably configure the diluent contactor to deliver sufficient diluent fluid towards the upstream compression heated oxidant fluid to keep the fuel fluid at the desired temperature, particularly at high pressure ratios and oxidant fluid temperatures.

Users may configure a compound multi-passage contactor tube 220 so that the heat transfer between fuel fluid and diluent fluid maintains the fuel fluid temperature within a desired range, particularly in the presence of heat from combustion and hot gases. For example, users adjust the portion of thermal diluent cooling and diluent passages oriented nearer the combustion (generally downstream) to the thermal diluent cooling and diluent passages oriented nearer the incoming hot compressed oxidant fluid (generally upstream) as needed relative to the fuel fluid and fuel fluid passages in order to control the temperature of the fuel fluid and/or diluent fluid within desired ranges. They may use methods of calculating heat transfer as illustrated by Jordal (2001). These may be further expanded to account for radiation and variations in flow, turbulence etc., and by using computational fluid dynamics (CFD) coupled with complementary finite element heat transfer tools as needed.

In order to protect the multipassage contactor tube from high radiant heat fluxes, a portion of diluent fluid may be ejected from orifices in such as way as to form a protective or cooling film around the tube. This may utilize specialized passages and orifices or porous layers. Use of protective fluid layers is used in gas turbine art, both for combustor liners and turbine blades. However the cooling fluid is commonly compressed air. In the present invention, the protective fluid is likely to be liquid water. Users may position some thermal diluent orifices upstream to provide a thin film over the outer fuel fluid passage walls to protect them.

With reference to FIG. 28, with a concave or convex spatial orifice array, radiation and hot flowing gas from combustion may come from a diagonal direction. In some embodiments, users configure asymmetric compound direct contactor tubes and/or the fluid flow or diluent temperature in an asymmetric fashion. E.g., the tubes, fuel and diluent delivery are configured to accommodate asymmetric heat transfer. They may account for one or both of heat flux from heated oxidant containing fluid compared to combustion radiation and recirculating hot gases. For example, with reference to FIG. 29, thermal barrier coating 34 may be provided on the side of the tube nearest the combustion and/or the hot inlet oxidant fluid. The diluent passages in the multi-passage contactor tube 220 may be particularly enlarged, or more diluent or cooler diluent flowed through some diluent passages compared to others in order to tolerate higher heat flow from one direction than another. E.g., particularly from downstream vs upstream in a planar array.

Secondary Manifolds

Figure 42:
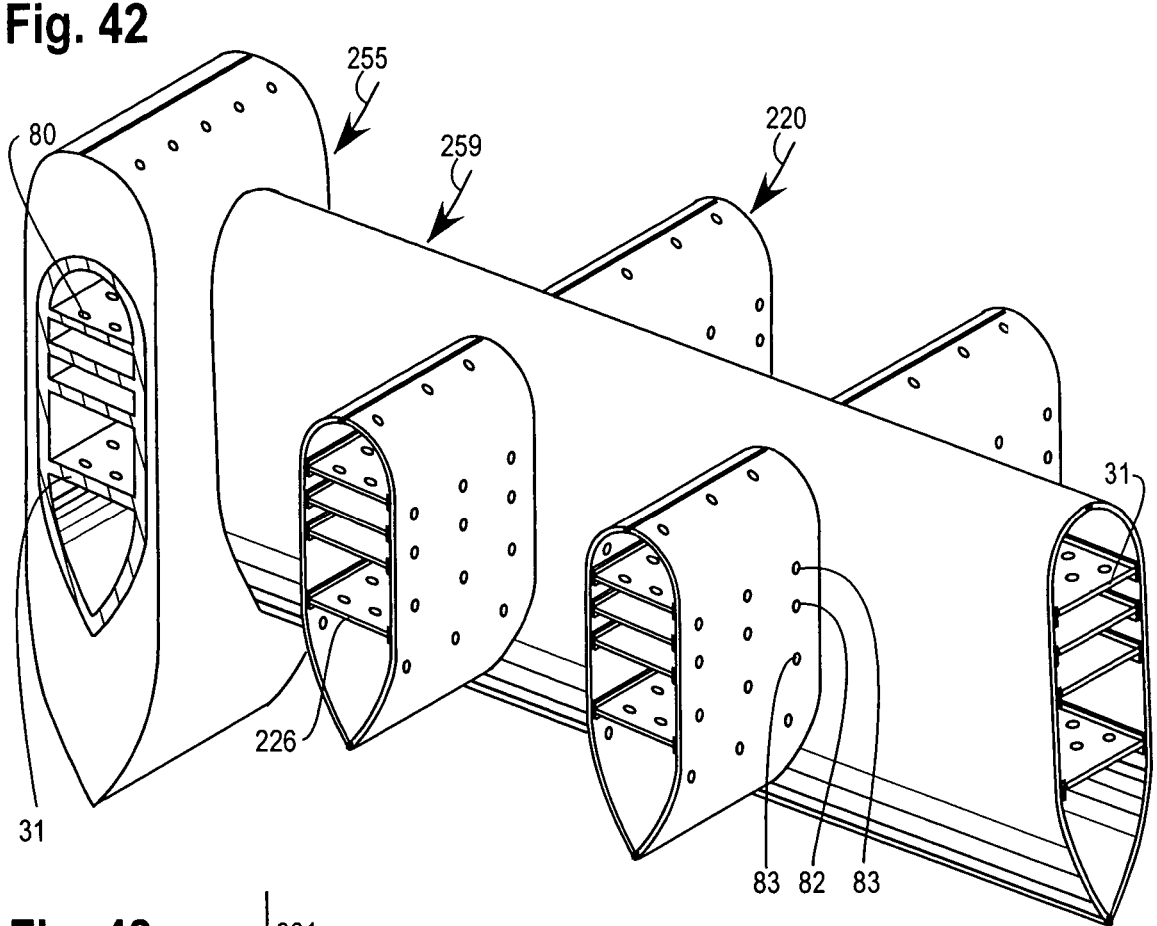
FIG. 42 is a perspective view of an array of multi-passage contactor tubes with inter-tube ducts and manifolds.
Figure 43:
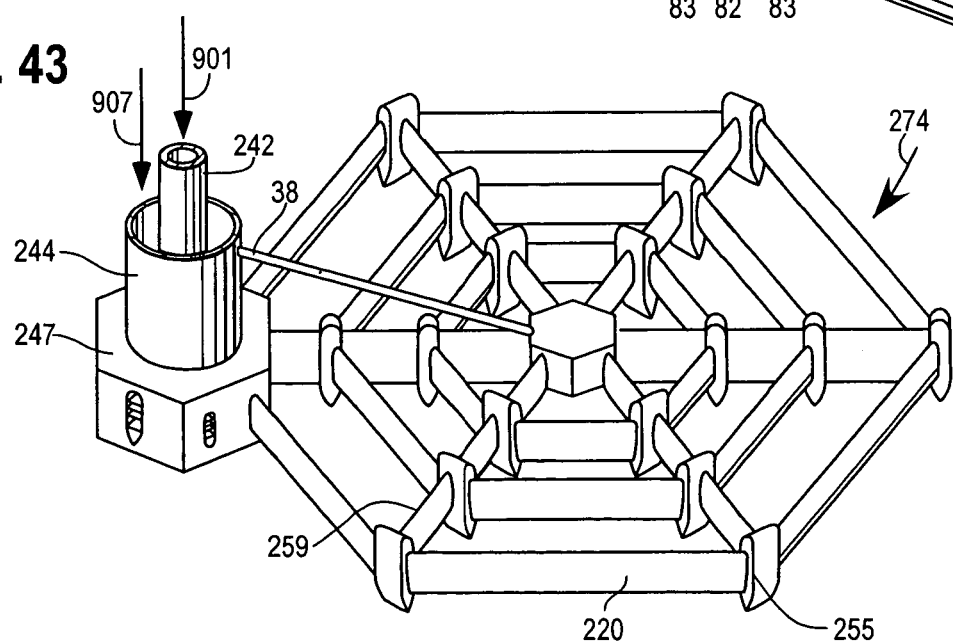
FIG. 43 is a perspective view of an hexagonal multi-passage contactor tube array module with multi-passage secondary manifolds attached to a central manifold header.

With reference to FIG. 42, users may configure a secondary compound manifold 259 and connect it to a compound tube duct junction 255 or equivalent compound manifold. One or more compound multi-passage contactor arrays 220 may be connected to the secondary manifold 259. With reference to FIGS. 42 and 43, secondary manifolds and contactor arrays may be configured to form hexagonal arrays or Cartesian or similar arrays.

With reference to FIG. 40, users may form effective compound secondary manifolds by bonding one or more inter-tube ducts 257 between two or more multi-passage contactor tubes 220 or between a distributed contactor tube 220 and an adjacent tube-duct 255 or equivalent multi-passage manifold. They may provide a bond layer 258 between each of the mating surfaces of the tube-duct junction 255 or inter-tube duct 257, and optionally to the corresponding mating surfaces of the multi-passage contactor tubes 220. In modified configurations, users bond the multi-passage tubes 220 directly to the manifolds, tube-duct junctions 255 and/or inter-tube ducts 257.

With reference to FIG. 42, users may configure one or more compound secondary manifolds 259 connecting the primary manifold 240 to two or more distributed contactor tubes 220.

Users may adjust the cross sectional flow area within the secondary manifolds 254 in proportion to the flow through them. They may adjust the external cross section transverse to the oxidant fluid flow across secondary manifolds 254. They preferably adjust these parameters to reduce the total life cycle cost of pumping fluid through the secondary manifolds 254 compared to compressing and pumping the oxidant fluid across the secondary manifolds 254.

In modified configurations, users adjust the number of inter-tube ducts 257 between or across direct contactor tubes 10 about in proportion to the total flow through those inter-tube ducts 257. Such methods of adjusting the cross sectional area of the secondary manifold 254 or the number of inter-tube ducts 257 assists in reducing the pressure drop of the transversely flowing oxidant fluid.

Users form one or more manifold connecting holes 250 through a manifold wall 249 at every location where users desire to flow fluid from the manifold 240 into a secondary manifold 254 or into a distributed contactor tube 10. They may "trepan" laser drill such larger manifold holes 250. Alternatively-these manifold holes may be formed using resist etching or other methods.

Users configure one or more connecting holes 74 in the tube wall 30 of the distributed contactor tube 10 or multi-passage tube 220 at every location where fluid needs to flow from a manifold (primary or secondary) 240 or one or more secondary manifolds 254 or inter-tube ducts 257 to the distributed contactor tube 10.

When connecting distributed contactor tubes 10 with multiple fluid passages, the inter-tube ducts 257 preferably have corresponding multiple internal passages. In other configurations, users configure one or more sets of inter-tube ducts 257 to form secondary manifolds 254 to conduct diluent fluid while one or more other sets of inter-tube ducts 257 conduct fuel fluid.

Curvilinear Contactor Tube Arrays

In some embodiments users form arrays of curvilinear direct contactor tubes 10. In such configurations, users preferably form the curvilinear side strips and then bond them together to form the distributed contactor tube 10 or multi-passage contactor 220. They then preferably assemble the curvilinear distributor tubes 10 with inter-duct tubes 257 and bond layers 258 to form the curvilinear direct contactor tube array 260. The assembled direct contactor tubes 10, inter-duct tubes 257 and bond layers 258 are preferably suitably held together while the bond layers 258 bond the contactor tubes to the inter-duct tubes. E.g., at elevated temperatures.

In modified configurations, users connect one or both ends of the distributed connectors 10 to the secondary manifolds 254. In other configurations, users bond the upstream side of the distributed contactor 10 to the secondary manifold 254.

Users preferably configure the end shapes of the inter-tube ducts 257 to complement the stream lined shapes of the adjacent direct fluid contactors 10. In other configurations, the inter-tube ducts 257 are formed with flat ends that conform to flat surfaced direct fluid contactors 10 and are bonded to them.

Hybrid Contactor Tubes & Manifolds

With reference to FIG. 41, in some configurations, users form strips to form direct contactor tubes 10, multi-passage contactor tubes 220. E.g., using rectangular strips. They preferably form the intra-tube walls 31 from other thin strips positioned transverse to the tube side walls 33. The intra-tube walls 31 are preferably held in a jig and bonded to one of the tube side walls 33. Users then bond the other wall on. Alternatively the intra-tube walls 31 may be held in alignment by thin wires. They may complement these rectilinear shapes with upstream/downstream additions to improve streamlining. E.g., additions that are V shaped, or formed from several arcs, or a half cylinder or similar streamlining forms.

With reference to FIGS. 40, 42 and 43, users may similarly use intra-tube walls to form multiple passages within manifolds 240, secondary manifolds 254, and/or inter-tube ducts 257. They may form the tube side walls 33 from thin perforated strips. Such configurations simplify the connections of tubes to inter-tube ducts 257, secondary manifolds 254, and/or manifolds 240, and reduce the assembly costs. In modified configurations, users extend the rectilinear strips out from the intra-duct passage walls. The streamlining shapes are preferably formed into these extensions.

Hybrid Contactor Arrays

With reference to FIG. 41, a multi-passage contactor array is formed by joining a thin perforated strip 33 to a set of intra-duct passage walls, along with a set of inter-tube ducts 257. Users preferably provide bonding layers 258 over the areas of contact between the components. The thin perforated strips 33 preferably extend out beyond the intra-duct passage walls. The portions extending out beyond the intra-duct walls are preferably formed into arcs to provide streamlining. Users then lay up multiple sets of these components to form a multi-passage contactor array.

This array of components may be clamped in jigs that hold the components together in place, including pressing together the upstream and downstream strip streamlining extensions, during bonding. Bonding can be performed by using suitable heat or other bonding measures.

In modified configurations, users pressurize the fluid passages within the array after assembly to differential pressures greater than the normal operating pressure to pressure form the passage walls outward, preferably between shaped jigs. This provides some further streamlining to the otherwise flat sides of the multi-passage contactor tubes 220.

Tube-Duct Junctions

With reference to FIG. 40, users may similarly form rectilinear Tube-Duct Junctions 255 with passages on one set of opposing sides to connect adjacent multi-passage tubes 220 sets or manifolds, and on the other set of opposing sides for adjacent inter-tube ducts 257. (See also FIG. 42.) Users preferably form mounting indent/ridges 256 on the Tube-Duct Junction 255 to facilitate assembly and bonding between the tubes and inter-tube ducts 257. The tube side walls 33 preferably overlap these mounting indents/ridges 256 to improve bonding.

In some configurations, the Tube-Duct Junctions 255 and the inter-tube ducts 257 are preferably elongated in the upstream-downstream direction relative to the multi-passage contactor tubes 220 to reduce the pressure drop and parasitic pumping of fluids within the duct as well as reducing the drag coefficient and pumping costs of the oxidant fluid across the duct. These ducts are preferably streamlined to reduce pressure drops in the transversely flowing oxidant fluid. This may be accomplished in similar fashion to the assembly of multi-passage contactor tubes 220 from side strips etc. as described herein.

Compound Secondary Manifolds

In some configurations, users form Compound Secondary Manifolds 259 by joining Tube-Duct Junctions 255 together with inter-tube ducts 257 by methods described herein for forming rectilinear arrays of multi-passage tubes. Shorter multi-passage contactor tubes 220 are then laid up between these Compound Secondary Manifolds 259.

In modified embodiments, users utilize combinations of one or more of the distributed contactor tubes described herein together with the tube-duct junctions to form multi-passage arrays.

Multi-Passage Contactor Modules

With reference to FIG. 43, users may form perforated contactor array modules 274 from direct contactor tubes 10 or multi-passage direct contactor tubes 220 that are suitably configured to be positioned adjacent to one another in larger arrays. E.g they form hexagonal array modules, rectangular or Cartesian array modules, or trapezoidal shaped arced modules to fill annulus sections.

Arrays of Multi-Passage Contactor Modules

With reference to FIG. 43, multiple contactor array modules 274 are arranged into arrays, with each module in turn being formed from smaller arrays. e.g., into hexagonal or Cartesian arrays. With hexagonal arrays, users preferably provide at least one distributed contactor tube 10 or multi-passage contactor tube 220 in a hexagonal shape. They may provide more orifices angled out near the corners to accommodate the relatively larger duct area covered by those portions. Users may provide a central axial hexagonal direct contactor to form micro-jets that spray outwards within surrounding hexagonal direct contactor tubes 10 or multi-passage tubes 220 that form micro-jets spraying both inward and outward.

Manifold Header

With further reference to FIG. 43, users may connect a fuel fluid manifold 242 and a diluent manifold 244 to a central manifold header 247 preferably near the duct axis. These manifold connections are preferably symmetric so that users may assemble a set of array modules 274 together and connect them to this header 247. Support ribs 38 are used as needed.

For example, users form sets of hexagonal modules 274 with one or more fuel fluid manifolds 242 and diluent manifolds 244 to a central header 247 according to whether the hexagonal module 274 is positioned near the duct axis, in the next ring of modules out from the duct axis, or in the second ring of modules out from the duct axis etc.

Similarly, users preferably provide stiffening ribs 38 between the hexagonal array modules and one of the fluid manifolds, or to an equivalent central structural support. E.g., to the diluent manifold 244. They preferably configured these stiffening ribs 38 in sets corresponding to the radial location of the array modules 274 similar to the configuration of the manifolds 242, 244.

Such modular configurations facilitate removal and replacement of one or more array modules 274 through relatively small pressure vessel port in the combustor pressure vessel compared to having to remove a monolithic array filling the full cross sectional area of the combustor. In modified configurations, users may provide different sets of fuel fluid and diluent manifolds 242, 244 to connect between the array modules 274 and the central header 247, etc.

Intra-Tube Diluent Flow

With reference to FIG. 41, users may provide multiple inter-passage walls 31 to form multi-passage contactor tubes 220. Sometimes, when using multi-passage tubes, it may be desirable to form pressure equalizing holes in the inter-passage walls to reduce stresses. Users may provide orifices 80 through those inter-passage walls 31 to provide passage for diluent fluid and/or fuel fluid to adjacent passages 222. This assists in equalizing pressures between passages 222 to reduce stresses within multi-passage contactor tubes 220.

With reference to FIGS. 40 and 42 and 43, they may similarly form secondary manifolds 254, compound secondary manifolds 259, or manifolds 246. Users may similarly provide orifices 80 in the outer walls of the multi-passage contactor tubes 220, secondary manifolds 254, compound secondary manifolds 259, or manifolds 246 into such adjacent internal passages 222. They may deliver diluent fluid through these internal and external orifices 80. This provides means to deliver fluids through orifices in inter-passage walls 31 from adjacent internal passages without having to provide corresponding fluid connections to those passages 222 between corresponding multi-passage contactor tubes 220, and secondary manifolds 254, 259, and/or manifolds 246. Such orifices 80 also provide ways to deliver diluent fluid flow through those passages to cool the associated external walls 33, 249.

Upstream/Downstream Streamlining Caps

With reference to FIG. 40, in some configurations, users form multi-passage contactor tubes 220 from thin strips. They add U shaped, V shaped, double arc gothic ceiling shaped or streamlined shaped extensions 229 upstream and/or downstream of the multi-passage contactor tubes 220.

Micro-Swirler Mixing Enhancers

With reference to FIG. 59, users preferably provide numerous miniature mixing elements or micro-swirlers 290 to form and direct numerous miniature flows of fluid at an angle to the axis of the fluid duct as the second (oxidant-containing) fluid 904 flows across the orifices and between the distribution tubes in some embodiments. The micro-swirlers are preferably formed with an airfoil cross sectional shape 297 for improved efficiency, though they could be formed from simple angled, bent or curvilinear plates. These angled fluid jets impart transverse momentum to the oxidant containing fluid between and downstream of those distribution tubes at an angle to the duct axis. These angled miniature flows create miniature or meso-vortices within the second fluid flow that are typically at an angle to or perpendicular to the distribution tubes.

Over and Between Tube Micro-Swirlers

Users may variously configure micro-swirlers over a tube, between tubes, or across multiple tubes as desired or needed for an application.

With reference to FIG. 59, to form such angled mixing jets within the second fluid, in some embodiments users position "T" type micro-swirlers 294 between adjacent distribution tubes 10 to direct the fluid 904 flowing across those tubes at an angle to the axis of the fluid duct (i.e., at an angle between 0 degrees and 90 degrees to the tube axis.)

Users preferably cut out each lower outer portion of a "T" micro-swirler 294 to fit over half of a distribution tube 10. They then preferably bond the micro-swirlers to those distribution tubes as appropriate. E.g., by glueing, soldering, brazing, or welding. Alternatively, the "T" micro-swirlers 291 are cut and force fit or "crimped" between the distribution contactor tubes that are separately mounted or connected together.

Users may configure the micro-swirlers along contactors tubes to provide a desired spatial distribution of mixing. Consequently, the micro-swirlers may be staggered or not aligned between adjacent contactor tubes, particularly in annular or circular embodiments with varying distance from the axis.

With reference to FIG. 60, in other embodiments, users similarly install "saddle" micro-swirlers 291 with two legs over one or more distribution tubes 10. A section in the middle of the "saddle" micro-swirler 291 is cut out to form the two "legs" so that it fits over a distribution tube 10. These micro-swirlers may be extruded and cut or bent into vanes 298 of desired shapes.

With further reference to FIG. 60, in modified embodiments, users install one or more micro-swirler ribs 296 mounted across multiple contactor tubes to act as stiffeners. These are equivalent to multiple micro-swirlers 290 bonded together either a "T" micro-swirlers or "saddle" micro-swirlers. In modified configurations, the top bar of the "T-shirt" micro-swirler or "Saddle" micro-swirler is asymmetrically skewed relative to the vertical bar or "shirt" to accommodate axial displacements between adjacent tubes, such as in concave contactor arrays or convex contactor arrays etc.

With reference to FIG. 60, users preferably curve the two swirler vanes 298 of a "saddle" micro-swirler 291 in opposite directions in a "Striding" configuration to direct the flow in opposite directions on either side of a distribution tube.

Users preferably form a strip into head-head "saddle" micro-swirler outlines. They preferably form the two sides of this strip into two complementary aerodynamic shapes. They curve the shapes over and on each other and bond them to form two airfoils 297 to efficiently redirect the fluid. Alternatively, users form a single strip into alternatingly directed airfoils 297 which are then cut in half to form "striding" "saddle" micro-swirlers 291. E.g., by using laser or water jet cutting methods.

In modified configurations, users slit the downstream portion of the "shirt" of a "T-shirt" micro-swirler 294. They then form two swirler airfoils 297 or vanes 298 of the "T-Shirt" micro-swirler to curve in opposite directions in a "Striding" configuration. This directs the flow in opposite directions on either side of a tube to tube gap G. (See, for example, FIG. 62 and FIG. 65).

In modified configurations, users form a strip into simple single thickness curved vanes 298 that approximate airfoils 297 in either the "saddle" micro-swirler 291 and 292 or "T-shirt" micro-swirler 293 and 294. This simple curve preferably has a uniform curvature to efficiently direct the flow. Such simple curved vanes 298 are less expensive to make though not as efficient.

Figure 63:
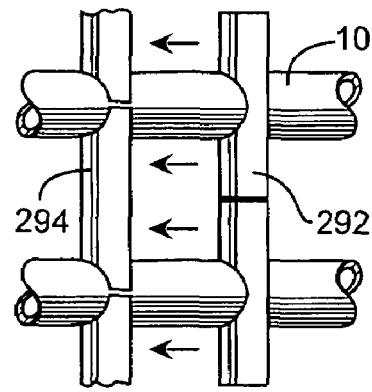
FIG. 63 is an elevation view of "sitting" "T-shirt" (left) and "saddle" (right) micro-swirlers oriented about tube banks for "uniform-direction" swirl.
Figure 64:
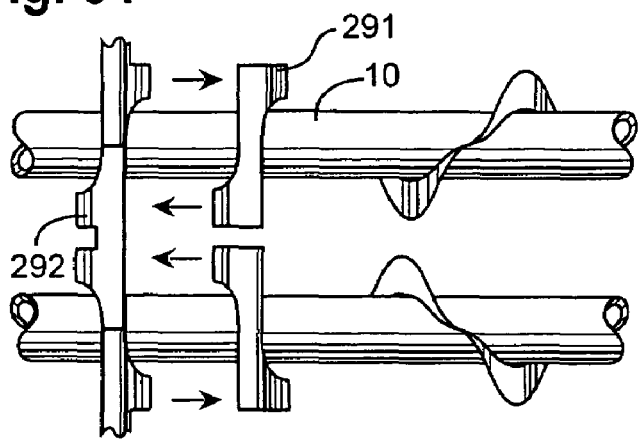
FIG. 64 is an elevation view of "sitting" "T-shirt" (left) and "striding" "saddle" (right) micro-swirlers oriented about tube banks for "alternate-with-gap" swirl.
Figure 65:
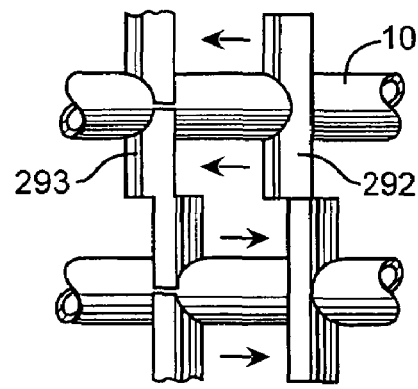
FIG. 65 is an elevation view of "striding" "T-shirt" (left) and "sitting" "saddle" micro-swirlers oriented on tube banks for "alternate-with-tube" swirl.

In modified configurations, users form "sitting" micro-swirlers of a "saddle" configuration 292 by curving both micro-swirler airfoils 297 or vanes 298 over the distribution tube in the same direction in a "sitting" configuration with both "legs" in the same direction (See, FIG. 63 and FIG. 65.) In other configurations, users provide a "sitting" "T-shirt" micro-swirler 294 with a single curved airfoil 297 or vane 298 and position it between two distribution tubes in the "sitting" configuration (See, FIG. 59, FIG. 63 and FIG. 64.). Multiple "sitting" micro-swirlers may be connected together and positioned across multiple tubes. Such micro-swirlers redirect at least a portion of the flow in the direction of the legs. They also create micro-vortices along the edges of the micro-swirler legs.

Users may orient or configure one or more swirler airfoils 297 or vanes 298 upstream of the distributed contactor tubes 10. The micro-swirlers may be displaced upstream so the vanes do not directly interfere with orifices. Alternatively, users may place swirler airfoils 297 or vanes 298 downstream of the distributed contactor tubes 10.

Figure 62:
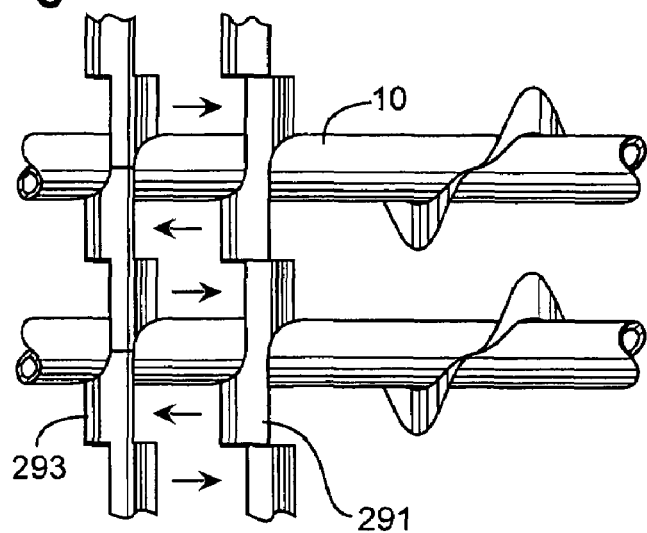
FIG. 62 is an elevation view of "striding" "T-shirt" (left) and "saddle" (right) micro-swirlers oriented about contactors for "alternate-within-gap-tube" mixing.

With reference to FIG. 62, in some configurations, users wrap distribution tubes with thin strips to form helical micro-swirlers 296 about the tubes. E.g., stretch formed or extruded and positioned perpendicular to the tube surface. These form turbulence generating continuous "swirler" vanes alternatingly on either side of the distribution tube, similar to the "saddle" "striding" micro-swirler configuration 291. These are readily formed around circular tubes or elliptical tubes. They may be formed around more aerodynamically shaped tubes.

Micro-Swirl Flow Orientation

With reference to FIG. 62 through FIG. 65, in some configurations users configure the vanes of microswirlers from four general configurations. Considering two vanes or legs per gap and taking two adjacent gaps, there are four configurations that can be formed from the vanes of two or more micro-swirler airfoils 297 or vanes 298 per tube 10 (or per gap G). These may be configured for maximum turbulence, maximum macro-swirl or with in between configurations as desired. Four embodiments are depicted in FIG. 62 through FIG. 65.

Users thus configure micro-swirl components to achieve desired mixing across the flow.

Users commonly apply such micro-swirl in circular ducts 144. In other configurations, users readily apply such micro-swirl in annular or rectangular fluid ducts 145 or in other configurations as needed or desired. Such efficient micro-swirl increases turbulence and mixing that is commonly desirable especially in exothermic chemical reactions and combustion.

With reference to the left of FIG. 62, generally for the highest micro-turbulence to give more effective mixing, users preferably orient alternating airfoils 297 or vanes 298 in opposite directions within gaps G and correspondingly in adjacent gaps. These may be configured as an array of "striding" "T" micro-swirlers 293 along the gaps between distribution tubes 10. Similarly, with reference to the middle of FIG. 62, users preferably configure arrays of "striding" "saddle" micro-swirlers 291 with opposed legs positioned over contactor tubes with the swirlers 291 oriented in the same direction.

With reference to the right of FIG. 62, the helical micro-swirlers 296 may also be wrapped in the same direction in adjacent tubes. These helical micro-swirlers form micro-vortices similar to those formed by the respective saddle or T-shirt micro-swirler configurations. Such configurations provide the maximum micro-turbulence and mixing in the second flow across the entire fluid duct 130.

Micro-swirlers oriented in this way impart a transverse rotational momentum component to the second fluid which changes direction with every half tube gap. This flow orientation may cause the largest density of micro-vortices for a given density of micro-vanes 290. Typically there is at least one micro-vortex forming downstream of each contactor tube 10 and each tube gap G between opposed microswirler legs.

Users may configure the width of the micro-swirlers legs or vanes 298 legs between 5% and 50% of the width of the gap G. To increase mixing, they preferably configure the leg width between 20% and 40%, and more preferably between 30% and 35%. Such configurations form a micro-vortex about the leg of each edge of the micro-swirler legs as well as forming a micro-flow oriented along the direction of the micro-swirler leg.

With reference to FIG. 63, to configure for minimum turbulence and maximum macro-swirl, users preferably orient all the airfoils/vanes in the same direction in some embodiments. For example users preferably position an array of "sitting" "T" micro-swirlers 294 in inter-tube gaps G along the distribution tubes 10 with the vanes oriented in the same direction relative to the flow axis. Similarly, to achieve flow swirl in the same direction, users preferably configure arrays of "sitting" "saddle" micro-swirlers 292 over contactor tubes all oriented in the same direction. These are equivalent to using micro-swirler ribs with all the swirler legs oriented in the same direction.

Micro-swirlers oriented in this way impart a transverse rotational momentum component to the second fluid in the same direction over the subregions for which the micro-vanes micro-foils or micro-ribs are thus configured and oriented. These form relatively few micro-vortices downstream the contactor tubes 10 or tube gaps G.

For intermediate turbulence, users preferably configure "pairs" of airfoils/vanes in the same direction however positioned between rows or across tubes as shown in FIG. 64 and FIG. 65.

With reference to the left of FIG. 64, in some embodiments, users position an array of "sitting" "T" micro-swirlers 292 along a gap G between distribution tubes 10. Users orient these vanes in the opposite directions in alternating tube gaps G. Alternatively, with reference to the middle of FIG. 64, to achieve the same flow orientation, users configure arrays of "striding" "saddle" micro-swirlers 291 over contactor tubes, generally oriented in the opposite directions across the gap of each pair of contactor tubes 10.

Similarly, with reference to the right of FIG. 64, the helical micro-swirlers 296 may also be wrapped in opposing directions in adjacent tubes. These helical micro-swirlers form micro-vortices similar to those formed by the respective saddle or T-shirt micro-swirler configurations.

Micro-swirlers oriented in this way impart a transverse rotational momentum component to the second fluid which changes direction with every tube gap G. Typically such configurations form a series of micro-vortices forming downstream of the middle of each contactor tube between the counter-rotating flows.

For similar intermediate turbulence, users preferably configure opposed pairs of airfoils/vanes in between rows or across tubes as shown in FIG. 65. For example, in some embodiments, users preferably position an array of "striding" "T" micro-swirlers 293 along the gap G between distribution tubes 10. Users orient the vanes to be directed in the opposite direction with alternating tube gaps G.

Similarly, to achieve the same flow orientation, users preferably configure arrays of "sitting" "saddle" micro-swirlers 292 over contactor tubes, generally oriented in the opposite direction with alternating contactor tubes 10. Correspondingly, users may combine oppositely directed "striding" "T" arrays and oppositely directed "sitting" "saddle" arrays.

Micro-swirlers oriented in these ways impart transverse rotational momentum components to the second fluid which change direction with every set of contactor tubes 10. Typically there is at least one micro-vortex forming downstream of each contactor gap, i.e., approximately downstream of the center of the tube-to-tube gap G between the counter-rotating flows corresponding to the tubes.

Micro-Swirler Spacing

Users preferably space micro-swirlers 290 along the distribution tubes at about half the transverse gap from tube to tube in some embodiments. Users preferably increase or decrease this spacing according to whether they need to reduce or increase the pressure drop across the array of distribution contactor tubes 10 or multi-passage tubes 220, or if they need to decrease or increase mixing within the combustor 56. Increasing the degree of mixing and pressure drop forms a more uniform transverse distribution of the axial velocity across the duct.

Users preferably align the intake of the micro-swirler airfoil 297 or vane 298 with the incoming oxidant fluid at that location. E.g., usually aligned with the axis of the fluid duct 130. Users may configure the exit angle of the micro-swirler airfoil 297 or vane 298 such that the airfoil or vane angle at the micro-swirler exit deviates about 5 to 80 degrees from the flow axis. They preferably configure these from 10 to 50 degrees, and more preferably from 15 to 30 degrees from the micro-swirler intake in some configurations. (E.g., from the axis of the fluid duct 130). Users preferably increase or decrease this micro-swirler vane angle according to whether they need to reduce pressure drop across the array of distributed contactor tubes 10 or multi-passage tubes 220 or perforated tube array module 274, or if they need to increase mixing within the combustor 56.

Micro-swirlers 290 are preferably made of corrosion resistant materials able to take the temperature of thermal cleaning. Users preferably periodically remove fine fibers and materials that escape the upstream air/gas filter 390 by heating the micro-swirlers 290 with the distributed contactor tubes until the accumulated materials gasify. With mildly oxidizing diluent fluids (such as water or steam), diluent is added upstream or through the contactor tubes and heated or preheated. The heated diluent (e.g., steam) further reacts with carbonaceous materials to gasify and remove them.

Users preferably install micro-swirlers 290 to provide more uniform mixing in some embodiments. By mixing combusting gases and diluent fluid more uniformly, micro-swirlers 290 smooth out the temperature profile both along and across the perforated distributor contactor tubes.

In some configurations, users may add micro-swirlers 290 along one or more other components within the combustor 56. E.g., along manifolds 240, along tube rib supports 38 and along tube stiffeners 36. "Saddle" type micro-swirlers 291 are preferably mounted over these components.

In modified configurations, users configure the micro-swirler airfoils 297 or vanes 298 perpendicular to the contactor tubes 10, 220. In further modifications, users provide a mixture of parallel and perpendicular orientations to provide more uniform mixing.

Micro-Swirler Configuration

With reference to FIG. 60, positioning micro-mixers or micro-swirlers 290 about contactor tubes 10 creates numerous meso-vortices and/or micro-vortices and turbulence within the combustor. These meso-vortices are typically on a scale substantially smaller than conventional macro-swirl generators. With straddle type micro-swirlers (e.g., 291), each edge of a micro-swirler leg may also create two micro-vortices. The larger meso-vortices further degenerate into numerous micro-vortices.

Users may form these micro-vortices with a desired transverse distribution across the duct. E.g., they may configure the number of micro-swirlers per unit area in proportion to the transverse distribution of axial fluid flow rate. Similarly they may be uniformly configured. These micro-swirlers thus provide effective or uniform mixing of oxidant fluid, fuel fluid and/or diluent fluid. These are typically more effective than conventional mixing methods.

With reference to FIG. 60, for example, positioning micro-swirlers 290 every 7 mm along tubes spaced 7 mm apart forms about 20,000 micro-swirlers per square meter. Similarly, using micro-swirlers 290 with two separate legs or vanes each (e.g., 291 and/or 292), provides about 40,000 micro-swirler vanes per square meter. Each micro-swirler vane may generate a separate micro-vortex along each edge of the micro-swirler vane. Depending on micro-swirler array configuration, users may thus form 40,000 to 80,000 meso-vortices and micro-vortices per square meter. These meso-vortices break up into numerous micro-vortices, which in turn break up into smaller more numerous nano-vortices as they progress and decay.

These micro-swirlers 290 may similarly be configured per given number of orifices per unit area. E.g., where there is an orifice about every 0.7 mm, positioning a micro-swirler about every 7 mm gives about twenty orifices per micro-swirler across a tube or in tube walls facing a gap.

Where micro-swirlers occlude part of the tubes, orifices are preferably reconfigured with denser specific orifices per unit cross section in the open areas between swirlers. Similarly where there is higher speed oxidant speed on one side of a swirler vane then the other, more orifices may be configured to deliver fluid into the faster flowing cross flow.

Orifice Orientation Configuration

Users may variously orient the contactor tube orifices to improve mixing as taught in the '191 patent application. (See for example e.g., Section "Orifice Angular Orientation to Tube Axis" and to FIG. 30, FIG. 31, FIG. 32 and FIG. 33 in that application).

The diluent fluid mass flow may be 3 to 7 times that of the fuel mass flow in combustors. Accordingly, by configuring the orientation of diluent micro-jets users may achieve substantial transverse turbulence and mixing. They may similarly adjust the degree of transverse turbulence and mixing along the contactor tubes as well as across the contactor tubes.

Micro-Swirler & Orifice Orientation Configurations

Users may orient orifices on contactor tubes with a orientation vector component inline with the direction imparted to the oxidant fluid flow by the local micro-swirler airfoils 297 or micro-swirler vanes 298. This generally increases the added transverse momentum component of the oxidant fluid flow and the degree of mixing. Alternatively, they may orient the orifices more towards the perpendicular or normal to the transverse oxidant flow, to increase the degree of penetration of the fluid micro-jet exiting the orifice. With liquid fuel fluids this reduces liquid splashing on micro-swirler airfoils 297 or micro-swirler vanes 298.

Users may also orient the contactor tube orifices across or counter to the direction of the oxidant fluid flow imparted by the micro-swirler airfoils 297 or micro-swirler vanes 298. This further improves mixing. They may similarly orient orifices to inject the fuel or diluent fluid into vortices created by the micro-swirler vanes. This assists in mixing the fluids.

Electric Fields to Improve Combustion

In some embodiments, users preferably provide high voltages and one or more combustor electrodes 320 to generate electric fields within the combustor 56. These electric fields are preferably used to reduce jet size, create smaller drops while enabling larger orifices 80. They are also preferably used to increase mixing in combusting gases. Both these methods improve combustion, improve temperature uniformity, reduce emissions, and reduce fluid filtering requirements and orifice clogging.

Electrically Excited Direct Contactor Arrays

In some embodiments, users preferably add an electric field excitation. This provides benefits of reducing microjet size and the liquid drop size, especially with viscous fuel fluids. In such embodiments, users apply a high voltage across or between a fuel perforated tube electrode 322 and/or a diluent perforated distribution tube electrode 324 and/or corresponding arrays of those direct contactors. (See, for example, FIG. 66, and FIG. 67.) The electrical field(s) across or between the electrodes 322, 324 constricts liquid jets formed from one or both distributed contactors. This causes the jets to breakup and form smaller drops than would be formed without the electric field(s).

In some embodiments, users preferably apply a differential high voltage between fuel fluid and diluent distribution tube arrays. Users connect a first electrical connection at a first voltage to the fuel fluid distribution tube electrodes 322 and a second electrical connection at a second voltage to the diluent distribution tube electrodes 324. In such configurations, users form an electric field between those distribution tube electrodes 322, 324. The electric field is a function of the difference in electrical voltage and spacing between the arrays.

Liquid jets emitted from orifices in one or both tube arrays will be attracted to the other array. This electric field narrows each liquid jet. The liquid jets then break up into small droplets. The droplets are smaller than the diameter of the drops that would form without the excitation. These drops are generally significantly smaller than the orifice diameter.

In some configurations, users preferably attach the fuel fluid and diluent fluid distribution tube electrodes 322, 324 to corresponding fuel fluid and diluent fluid manifolds. They apply the high voltage excitation between those fluid manifolds. To do this users electrically isolate the fluid manifolds from each other. If either the fuel fluid or diluent is conductive, then the high voltage may be applied to the non-conductive liquid array.

In some configurations, users apply a high voltage between fuel contactor perforated tube electrodes 322 and diluent contactor perforated tube electrodes 324 positioned upstream and downstream of each other. (See, for example, FIG. 66 and FIG. 67.) The electric field generated will attract the fuel fluid jets downstream and form droplets with a higher velocity in the direction of flow of the second or oxidant fluid. (See, for example, FIG. 66 and FIG. 67.)

The electric field similarly attracts and narrows the diluent liquid jets. Positioning a liquid diluent upstream of a gaseous fuel will provide simple breakup of the liquid diluent as it flows downstream. When the diluent distribution tube electrode 324 is downstream of the fuel distribution tube electrode 322, the relative strengths of the drag by the oxidant fluid (E.g., air) compared with electrical attraction will determine if the drops are moved upstream or carried downstream. Either way, smaller drops will be formed with the electrical excitation.

Users preferably adjust the upstream/downstream order and array spacing of the tube electrode arrays 322, 324 to achieve the relative evaporation rates of fuel fluid and diluent desired or needed to reliably achieve combustion while constraining combustion temperatures.

In some embodiments, users apply a high differential voltage between alternating conductive perforated fuel electrodes 322 and perforated thermal diluent tube electrodes 324. Users thus generate electric fields between the alternating tubes 322, 324. In some configurations, these distribution tubes 322, 324 are generally oriented transversely to the flow of the oxidant fluid. (See, for example, FIG. 66.)

The electric field between alternating fuel distribution tube electrodes 322 and diluent distribution tube electrodes 324 causes the respective jets issuing from those tubes to be attracted towards the adjacent tube, transverse to the oxidant gas flow. The transverse electric field will cause liquid droplets from the diluent and/or fuel arrays 322, 324 to be attracted transversely to the oxidant fluid flow. These electric fields cause the liquid fuel and diluent jets to constrict and form smaller drops than in configurations without the electric fields. The droplets will then be entrained in the second fluid as it flows downstream.

In some embodiments, users preferably provide at least one separate electrode or grid electrode 326 generally parallel to at least one of the liquid fuel perforated tube electrodes 322 and/or liquid diluent perforated tube electrodes 324 or corresponding direct contactor arrays. (See, for example, FIG. 66.) They provide a high voltage power supply 300 to supply the needed or desired voltage(s). The high voltage(s) are delivered from the high voltage power supply 300 by insulated conductors to the fluid duct wall 132 and then through the duct wall 132 by high voltage feed-throughs 316. Inside the fluid duct 132, the high voltage feed-throughs 316 are connected to the grid electrodes 326 and liquid distributors 322 and/or 324 to apply high voltage between them. The high voltage creates a high voltage field between the grid electrode 326 and at least one of the fuel fluid and diluent distribution tubes 322, 324. The electrode or grid electrodes 326 are preferably formed from relatively conductive material that is significantly more conductive than the fluid flowing between the grid 326 and the direct contactors 322, 324.

To avoid attracting liquid jets upstream, in some configurations users preferably provide a electrical grid electrode 326 downstream of the diluent array. (See, for example, FIG. 66) Users then excite this diluent array with third electrical voltage greater than the second electrical voltage applied to the diluent array. Users preferably form this grid electrode 326 as a screen configured parallel to the diluent liquid distribution array and downstream from it. They make the screen strong and stiff enough to withstand the drag of the axial fluid flow. Users preferably form the screen with streamlined ribs 38 and/or wires to reduce the drag. Alternatively users support the screen by a streamlined structure. Users support this excitation grid electrode 326 from the fluid duct walls 132 by suitable structural support insulators 314.

In some embodiments, users preferably form cooled electrodes 328 from tubes. This is particularly done when these cooled electrodes 328 are downstream of the fuel fluid and diluent distribution tubes and are near the combustion or are within the hot combustion gases, where they experience heat from combustion. Users then flow diluent fluid through the tube electrodes 328 to cool them. (See, for example, FIG. 66).

The cooled tubular electrodes 328 are preferably coated with a high temperature insulating thermal barrier coating 34. This protects the tubular electrodes 328 from radiant heat flux from the combustion and reduces convective heat transfer from hot gases. It also reduces the cooling diluent flow needed to cool the tubular electrodes 328. The resulting heated diluent is preferably delivered upstream into the combustor 56.

In other configurations, a perforated tube electrode 328 is used to duct and distribute diluent fluid. The heated diluent is then delivered through perforations in the tube electrode 328 into the combusting gases and/or energetic fluid 920.

In modified configurations, users position the excitation tubes or tubular grid electrode 328 downstream of the diluent tubes-and in line with them. The upstream axial orifices 84 in the diluent tube are preferably aimed axially at the downstream excitation tubes. This decreases the temperature of the hot gases flowing across the tubular electrode excitation tubes 328, reducing their temperature and their cooling requirements.

In some configurations, users preferably form the cooled tubular electrodes 328 from tubes of high temperature materials with an internal conductor. E.g from single or polycrystalline sapphire or aluminum oxide, silicon carbide, silicon nitride or other suitable high temperature materials surrounding a metallic conductor. In modified configurations, users provide an insulating sapphire sleeve over a cooled metal electrode tube 328.

In such configurations, users preferably electrically isolate the diluent distribution tube array from the fuel fluid distribution tube array. Users preferably ground the fuel fluid distribution system as a safety measure to avoid sparks and explosions such that the first electrical voltage is fixed at zero. (See, for example, FIG. 66, FIG. 67.)

Figure 68:
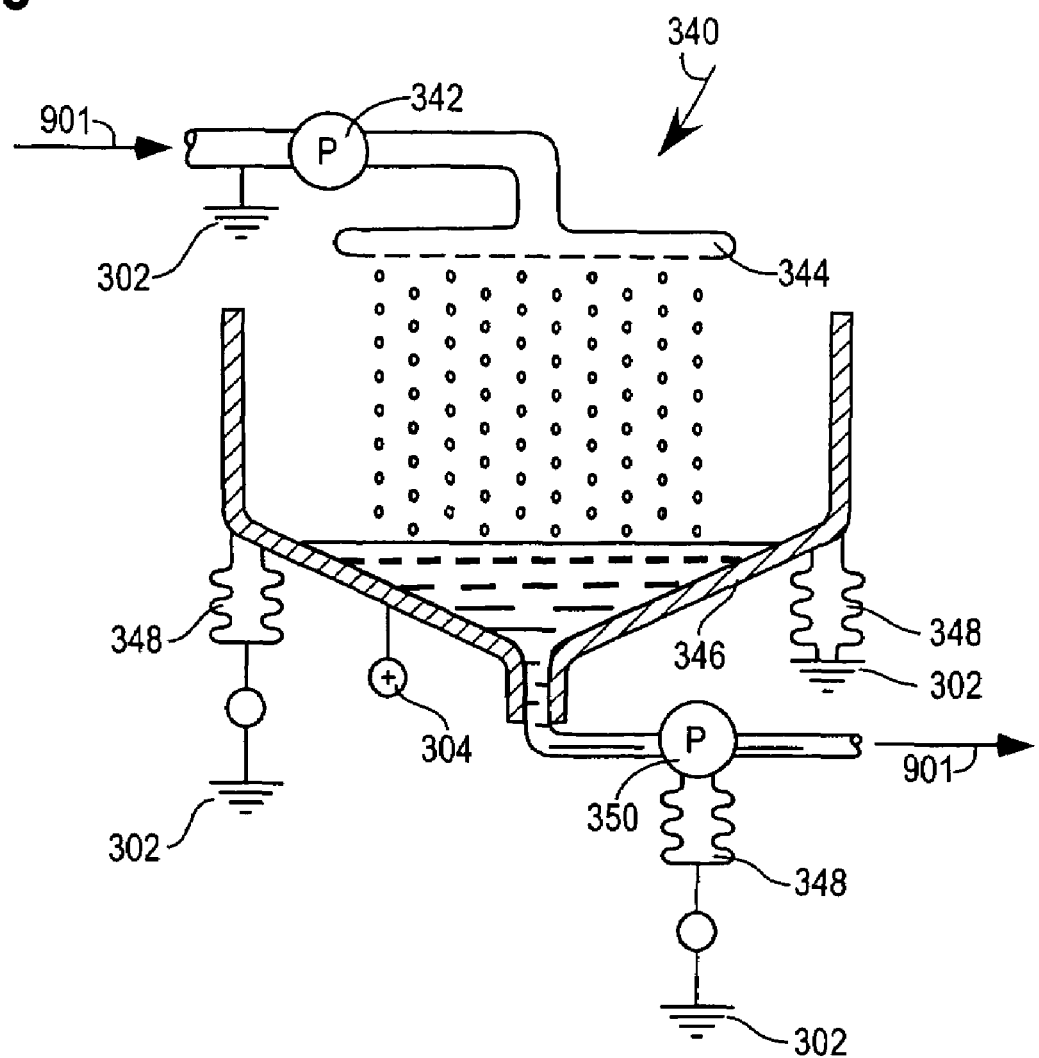
FIG. 68 is a schematic view of an electrically isolated fluid delivery system to deliver a conductive fluid at an elevated voltage.

Users apply high electrical fields to help create smaller drops with larger orifices than conventional injection methods, particularly with heavier fuel fluids. Where the fluid delivered is conductive, electric fields with conventional continuous liquid connections will result in some electrical current through the liquid diluent. (e.g., with water thermal diluent or methanol fuel.) In some configurations, to isolate the diluent liquid supply from the excitation system, users preferably provide a conductive-liquid isolator 340. (See, for example, FIG. 68.) Users thus preferably reduce any electrolysis of the diluent fluid and potential generation of explosive gases like hydrogen.

In such configurations, users preferably provide a perforated liquid distributor array 344 at the top of a electrically isolated liquid drop tower 344 with a vertical duct, supported on insulating supports 348. The walls of the tower duct are preferably formed of non-conducting material. A grounded supply pump 342 delivers liquid to the liquid distributed array 343. The orifices 80 in the liquid distributor array 343 are preferably aimed directly down. Users further provide a uniform flow of diluent liquid through this tube array resulting in a constant flow of substantially mono-disperse drops (or alternatively with a narrow drop distribution.) A droplet collector 346 collects the liquid drops. The collected liquid is then delivered by an elevated voltage supply pump 350.

Users preferably adjust the height of the tower and/or the second electric voltage applied to the diluent distribution array such that the electrical gradient through the liquid vapor is less than the electrical breakdown field within that vapor, including the effect of drop to drop spacing. By providing this "rain" of drops, users effectively provide electrical isolation between the diluent distribution system and the diluent supply.

With an electric field, users preferably use larger orifice diameters to achieve the same or smaller liquid droplets, especially with viscous fuel fluids compared to what users otherwise would need without the electric field. This reduces the pumping requirements and the probability of clogging the orifices.

Users preferably position the orifices relatively closer together with electric field excitation that without. Minimum orifice spacing is preferably reduced from about three times the orifice diameter to about twice the orifice diameter (or possibly down to 1.5 times the orifice diameter as desired or needed)

Electric Control of Combusting Gases

Ionic components within the combusting gases or hot fluid experience a force in the direction of an applied electric field. In some embodiments, users position at least one downstream electrode (or grid electrode 326) further downstream than at least some of the combusting gas. A high voltage supply between the downstream electrode and at least one upstream distribution tube creates an electric field between the electrode and distribution tube. This electric field has axial components that significantly accelerate charged components within a combusting gas or hot fluid upstream or downstream.

Flame holders are commonly used to stabilize combustion. In some embodiments, users preferably incorporate a flame holder into electrical field excitation of the combustion chamber. For example, with reference to FIG. 67, users may position at least one flame holding axial electrode 330 downstream of the fluid contactor arrays. With the "horn" contactor array 262 this axial electrode 330 is preferably located near the axis of the fluid duct 130. This axial electrode 330 is preferably supported by the central flame holder 100 and electrically isolated from the rest of the combustor 56. This axial electrode 330 is connected to a high voltage power supply 300, preferably at a voltage difference from ground 302 and greater than the nearest upstream direct contactor array.

Figure 67:
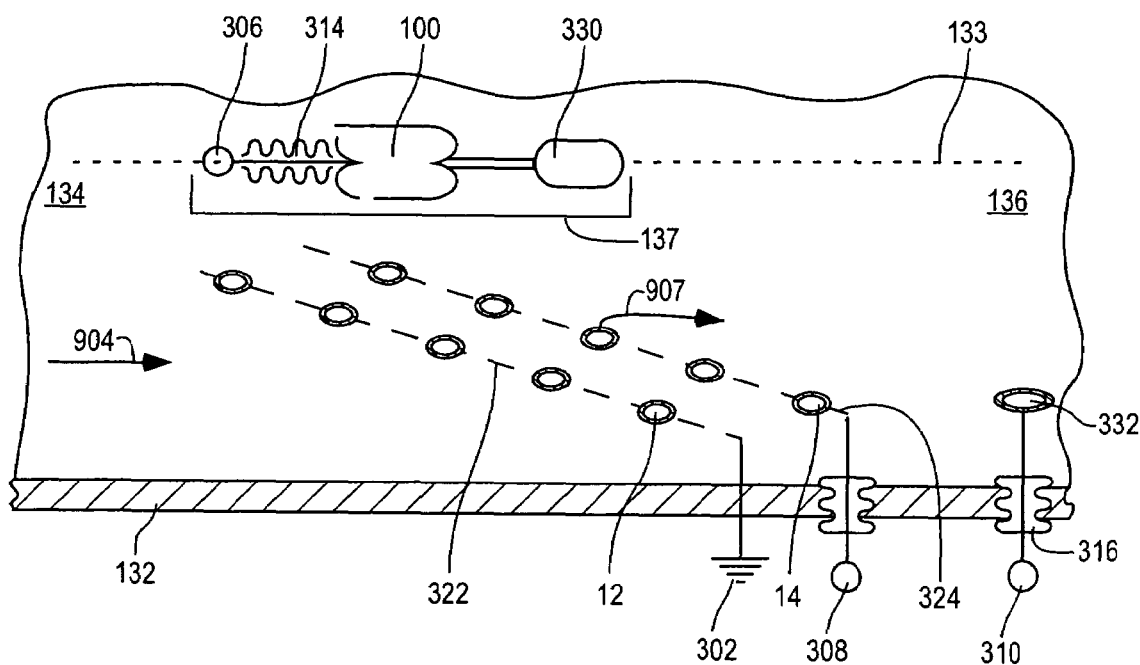
FIG. 67 is a schematic view of high voltage excitation of fuel and diluent fluid delivery with an electrically isolated flame holder and a downstream electrode, in half a duct.

With further reference to FIG. 67, users preferably position at least one downstream flame holding peripheral electrode 332 around the periphery of the fluid contactors. (E.g., downstream near the periphery of the "horn conical combustor 262.) With the "horn" combustor 262, this configuration may assist in flame holding capability near the coolest, least radiant combusting gases. This electrode is connected to the high voltage power supply 300, preferably at a voltage difference from ground and greater than the nearest upstream direct contactor array.

With further reference to FIG. 67, users may position multiple tubular electrodes 328 to form a grid electrode downstream of the fuel fluid and diluent direct contactor arrays. The tubular electrodes 328 are preferably thermally insulated to protect them from the combustion heat. Users preferably cool these tubular electrodes 328 with diluent fluid. The heated diluent is preferably ducted and delivered through the upstream diluent direct contactor array. Alternatively, the heated diluent is then preferably delivered into the combusting gases.

Figure 57:
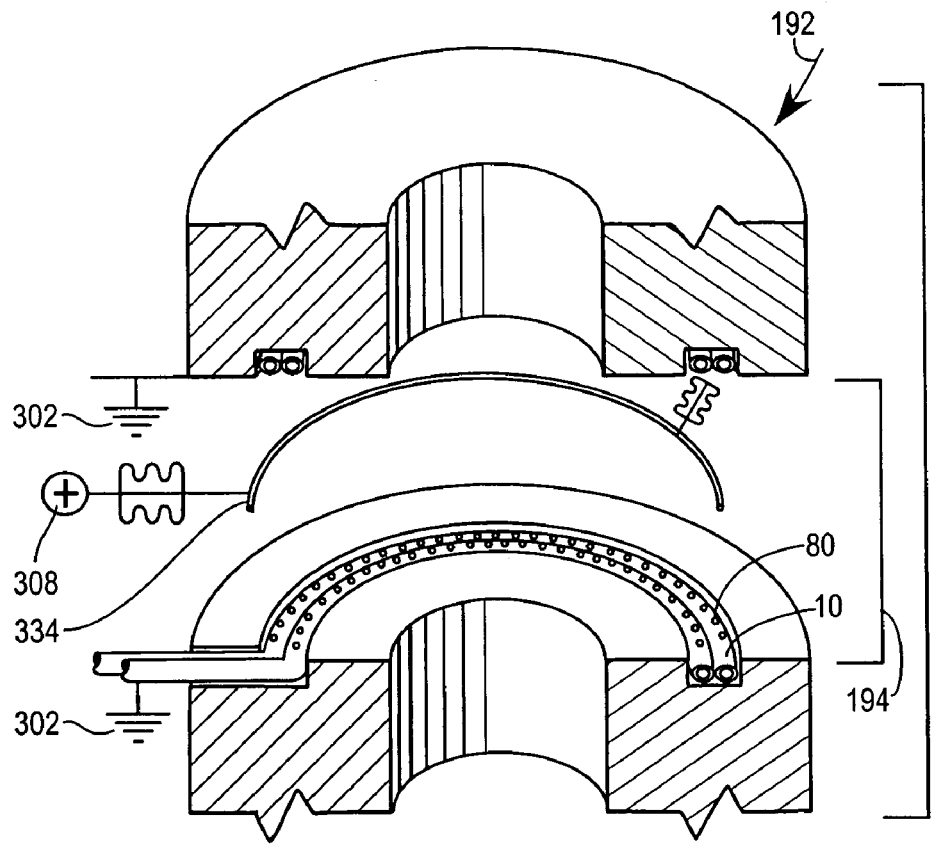
FIG. 57 is a conceptual perspective view of a circumferential slot port into a cylinder with upper and lower peripheral perforated fluid contactors, and an intermediate electrode.

With reference to FIG. 57, users preferably position a mid-duct electrode 334 between two or more perforated distribution tubes. In some circumferential slot port configurations, for instance, perforated distribution tubes are preferably located at the walls and preferably inset.

Users preferably form the mid duct excitation electrode 334 as a ring in the middle of the fluid duct 130 between the peripheral perforated distribution tubes. This mid duct electrode 334 is preferably connected to a high voltage source while the peripheral distribution tubes and the combustion cylinder 192 are preferably connected to ground 302. The central circular mid duct excitation electrode 334 is preferably supported by one or more electrical insulators 314 mounted on the combustion cylinder 192 or adjacent structural supports 280.

When liquid fuel and/or diluent are delivered through the perforated distribution tubes, the electric field between those tubes and the central mid duct excitor electrode 334 will reduce the cross sectional area of mini-liquid jets. (E.g., "neck down" the jet, possibly sufficient to form micro-jets.) These micro-jets will break into very small drops. The transverse oxidant fluid flow will carry these small drops along a side port 196 into the combustion cylinder 192.

The polarity of the field is preferably selected to accelerate charged hot components of the combusting gases in the upstream direction in some embodiments. This reverse flow of hot charged components may assist in igniting the upstream combustible mixture. This may significantly improve the flame stability in the face of downstream flowing fluid. This electric field flame holder may significantly increase the upper flow limit at which the flame remains stable. Such higher fluid flows may increase the thermal power that can be generated per unit cross section of the combustor. They may also reduce flame-outs and improve plant availability.

Positively charged ions and molecules will attract and entrain surrounding gas molecules. Positively charged fluid components have a greater hydraulic cross section than electrons. (e.g., charged gas or vapor molecules.) With positive electrodes 304 downstream and negative electrodes 306 upstream, the positively charged molecules and molecule clusters will flow upstream and drag surrounding gas molecules along with them.

Similarly some electrons will attract surrounding molecules. E.g., charge nearby droplets of diluent or fuel fluid. Some electrons will attach to other large components within the fluid (e.g., soot particles, and aerosols.) Negative upstream electrodes 306 and positive downstream electrodes 304 will accelerate such negatively charged particles downstream. Such configurations will accelerate negatively charged diluent droplets, helping them move into the combusting gases. Such diluent acceleration may help move downstream the thermal diluent drops and may help the corresponding evaporation and cooling of the fuel-oxidant-diluent mixture.

In some configurations, users may reverse the polarity of one or more electrodes relative to those described herein.

In some configurations, users apply and modulate (e.g., oscillate and/or pulsate) an axial electric field in line with the axial fluid flow. The fluctuating axial electric field accelerates the ionic species within the combusting fluids along the axial direction. The moving ionic species in turn cause an oscillating drag on the combusting fluid. This may improve mixing within the combusting fluid.

The fluctuating axial field may significantly increase the axial fuel fluid and diluent mixing. This may improve the temperature uniformity and fuel/oxidant ratio within the combusting fluid. The improved mixing and improved temperature uniformity in turn may reduce the formation of nitrogen oxides and increases the oxidation of residual unburned fuel and carbon monoxide.

In some configurations, users preferably apply an electric field to excite the combusting gases at frequencies similar to the resonant frequencies within the combustion chamber but out of phase with those resonances to possibly reduce such resonance. (Or similar to their overtones, including any associated ducting and work engine.) Similarly, users may apply an electric field to excite the combusting gases at frequencies other than the resonant frequencies within the combustion chamber including any associated ducting and work engine. This may help reduce the acoustic fields and resonances created or amplified by applying oscillating electrical excitation in the combustor.

To form this excitation signal, users preferably create a "pink" noise formed by removing (or reducing) the resonant frequencies in a "white" or random noise. In some configurations, users monitor the sound within the combustor. They preferably form a Fourier Transform of the measured combustion chamber sound. They remove or appropriately reduce the resonant frequencies. They then "reconstitute" the desired "pink noise" signal from the modified Fourier spectra. The amplitude of the reconstituted signal is then controlled with suitable feedback to reduce the combustion noise and resonances.

In some embodiments, users modulate the applied high voltage in the combustor to use it as an acoustic speaker or ultrasonic horn. The very low mass of the excited gas species may form a fairly linear speaker. This method may form a speaker with a broad acoustic response range that may extends significantly into the ultrasonic region and to the sub acoustic range. In some embodiments, users jointly control the amplitudes and relative phases of the fluid delivery rates and the oscillating electrical field excitation to achieve the desired or needed acoustic excitation.

In some configurations, users apply an electric field with a component transverse to the flow direction of the combusting gases. Applying this transverse field causes flowing ionic species to be accelerated with an acceleration component transverse to both the flow and electric field.

E.g., with reference to FIG. 67, users may form an electric field transverse to the flow by applying a high voltage between a central electrode and a peripheral duct. E.g., a "horn" configuration within a circular fluid duct.

This transverse acceleration may improve mixing of the combusting fluid by moving hot ionic gases across adjacent fuel fluid and diluent drops. This transverse electric field is preferably configured to accelerate the hot ionic gases outward from the flame holder across the combustible fuel mixture formed by the fuel fluid and diluent distribution arrays. Similarly this transverse field may accelerate charged fuel fluid and/or diluent drops transversely to the oxidant fluid flow down the fluid duct 130.

Figure 66:
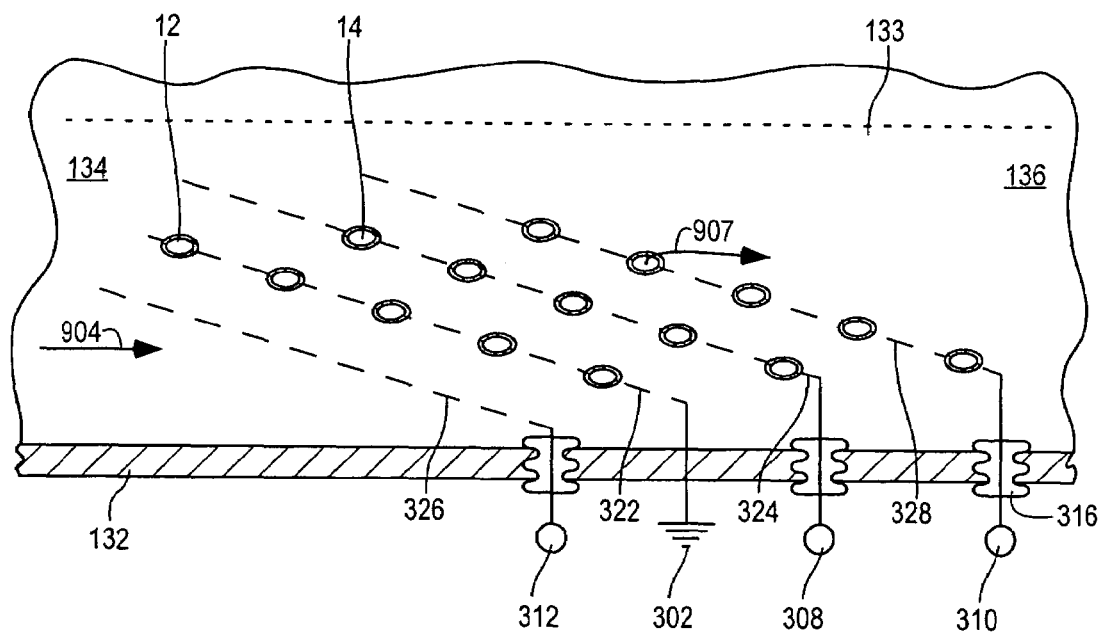
FIG. 66 is a schematic view of high voltage excitation of fuel and diluent distribution contactor tubes with upstream and downstream electric grids, in half a duct.

With reference to FIG. 66, users may configure electrodes outside a concave array such as a rectangular tent array. For example, the electric voltage may be applied to an electric grid array 326 either outside (or upstream), or inside (downstream) of one or more contactor arrays such as formed from contactors 12 or 14. The electric grid may similarly be configured within a contactor array configured as an annular array such as FIG. 4, or as shown in FIG. 59 of the '191 patent application.

The voltage may be connected to an electrode 312 delivered through an insulator or feed through 316 in the duct wall 132. The voltage is applied between the electrode 312 and another electrode connected to one of the contactor arrays. E.g., by connecting the duct and electrode to ground 302 as shown in FIG. 66. This is preferably connected to the fuel array to reduce explosion hazards.

The electric field may accelerate the ionic flow in the other direction transverse to the flow. Such transverse hot gas acceleration may improve the rate at which the flame jumps from one portion of combustible fluid mixture to another or from one drop to the next. This may increase the effective flame speed and the flame stability.

In some configurations the high voltage is applied to the second contactor array. E.g., the diluent contactors 14 connected to a grid array 324 and connected to a high voltage electrode 308 as shown in FIG. 66.

In some configurations, users may provide an electrode 328 downstream of the other contactor array and connected to a high voltage electrode 310 fed through an insulator 316. To better accommodate heat from downstream combustion, users preferably use one or more conductive tubes to form the electric grid 328. They deliver fluid through the tubes to cool them such as diluent 907. The conductive tubes may be perforated to deliver some diluent 907 through the tube walls and cool the outside of the tube. The orifices may be oriented upstream to provide a cooling flow around the cooled electrodes.

Such improved mixing may further reduce local hot and cold spots within the fluids. Reducing the local hot spots may significantly reduce the formation of oxides of nitrogen by exponentially reducing the extended Zeldovich thermal NOx formation rate. Similarly, this may improve the mixing of oxidant and fuel species. Both these factors may improve the oxidation of carbon monoxide and unburned fuel.

Figure 80:
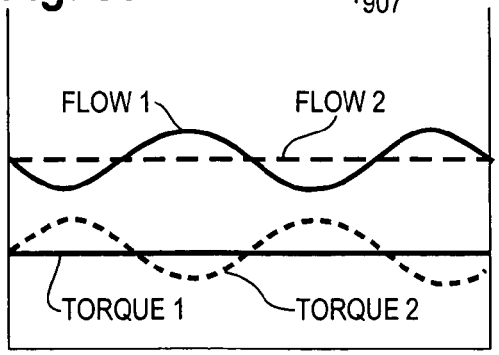
FIG. 80 conceptually shows conventional motor torque and fluctuating pump flow with compensating torque and controlled pump flow.

With reference to FIG. 80 in the '191 patent application, users may deliver one fluid through the contactors connected to the ground and another fluid deliver through the contactors connected to the elevated voltage. They may similarly apply an electric field by applying a high voltage between parallel electrodes or grid electrodes 326 transverse to the fluid flow.

In modified configurations, the transverse electric field is modulated in an pulsating and/or oscillating fashion. Applying such fluctuating transverse fields may accelerate the hot ionic fluids first in one transverse direction and then in the reverse direction. Such transverse hot gas motion may improve fuel, diluent and hot gas mixing within the combusting fluids and hot combustion gases.

In modified configurations, users combine these methods. They preferably provide one or more excitation voltages to and/or across the fuel and/or diluent distribution tubes to ionize the fuel and/or diluent drops. Users may further apply and modulate a transverse electric field. Such oscillating fields may accelerate ionized gas, charged fuel fluid drops and/or charged diluent drops transversely to the fluid flow. This may assist mixing of the evaporating and combusting fluids.

Thermal Control of Combustor Components

Users preferably configure the reactor or combustor with a number of features and components to accommodate high temperatures, strong thermal gradients and high differential thermal expansion.

Accommodating Differential Thermal Expansion

Users preferably provide measures to accommodate differential expansion, especially from thermal gradients normal to the axis of continuous components. In configurations using two or more direct contactors with different temperatures between the contactors, users preferably provide one or more measures to accommodate substantial differential thermal expansion, especially when contactors are generally in parallel and made of similar materials. They may provide one or more measures to accommodate the major differences in thermal expansion of combustor liner 60 and pressure vessel 170 and/or external enclosure of the combustor 168 caused by major changes in the temperatures and/or thermal coefficients of expansion of those components.

With reference to FIG. 6, to accommodate differential expansion along multiple direct contactors 10, users preferably form at least one of the affected contactors into one or more free spans, convolutions, serpentine shapes, periodic bends or similar curvilinear sections. E.g., when they may be subject to different temperature fluids or different temperatures. In the simplest configurations, they configure contactor tube sections as free standing curvilinear spans that allow radial movement on expansion. This allows radial expansion between supports 37 without substantial stresses.

When convolutions are provided, they are preferably configured in the hotter contactor, and are aligned parallel with the axis of the first fluid duct 130. Those convolutions may be aligned transversely to the duct axis 130. Users may provide flexible supports 37 for contactors, e.g., comprising convolutions. Users may use materials of differing thermal coefficient of expansion to form the contactors experiencing different temperature changes, with the lower coefficient of expansion to the contactor with the higher temperature difference.

As shown in FIG. 3 and FIG. 29 through FIG. 35, where thermal fins 40 or webs 42 are attached to one or more of the contactor tubes 10 or liner 60, users preferably configure convolutions or flutes in the fin or web to form a fluted fin 66 on at least one side of the contactor tube 10 or liner 60 to accommodate the differential expansion between fin and tube or web and tube. The degree of convolution or fluting in the fin preferably increases with increasing distance from the tube. Alternately uniform flutes may be used. To accommodate differential expansion along the extrusion axis of the redirector surfaces, users may provide periodic gaps in the hotter redirector surfaces in some configurations.

In some configurations, as shown in FIG. 36 and FIG. 37, users may preferably provide one or more expansion slits or gaps 67 in fins or webs attached to the tubes or tube-fin liner to provide for differential expansion between the fin and the tube. When users provide fins or webs between nearby tubes, they may cut the web between the tubes into two separate fins to allow for movement between tubes and avoid excessive shear. They further provide stiffeners with curvilinear sections to provide supports between tubes. In modified configurations, they form or cut webs between tubes 10 into strips and form or bend the web strip to some degree away from the axis of the tube to reduce the shear in the web section from relative movement between the adjacent tubes.

Users preferably configure the convolutions in the fins where the axis of the convolution is about axially aligned to the second fluid flow or to the duct to reduce changes in transverse gap spacing between adjacent contactor tubes. On modified configurations, users configure convolutions transverse to the second fluid flow or duct orientation, or in a direction intermediate between axial and transverse directions, depending on the major direction of differential thermal expansion.

With reference to FIG. 1, in some configurations, users accommodate differential thermal expansion, vibration and/or oscillation by providing flexible support connections 72 between the contactor array 261 and the duct 130. Similarly they provide convolutions, serpentine sections, helical curves, bends or similar curvilinear sections in supporting stiffeners, ribs, sub-manifolds or manifolds to flex and accommodate the relative thermal expansion between one or more of the contactors, the liner and the duct or pressure vessel 170.

With reference to FIG. 1, where contactors are connected to manifolds or sub-manifolds, the manifolds are preferably configured within the contactor span, to reduce the degree of expansion of the contactor from the manifold or sub-manifold connection. The manifold(s) are preferably connected symmetrically and midway or uniformly along the contactor to reduce the relative length of the contactor extending from or between manifold(s).

Reducing Differential Expansion

With reference to FIG. 28, where differential thermal expansion is experienced between one or more of adjacent contactors 10, combustor liner 60, pressure vessel 170 and combustor external enclosure 168, users preferably adjust one or more of the relative parameters influencing that differential expansion to reduce the degree of differential expansion in some configurations. In various configurations users adjust one or more of the heating or cooling rates affecting one or both of the contactors 10 and the coefficients of thermal expansion in one or both of the contactors 10. To adjust the heating (or cooling) rates, they further adjust one or more factors affecting the heating (or cooling) rates.

In some configurations, users adjust one or more parameters affecting the internal heat transfer coefficient comprising the fluid temperature, fluid flow rate, and internal turbulence. For example, they may:

Relative Fluid Temperatures: use a heat exchanger to adjust the relative fluid temperatures delivered to the contactors, (e.g., hot water vs fuel vs steam);

Relative Flow Rates: adjust one or more of the flow rate through one or more of the contactors 10 between one or more delivery manifolds and collector manifolds;

Internal turbulence: adjust the surface roughness of the internal tube wall and/or internal components to change the turbulence.

With reference to FIG. 3, to reduce differential thermal expansion, users may adjust the thermal conductivity of the tube wall 30 between the combusting gas and the fluid flowing through the contactor tube 10, comprising one or more of providing a thermal barrier coating 34, adjusting the thickness of the thermal barrier coating 34, or by adjusting the thermal conductivity of the barrier coating material.

With reference to FIG. 3, to reduce differential thermal expansion in some configurations, users reduce the external heat transfer to the contactor tube 10. They may provide a film of thermal diluent 907 flowing over the contactor tube 10. This film of thermal diluent may be formed by orienting diluent orifices upstream, resulting in diluent flowing back downstream around the contactor tube. It may similarly be formed by directing the diluent orifices downstream so that jets of thermal diluent 907 flow over downstream contactor tubes 10. With further reference to FIG. 28, thermal fins 36 may be used to protect contactors 10 or tube fin liners 61 from downstream combustion radiation.

Protective Erosion Barriers

With reference to FIG. 3, users may provide mechanically protective abrasion or erosion barrier coatings 35 to protect contactor tubes 10 from abrasive components in fuels. Such abrasion barrier coatings 35 are generally provided when using heavy oils with substantial quantities of ash. Such coatings are particularly important when delivering fuel fluids comprising fluidized powders such as powdered coal in the second fluid flowing over the direct contactors 10. Such coatings are predominantly oriented on the upstream side of the tube to protect against direct impingement. They are also provided over other areas around the contactor prone to erosion.

Flexible Supply Tube

Combustion heats a combustor liner 60 which causes differential expansion relative to the fluid duct and/or pressure vessel. With reference to FIG. 1, users preferably provide a flexible supply tube 54 preferably configured in a curvilinear path to provide the fuel fluid to the fuel manifold 242 within the combustor 56 in various embodiments. In configurations without a fuel manifold 242, the curvilinear flexible supply tube 54 may deliver fuel fluid directly to the distributed fuel contactor tube 11. The curvilinear path preferably includes a helical or serpentine portion that can readily accommodate the maximum differential thermal expansion experienced. In some embodiments, similar flexible supply tubes 54 are also used to deliver diluent fluid to the diluent fluid manifold 244 or thermal diluent distributed contactor tube 14. With reference to FIG. 52, a flexible supply tube 54 may be used to deliver fluid to a vibrated array. Such flexible tubes may accommodate such differential expansion, or vibration or controlled oscillation of the tube array.

Support & Fluid Connections for Expansion

To accommodate high thermal expansion of the combustion liner, users preferably connect the liner to the surrounding pressure vessel through one axial cross sectional region that is fairly stiff or rigid. The rest of the liner is allowed to expand up and down the combustor relative to this support location. Other liner supports may be provided upstream and downstream which accommodate thermal expansion by flexure or sliding.

The fuel containing fluid and diluent containing fluid manifolds or sub-manifolds are preferably brought through the pressure vessel near a common axial location. This axial location for bringing fluid passages through the pressure vessel is preferably near the location where the combustor liner is supported. From this axial location, the curvilinear flexible supply tube 54 are configured to connect to the contactor arrays within the combustor.

View Factor Radiation Shield

In various concave array embodiments 262 or 261, each distribution tube itself shields the combustor liner 60 ("wall") from the radiation of the flame by the view factor blockage it forms and by mechanical separation of hot gases from the wall. (See, E.g., FIG. 28.) Users preferably provide two or more fuel fluid and cooling diluent passages within a multi-passage tube. (See, e.g., FIG. 31)

As needed, users extend the axial dimension of a perforated distribution tube into an elliptical, oval, or more aerodynamically shaped form. This increases the cross sectional area seen by the flame ("view factor"). In concave configurations, such elongation increases the inherent shielding of the combustion wall or liner from the combustion radiation. This axial extension also increases streamlining and reduces drag, pressure drop and fluid pumping costs. This helps increase fuel evaporation relative to diluent evaporation as well as increasing the radiation shield. (See, E.g., FIG. 31.)

In some configurations, users form two passages with an intermediate connecting web-stiffener 42. (See, for example, FIG. 29.) In modified configurations, users further extend the tube separation and increase the radiation shield between the flame and combustor wall 59 or liner 60 provided by the adjoining web-stiffener 42. In modified configurations, users use a perforated web 44 to increase cooling by the axially flowing second fluid.

Such web-stiffener radiation shields 42, 44 further act as thermal fins, collecting and returning a significant portion of the radiated energy collected back to the fluids passing through the adjoining passages and to the oxidant fluid traversing the tube passages 222 and web-stiffener 42.

Users may further form two passages and one, two or three spacers or fins. (See, for example, FIG. 29, FIG. 33, FIG. 35). Users preferably form four semicircular sections in the strip, fold the strip over and bond the two sides together with bonds 39. This generally forms two passages with a structural web-stiffener 42 between them. In some configurations, users further provide one or two fins upstream or downstream of the two passages, using this method as example.

In some embodiments, users preferably connect fins to or between tubes variously to cool the fuel fluid distribution tubes, and to shield the combustor liner from the combustion heat, and to recover combustion heat that would otherwise travel through the combustor wall. For example, users preferably attach a fin-stiffener 40 or radiation shield to the upstream and/or downstream portion of each tube or to each single or joint fuel-cooling diluent tube (as described above) to further extend its transverse cross section and effectiveness as a radiation shield. (See, for example, FIG. 32 through FIG. 37.) This further assists in stiffening the tube against the bending moments created by the drag of the 2nd fluid flowing transverse to the tube.

In some configurations users form a fluid passage in one side of a tube and flatten the other side to form a streamlined or aerodynamic distribution tube 10 with a fluid passage at one side attached to a fin-stiffener 40, wing or web-stiffener 42 forming a radiation shield to form a fin-stiffener tube 46. (See, e.g., FIG. 32.)

With reference to FIG. 33, users may use the method of attaching stiffeners 40 to tubes to form two fin-stiffeners 40 on either side of a common dual passage contactor tube 16. These finned extensions can act as a radiation shields to the flame and duct that energy to the cooling diluent flowing through the tube and the oxidant fluid flowing across the tube and fins. (See, e.g., FIG. 33.) With reference to FIG. 35, users may provide a combination of a fin-stiffener tube contactor 46 with a second fin-stiffener tube 46 or another tube either upstream or downstream.

With reference to FIG. 34, users may further extend the method (as shown in FIG. 29) of adding fin-stiffeners 40 to act as radiation shields to a contactor tube 10. They may provide a perforated web-stiffener 44 joining two tube passages. Users may extend the web-stiffener 44 on the other side of one or both passages by attaching a fin-stiffener 40 upstream and/or downstream of the passages joined by the web-stiffener 44.

Users preferably attach a V shaped (or U shaped) extension to one or both of the upstream or down stream end of the tube as a fin-stiffener 40. (See, for example, FIG. 36 and FIG. 37.) Such extensions add both significant structural bending stiffness and streamlining. In other configurations, users add a simple fin-stiffener 40 which provides lower costs. (See, e.g., FIG. 33.)

Users preferably form a shield-tube with one fin-stiffener 40 by taking a strip, forming it into a tube, and then bending the extension back to form a thermal fin, stiffener and/or radiation shield. (See, for example, FIG. 36.) The assembly is preferably bonded along two lines where strip edges contact another portion of the strip.

With reference to FIG. 37, users may similarly form a dual fin-stiffener tube 48 with two fin-stiffeners 40. This assembly is preferably bonded along four lines where strip edges contact another portion of the strip. Each outer tube wall 30 of the fluid passage(s) has only one strip thickness so users can perforate them to form small orifices.

Insulating Coating

To increase the allowable temperatures of the energetic fluid 920, users preferably coat the fuel fluid and diluent distribution tubing with a protective high temperature insulating ceramic ("barrier") coating 34. The coatings 34 are preferably designed to protect the underlying metal from corrosion and increase the temperature drop from the energetic fluid 920 to the metal wall temperature. Such coatings 34 are similar to those used to coat turbine blades 450 and vanes.

To reduce radiation heating and coking or clogging of fuel fluid fluid lines and injectors, users preferably insulate fuel fluid lines and injectors with a thermal barrier coating 34. Users especially coat the tube array closest to the flame and of that the portion facing the flame.

The tubes may be coated to protect them from hot gases. Coating on both the upstream and downstream sides might keep the whole tube at a more uniform temperature reducing thermal expansion or distortion. However, coating on the side closest to the flame is most valuable. Similarly, all tubes could be coated, but the ones closes to the flame, and in particular ones carrying fuel benefit most by such a coating. Such coatings will also be important on stiffeners and other structures which are not cooled by a flowing fluid (such as the fuel or the diluent).

If the fluid distribution orifices are formed before the thermal barrier coating is applied, the orifices should be protected or filled with a fusible or combustible material, which can be removed by heating or combusting after the coating is completed. Alternatively, if the orifices are created after the coating has been applied to the tubing, the coating may need to be removed before the orifice is drilled.

Users preferably coat the fin-stiffener extension 40 with a thermal barrier coating 34 or similar insulating material or formed from an insulating material as desired or needed in some configurations. (See, e.g., FIG. 30 and FIG. 29.) Such fin-stiffener extensions 40 further increase the radiation shielding factor of each tube as well as protect and stiffen the tube.

In addition to conductive cooling within the tubes, droplets leaving the tube and evaporating further cool the gas flowing past the tube and consequently the tube.

Combustor Liner

In some configurations, users preferably configure the combustor to deliver a fairly uniform temperature across the combustor exit. E.g., a Pattern Factor near unity. In doing so, users preferably provide an inner combustion wall or "liner" 60 that can tolerate high axial fluid flows, high thermal fluxes, temperature gradients, and thermal stresses from the combustion and hot gases. Users preferably form combustor fluid duct walls 132 or combustion liners 60 of materials that can tolerate the high heat fluxes from combustion. E.g., combustion resulting in mean temperatures within the exit energetic fluid generally greater than about 1200 K (about 927° C. or 1701° F.) More preferably, the combustor walls handle temperatures greater than about 1600 K (about 1327° C. or 2421° F.), and more preferably above 1800 K (about 1527° C. or 2781° F.) for current large turbine combustors.

In configurations where users provide a fairly uniformly distributed diluent fluid to displace most of the excess air used as a coolant, users preferably eliminate all or most of the coolant air flow conventionally directed through the combustion liner, as described herein. In so doing, they eliminate the high thermal gradients and stress gradients conventionally formed by and around cooling orifices through combustor liners 60.

By eliminating or reducing the thermal diluent cooling flows through the liner users thereby eliminate or reduce the reduction in energetic fluid temperature near the combustor walls. This increases the mean energetic fluid temperature, thereby increasing thermal efficiency in downstream utilization devices such as turbines.

Users may use a high temperature structural material for the combustor liner 60. E.g., users preferably form the combustor liner 60 from polycrystalline sapphire, single crystal sapphire, aluminum oxide, silicon nitride, silicon carbide or other suitable high temperature materials. E.g., Sapphire has high strength and can tolerate temperatures of about 1500° C. or higher. Sapphire's melting point is about 2053° C. It is variously reported as tolerating temperatures of about 1800° C. to about 2000° C. and is used to form the nose cones of ballistic missiles. This would give the benefit of eliminating most or all of the large air flows and orifices through the combustor liner.

Alternatively, users form the liner from high temperature alloys such as hastalloy. With metal liners, users preferably provide a thermal barrier coating (TBC) 34 to protect the liner from the hot gases.

With reference to FIG. 28, users may wrap the combustion liner with cooling ducts 142. These are preferably spring loaded. In other configurations, they use tube-fins 61 with coolant passages 62 to form a liner. Coolant passages 62 may be incorporated into the liner. They provide diluent fluid through these cooling ducts to control the temperature of the combustor liner to not exceed a desired temperature. Such coolant ducts can accommodate the full temperatures of the combustor exit 136 (TIT) as commonly managed by the inlet sections of turbines 440.

These cooling ducts are preferably cooled with suitable diluent fluid according to the duct materials and temperature desired. E.g., steam cooling to further superheat the steam before ducting it to be delivered through upstream contactors in the combustor. In other configurations, water coolant is used to enable higher temperatures within the combustor.

Users preferably provide combustor liners 60 capable of accommodating fluids traveling at high axial speed through the combustor 56 in some configurations. E.g., preferably higher than 35 m (115 (45 ft/s).

In modified configurations, users form a compound combustor liner 60 by wrapping a ribbon wall element 69 capable of handling high temperatures, in overlapping helical bands over a mold. E.g., the ribbon 69 is preferably formed from a thin sheet of crystalline or polycrystalline sapphire or other suitable high temperature material. In other configurations, the ribbon 69 is formed from high temperature metal and is preferably covered by a thermal barrier coating 34.

The high temperature helical ribbon is preferably formed in a modified S shape such that a flatter upstream portion of the ribbon is radially outward and overlapping the flatter radially inward downstream portion of the adjacent wrap. (See, for example, FIG. 30) The inner surfaces of adjacent wraps are aligned with each other forming a fairly smooth inner surface. The helically wrapped liner is preferably stiffened with multiple stiffening ribs bonded to the helical wrap ribbon 69 on the radially outward surface. These configurations provide flexibility to help accommodate temperature gradients and differential thermal expansion.

In some modifications, users preferably configure the ribbon wall 69 in multiple sections connected to a thermal diluent manifold (not shown). The heated diluent is delivered to another diluent collection manifold (not shown.) The heated diluent is then delivered into the combustor near the upstream end.

In other configurations, the high temperature liner is formed from circumferential rings, or axial strips which are preferentially abutted or overlapped. In some configuration, multiple wraps, strips, rings are periodically bonded to adjacent components.

In some configurations, users preferably form a combustion liner with a sequence of insulating "rings" suitably shaped for the cross section of the combustor 56. They preferably form rings with matching curved shapes (E.g., tongue in groove".) They preferably provide at least one axial insulation spring 160 to spring load the insulating combustor liner rings 154 from the upstream cool end to keep the rings 154 smoothly abutted against each other. Such rings 154 readily accommodate relative thermal expansion. In other configurations, the combustion liner may be made of wedges 152 or tiles 156. Users use corresponding radial insulation springs 158 to keep the insulating wedges 152 or tiles 156 snugly abutted against each other. By reducing the cumulative thermal stresses, users thus provide for substantially higher thermal transients than with continuous liners.

In some embodiments, the concave "horn" trifluid distributed contactor 262 substantially shields a significant portion of the upstream part of the combustor liner 60. Users thus preferably use duct walls 132 or combustor liners 60 with lower temperature requirements for that shielded portion of the duct than in conventional systems.

Protective Thermal Insulation

Temperatures of the combustor exit 136 ("Turbine Inlet Temperatures" TIT) for several generations of high temperature turbines 440 exceed the working strengths of common structural metals and push the limits of exotic high temperature materials. E.g., from about 1,100° C. for "E" class turbines to about 1,440° C. to about 1525° C. flame temperature desired by GE in its H class turbines. Aircraft engines operate at about 100K higher. The highest working temperatures of turbine blade superalloys are about 1,100° C. with technology increasing such working temperatures somewhat with time. Where such higher working temperatures are needed or desired, users preferably cool and insulate components exposed to the combustion and energetic fluid 920, especially structural components.

In some embodiments, users preferably provide a protective ceramic Thermal Barrier Coating ("TBC") coating 34 to cover at least some the surfaces inside the combustion chamber exposed to the flame. This protects the substrate from corrosion and forms a hot radiating surface that enhances radiant heat transfer to the surrounding fluid.

High Temperature Insulation

Users preferably provide high performance high temperature insulation 150 between the combustor liner 60 and the surrounding pressure vessel 170 in many configurations. (See, E.g., FIG. 44 and FIG. 28.) The insulating materials preferably accommodate the temperatures within the combustion liner 60 or combustion chamber 424. E.g., users preferably use fibrous or foamed alumina type insulation capable of sustained operation at about 1,922 K (about 1,649° C. or 3,000° F.) for combustor energetic fluid 920 temperatures of about 1798 K (about 1525° C. or 2777° F.). Such insulation is preferably mixed with alumina silicate or similar materials for lower temperatures to reduce the cost. For higher temperatures, users preferably use zirconia or similar materials such as used in the Space Shuttle tiles.

Figure 69:
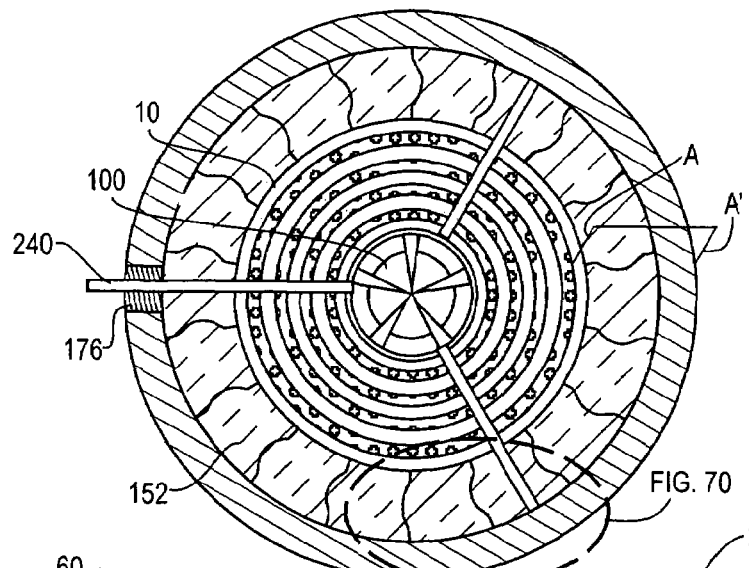
FIG. 69 is a schematic cross-sectional view of a pressurized fluid combustor with fuel and diluent distribution tubes, manifolds, a flame holder, peripheral insulation and a pressure vessel.
Figure 70:
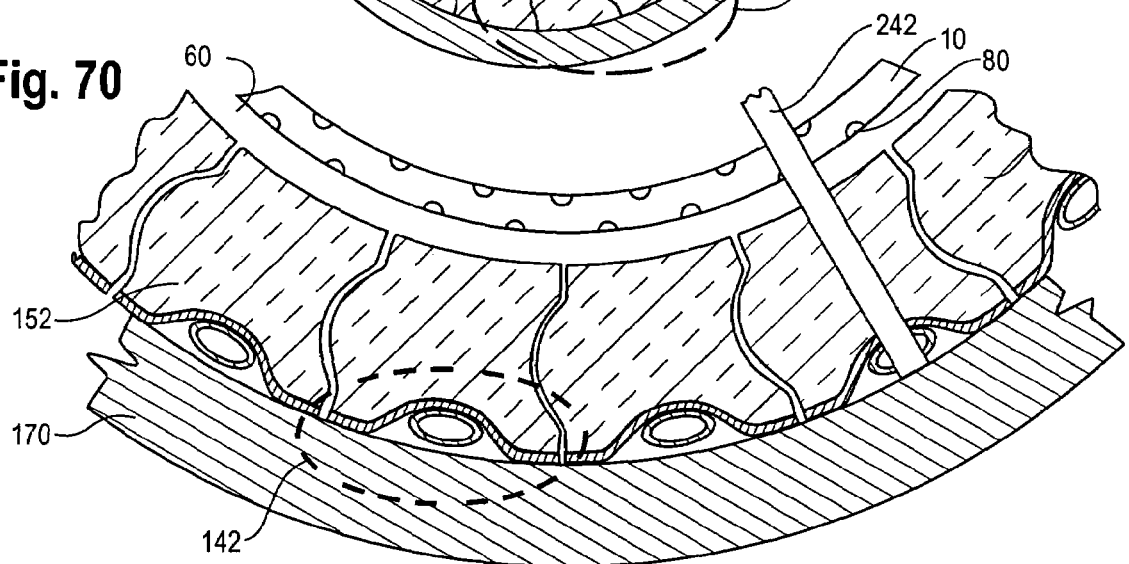
FIG. 70 is an enlarged cross-sectional schematic of a combustor wall with spring-fin coolant passages between insulation wedges and a pressure vessel.
Figure 71:
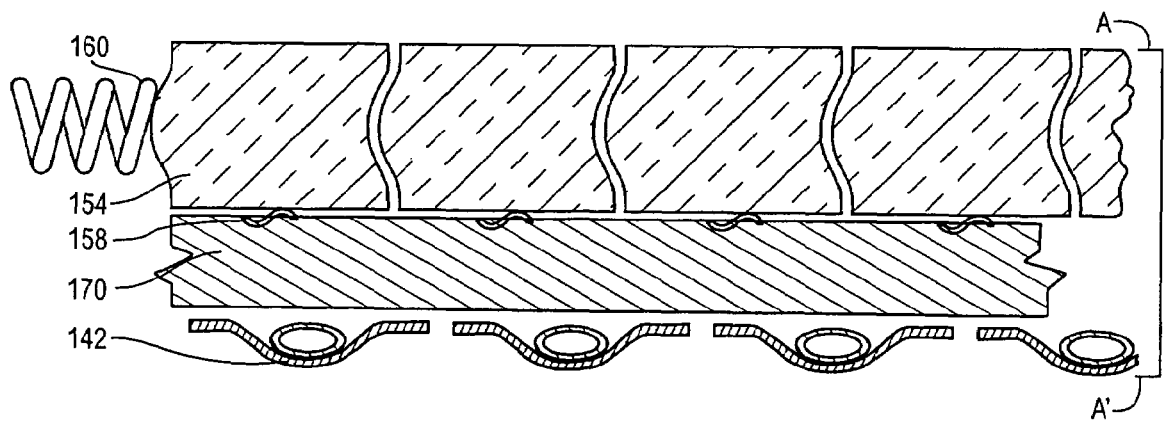
FIG. 71 is an enlarged elevation schematic of a combustor wall with external cooling fin-passages, and springs between insulation wedges and a pressure vessel.

In some embodiments, users preferably form the combustion liner with insulating wedges 152, rings 154 or tiles 156. (See, E.g., FIG. 69 to FIG. 71) In cylindrical or similar interior configurations of the combustor 60, the wedges 152 or tiles 156 will commonly have narrower inner circumferences and wider outer circumferences. (See, for example, FIG. 70.) Such configurations naturally hold the wedges 152 or tiles 156 in place circumferentially. To further hold the insulation in place, users preferably form the transverse sides of the insulation into matching concave/convex shapes, in a principle similar to "tongue-in-grove" board edges. (See, for example, FIG. 70 and FIG. 71.)

In modified configurations, users preferably provide spring loading between the insulation wedges 152 or tiles 156 and surrounding pressure vessel 170. For insulating rings 154, users preferably provide an axial spring loading to accommodate thermal expansion while keeping inter-ring passages tight. Insulation 150 expands and contracts at a different rate and heats up more than the surrounding pressure vessel 170.

In some configurations, users use insulating tiles 156. They preferably provide clips on coolant tubes to support insulating tiles 156 or bond the insulating tiles 156 to the coolant tubes or to the pressure vessel 170.

Pressure Vessel Cooling

In various embodiments, users preferably provide insulation and/or a cooling system 178 to protect the pressure vessel 170 and other combustor components from the combustion and hot energetic fluid. (See, for example, FIGS. 28, 69 through FIG. 71). They also insulate the exterior of hot (or cold) components to further reduce heat losses (gains), improve efficiency and protect people. E.g., they provide insulation 150 outside of the pressure vessel 172 and place a finned cooling tube 148 adjacent to the pressure vessel.

Users preferably duct diluent fluid next to the exterior pressure vessel 170 in some configurations. The diluent fluid temperature and flow rate are preferably controlled to keep the pressure vessel 170 within standard ASME pressure vessel conditions. The heated diluent is then preferably ducted into the combustion chamber 56 to return to the energetic fluid the heat lost through the combustor wall(s) 59.

Users preferably provide cooling thermal diluent ducts 142 along the interior of the pressure vessel 170. (See, e.g., FIG. 70.) Users wrap the cooling ducts 142 transversely around the interior of the pressure vessel 170. Similarly, users may provide spring mounted coolant ducts 142 are positioned axially along the interior wall of the pressure vessel 170. These methods cool the interior of the pressure vessel 170, preferably providing the advantage of a lower average temperature for the pressure vessel than by cooling the exterior. In other configurations, users wrap spring loaded cooling ducts 142 around the pressure vessel 170. (See, e.g., FIG. 71.)

The cooling ducts 142 preferably have an extended fins or "flat" contact surfaces that increases the contact area with the pressure vessel 170 and between the pressure vessel and the insulation. This assists heat transfer between the cooling duct and the pressure vessel 170. Users preferably provide some axial or similar convolution to this coolant duct 142 to provide some spring loading under tension to ensure good contact.

Cooling Gas Flow Along Inner Combustor Liner Wall

In some embodiments, users provide a fluid flow passage around the fuel fluid distributor adjacent to the combustor liner 60. This delivers a cooling fluid flow along the combustor liner 60.

In various embodiments, users preferably use a distributed perforated tube to deliver a diluent fluid along the radially inner wall of the combustor liner 60 to cool and protect it. Users may provide a peripheral section of the thermal diluent distribution contactor between the outer edge of the fuel fluid distribution tubing out to the combustor wall 59. They may further deliver liquid diluent through this peripheral contactor. Oxidant containing fluid passing through this cooling distribution tubing will entrain liquid drops emitted along the combustor wall 59 or liner 60.

Users may also deliver nitrogen or recirculate vitiated combustion gas along the inner combustor wall 59. This hinders combustion and limits the gas temperature along the combustor liner 60.

Users preferably control the liquid/gas ratio in this peripheral cooling zone to maintain the base metal temperature below a first prescribed level and thus to control the maximum wall temperature to below a second prescribed level in some embodiments.

U.S. Pat. Nos. 5,617,719, 5,743,080 and 6,289,666 to Ginter taught of ducting the oxygen containing fluid flow along the exterior wall of the combustor liner 60, and surrounding the liner by another fluid duct. It further taught of delivering diluent fluid into the fluid that flows past the exterior wall of the combustor liner 60. In some embodiments of the present invention, diluent fluid is ducted past the exterior (radially outer) wall of the liner to cool the liner. The diluent fluid is preferably delivered through a direct fluid contactor 14 parallel to the liner 60. The heated diluent fluid is then introduced into the combustion chamber 424. Alternatively the diluent fluid is ducted within the liner 60 itself. (See, E.g., FIG. 28, FIG. 30.)

Cooled Tube-Fin Compound Combustion Liner

Figure 30:
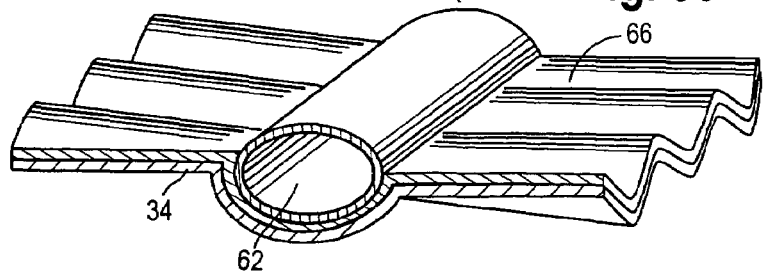
FIG. 30 is a conceptual perspective view of a combustor cooled fin-liner with insulated fluted fins and a coolant passage.

With reference to FIG. 28, in some embodiments, configure cooled liners. For example users preferably form a compound combustor liner using a finned tube-fin liner 61 having a diluent fluid passage. This liner is preferably provided at least along the hottest region of the combustor. E.g., preferably from the downstream end of the distributed contactor to at least downstream of most of the combustion. With reference to FIG. 30, the hybrid wound tube-fin liner 61 preferably comprises a tube-fin fluid passage 62 with thermally conductive fins 66 connected to the diluent fluid tube on the upstream and downstream sides.

Users preferably wind the finned tubes in a helical fashion to form the combustor tube-fin liner 61. The tube spacing preferably provides an expansion gap between the end of one fin and the next tube sufficient to accommodate the maximum operational change in wall temperature. Users preferably duct the diluent fluid through the tube-fin coolant passages 62 in a counter-flow fashion to the fluid within the combustion zone. The upstream end of the tube-fin liner coolant passage 62 is preferably connected to one or more of the diluent delivery fluid manifold(s). In other configurations, the tube-fin passages 62 are ducted in a co-flow fashion.

With reference to FIG. 30, the side of one or both of the fins and tube of the tube fin liner 60 towards the combustion are preferably coated with the thermal barrier coating 34. The thickness of the thermal barrier coating 34 is preferably adjusted in proportion to the axial length of the tube-fin liner 61 and temperature increase to control the thermal induced stress at the interface between the tube-fin liner 61 and the thermal barrier coating 34 due to differential thermal expansion.

The diluent fluid tube 14 is preferably flattened or elongated in some embodiments to reduce the radial depth and increase the axial coverage. The radially inner side downstream fin is preferably in line with the radially inmost section of the tube to reduce roughness and drag. The radially outward (preferably upstream) fin and its thermal barrier coating 34 are preferably offset radially outward sufficient to accommodate the radially inward (preferably downstream) fin of the adjacent tube-fin liner 61.

This preferably provides a substantially "level" inner surface for the high speed gas flow. Users preferably provide small gaps between the fin of one tube and the adjacent tube to accommodate some or all of the differential expansion between the interior of the combustor 56 or the fluid duct 130 and the exterior pressure vessel 170 as the temperature changes in operation as desired or needed.

In such embodiments, at least one and preferably three axial tube-fin stiffening ribs 70 are preferably attached to the radially outward side of the wound tube-fin liner 61. In modified configurations, such tube-fin stiffening ribs 70 are wound in a helical fashion crosswise to the helical cast of the wound tube-fin liner. The stiffening ribs 70 are preferably extended and attached to the pressure vessel 170 to provide structural support to the combustor liner 60 or tube-fin liner 61. In some configurations, the stiffening ribs 70 further include convolutions to provide flexure capacity as desired or needed to accommodate differential thermal expansion.

Such configurations of periodic overlapped tubes and fins and stiffening ribs 70 provide ready axial and circumferential flexure as the combustor heats and cools while providing structural supports for the combustor liner 60 or tube-fin liner 61. Such structures incorporate the capacity to accommodate very rapid heating and cooling rates as might be experienced in rapid system startup and shutdown.

In other configurations, the finned tubes may be fashioned in cylindrical arcs and connected to one or more axial fluid manifolds 240. Conversely, the finned tubes may also be configured axially and connected to one or more circumferential fluid manifold(s) 240.

In modified embodiments, the tube-fin described herein is wound around (radially outward) a high temperature insulating combustion liner 60 to cool the liner. The liner is preferably made of mullite or similar high temperature ceramic with good temperature and thermal shock characteristics.

In such configurations, the tube-fin is preferably formed with fluctuating curves perpendicular to the fins. Such convoluted finned tube is preferably wound around the inner insulating liner with a modest tension. As the insulating liner and tube-fin liner heat up, the tube-fin liner will typically expand faster then the insulating liner. The curves are preferably pre-tensioned sufficient to accommodate the maximum operational differential thermal expansion between the insulating liner and the wound tube-fin liner.

Liner Supports

In some configurations, the combustor liner 60 is preferably flexibly supported and connected to the outer surrounding pressure vessel 170 with tube-fin array supports 72. In some embodiments, users preferably configure these flexible supports with convolutions, helical coils or similar configurations. These provide flexure to accommodate differential thermal expansion as the system heats and cools. In other embodiments, an insulating liner is cooled by wrapping it with a cooling tube carrying diluent fluid.

Acoustic Pressure Damping

Pressure oscillations within a combustor 56 can cause significant damage or fatigue. With reference to FIG. 30, gaps are preferably configured between overlapping fins of the combustor tube-fin liner 61 to provide damping for the acoustic pressure oscillations. (See, for example, FIG. 30). Users preferably corrugate or "flute" at least the radially inward (preferably downstream) fin 62 to provide damping chambers between the overlapping fins from adjacent tubes. E.g., between a fluted fin 62 and plane fin 64 or between two fluted fins 62. (See, e.g., FIG. 29.) Pressure oscillations move the energetic fluid 920 in and out of the passages formed between the overlapping fins providing significant acoustic damping. The size of the passages is preferably adjusted to damp major resonances, particularly at higher frequencies. The fluting further accommodates differential thermal expansion between upstream and downstream sides of the tube-fin.

Where such gaps or corrugations are configured in the tube-fin liner 61, users preferably extend the thermal barrier coating to the inner side of that fin to reduce heat gain to the fin and enable the cooling duct to maintain the design temperature.

Flame Holder/Ignition Authority

With reference to FIG. 1, in various embodiments, users preferably provide at least one "flame holder" 100 ("flame stabilizer", "ignition authority" or "pilot light") to ignite the combustible mixture of fuel fluid and oxygen. (See, for example, FIG. 28, FIG. 44, FIG. 52, FIG. 54, FIG. 67, etc.) The flame holder 100 preferably provides an ongoing ignition source to assure reliable combustion of the surrounding combustible mixture.

Trifluid Flame Holder

Figure 72:
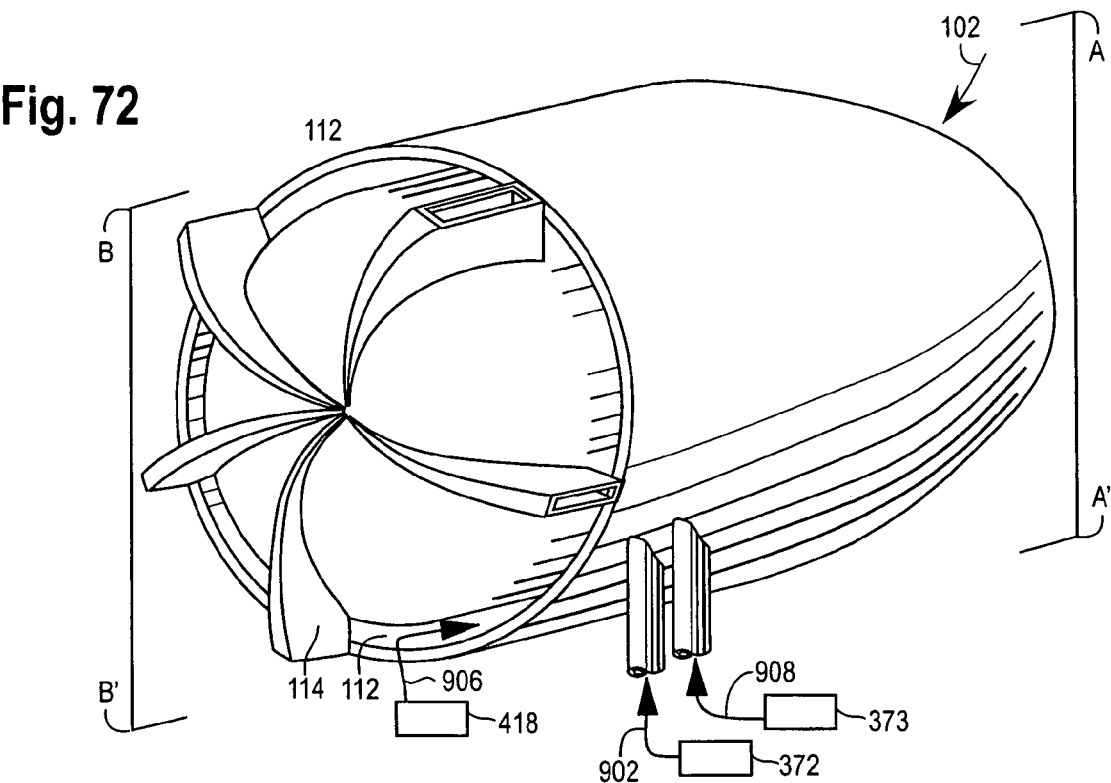
FIG. 72 is a conceptual perspective view of a toroidal flame holder with peripheral upstream oxidant fluid intake ports and peripheral upstream hot gas outlet ports.

With reference to FIG. 72, users preferably provide a pilot fuel fluid delivery system 372, a pilot thermal diluent delivery system 373, and a pilot oxidant fluid delivery system 418 to an ignition authority 102 to form a "trifluid flame holder" that mixes and combusts oxidant, fuel and diluent. Users preferably configure the flame holder including diluent delivery to control the temperature of the pilot combustion and provide some of the advantages described herein, including reducing pilot combustion intensity and temperature and reducing NOx formation.

With further reference to FIG. 72, users preferably use steam (or water) as the pilot diluent fluid 908 delivered to the trifluid flame holder 100. They preferably configure the pilot oxidant fluid delivery of pilot oxidant fluid 906 and pilot fuel fluid delivery of pilot fuel 902 to obtain an oxidant/fuel ratio lambda of about 1.5 or less and deliver steam diluent to reduce combustion intensity and temperature. Steam diluent generates substantial quantities of OH radicals in the hot pilot gas. The hot pilot fluid is preferably formed between about 1300 K and about 1900 K (1027° C. and 1627° C. or 1880° F. to 2960° F.) This provides a good concentration of OH and hydrocarbon radicals to assist ignition and combustion while avoiding major NOx formation.}

Concave Redirector Flame Holders

Figure 73:
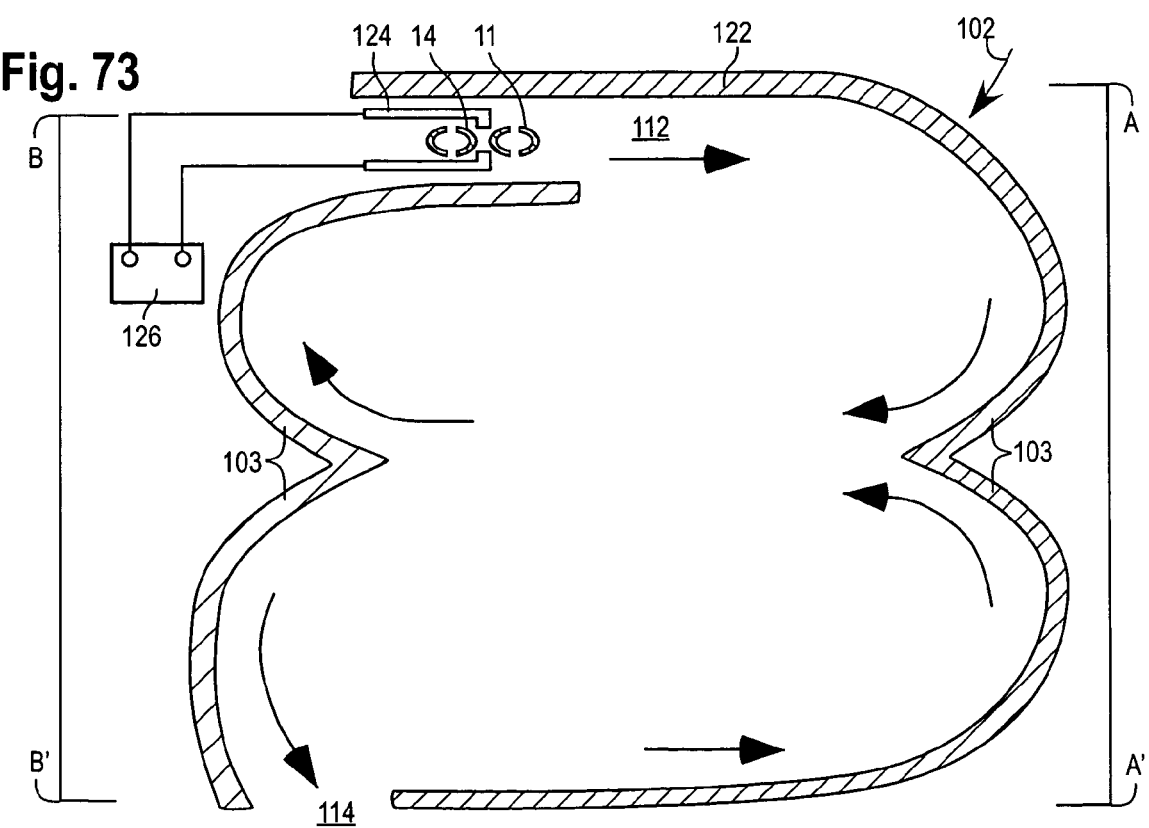
FIG. 73 is a schematic cross-sectional view of a toroidal flame holder with peripheral upstream oxidant fluid intake ports, an igniter, peripheral upstream hot gas outlet ports, and a single outer wall.

In some embodiments as shown in FIG. 73, users preferably provide two opposing internally concave redirector bodies 103. These concave opposed redirectors 103 provide an efficient means for trapping and stabilizing an internal vortex in the presence of external axial fluid flows. An outer shroud 122 preferably with curvilinear surfaces preferably streamlines the body, thus reducing the pressure drop due to the second fluid flowing over the flame holder. These outer convex surfaces of the streamlined shroud 122 further reduce the pressure outside the transverse ports by the Bernoulli effect, drawing the hot gases outwards.

These internally concave redirectors 103 preferably form a portion of an internal cavity which at least partially encloses and optically surrounds the recirculating gases within the flame holder 100. These hot opposing or enclosing surfaces form a "gray body" with enhanced internal radiation flux (i.e., near to a "black body"). This improves fuel fluid evaporation, thermal equilibration and combustion.

In modified embodiments, users position two opposed redirectors 103 with gaps between them. In other variations, users provide one internally concave redirector 103 in opposition to a bluff body to obtain some of the benefits of the flame holder 100 described herein.

In some embodiments, users form the internally concave redirector surfaces by taking opposing C shaped curves and extending these about an offset axis to form two surfaces of revolution such as about the longitudinal axis of the flame holder 100. The flame holder 100 is preferably oriented with its longitudinal axis parallel to the second fluid duct. E.g., similar to two opposed umbrellas with concave internal surfaces facing each other. (See, for example, FIG. 72, FIG. 73, FIG. 74, and FIG. 75.)

With reference to FIG. 72 and FIG. 73, in some embodiments, the upstream and downstream outer surfaces of the internally concave curved surfaces 103 may be alternatingly scalloped into upstream oxidant fluid intake ports 107 and downstream hot gas exit ports 114. (See, for example, FIG. 72 and FIG. 73). The scalloped concave redirectors 103 are offset such that the upstream facing scallops form scoops or intake ports 107 to capture and entrain oxidant containing fluid into the concave vortex flame holder 100. Similarly the downstream facing scallops form hot gas exit ports 114 to eject the hot fluid radially into the surrounding fluid.

Flame Tubes

With reference to FIG. 44, users may include at least one hot gas delivery flame tube 116 from the ignition source, pilot flame, and/or the flame holder 100 and position it near the combustible mixture formed within the combustor 56. Users preferably establish a flame in an upstream cavity or flame holder 100. The flame tube 116 directs the hot gas or combusting mixture from at least one of the ignition source, pilot flame or flame holder 100, into the combustible mixture downstream of the direct contact fuel fluid and diluent fluid distribution arrays.

The flame tube 116 preferably exits near the combustible mixture downstream of distributed contactors near the upstream end of the contactor. The flame tube 116 preferably ignites a combustible mixture in at least one location within the combustor 56. It may also exit near or within at least one downstream flame holder 100.

Toroidal Trapped Vortex Flame Authority

With reference to FIG. 72, users preferably configure the internally concave redirectors 103 of the flame holder 100 to form a modified toroidal shaped chamber 102. This "doughnut" shaped structure 102 provides an internal chamber to recirculate hot gases from a pilot flame. (See, for example, FIG. 73, FIG. 74, and FIG. 75.) Hot gases flow out from ports in the flame holder 100 to ignite a nearby portion of a flammable mixture when it is present. A flame holder structural support 118 is provided to support the flame holder 100 within the combustor 56.

The internal surfaces of the toroidal configuration almost completely enclose and optically surround the recirculating gases in many embodiments. These hot enclosing surfaces approximate a "black body". The hot surfaces generate a fairly uniform high radiation field within the modified toroidal chamber. The recirculating hot gas and high radiation field facilitate fuel fluid evaporation as needed. They further heat the combustible mixture forming a more easily ignitable combustible mixture.

With reference to FIG. 73, the modified toroidal chamber 102 further provides a moderate fairly well controlled flow field protected from oscillating eddies, vortices and similar variations ("gusts") that could blow out a pilot flame or full flame. In some configurations, the walls of the modified toroidal chamber 102, the redirectors 103 and/or the structural support 118 are covered with insulation or a thermal barrier coating 120 to protect them from high internal and/or external temperatures or hot gases.

With reference to FIG. 73, to provide the pilot oxidant fluid flow, a portion of the total oxidant fluid is preferably directed into the modified toroidal chamber 102 usually along the axis either from the downstream or upstream ends in various embodiments. (See also FIG. 74, and FIG. 75.) The modified opposing internally concave surfaces 103 of the modified toroidal chamber 102 form diverging tips, symmetrical about the axis in some embodiments. These diverge and redirect the impinging fluid flows back 180° to the original fluid flow With reference to FIG. 74, users preferably form the upstream portion of the toroidal flame holder into a converging duct to direct the impinging oxidant fluid into a pilot oxidant passage 108 to mix with a pilot flow of fuel 903 delivered through a fuel contactor 12 and mix and flow through an axial mixture intake port 112. By positioning an upstream intake duct and at least one transverse downstream exit ports, users may provide the pressure difference that draws the oxidant fluid into and through the flame holder.

This pressure difference with a converging duct accelerates the intake fluid downstream through the mixture intake port 112 along the axis. The opposing concave surface 103 redirects this jet into an internal vortex. This intake jet also entrains the adjacent internal fluid further driving the vortex. The second opposing concave surface 103 opposite the first concave surface 103 forms a complementary surface to continue the internal vortex. The two internal concave surfaces 103 form a modified toroidal chamber 102.

In some embodiments, users preferably position a smaller pilot oxidant tube 110 upstream and axially in line with the main oxidant fluid passage 108. They provide a flame holder oxidant delivery system 418 to deliver the pilot oxidant fluid flow through this pilot oxidant tube 110. A small pilot compressor/blower or pump may be provided in this delivery system to deliver the oxidant fluid to the flame holder. The axial jet formed by this pilot intake tube 110 entrains further oxidant from the surrounding fluid in the main oxidant passage 108 through a mixture delivery port 112 into the modified toroidal chamber 102.

Figure 75:
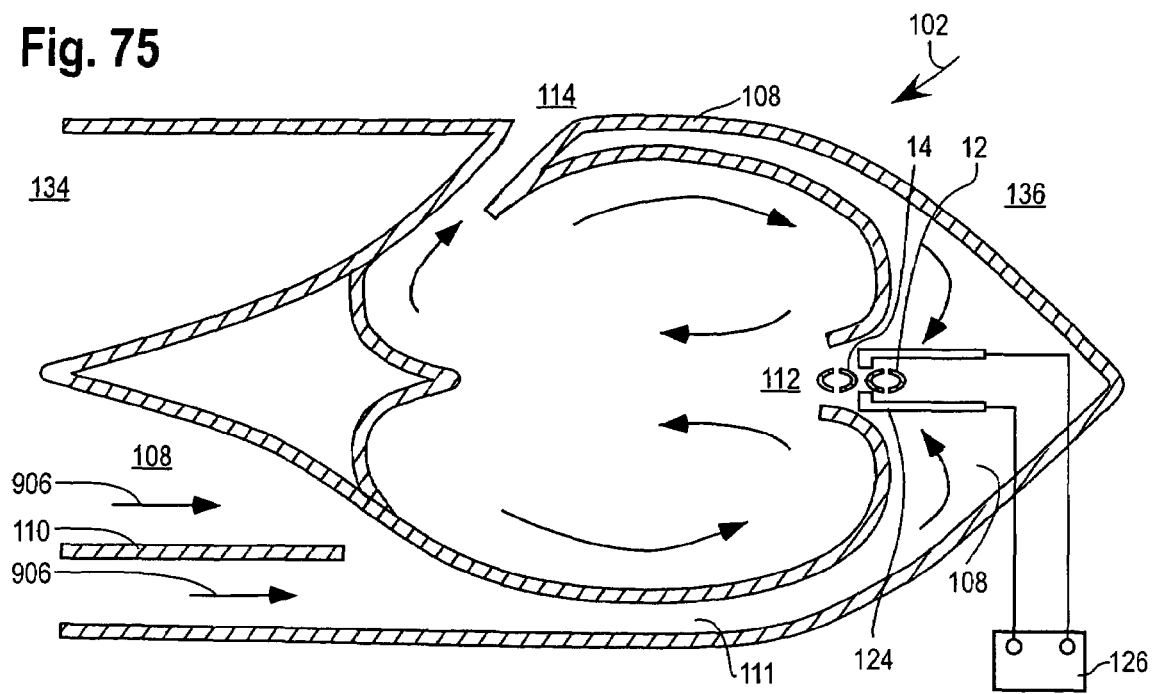
FIG. 75 is a schematic cross-sectional view of a toroidal flame holder with peripheral upstream oxidant fluid intake ports, an igniter, peripheral upstream hot gas outlet ports, and a double outer wall.

With reference to FIG. 75, users may duct the intake oxidant fluid into at least one circumferential passage 111 to the downstream portion of the flame holder 102. There the fluid is delivered into the center portion of flame holder 102 through a downstream axial port 112. This downstream fluid intake reverses the vortex flow from axially "downstream" to axially "upstream" (relative to the external flows.)

The flow through the circumferential passage 111 cools the walls of the flame holder 102. Where needed or desired, this cooling reduces the temperature of the toroidal chamber walls that are heated from one or both of combustion within the flame holder 102 or the main combustion outside the flame holder.

In some such embodiments, users preferably provide circumferential ducts 108 or pilot tubes 110 to direct pilot oxidant fluid flow(s) 906 into this circumferential passage 111. As before, these pilot oxidant flows entrain surrounding oxidant fluid into the circumferential passage(s) 111.

Figure 74:
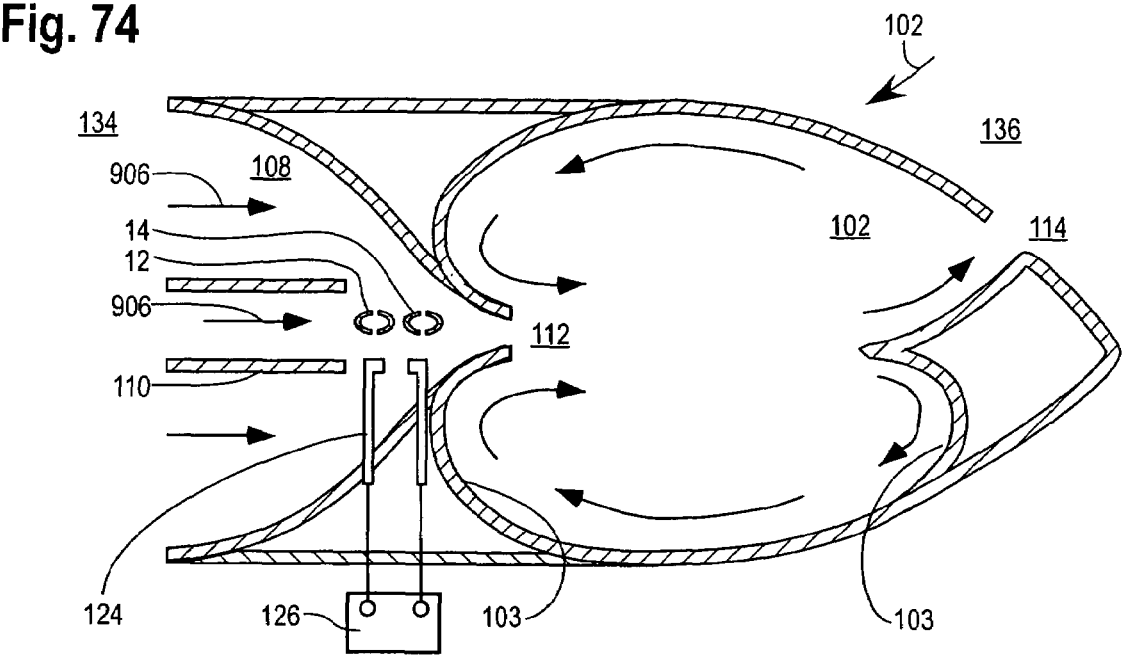
FIG. 74 is a schematic cross-sectional view of a toroidal flame holder with axial upstream oxidant fluid intake ports, an igniter and downstream hot gas outlet ports.

With reference to FIGS. 73, 74 and 75, users preferably provide one or more pilot fuel fluid flows through perforated fuel contactor tubes 12 that are injected into the oxidant containing fluid 906 flowing into the flame holder 102. Users position and configure the fuel distribution passages or tubes 12 within or adjacent to the oxidant containing fluid flows. These are configured so that the fuel fluid mixes, evaporates and preferably combusts before touching an internal surface.

Users preferably locate the fuel passage(s) 12 to protect them from the combustion within the flame holder 102 as well as the main combustion within the duct to avoid, reduce or control polymerization and coking.

With reference to FIGS. 73, 74 and 75, users preferably provide perforated diluent contactor tubes 14 to distribute a pilot diluent flow into the fuel-oxidant mixture and/or into the internal vortex combustion flame of a flame authority 102. They preferably position passages with thermal diluent between the fuel fluid passages and the combustion or hot gases. They preferably configure the thermal diluent orifices to provide suitable diluent fluid/fuel fluid flows to achieve the desired temperature in the hot gas while constraining emissions of NOx and other pollutants.

In some configurations, the diluent fluid cools portions of the structure of the flame holder 100 as well as providing flows that support and cool the trapped vortex. Diluent fluid delivered through thermal diluent passages into the circumferential ducts 111 cool those walls and the downstream portion of the flame holder 102 including the downstream concave vortex forming redirector 103. In some configurations the diluent fluid is be directed through an axial structural duct to the downstream redirector 103. In particular, users preferably cool the hottest portions of the flame holder 102 where the flame or hottest gas impinges such as the diverging cone opposite the fuel fluid and oxidant intake. (See, for example, FIG. 74, FIG. 75.)

In some configurations, users preferably deliver the diluent fluid, and/or oxidant fluid (and possibly fuel fluid) through perforated distribution tubes 14 or passages 108 formed into the upstream and downstream internally concave structures 103 that comprise the modified toroidal flame holder 102. Users locate these delivery tubes 14 or passages 108 and adjust the relative orifice sizes, locations and orientations as needed or desired.

The oxidant fluid flow into the flame holder and the flow of the hot gases exiting the flame holder provide the primary momentum exchanges that support the internal vortices. Users direct the oxidant fluid flows into the flame holder 102 and direct the hot gases out of the flame holder. These provide the primary momentum exchanges that support one or more internal vortices. The combustion expands the gases within the flame holder increasing the exit flow velocity.

To further support the internal vortex, in some embodiments users preferably position and orient the fuel fluid passages 12, oxidant passage 108, and/or thermal diluent passage 14 and at least one of the oxidant fluid, diluent fluid and the fuel fluid flows, into modified toroidal chamber 102 with a velocity component in the local direction of the fluid flow.

In some configurations, these fluids are directed "upstream" (externally) from the axially "downstream" end of the toroidal vortex, or "downstream" from the "upstream" end according to the local vortex flow directions. (See, for example, FIG. 74 and FIG. 75.) (Note: "Upstream" and "Downstream" refer to the direction of the main 2nd fluid flow exterior to the flame holder 100. The flow within the toroidal flame holder 100 moving axially downstream to upstream within the flame holder.)

For example, with reference to FIG. 75, users may provide perforated tubes or fluid passages in the downstream end of the flame holder to inject fluid and preferably direct fluid upstream from the downstream axial port 112 or inner radius of the downstream concave vortex forming body 103. To deliver those pilot fluids, they preferably provide circumferential ducts 111 etc. between inner and outer walls of the flame holder to deliver the fluid from upstream to the downstream axial inlets. These pilot fluid deliveries may also be provided by external tubes to the downstream inlets.

Similarly, with reference to FIG. 73, they may provide perforated contactor tubes 12 and 14 in the upstream outer radius of the upstream concave surface 103 to distribute pilot fuel fluid and pilot diluent fluid into the downstream flowing pilot oxidant fluid flow.

In other embodiments, users may direct the fluids radially inward from the outer edge of the concave vortex forming body 103. In some configurations, the fluid(s) to these downstream locations are delivered along an axial tubular structural support of the downstream concave vortex forming structure 103. In other configurations these fluids are directed radially outward from the axis and/or radially inward from the circumference through radial orifices 85 towards the axis depending on the local vortex directions. In other configurations, users inject vapor formed by evaporation of vaporizable diluent liquid.

With reference to FIG. 72, users preferably configure at least one hot gas port 114 so that it ejects a hot gas radially outward from the flame holder 102 into the surrounding fluid flow downstream in some embodiments. (See, for example, FIG. 72, FIG. 73, FIG. 74 and FIG. 75.) In some configurations, the hot jet may contain combusting fluids. The hot gas jet convectively heats the surrounding fluid.

Users preferably position the hot gas exit ports 114 and orient the preceding surfaces to direct the hot gas outward and generally parallel to (across) the nearby direct contact fluid distributor surfaces. Users preferably configure the surface within an enclosed flame holder 102 preceding the exit with an exit radius significantly larger than the surrounding concave surface 103. This directs the outward flow of the hot energetic fluid 920 into the surrounding gas flow.

With reference to FIG. 72, users preferably elongate the hot gas ports 114 for the hot gases to exit the flame holder 102 along the upstream-downstream axis of the duct. (See, also FIG. 73.) Such elongated ducts 114 form axially elongated jets of hot gas which will penetrate the surrounding axial flow further than a round jet.

Igniters

With reference to FIG. 73, pilot combustion is started using at least one igniter 124 within or near one or both of the pilot fuel delivery 12 and the axial mixture port 112. (See also FIG. 74 and FIG. 75.) They may similarly use high pressure compression heating of the oxidant fluid to ignite the combustible mixture.

The igniter 124 is preferably positioned near where the combustible mixture of fuel fluid and oxidant fluid is formed. Users preferably excite the igniter to initiate the combustion. The igniter 124 may then be turned off, preferably after the flame holder has heated up sufficiently to continue operating with a desired reliability. Alternatively, users may use at least one igniter 124 to ignite the combustible mixture within the duct in other configurations. Where greater combustion reliability is desired or needed, users preferably use multiple igniters 124 to ensure that at least one will ignite the combustible mixture.

With further reference to FIGS. 73, 74 and 75, users preferably use spark igniters 124 to initiate combustion in the fuel oxidant mixture in some embodiments, preferably near the upstream end of the flame holder. Users preferably provide an igniter excitation source 126 and connect it to the respective igniter 124 where electromagnetic energy is required to excite the igniter.

In some embodiments, an inductive heater is configured to heat a resister within the combustor or flame holder or within an associated chamber sufficient to ignite a combustible mixture. In other embodiments, users may provide a microwave generator and concentrating duct to provide heat to ignite a combustible mixture. They preferably use microwaves to heat a microwave absorbing igniting component near the microwave duct exit in contact with the combustible mixture until it becomes hot and ignites the surrounding combustible mixture. Users preferably provide a microwave transparent wall between the microwave and the igniting component. This microwave transparent wall separates and protects the microwave duct from the combustion chamber.

In modified configurations, users provide microwave energy to directly or indirectly heat a fluid component and ignite a combustible mixture in the flame holder in some embodiments. Materials substantially transparent to microwave frequencies preferably form at least part of the upstream structure of the flame holder or some tube or chamber with a combustible mixture leading to the flame holder. Microwave energy is preferably provided axially to heat the flame holder or a connected chamber holding a combustible mixture.

Users similarly provide power by laser light piped through a optic fiber and lens into the combustion chamber or concave trapped vortex flame holder in some embodiments. Focused laser light provides very concentrated energy delivery resulting in a very high power and high temperature at the focal point. This then ignites the fuel oxidant mixture. They may similarly focus solar energy.

Users may similarly provide a catalytic surface igniter 124 in a chamber and a system to provide a combustible mixture about that catalytic surface in some embodiments. In other embodiments, users may provide a glow plug as an alternative or additional method to ignite the fuel fluid near the flame holder in some embodiments. These are preferably within a protected region such as within a flame holder or downstream of a protective surface in at least one location along a distributed pilot system.

Supporting Structures & Components

Fluid distribution arrays require supports against the transverse fluid flows as well as against gravity and vibration. The arrays and supporting structures may also be protected against high temperature thermal fluxes as desired or needed.

Upstream Supporting Ribs

In some embodiments, users preferably provide at least one and preferably three or more tube support ribs 38 or stiffening or supporting structures to stiffen and support the perforated distribution tubes relative to each other. In some configurations, users use other stiffening wires or rods as tube stiffeners 36 to connect and support the perforated distribution tubes 10 relative to each other.

Users preferably position these support ribs 38 upstream of the distribution tubes to distance and shield the ribs from the downstream combustion and associated radiant heat flux. This keeps the ribs 38 cooler than if they were positioned downstream of the tubes.

Fluid Distribution Manifolds

Users commonly connect the perforated fluid distribution tubes to at least one manifold 240 to supply the respective fluid to the tubes. Users preferably provide separate fuel manifolds 242 for fuel and diluent manifolds 244 for thermal diluent distribution tubes respectively. (E.g., diesel fuel manifolds 242 and water manifolds 244.)

Users preferably close the fuel fluid passage or tube at one end of the multi-passage contactor tube 220 or joint tube, and close the diluent passage at the other end of the multi-passage contactor tube 220. The open end of the fuel fluid passage is preferably connected to a fuel fluid manifold while the diluent passage at the other end of the dual passage tube 16 is connected to a diluent manifold.

In other configurations, multi-passage manifolds 246 are used to deliver multiple fluids. In such configurations, users connect both fuel fluid and diluent passages of a multi-passage tube 220 to a multi-passage manifold 246.

To accommodate temperatures in the energetic fluid 920 higher than the maximum allowable metal working temperature, users preferably internally or externally cool structures around and within the combustor and work engine below the temperature of the respective combusting fluids and/or energetic fluid 920 in some embodiments. They further apply insulating thermal barrier coatings 34 to reduce heat gain.

Users preferably utilize the fluid manifolds 240 both as supporting structures or ribs and as fluid supply passages in some embodiments. The fluid manifolds 240 preferably support the distribution tubes relative to each other. The fluid manifolds 240 preferably support the distribution arrays within the combustor. The fluid manifolds 240 transfer the drag forces from the moving second fluid on the distributed contactor arrays 10 to the combustor walls and thence to the pressure vessel 170.

Users preferably provide flexure bends, helices or similar curved portions to accommodate differential thermal expansion between the cool exterior and hot combustor interior or inner combustor liner 60.

Users preferably streamline at least some of the structural ribs 38 and manifolds 240 to reduce fluid drag, pressure drop and pumping losses from those ribs 38 and manifolds 240 in some embodiments. The axial elongation of streamlining further increases the bending moment about an axis perpendicular to the second flow. This elongation improves the ability of the supports, ribs 38 and manifolds 240 to withstand the bending forces caused by the transverse fluid flow.

Tube Vibrator

With reference to FIG. 52, in some embodiments, users may provide a tube vibrator 50 to vibrate one or both of the fuel fluid tube contactor and/or diluent fluid tube contactor in an array. The contactor array is preferably stiffened by tube ribs 38 and supported by flexible mounts 72. The fluids are preferably delivered to the array through flexible supply tubes 54. (See the '191 patent application FIG. 50, the description under section 11.9 "Vibrate Tubes-Orifices" and related discussion on flexible structural supports.)

Asymmetric Diluent & Fuel Tube Locations

In some embodiments, users preferably position a fuel tube near the flame holder. Such configurations provide a near stoichiometric fuel rich region next to the flame holder that helps the flame holder ignite the combustible mixture.

Similarly, users preferably position a diluent tube near the duct wall as desired or needed. This helps cool the duct wall where desired or needed. In other configurations, users provide a diluent tube next to the flame holder. This helps cool the flame holder.

Thermal Diluent Delivery: Water & Steam

Users preferably provide controls to precisely delivery the diluent fluid, especially when using liquid water as diluent. (See, for example, FIG. 76.) Conventional technology has significant limits on the water to fuel ratio prior to combustion before it exceeds the combustion quenching limit or a compressor surge limit. (E.g., LeFebvre 1998 notes about 1.1:1 water/fuel m/m at the "lower" fuel/air limit.) By contrast, in the prior VAST Patents, Ginter taught and reported operations up to at least about 16:1 water/fuel m/m by injecting water into the combustor including into the combusting gases and into the combustor 56 after the combustion. Those patents and operations included delivering some diluent fluid into the oxidant fluid prior to the combustion. (e.g., water and/or steam into compressed air.)

Minimum Diluent

In some embodiments, users preferably provide at least a minimum amount of excess oxidant fluid as desired or needed to satisfactorily oxidize carbon monoxide and other combustible components. Correspondingly, users preferably then add sufficient diluent fluid through distributed contactors 14 to control the temperature of the energetic fluid to the maximum temperature desired or needed.

Users preferably add sufficient diluent fluid to oxidant containing fluid and/or fuel containing fluid to cool the energetic fluid by about 1° C. or more as desired or required, while accounting for the relative specific heats, latent heat of vaporization, enthalpies etc. e.g., from about 1957° C. to about 1956° C. or lower at about 110% oxidant/fuel stoichiometric ratio lambda or about 0.07% ratio of diluent fluid to fuel by mass or more.

Maximum Diluent Evaporative Cooling

In modified embodiments user preferably add further diluent fluid through direct contactors to reduce the temperature of the energetic fluid. Users preferably provide diluent at rates sufficient to evaporate the diluent and form a fairly uniform saturated energetic fluid. Users provide cool or chilled thermal diluent as needed to lower the temperature at which the energetic fluid becomes saturated. In modified configurations, users provide surface heat exchangers to cool the energetic fluid together with the evaporative cooling of the diluent fluid.

E.g., with near stoichiometric combustion, users readily add from 1.5:1 to 7:1 or more thermal diluent/fuel m/m. E.g., water/diesel#2 to reduce the temperature over the range of about 1719° C. to about 846° C. or lower without reaching the water saturation limit. (I.e., 100% relative humidity). See, for example, Table 2.

With lower excess oxidant fluid and the higher temperatures of reachable by combustion and the energetic fluid, users can control temperatures with diluent fluid over substantially higher temperature ranges with greater ratios of diluent fluid than can be obtained by saturators in conventional thermal systems. e.g., with systems similar to the Humidified Air Turbine ("HAT") cycle, or the Evaporated Gas Turbine ("EvGT") or the Humidified Air Water Injected Turbine (HAWIT) cycle systems. The diluent evaporation is much faster with much smaller equipment than can be accomplished with such conventional configurations.

Maximum Diluent Cooling

In modified embodiments, users provide further diluent fluid through direct contactors to cool energetic fluids below the diluent saturation conditions. (See, for example, the direct contact cooler description herein.) In such configurations, users provide sufficient residence time for the direct contact diluent cooling to achieve the fraction of thermal equilibrium desired between the diluent drops and the energetic fluid. With such configurations, users may cool the energetic fluid or other elevated temperature fluids to temperatures within about 1° C. of the temperature of the thermal diluent fluid delivered.

Where temperatures near or cooler than ambient temperatures are needed, users preferably chill or refrigerate the diluent fluid down to near the freezing point of the diluent fluid. E.g., with water, users achieve temperatures in a cooled "energetic" fluid down to about 2° C. (or similar temperature close to 0° without forming ice). To control fluid temperature to colder temperatures, users preferably deliver low temperature diluent fluids through direct contactors. E.g., fluorinated hydrocarbons.

When using oxygen or oxygen enriched air as the oxidant fluid, users similarly add diluent fluid until the oxidant fluid is at least saturated with diluent. Here diluent fluid is used to constrain the combustion temperature and effectively "cool" the energetic fluid instead of using excess oxidant fluid or the portion of nitrogen etc. removed.

Maximum Diluent Prior to Combustion

To avoid the combustion limits on total diluent fluid/fuel delivery, in some embodiments of the present invention, users preferably establish at least operating limits on the amount of diluent fluid effectively evaporated and mixed with the fuel fluid upstream of the onset of combustion. These limits are preferably established while accounting for the air/fuel ratio and fluid temperatures. Where drop size and surface effects further affect the combustion limit, users preferably incorporate surface area, drop size distribution or other effective parameters into these diluent fluid limits.

In some embodiments, users preferably control the location, drop size, flow rate and axial velocity of diluent fluid delivered upstream of the onset of combustion. As desired or needed, users preferably increase or decrease one or more of the axial component of velocity or drop size of the diluent fluid to reduce or increase the amount of evaporated diluent fluid present or the drop size distribution or surface area prior to the desired onset of combustion. Users variously vary the differential pressure across the tube, the diluent fluid viscosity, and/or the axial component of orifice orientation to adjust the axial component of diluent velocity. Similarly, users preferably adjust the injection location further downstream or upstream.

By such measures, users preferably inject the diluent fluid downstream into the combusting gases such that less than the critical amount of evaporation and/or concentration of droplets occurs prior to the flame in some embodiments. The rest of the diluent fluid delivered preferably evaporates within the combusting gases, or in the energetic fluid 920 after most of the combustion.

The distributed fluid contactors provide more uniform and/or more controlled distribution of oxidant fluid, fuel fluid and diluent fluid than conventional measures. Such measures avoid or reduce the cold spots in conventional systems that contribute to carbon monoxide and other un-oxidized fuel components and byproducts. They also reduce the hot spots where substantial oxides of nitrogen are formed.

By such measures, in such embodiments, users preferably deliver substantial amounts of diluent fluid upstream of the combustion. In some configurations users deliver diluent fluid downstream of the combustion. Thus in some configurations, users preferably reduce the oxidant fluid to less than about 150% of the stoichiometric ratio. Correspondingly users preferably deliver diluent in excess of conventional quenching limits experienced in the relevant art.

Users preferably deliver more than the amount of diluent than that which saturates the oxidant fluid intake to combustor. Compare the limits of water injection by the water that saturates the air in the Humidified Air Turbine (HAT) cycle, Evaporated Gas Turbine (EvGT), Recuperated Water Injection (RWI), Steam Injected Gas Turbine (STIG) and Humidified Air Water Injected Turbine (HAWIT) cycles. E.g., less than about 151% of stoichiometric oxidant/fuel where the water saturates the intake air in the HAT or Evaporated Gas Turbine cycle as reported by Lundstrom (2002).

Pilot Combustion/Flame Holder Control

Pilot flames and flame holders contribute to a substantial portion of the total NOx emissions in conventional systems. The NOx formation is typically far greater than the proportional thermal energy in the pilot vs main flames because the pilot flames are not thermally controlled.

In some embodiments, users further control the diluent flow with time, especially when igniting the combustible mixture to initiate combustion. Users preferably start the ignition source and then provide and mix oxidant fluid and fuel fluid at near the stoichiometric oxidant/fuel ratio with little diluent fluid and a small excess of oxidant.

Once the combustible mixture has ignited, they preferably increase the rate of diluent fluid relative to fuel to control the temperature of at least one of: the combusting gases, the peak combustion temperature, the energetic fluid 920 within the combustion chamber 424, the energetic fluid 920 in the equilibration chamber or transition zone/piece 426, and/or the energetic fluid 920 in the work engine, (such as among the turbine vanes 448 and turbine blades 450 in the first stages 446 of a turbine,) the fuel distribution array, and the diluent fluid distribution array.

During such operations, the oxidant/fuel ratio is preferably maintained within a desired combustible range near the stoichiometric ratio yet with sufficient excess oxidant to effectively oxidize the fuel and combustible byproducts such as carbon monoxide. Constraining temperature and/or the excess oxidant substantially reduces the formation of emissions of oxides of nitrogen.

Such embodiments facilitate ignition, constrain formation of emissions during startup, and overcome the common difficulty of igniting the diluent/oxidant/fuel mixture near the lean limit common in many conventional operations.

When using flame holders 100 or pilot flames as described herein, users preferably purge them, initiate a combustible mixture and preferably ignite the combustible oxidant/fuel mixture as described herein. They then cool the combustion and/or associated fluids and components with diluent fluid as described herein. In some configurations, users preferably provide some diluent fluid to dilute the combustible mixture before igniting it to reduce the initial temperature. However, the ratio of diluent fluid to fuel is constrained to maintain the mixture within the combustible range.

Users preferably adjust the orifice frequency and distribution to more uniformly control the combustion temperature and temperature distribution within the flame holder 100 to reduce emissions, maintain flame stability and protect the flame holder 100. Users preferably use pilot oxidant flows to purge the flame holder 100 of explosive mixtures. They then start the igniter 124 and begin fuel fluid delivery.

Once the flame is started, users preferably begin to deliver the diluent fluid to control the combustion within the flame holder 100. Users preferably control the fuel fluid, oxidant fluid and diluent fluid delivery rates to control the pilot combustion rate and temperature, and the hot fluid temperature and discharge rate into the surrounding combustor.

With flame holders 100, the rate of fuel fluid, oxidant and diluent delivery and corresponding heat generation rate is preferably started low and increased at a suitable rate in some embodiments up to a desired value. This limits the rate of thermal heating and thermal stresses in the flame holder 100 and associated structures to desired or needed limits.

Users similarly control the oxidant fluid, fuel fluid and diluent flow rates to the flame holder 100 over time to heat the surrounding combustor and the downstream work engine at a suitable rate to bring it up to desired operating temperatures while reducing the thermal shock common in starting conventional systems. This substantially reduces thermal stresses and maintenance and repair costs typical of conventional systems.

Constraining fluid temperatures and/or excess oxidant in pilot flames and/or flame holders 100 as described herein substantially reduces a major source of NOx formation in conventional operations. Similarly, providing sufficient excess oxidant and maintaining the temperatures above desired temperatures across the combustor for at least a prescribed residence time reduces the unburned fuel (or unburned hydrocarbons "UHC") and carbon monoxide (CO) to acceptable concentrations.

Spatial Temperature Profiles

Users preferably precisely control spatial temperature distributions in one, two or three dimensions by controlling the effective ratio of total excess diluent to the heat release profile. I.e., the effective increase in diluent fluid enthalpy including all diluent included in the added diluent, the oxidant containing fluid and the fuel containing fluid. This spatial temperature distributions are variously configured and controlled using the many degrees of flexibility in configuring orifice size, orifice orientation, orifice spatial density (# orifices/unit cross sectional area), orifice spatial distribution, and controlling parameters in time for each of fuel fluid, oxidant fluid and diluent fluid, users achieve very high flexibility and control in configuring spatial and temporal composition profiles and/or temperature profiles.

Spatial Temperature Profiles

In some embodiments, users preferably adjust the relative number, size, location and orientation of the relative fuel fluid and thermal diluent orifices to provide the desired fuel fluid and diluent fluid distributions relative to the oxidant fluid flow for the design delivery conditions. These parameters affect the radial and circumferential (or transverse) composition distribution ratios of excess oxidant fluid and diluent fluid to the fuel fluid and heat release rate. In some embodiments, users adjust the axial composition and axial temperature profiles by adjusting the relative number, size, location and orientation of fuel fluid and diluent orifices about fuel contactors and diluent contactors, and the location and spacing of two or more of those contactors along the axial direction. Controlling these combinations corresponding control the time averaged spatial temperature profiles of the energetic gas.

Temperature Profiles Along Distribution Tubes

Using the methods described herein, users preferably configure the spatial or transverse temperature distributions or profiles across the combustor parallel to the distribution tubes (commonly perpendicular to the duct or 2nd fluid flow) in some configurations. To configure the composition profiles and temperature profiles, users preferably configure the orifice size, orifice spatial density, orifice orientation, and tube to tube gap along fuel distribution tubes 11 and along diluent fluid distribution tubes 14. These methods enable users to provide a wide range of curvilinear spatial temperature profiles ranging from uniform to spatially varying to step jumps as follows.

With the high resolution liquid delivery systems and high precision speed sensors herein described, users preferably control the oxidant/fuel ratio to about 105% of the stoichiometric ratio. (Combustion with these parameters without diluent would result in very high near stoichiometric adiabatic flame temperatures.) Users then preferably reduce or constrain this temperature in the energetic fluid by adding diluent fluid before and/or after the flame front to reach the desired or needed temperature within the combustor and in the energetic fluid as it leaves the combustor.

In some configurations described, users provide high resolution of orifices along a perforated distribution tube, transverse to the oxidant flow. E.g., about 167 orifices/mm per line with 2 μm orifices. Users preferably add multiple lines along a peripheral arc about the distribution tube preferably at different orientations to the flow to spread out the drops. With about 6 lines of orifices, users nominally provide about 1,000 orifices per mm per distribution tube, or 1 million orifices per meter.

By adjusting the spatial density of orifices, users readily configure the diluent/fuel ratio with high resolution. E.g., readily within 0.1% of the temperature range within each transverse mm of the distribution tubes. The mixture of combustion gases and diluent fluid is smoothed out by turbulence with axial distance. Users thus provide highly controlled temperatures by such measures with high temperature combustion to the temperature of the combustor exit 136 (or Turbine Inlet Temperature).

Uniform Temperature Profiles along Distribution Tubes

In some configurations, users configure the fluid distribution tubes to compensate for variations in fuel and oxidant fluid flows and achieve highly uniform temperature profiles throughout the energetic fluid 920 exiting the combustor. With the precise spatial fluid distribution techniques described herein, users preferably control the temperature to within about 1.5 degree Kelvin over a temperature range of 1,500 K rise above ambient temperature within each mm across a span of 1 m along the perforated distribution tube transverse to the oxidant fluid flow. I.e., from about 288 K (15° C. or 59° F.) to about 1,788 K (1,515° C. or 2,759° F.). Diffusion and turbulence will further reduce these variations in the spatial temperature gradient.

Correspondingly, users preferably provide combustor liners/walls that accommodate spatial temperature distributions with higher combustion temperatures desired near the combustor walls. These may include materials to accommodate higher temperatures, provide thermal barrier coatings 34, and/or provide combustor liner cooling methods as described herein.

Correspondingly, users preferably provide transition zones between the combustion chamber 424 and expander 440 with high temperature wall materials and/or cooled walls that accommodate higher temperatures in the energetic fluid 920 near the walls and provide more uniform temperature distributions across the energetic fluid duct 130.

In some configurations users configure the combustor to provide moderate uniform thermal gradients by systematically adjusting the orifice spatial density ratio in some configurations. For example, with an orifice specific density of about 1,000/mm of distribution tube length as described, users readily adjust the ratio of the spatial density of thermal diluent orifices 83 to the spatial density of fuel orifice 82 to adjust the temperature of the combustion gases with a uniform gradient. E.g., a thermal gradient of about 1,000 K across 1 m or about 1 K/mm from about 515° C. to about 1,515° C. (In such cases, users adjust the relative diameters of the diluent orifices 83 and fuel orifices 82 and the relative pressures to achieve the diluent/fuel mass ratio needed to constrain the temperature at the combustor exit 136.)

Where strong thermal gradients are desired or needed, users preferably change the orifice spatial density to provide a very rapid transverse temperature gradient (or a "step" temperature jump). E.g., potentially providing a thermal step jump of about 1,500 K across about 1 mm near the combustion zone. I.e., nominally a temperature gradient of the order of 1 million K/m in the combustion just downstream of the distribution tubes. (Note that turbulence and diffusion will reduce this thermal gradient progressively axially downstream from the start of combustion.)

In a similar fashion, users modify such configurations to provide any curvilinear or arbitrary spatial temperature profile needed or desired by adjusting the ratio of total excess thermal diluent to excess heat release rate relative to the incoming fluid conditions. E.g., by adjusting the spatial distribution of the diluent delivery relative to the fuel and heat release, adjusted for excess diluent delivered with the oxidant and fuel fluids and incoming boundary conditions. This includes adjusting the spatial density of the areas of diluent orifices 83 to the spatial density of fuel fluid orifices 82 along the distribution tube, and adjusting for the differential fluid delivery pressures involved. With such configurations, users provide thermal gradients along the perforated distribution tubes and transverse to the oxidant fluid flow that vary by about six orders of magnitude from less than about 1 K/m (0.045° F./in) to more than about 1 million K/m (45,000° F./in).

In some configurations, users preferably provide curvilinear temperature profiles across the distribution tubes. For example, to provide radial skewed inverted parabolic temperature profiles as desired by turbine designers as described above where the distribution tubes are oriented in the circumferential direction perpendicular to the desire temperature profile. In this case, users adjust the orifice spacing etc. from one set of fuel fluid and diluent distribution tubes to the next radially across the annular duct 146 while orienting the distribution tubes circumferentially inline with the annulus.

In some applications, users configure the temperature profiles to those desired from combustors by turbine manufacturers. For example, in annular combustor configurations, turbine designers prefer uniform temperatures circumferentially corresponding to the downstream motion of turbine blades 450. Correspondingly, in conventional designs, turbine designers prefer an inverted approximately parabolic profile radially across the turbine vane 448 and/or blade from inner radius near the hub to the outer radius near the shroud. The blade tip is more difficult to cool and is often designed cooler than mid portion of the vane or blade. The blade root or hub experiences higher centripetal ("centrifugal") forces as the blade spins. Accordingly, the blade root is often kept cooler than the mid portion of the blade. The peak temperature is often skewed outward from the middle of the blade.

To provide the highest resolution and precision in skewed inverted parabolic temperature profiles (such as for turbine blades), users preferably configure the perforated distribution tubes radially and connect them to circumferential manifolds, preferably at least around the outer combustor circumference. They further add an inner manifold to improve fluid pressure uniformity and add structural support. Users preferably adjust the orifice spatial density, orientation (and optionally orifice sizes) of the radial thermal diluent and/or fuel fluid distribution tubes relative to radial oxidant fluid mass flow and temperature distribution profiles to adjust the temperature of the energetic fluid 920 to that desired as described herein. The oxidant mass flow and temperature in turn is evaluated from the velocity and density distributions, and thus the radial temperature and pressure distributions of the oxidant fluid (e.g., compressed air.)

In annular combustors with radial direct contactors, users account for the increasing gap between contactors with increasing radial distance from the hub to the shroud. Users preferably adjust the orifice size according to the desired jet penetration distance. They correspondingly adjust the spatial density of net effective orifice area to account for the changes in fluid jet flow rate, and for the radial profile of oxidant fluid mass flow rate.

In some configurations users desire or need a cooler combustor wall temperature than the mean temperature of the combusting gases or energetic fluid 920. In such situations, users may adjust the orifice area spatial density at the ends of distributor tubes near the combustor liners/walls to deliver higher ratios of diluent/fuel and/or lower ratios of fuel/oxidant to achieve the lower spatial temperature distributions desired near the combustor walls compared to temperatures within the rest of the combustor. This method enables much sharper temperature gradients near the combustor walls than the second degree (e.g., parabolic to exponentially varying) profiles typically obtained in the relevant art. This temperature profile appears similar to a "Hip roof" or modified "Hip roof" with parabolic distributions near the walls.

For example users adjust the spatial temperature distribution to deliver energetic fluid to a turbine to provide a more flattened temperature profile near the maximum blade temperature. They correspondingly provide steeper temperature gradients near the blade root and tip to reach prescribed blade root and tip temperature constraints.

By adjusting the spatial temperature distribution to provide fairly uniform energetic fluid temperatures within the combustor with sharp drops in the energetic fluid temperatures near the walls, users achieve substantially higher mean temperatures in the energetic fluid than conventional methods of cooling using gaseous diluent delivered through the combustor walls with second degree temperature gradients. For example, users may provide a uniform temperature of 1500° C. in the central 50% of an annular combustor while dropping the fluid temperature to a wall temperature of 1000° C. in the inner and outer 25% of the annulus through a parabolic temperature profile.

This embodiment of a modified "Hip roof" temperature profile method provides a nominal mean temperature of 1690K (1417° C.) assuming an inner annular radius that is 50% of the outer radius and a uniform velocity across the duct. A conventional inverted parabolic temperature profile with the same 1500° C. peak fluid temperature and same 1000° C. wall temperature nominally gives an average temperature of 1606 K (1333° C.) assuming the same uniform velocity across the duct). (Actual mass weighted mean temperatures will provide similar scaled improvements when adjusted for mean velocity profiles.) This nominally provides a 5.2% higher absolute mean temperature in the energetic fluid exiting the combustor with this modified "Hip roof" temperature profile.

Assuming a mean Carnot exhaust temperature of 343K (70° C.), this embodiment improves the mean energetic temperature by adjusting the temperature profile which provides a nominal 1.34% improvement in a Carnot cycle efficiency with the same peak temperature in the energetic fluid and the same combustor wall temperature. I.e., substantially increases the thermodynamic performance of a power cycle over conventional skewed inverted parabolic or exponential temperature profiles.

With a conventional parabolic temperature profile (second order variation based on relative distance), the change in temperature in the outer 25% of the duct is 400% of the temperature change in the inner 25% from midway across the duct. Using the temperature distribution methods described, users readily achieve temperature changes that vary exponentially (2.73 order) or a third order or higher with relative transverse distance from midway across the combustor duct to the duct walls. E.g., giving temperature changes in the outer portion from the 25% point to the walls that are at least 900% of the temperature change from mid span to the 25% point half way to the walls.

Temperature Profiles Transversely Across Distribution Tubes

In similar methods, users preferably modify configurations to control the temperature profile across the duct transverse (perpendicular) to the distribution tubes (and about perpendicular to the duct axis or oxidant fluid flow). Users preferably configure the orifice size, orifice spatial density, orifice orientation, and tube to tube gap from one distribution tube to the next across the combustor. In some configurations, users preferably apply these measures in the thermal diluent distribution tubes to change the temperature profiles (or temperature distributions) transverse to the duct while delivering fairly uniform oxidant/fuel ratios, or compensating for desired transverse oxidant fuel profiles.

In some configurations, users preferably configure the fuel fluid distribution tubes 11 and/or thermal diluent tubes 14 as described herein, to provide a fairly uniform temperature profile across the combustor 56 transverse to the duct axis and perpendicular to the orientation of the fuel fluid distribution tubes 11 and diluent distribution tubes 14. This further raises the mean temperature of the energetic fluid 920 exiting the combustor 56 to be nearer the peak exit temperature. This results in lower temperature "profile factors" for downstream turbine blades and enables higher mean temperatures in the energetic fluid with correspondingly higher thermodynamic efficiencies.

Where temperature gradients are desired transversely across the distribution tubes (perpendicular to the fluid flow), users further preferably adjust the orifice size, orifice orientation and spatial density from one side of a distribution tube to the other side to provide a more uniform temperature gradient across the distribution tubes. By configuring the orifice orientation as taught in the '191 patent application, users configure individual sprays to deliver diluent to different distances across the tube to tube gap. By so adjusting the orientation of one or both of fuel and diluent orifices, users achieve control over the temperature distribution across the tube to tube gap as well as from one gap to the next.

In the extreme of a step jump in temperature transverse to the distribution tubes, users preferably adjust the diluent delivery on one side of the distribution on the boundary to the other side, while the rest of the distribution tubes provide uniformly low or high temperatures respectively. This provides a sharper thermal gradient. Alternatively, users change the temperature step by changing the diluent fluid to fuel ratio from one tube to the next across the temperature step boundary.

In some configurations users desire or need a cooler combustor wall temperature than the temperature of the combusting gases or energetic fluid 920. In such situations, users preferably deliver higher ratios of diluent/fuel and/or lower ratios of fuel/oxidant near the combustor wall than within the rest of the combustor 56. In the extreme, users preferably provide a diluent delivery tube without a fuel fluid distribution tube next to the combustor liner/wall 60. In a modified version, users provide a fuel fluid distribution tube with orifices on one side of the tube and not on the other side.

By providing more uniform temperatures limited by downstream peak temperatures (e.g., peak temperatures in turbine blade structural components), users provide configurations with higher temperatures across the combustor compared to conventional applications. Correspondingly, users provide combustor walls, transition walls, and expander vanes and blades that accommodate such higher peripheral and mean temperatures with the same peak temperature. Users preferably insulate the combustor walls in such configurations to reduce the heat loss and thermal gradients near the duct walls.

Similarly to configuring radial profiles in annular combustors, users configure circumferential fluid flow and temperature profiles or similar "pattern factors" about the annular combustor. Users generally seek to form uniform circumferential fluid flow profiles. They correspondingly configure the contactors to achieve uniform oxidant to fuel and diluent to fuel ratio profiles. These in turn result in uniform temperature profiles. Alternatively, the profiles may be configured to achieve desired profiles other than uniform profiles.

Axial Temperature Profiles

Users configure the spatial orifice distribution to control the axial temperature profile within the combustor in some configurations.

As described herein, delivering fluids through multiple orifices distributed with axial components along contactors provides axially spaced or distributed jets. With such measures, users provide axial mixing and combustion with significant control over axial thermal temperature profiles across the combustor.

Users may displace one or more arrays of diluent contactors 11 axially relative to fuel contactor arrays 14 within a combustor. They further preferably combine this with one or more of diluted fuel, diluted oxidant. With such measures, users provide further methods to control the temperature profile across the combustor.

In some embodiments, users may configure arrays of distributed contactors with a spatial component axially along the combustor. The axially oriented contactors may be connected to transverse sub-manifolds that are connected to major manifolds. Such configurations enable more control over delivery and mixing of fuel fluid and diluent fluid with oxidant fluid. This may be combined with mixing diluent with oxidant fluid to form a diluted oxidant, and with fuel fluid to form diluted fuel. E.g., spraying steam or water into compressed air to form highly humid or saturated air, or mixing water with an alcohol.

Users may combine these methods of distributing orifices spaced with an axial component within the combustor. In some applications, they configure curvilinear contactors generally across the combustor but with a substantial axially oriented angle. Similarly, they configure other curvilinear contactors oriented in a generally axial direction but with substantial off axis angles in one or both transverse directions.

For example, users may configure concave "horn" arrays, convex "funnel" arrays, pyramidal tent arrays, rectangular tent arrays, annular tent arrays or other curvilinear downstream oriented concave or convex three dimensional spatial arrays wherein the contactors may be oriented transversely to the second fluid duct axis, or predominantly axially to the duct axis, or generally radially to the hub, or in configurations with predominantly intermediate angles to the transverse and axial dimensions. For example, forming an annular array by bending a planar "herringbone" array about its "backbone manifold.

These contactor arrays may further be composed of compound contactors having multiple passages to duct and mix two or more fluids with a third fluid. E.g to deliver and mix fuel fluid and diluent fluid and mix them with oxidant fluid. Similarly, users may form multiple curvilinear arrays mutually displaced relative to each other along the second duct axis or similarly along one or both transverse directions or with displacement components of two or more of those directions.

Curvilinear Composition and Temperature Profile Ranges

Relevant practice evaluates the increase in temperature of a bulk fluid mixture above the boundary conditions of its incoming temperature. Here users evaluate at least one distribution of this increase in temperature relative to the corresponding boundary condition of the distribution of the incoming temperature. More particularly, they evaluate the spatial distribution of the "total diluent cooling to excess heat generation ratio" or equivalent "temperature increase" relative to the corresponding fuel fluid and oxidant fluid temperature boundary conditions in at least one transverse and/or axial direction, to achieve one or more desired or needed distributions of temperature increases in those transverse and/or axial directions.

Here the total diluent cooling is evaluated as the change in total diluent enthalpy including one or more of the heat capacity, latent heat of vaporization, and chemical dissociation for total excess oxidant fluid (in lean compositions), excess fuel fluid (in rich compositions) thermal diluent vapor, thermal diluent liquid and any other constituents other than the stoichiometric reacting fluids. The excess heat generation is evaluated as the heat generation in excess of that required to heat the stoichiometric reacting fuel fluid and oxidant fluid to the desired energetic fluid exit temperature. They then evaluate one or more controllable individual fluid flow profiles to control the ratio of the desired distribution of total diluent enthalpy to the distribution of excess heat generation.

Because of uncertainties in fluid delivery, mixing and measurement, relevant desired or actual bulk fluid temperatures are sometimes described as between an upper value and a lower value within a desired or required probability. E.g., between 1450° C. and 1550° C. with a 95% probability.

In the present method, users describe one or more spatial distributions of fluid temperatures as occurring within an uncertainty range between one or more upper temperature spatial distributions and one or more lower spatial temperature distributions to a desired or required probability. For example, they may configure one or more desired upper temperature profiles and desired lower temperature profiles in one or more transverse or axial directions to a desired probability. E.g., the temperature may be described as an inverted skewed parabola between the inner radius and outer radius of an annular combustor to a 95% probability.

To achieve the spatial temperature distribution within these spatial temperature bounds, users establish corresponding spatial fluid delivery distributions of thermal diluent relative to the oxidant fluid and fuel fluid within similar boundaries. Users then preferably configure the fluid delivery orifices and control the individual transverse or axial fluid flow distributions respectively so that they are substantially within those desired fluid profile ranges within desired flow uncertainties. Correspondingly, users control the distribution of the ratio of one or more respective fluid flow distributions such that one or more of the final transverse or axial fluid oxidant to fuel fluid ratio profiles, diluent vapor fluid to fuel fluid ratio profiles and liquid diluent to fluid fuel ratio profiles are within the desired fluid ratio profiles to within desired ratio uncertainties.

More preferably, users configure the transverse distribution(s) of the ratio of the total enthalpy change to the excess heat generation to control the transverse distribution(s) of the temperature increase. They preferably control this relative to the boundary conditions of equivalent fluid temperature distribution of the unreacted fuel fluid and oxidant fluid to achieve the desired transverse temperature profiles at the combustor exit. These methods consequently achieve temperature profiles within desired temperature profile ranges and within the desired temperature uncertainties.

Spatial Combustor Heaters

In some embodiments users configure a multi-fluid combustor as described herein, and in the '191 patent application, to provide energetic fluid across a surface heat exchanger to heat a product fluid. For example heating a product fluid through heater tubes. They may control the temperature and/or flow rate of the energetic fluid to control the heat transfer. They may also vary the heat transfer through the wall of the heat exchanger using one or more parameters of radiation shields, insulating barriers, and heat exchange surface or fins. By using one or more of these methods, they preferably control the heat flux through the heat transfer wall to the product fluid.

Through Heater Walls

In some applications, users seek to heat materials or a product fluid using a heater tube 276, whether through an internal tube wall surface 277, an external tube wall surface 278, or a wall of heater tubes or heater tube bank 279. In such applications, users seek to control the heat transfer rate to a heat transfer surface to provide a desired temperature profile or heat transfer profile.

Exterior Heating

In some heating applications, heater tubes are "fired" (heated) about an external tube wall surface to heat a product flowing through the heater tubes. Chemical refineries, for instance, commonly heat high pressure vertical heater tubes 276 containing petroleum or ethylene to "crack" the product. E.g., about 125 mm (6") in diameter and about 12.2 m (40 ft) high. These are commonly fired from below with natural gas. Such heating results in substantial thermal variations both circumferentially, vertically and from tube to tube in a heater tube bank 279. The heater tubes 276 are commonly operated near or at their metallurgical design limit. This requires expensive heater tubes, with consequent high operation and repair costs.

Interior Heating

In some heating applications, companies heat asphalt or chemicals by heating interior surfaces of heating tubes. E.g., in large asphalt tanks using U-Tube heaters. Conventional burners rapidly burn through the tube wall 30 near the entrance, while providing little heat transfer further downstream. This commonly results in expensive downtime for repair and creates a fire hazzard. With reference to FIG. 44, users may configure a combustor to delivery energetic fluid through a heater tube 277. They may configure the combustor itself within the heater tube.

Heating two sides of a heater tube "row" or "wall" or heater tube bank 279 appears like "exterior" heating. In such configurations, users preferably provide one or more distributed combustion arrays on either side of a heater tube bank 279 to provide the spatial heating desired. Similarly, providing heating between heater tube banks 279 may appear like "interior" heating. In such configurations, users preferably provide one or more distributed combustion arrays between the heater tube banks 279 to provide the spatial heating desired.

"Horn" Enclosed Tube Heater Arrays

In some configurations, users preferably provide an annular "horn" distributed combustor array 262 or "cylindrical" distributed combustor array to enclose or surround a heater tube 276 along most of its length to heat the tube and its contents. The distributed combustor is preferably surrounded by a duct. I.e., the combustor may be configured as an annular duct 146 in which the heater tube forms the inner wall of the annulus. Users preferably provide a blower to provide air through the duct and distributed combustor. A chimney or stack may also be used to draw air through the duct.

In applications requiring heating fluids under high pressure, users preferably provide a heater tube surrounded by a pressurized combustor. With reference to FIG. 4 coupled with FIG. 28, users may take a high temperature heater tube 276 and surround it by a "horn" combustor array within a combustor liner 132. They preferably surround the duct with insulation 150. They further provide a pressure vessel 172 or tube around the combustor to provide the pressure containment. They may use a suitable compressor to provide the oxidant containing fluid at an elevated pressure.

These methods provide the benefit of reducing the pressure drop across the high temperature heater tube 276. It further improves the temperature control along the heater tube. One or both features enable users to improve the desired temperature distribution in the product fluid within the heater tube. These method enable the product to be heated to higher temperatures.

A conventional "horn" combustor results in progressively increasing combustion proportional to distance. In some applications, users may adjust the combustor diameter and tube spacing H to control the combustion rate along the combustor as desired or needed to achieve a desired temperature profile. For example, users may configure the distributed combustor as a more parabolic or elliptical concave combustion surface, such as to achieve a more uniform heating rate along the heater tube.

They may further increase the spatial density of tubes initially and provide fewer progressively downstream to provide more uniform spatial combustion rates. In such configurations, fins or radiation shields are provided to adjust the gap between adjacent perforated distribution tubes to adjust the flow of oxidant fluid between them.

"Cylindrical" Combustion Array Heater

In some embodiments, users apply a cylindrical combustion array around a tube to heat the tube or within a duct or between heating tubes to heat them. One side of the cylindrical array is blocked off near the fluid duct entrance 134 and the other at the fluid duct exit 136 to force the oxidant fluid (E.g., air) through the cylindrical combustor.

There is a progressive pressure drop in the energetic fluid flowing along the cylindrical combustor due to flow turbulence and wall drag. In some configurations users preferably adjust the distribution tubes closer together to reduce the air gaps at the upstream end and spread them apart to increase the air gaps at the downstream end. This helps compensate for the pressure drop and maintain a more uniform oxidant/fuel ratio along the combustor.

In other configurations, users adjust the differential fuel and diluent pressure across the distribution tubes to compensate for the variations in oxidant flow. In some configurations, users adjust the spacing, size and/or number of orifices to similarly compensate for the variations in oxidant flow through the distributed combustor.

Convex or "Funnel" Combustor Arrays

Figure 48:
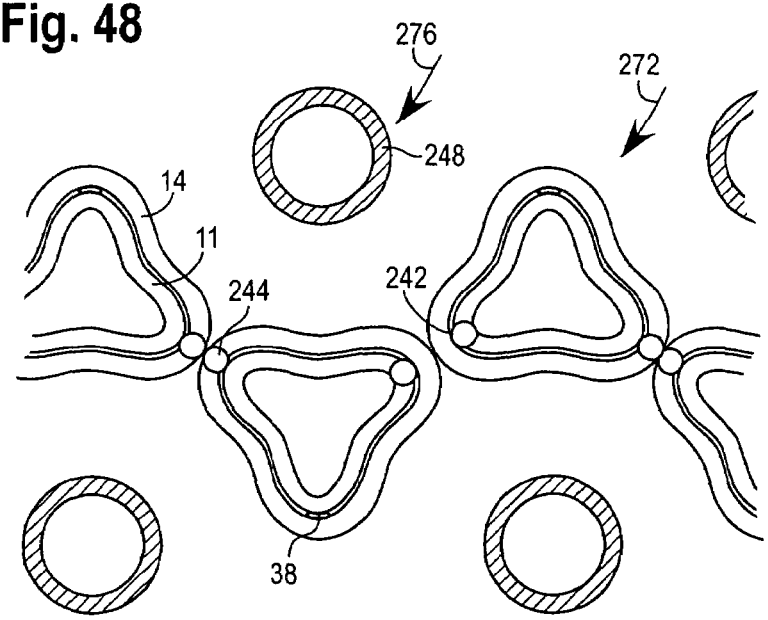
FIG. 48 is a schematic cross-sectional view of a hexagonal array of cusped surface combustors interspersed between heater tubes.

With reference to FIG. 44, users may apply a convex or "funnel" combustion array 264 within a heater tube 276 or within a duct to heat the inner surface of the heater tube or duct. With reference to FIG. 48, users may apply a convex or "funnel" combustor array 264 between heating tubes 276 in a heating tube bank to heat those tubes. Any gap between the funnel combustor array 264 and the outer heater tube or duct at the upstream end is preferably blocked off at the entrance to force the oxidant fluid (E.g., air) through the distributed combustor. For example, by using an insulating spacer or ring 154 configured to suite, the using the method shown in FIG. 53.

In configurations using the "funnel" combustor orientation, a liner fuel and diluent distribution tube configuration may result in a higher amount of combustion near the intake which progressively declines in proportion to the mixing—combustion surface area. Heating applications may prefer a more continuous heat transfer along the length and avoid burning out the tube. Eg. Along a U-tube heater.

In some embodiments, users preferably adjust the combustor surface array into a more convex shape such as an upstream opening parabolic, or elliptical shape to reduce upstream combustion and increase downstream combustion. In some configurations, users adjust the distribution tube-tube spacing H, orifice size, orifice spatial configuration (density and/or number) and/or differential pressure across the orifices to adjust the oxidant/fuel and diluent/fuel ratios to achieve the combustion rate and temperature profiles desired along the combustor. (Compare modifications with the "horn" and "cylindrical" combustor arrays.)

Cusped Combustor Arrays

Users may modify the convex or "funnel" combustion array to form external burner arrays to heat applications outside of the burner arrays other than ducts. Oxidant containing fluid is delivered up the center of these external burner arrays and flows out between the fuel and diluent orifice arrays similar to the "funnel" array. For example, with reference to FIG. 48 users may form one or more external burner arrays 272 and position them around or between heater tubes 276.

Gaps between the external combustor 272 or duct and nearby heater tubes at the upstream end are preferably blocked off to force the incoming oxidant fluid (E.g., air) to flow through the central passage of the distributed external combustor 272. For example, using suitably configured insulating "rings" 154 as blocking spacers between cusped contactor rings using the method shown in FIG. 44 and FIG. 53. Similarly insulation wedges 152 may be used as spacers between contactors oriented axially to the heater tubes.

Figure 51:
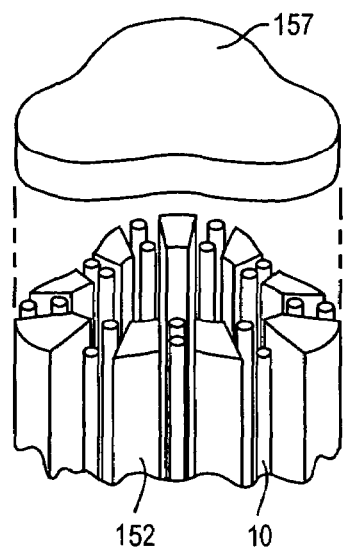
FIG. 51 is a perspective view of a cusped surface combustor with axial contactors interspersed with insulating spacers and cap.
Figure 55:
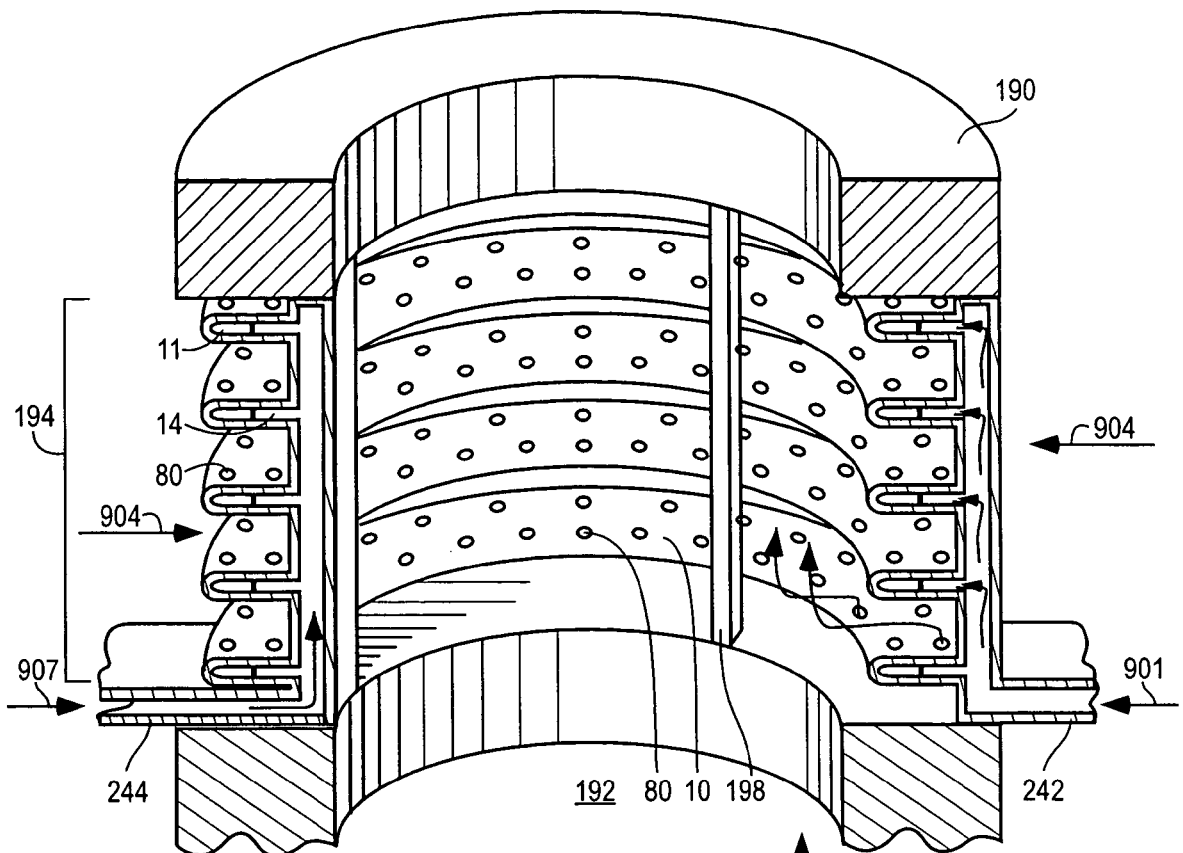
FIG. 55 is a conceptual perspective view of a circumferential slot port into a cylinder with an circumferential array of dual passage fluid contactors with two manifolds.
Figure 56:
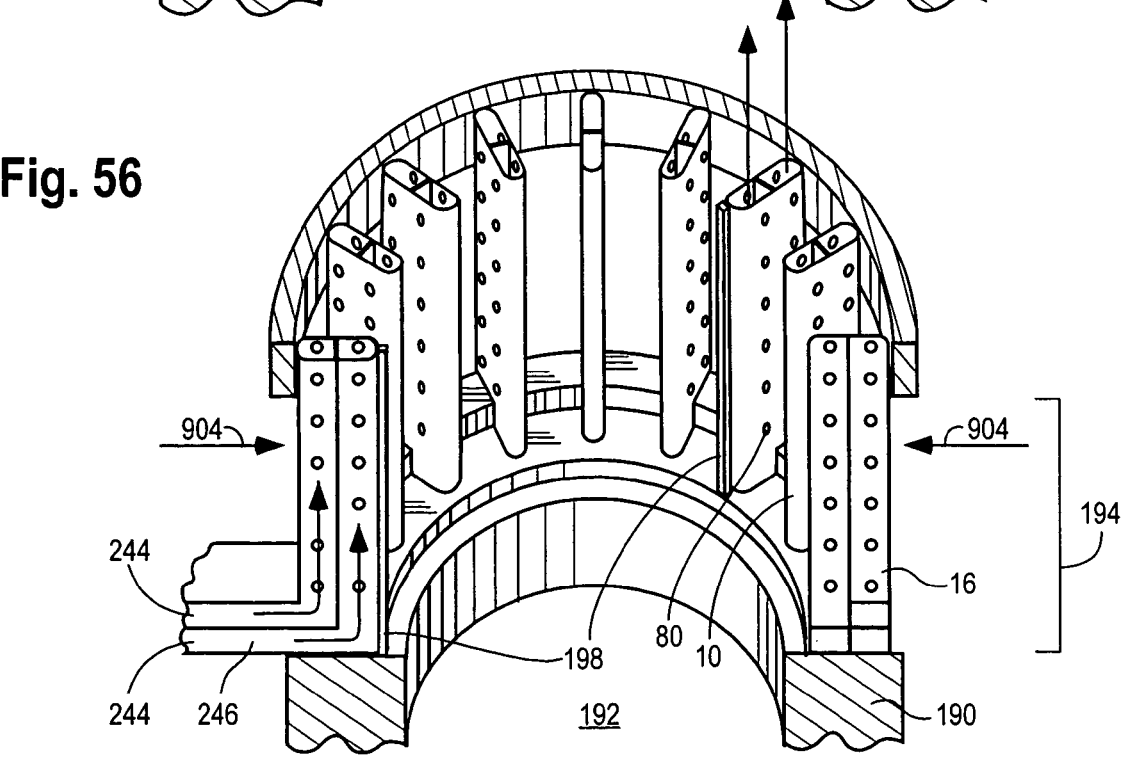
FIG. 56 is a conceptual perspective view of a circumferential slot port into a cylinder with an axial array of dual passage fluid contactors with two manifolds.

With reference to FIG. 51, the central passage of the distributed contactor 272 is preferably blocked at the downstream end by using a cap 175. This helps direct all the oxidant fluid to flow out between the contactor tubes.

Figure 49:
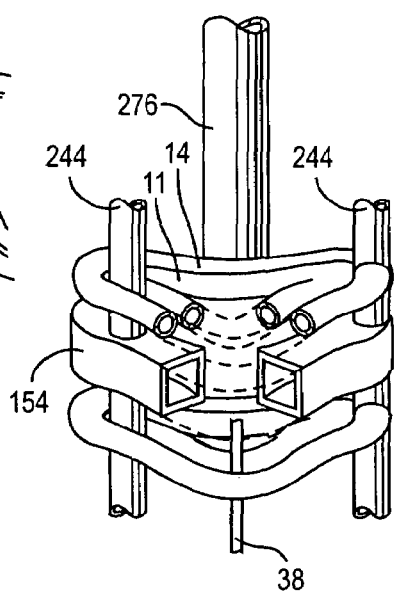
FIG. 49 is a perspective view of a supported cusped surface combustor, with manifolds and insulating spacers.

The fuel and diluent contactor tubes in the external combustor array 272 may be oriented transversely to the axis of the heater tubes as shown in FIG. 49, or axially along the heater tubes as shown in FIG. 51. To decrease the spatial heat flux density and/or the number of tubes, insulation spacers may be positioned between sets of fuel and diluent contactor tubes, either transversely or axially to the heater tube axis. With reference to FIG. 49, insulation rings 154 may be used as spacers between cusped contactor rings. Similarly insulation wedges 152 may be used as spacers between contactors oriented axially to the heater tubes as shown in FIG. 51.

With continuing reference to FIG. 48, the external burner arrays 272 may be configured into circular, that may be positioned within hexagonal banks of heater tubes. These burner arrays are preferably configured into triangular arrays, or more preferably into outwardly concave "cusped" tube arrays 272. These cusped combustor arrays 272 position the combustion flame more uniformly equidistant from the heater tubes along their full length than external circular combustor arrays formed into cylinders. These provide more controlled heating across the heater tube surfaces. E.g., more uniform around the heater tube.

In modified configurations, the curvature of the combustor's outer surface is varied between concave cusps, a triangle or square, convex arcs or a circle as needed or desired for economic, efficiency, quality and/or other factors. The fuel and/or diluent delivery rates may be further configured around the heater tubes to compensate for spatial variations such as radial distance from the heater tubes.

Figure 50:
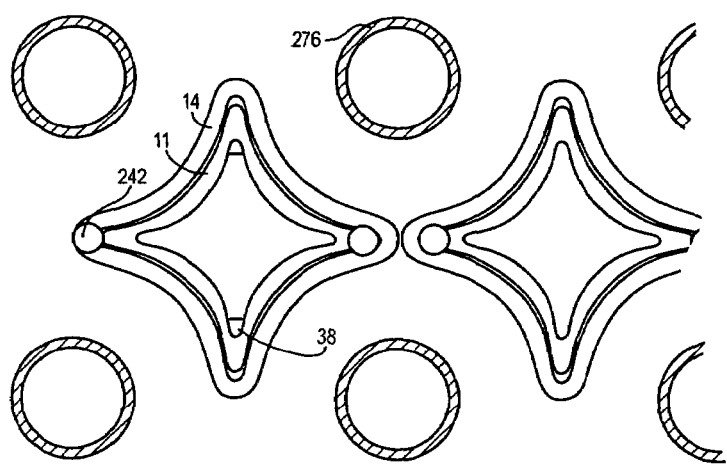
FIG. 50 is a schematic cross-sectional view of a Cartesian array of cusped surface combustors between heater tubes.

With reference to FIG. 50, cusped combustors 272 may similarly be positioned equidistant from four heater tubes in Cartesian arrays of heater tubes. The axes of the cusps are preferably aligned along the normal bisector of the neighboring heater tubes with the array corners pointing between those tubes.

The points of the cusped arrays are preferably rounded to provide room for oxidant fluid to flow to the outer edges of the cusp. The fuel fluid and diluent fluid distribution tubes forming the combustor surface may be supported by the fluid delivery manifolds 240 and/or ribs 38. These are preferably positioned inside the combustor near the points of the cusps.

In configurations using the "cusped" combustor orientation, one or both of the combustion rate and the temperature of the energetic gas along the cusped array 272 are preferably adjusted to compensate for variations in combustor surface area relative to heater tube surface. They are preferably configured to provide spatial combustion rates and temperature distributions closer to the desired spatial temperature and spatial energetic fluid flows desired to achieve prescribed spatial distributions of heat delivery rates along and about the heater tubes.

Combustion Walls

In some configurations, users preferably provide a generally planar tube array 266 of distributed contactor tubes to form a combustion "wall" with controlled heating across a heat transfer "wall" or across a bank of heater tubes. Similarly, in some configurations users provide two such "combustion walls" on either side of a single bank of heater tubes. These may be configured for generally uniform heat transfer surface.

As with the cylindrical combustor arrays, users may adjust the combustor array parameters using the principles described for other combustors and combustor array configurations described herein or in the '191 patent application.

Heat Transfer Configuration

With reference to FIG. 44, users preferably add a variable thermal barrier or shield 180 to modify the heat transfer rate between the combustion and/or energetic fluid and the heat transfer surface in some configurations. This provides a means to conveniently configure the rate of heat exchange through the heat transfer wall, (and preferably more uniform heat exchange rate) as follows: (See, for example, FIG. 44 between the "funnel" combustion array 264 and the fluid duct wall 132.) As the energetic fluid usually cools off as it heats the wall, the thermal barrier is generally decreasing in thermal resistance and forms a progressively declining thermal barrier with distance along the heat transfer wall. These measures may be configured on either one or both sides of the heat transfer wall, including heating the product fluid both from the inside or the outside.

Varying Radiation Shield—Progressively Perforated

Figure 45:
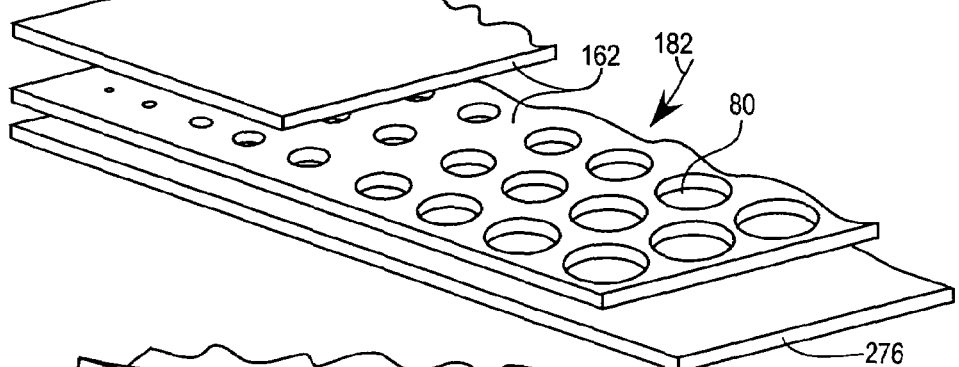
FIG. 45 conceptually depicts a thermal shield having a progressively decreasing radiation barrier.

With reference to FIG. 45, in some configurations, users configure the varying thermal barrier as a radiation shield 182 with varying properties between the energetic fluid and/or combustion zone and the heat transfer wall. For example, the varying radiation shield 182 may have progressively varying occlusion to radiation such as formed by a progressively perforated heat shield such as by progressively increasing holes. Other variations in the holes may similarly be used to vary the effectiveness of the radiation shield.

By progressively changing the net size of the holes or coverage, users may progressively vary the radiation shield. Such variations in the radiation shield 182 also progressively change the convective heat transfer. E.g., as hot gases increasingly pass through the progressively perforated heat shield 182.

The varying thermal barrier may include varying the radiation blockage between the combustor or energetic fluid and the heat transfer wall by varying the radiation shield such as the shape of a comb or fork with prongs of varying width. Other spatial patterns may be used to vary the coverage of the varying radiation shield 182 over the heater wall surface. Similarly users may vary the number of radiation shields. For example by using progressively fewer (or more) shields with axial distance. (See, for example, FIG. 47.)

In some configurations, users preferably provide a thermal barrier along a portion of the heater wall surface that has progressively varying thermal resistance along at least one curvilinear line along at least one wall of the heater wall. For example, with reference to FIG. 46, the progressively resistive thermal barrier 184 may comprise progressively thinner (or thicker) thermal barrier coating 120 or insulation. This progressively reduces (or increases) the resistance to heat transfer. Similarly, the varying thermal barrier may include varying coverage of the heat transfer wall by the variable insulating barrier such as the shape of a comb, or hand, with "fingers" 121 of varying width. Other spatial patterns may be used to vary the coverage of the thermal barrier over the heater wall surface. These thermal barriers may be positioned either on the energetic fluid side or the product fluid side of the heat exchange wall.

Figure 47:
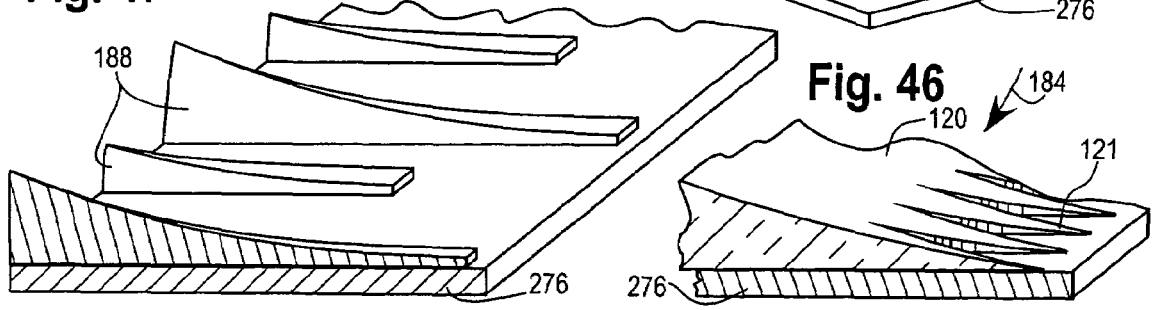
FIG. 47 conceptually depicts a thermal shield with progressively fewer thermal shields.

Users may vary the effective heat transfer surface of the heat exchange wall to vary the heat transfer through that wall in some embodiments. E.g., they may vary from a round to a fluted surface. With reference to FIG. 47, surface variations may include providing thermally conductive fins 188 on at least one side of the heat exchange wall 276. Users may vary the effective surface area the fins to control the heat transfer from the energetic fluid to the heat exchange wall. As depicted in FIG. 47, for example, they may vary the depth of the heat enhancement fins. Similarly them may vary the number of heat exchange fins.

Fluid Heating Configuration Method

Figure 81:
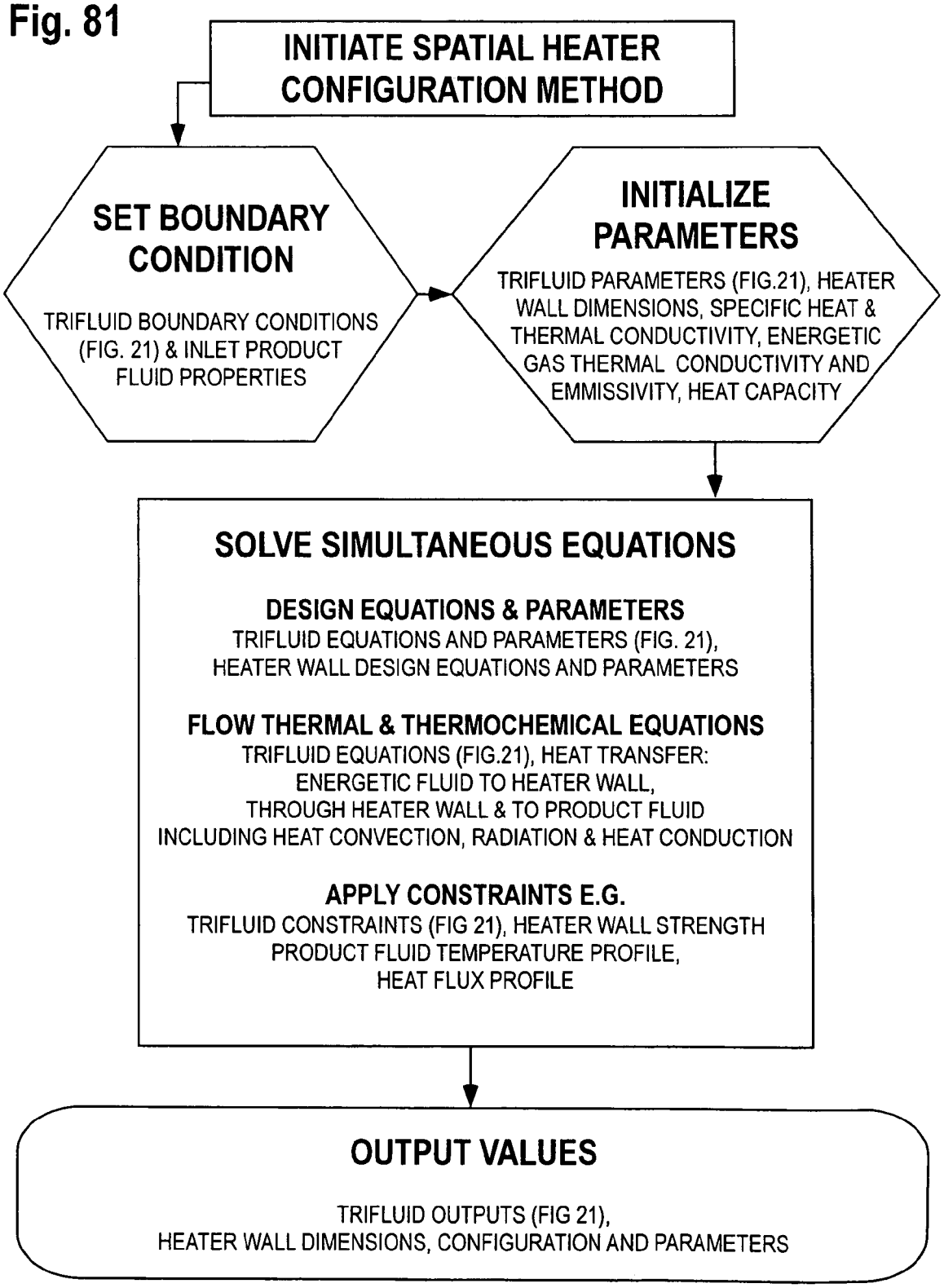
FIG. 81 schematically depicts a product heating configuration method.

With reference to FIG. 81, users preferably apply a fluid heating configuration method to configure combustors and heat transfer surfaces to heat a product fluid with desired constraints.

Boundary Conditions & Initialization

With reference to FIG. 81, users preferably apply the combustor configuration method of FIG. 21 to set up the boundary conditions of the fluids being delivered including the product fluid to be heated. They similarly initialize parameters as needed by the solution method and/or software utilized.

Heat Transfer Coefficient Distributions

With such configurations, users preferably configure and control the heat flux distribution(s) or profile(s) transferred to the product fluid being heated. E.g., along a curvilinear line on or near the heat transfer wall on the product fluid side.

For example, they may configure and control the heat flux along an axial line inside or outside the heater tube. Similarly they may configure and control the heat flux in the azimuthal direction transverse to the axis along or near an inner or outer periphery of the heat transfer tube.

Figure 46:
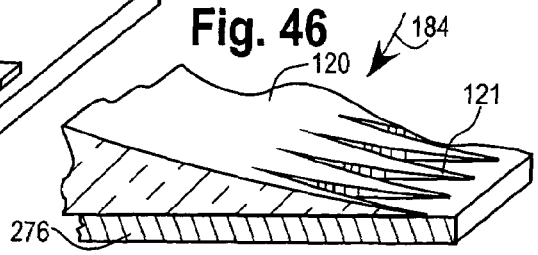
FIG. 46 conceptually depicts a thermal shield with progressively decreasing thermal insulation.

These measures may include controlling the radiant flux incident on the heat transfer wall. For example with reference to FIG. 45, this may include configuring the effectiveness of the radiation barrier between the energetic fluid and the heat transfer wall. With reference to FIG. 46, they may adjust the effective thermal barrier 184 on either one or both sides of the heat transfer wall and control the effective heat flux through the wall along a curvilinear line along or near a surface of the heat transfer wall.

With reference to FIG. 47, they may adjust the effect heat transfer surface along either one or both sides of the heat transfer wall. E.g., by adding heat transfer fins 188 or by fluting the wall. With these measures they configure the effective convective heat transfer surface along a curvilinear line along a surface of the heat transfer wall.

By configuring one or more of these heat transfer coefficients, users may configure the heat transfer rate through a heat transfer wall in such heating systems in one or more transverse and axial directions. By utilizing one or more of such methods of controlling the energetic fluid and the heat transfer coefficients, users preferably configure and control the spatial heat delivery flux distribution or profile along one or more directions about a heating system. E.g., such as axially or transversely.

Heated Fluid Parameters & Constraints

With further reference to FIG. 81, users apply desired constraints to the heating system, similar to the configuration method of FIG. 21. This may include a maximum temperature within the product fluid. E.g., to prevent product breakdown or byproduct formation. A similar constraint may be a desired temperature profile with time in the product fluid within the heat transfer system. Another constraint may be the mean flow rate of the fluid and the transverse velocity distribution across the product fluid duct. Users may also control the product fluid flow rate and flow configuration along the product side of the heating system to facilitate desired heating rates.

They preferably control the heat transfer flux, and flow configuration of the fluid being heated relative to the product fluid heat capacity, and the product fluid inlet temperature, and so control the temperature distribution of the fluid being heated. By using temperature sensors in one or more of the energetic fluid, heat transfer surface, and product fluid, users more precisely control the temperature of one or more of the energetic fluid, heat transfer surface and heated product fluid to within a desired temperature or temperature profile to within a desired temperature uncertainty.

Heating System Output Parameters

With the models parameters and constraints, users solve the simultaneous equations to obtain the desired heating system configuration. These may include one or more spatial distributions of heat transfer flux, energetic fluid temperature, energetic fluid flow, thermal insulation, radiation barrier, and heat transfer surface.

Precise Dynamic Fluid Delivery Control

Relevant Art: Fluid Delivery Equipment

Fluid delivery systems use centrifugal, moving cavity or positive displacement turbomachinery and pressurizing equipment (e.g., pumps or compressors.) The pump developed head (differential pressure) on centrifugal pumps varies with volumetric flow through the pump according to pump affinity laws. Change can be slight or large, depending upon the specific design of the pump. The head developed by moving cavity pumps generally varies slightly with changes of flow, but is still significant.

Relevant Art: Metering Pumps

Metering pumps can provide precise mean flow over very large changes in differential pressure (e.g., within +/−0.1%). However they delivery fluid with substantial dynamic pressure and flow pulsations. Piston pumps cause pulse variations of 100% of the average flow as they stop and recharge. Positive displacement gear pumps reduce these pulsations but they are still substantial.

Relevant Art: Multiple Phased Pump Heads

Some companies provide pump heads with slowly variable stroke. They further combine multiple heads in offset phase relationship to reduce pressure pulsations. E.g., The Bran and Luebe provide such equipment. Some claim they reduce pulsations to about +/−10% to 30%.

Relevant Art: Pulsation Dampener

Bran and Luebbe and other companies provide pulsation dampeners to reduce the fluid pulsations caused by changes in pump delivery rates. These may reduce the pulsations by an order of magnitude or more depending on how they are configured. However, such dampers then provide a time lag between the pump control and the fluid delivery. This lessens and may even eliminate the immediate dynamic control of the fluid by the pumps. However, stroke controls on the pump still assure the average flow rate is controlled as desired.

Relevant Art: Ratio Variations and Uncertainty in Exothermic Reactions

With exothermic reactions, changes in the ratio of reactants and of diluents to reactant(s) delivered results in substantial changes in the reaction rate, temperature and consequent variations in product quality and formation of unwanted byproducts. The type of fluid delivery system adds various pressure fluctuations to the fluids being delivered. E.g., Centrifugal, continuous cavity or metering pumps each typically result in a pulsating flow of some magnitude in the fluid delivered.

Relevant Art: Pressure Oscillations & Pressure Feedback

Combusting fuel fluids in a pressurized oxidant fluid results in pressure oscillations within the combustor. These pressure oscillations can feed back to the delivery ducts for the fuel fluid and oxygen containing fluid. LeFebvre (1998) observes that radiated sound power of combustion generally has a peak between 300 to 500 Hz within the broad spectrum of 100 Hz to 2,000 Hz. Within combustors, combustion instabilities cause noise ("growl" or "rumble") with pressure oscillation frequencies of 50 Hz to 180 Hz. These can aggravate stall problems. At higher operating speeds, engines can oscillate ("howl" or "hum") with frequencies from 200 Hz to 500 Hz.

Flow impedance differences between delivery liquid fuel vs gaseous oxidant result in consequent rapid fluctuations in oxidant to fuel delivery ratios. With gaseous fuels, different delivery pressures and compressor types result in varying flow impedances. These result in varying flow rates or fluctuations and thus varying oxygen/fuel mixture ratios. The combustion thermo-acoustic efficiency can cause pressure oscillations to build to significantly greater than 1% of the total pressure of the energetic fluid 920. Such high pressure oscillations can cause premature failure of combustors 56. Combustion oscillation can cause rapid high frequency excitation of turbine blades 450 which can cause rapid destruction of a expander 440 within a few minutes.

Relevant Art: Fuel Feedback Control

In the relevant art, efforts have been made to use fluid feedback to control these fluctuations in fluid delivery rates. E.g., pressure oscillations are measured and then efforts are made to modulate the fuel fluid flow relative to those oscillations to reduce the pressure oscillations.

Accurate, Precise Fluid Delivery Methods

Figure 76:
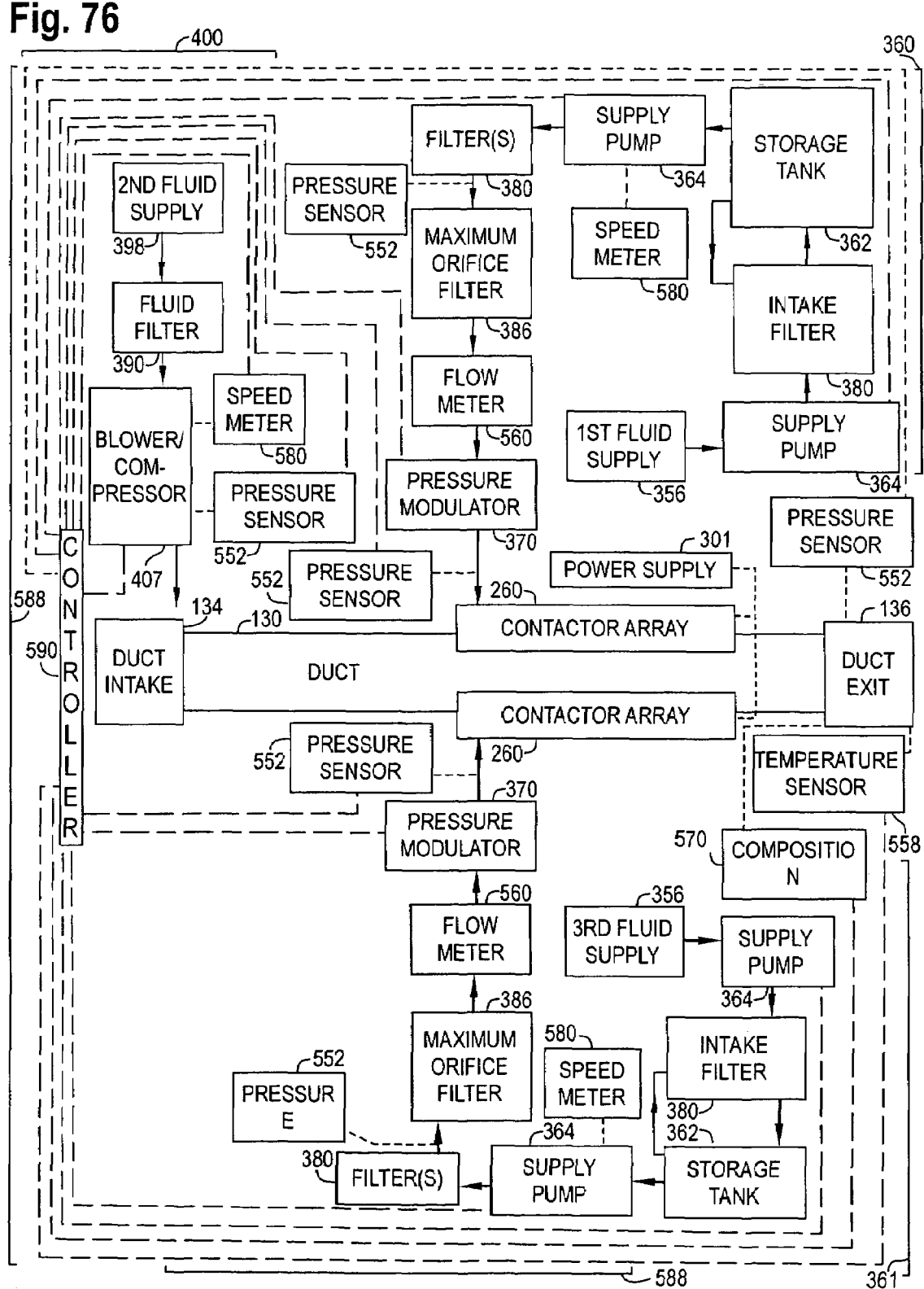
FIG. 76 is a schematic of a trifluid combustion control system, for delivering, mixing and combusting a filtered 1st (fuel) fluid and a filtered 3rd (diluent) fluid through distributed contactor tubes with a 2nd (oxidant) fluid.

In some embodiments, users improve on the relevant art by forming one or more fluid delivery systems 360, 361 or 400, using one or more of the following methods (See, for example, FIG. 76.) In some embodiments, users preferably use one or both of active and passive methods to reduce the variations in fluid delivery actuation that cause fluid pulsations and combustion oscillation. They preferably compensate for residual flows (leakage) and precisely calibrate fluid delivery systems 360, 361, 400. In some embodiments, users preferably add feedback from pressure, pressure fluctuations, temperature and fluid components. In some embodiments, they preferably monitor residual reactants and byproducts to further improve control of the fluid delivery systems 360, 361, 400. Users further use this dynamic delivery method to deliver the fluids through one or more distributed perforated tube arrays.

Fuel Delivery Systems

Users preferably use one or more positive displacement or metering pumps to deliver a prescribed quantity of liquid and/or to deliver liquid at a prescribed delivery rate as needed or desired. (See, for example, FIG. 76.) Alternatively, similar methods can be used with continuous cavity pumps and/or centrifugal pumps to pressurize or compress and deliver one or more liquid fluids and/or gaseous fluids.

Acoustic Fuel Delivery Response Rate

To control pressure oscillations in turbine power systems, users preferably configure the fuel fluid delivery system 360 with high torque, low inertia and short fluid delivery lines. E.g., preferably to achieve at least 200 Hz response, preferably over 700 Hz, and more preferably over 1.5 kHz response. For audio acoustic applications, users seek to higher frequencies upwards of 5 kHz, and preferably towards human audible response sensitivity of 20 kHz. To achieve such performance, users need a control actuation ability at least equal to those frequencies, preferably at least four times those frequencies. To provide closed loop control, users preferably use a sensor response rate at least twice those control values.

Users preferably use positive displacement pumps with a low pulsating amplitude. Some companies manufacture positive displacement precision gear pumps with a pulse fluctuation magnitude of less than +/−3% of the average flow. When operating at 400 Hz (24,000 RPM) with five pulses per revolution, the fluid output will nominally have a minor pulse rate of 20 kHz. Other companies make continuous cavity type positive displacement pump with pulse fluctuations of +/−1% of the average flow.

To improve pumping and reduce such pulsations, users preferably configure a compound positive displacement pump using two or more positive displacement pump heads in a uniform phased delivery arrangement with each other in some embodiments. For sinusoidal positive displacement pumps, users arrange two positive displacement pump heads in parallel but out of phase with each other so that the high pulse from one pump matches the low pulse of the other pump. The outlets of these two pumps are joined with equal lengths of pipe to maintain the out of phase relationship for the two fluids until they join in a common pipe. Alternatively differing lengths of pipe can be used together with corresponding variation in the phase between the pumps.

For non-sinusoidal flows, users choose three or more pump heads with the pump heads shifted in phase by the phase angle between pulses of one pump head divided by the number of pump heads. E.g., a gear pump head with six lobes has the rotation angle of 60 degrees between one lobe and the next. Thus users configure three pump heads with the second and third pump heads shifted about 20 degrees and about 40 degrees from the first. This will have substantially lower pulse flow amplitude. E.g., about less than 1% of average flow for a compound head using three precision positive displacement pumps with 3% of average single head pulse fluctuation.

Such a compound pump head will result in pulses per revolution equal to the number of lobes times the number of pump heads. E.g., three pump heads each with 6 lobes per head will result in 18 oscillating pulses per revolution. At a pump actuation rate of about 100 rps (6,000 rpm) this gives a nominal compound fluid pulse rate of about 1,800 Hz.

Precision Rotary Actuator & Pump

In some embodiments, users preferably provide a high responsivity precision rotary actuator to actuate one or more of the fluid pumps. I.e., a motor with a high torque to inertia ratio. E.g., users may attach a high responsivity motor to a compound displacement pump to precisely actuate this pump with a high response rate in some embodiments. More particularly, such rapid responsivity delivery may be used to deliver and control liquid fuel and liquid diluent substantially faster than the relevant art.

Figure 77:
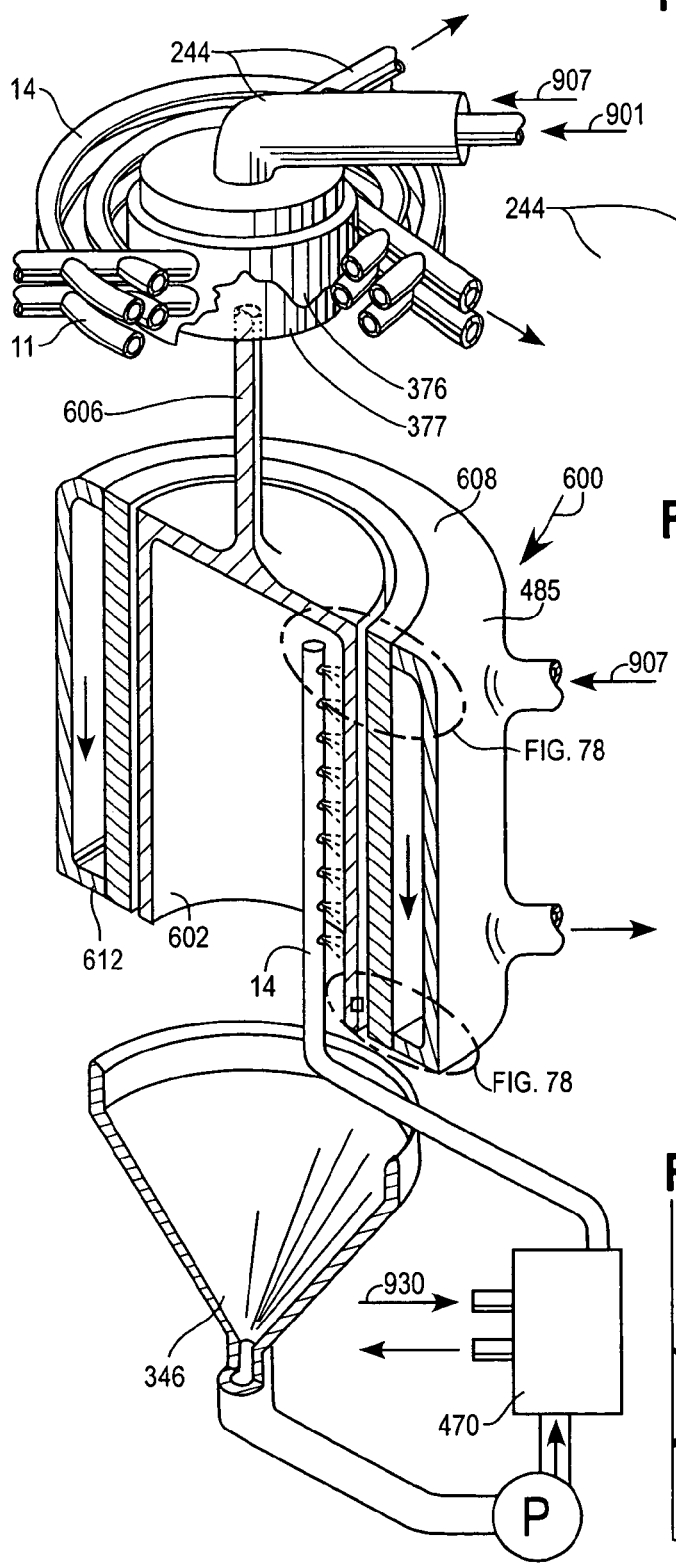
FIG. 77 is a perspective sectional view of a motor with cooled exterior stator and spray cooled thin-gap interior rotor close connected to a pump head.

With reference to FIG. 77, users preferably increase the applied torque and/or reduce the combined inertia of the rotary actuator. This significantly improves motor-pump responsivity. Users preferably use motors 600 with a high torque and low inertia to increase system responsiveness. For example, they may use a motor with torque/inertia of over 20,000 sec-2 preferably with high speed. Several companies make rotors from thin conductive cylinders or disks to increase the torque while reducing the rotor inertia. Such motors provide substantially higher torque/inertia and acceleration than conventional iron core motors.

For example, U.S. Pat. No. 6,111,329 to Graham and Yankie (assigned to G&G Technology, Inc. of Ventura, Calif.) teaches use of a thin copper cylinder rotor. They claim their ThinGap™ servomotor provides a high torque with very low inertia resulting in a rapid response rate without cogging, hysteresis, iron losses or lamination ringing. The rotor of their 300 Watt model TG3200 brush motor has a continuous peak Torque/Inertia reportedly of 23,100 sec-2. This model motor has a reported peak speed of 583 Hz (35,000 RPM). This technology can be scaled to higher or lower torques, powers and speeds.

Alternatively, thin disk ("disc" or "pancake") type motors may be used in some embodiments. (E.g., The Kollmorgen Motion Technologies Group of Commack, N.Y., makes ServoDisc™ motors with higher torque and lower speeds.) Assuming a pump with similar inertia to the motor, such a motor pump system may have a torque/inertia of the order of 10,000 radians sec-2. This suggests a response rate of about 1.6 kHz with a response time of about 0.6 ms before accounting for liquid inertia.

With reference to FIG. 77, users may use a coolant to cool one or more motors used to actuate the various fluid flows. For example, they provide a coolant jacket 485 next to the stator 608 to duct the coolant fluid along the stator. More preferably, they use diluent 907 as coolant and then recover the heated diluent. This heated diluent is preferably delivered to the heat exchange system to recycle the heat generated by the motors that would otherwise be lost. For example by delivering the heated diluent to the combustor.

Figure 78:
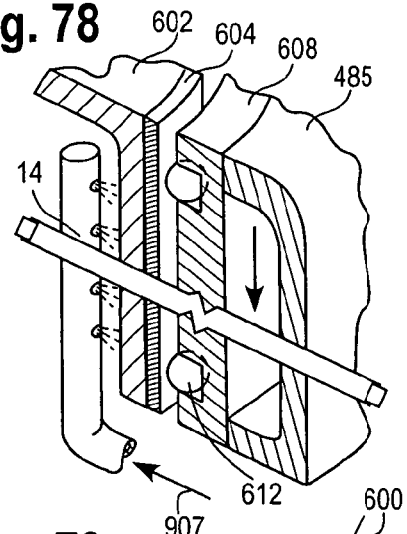
FIG. 78 is an enlarged view of a spray cooled wrapped rotor constrained by a peripheral bearing within a cooled stator.

For example, with reference to FIG. 77 and FIG. 78, users may configure a motor with an internal rotor, and provide one or more perforated diluent tubes 10 to spray coolant fluid inside the rotor. A corresponding thermal cooling jacket 485 may be provided around the stator 608 to cool it as desired or needed. The motor may be cooled by diluent 907.

Users preferably support the rotor 602 with a hollow core bearing 612 or hollow shaft on at least one end, preferably the lower end. This provides an inlet and outlet for the diluent. Preferably it enables at least one diluent distributed direct contactor 10 to be configured through the center of the hollow core bearing and positioned internally along the length of the rotor. The diluent may also be sprayed into the rotor from a contactor 14 through the hollow core bearing 612.

The rotor 602 is preferably oriented vertically to assist the coolant to flow off or out of the rotor. The heated diluent discharged from the rotor is collected in a diluent collector 346. This is preferably gravity fed. Alternatively the rotor may be oriented horizontally or at intermediate orientations as desired or needed. The diluent collector 346 is accordingly close coupled with suitable splash shields as needed for the particular configuration.

Figure 79:
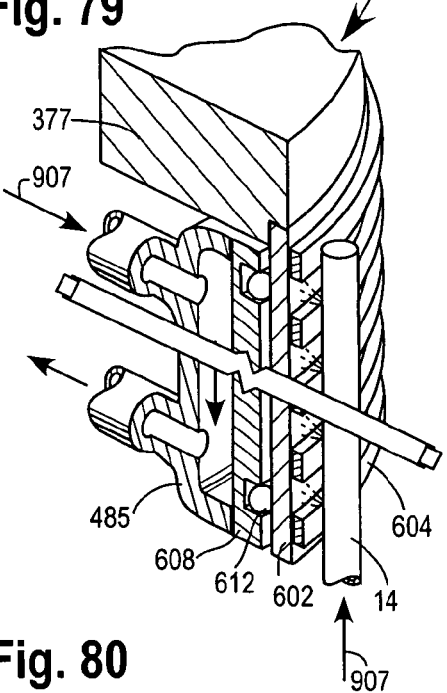
FIG. 79 depicts a spray cooled band wrapped thin-gap exterior rotor-pump head with an interior cooled stator.

With reference to FIG. 79, the rotor 602 may be positioned on the exterior and the stator 608 on the interior of the motor 600. Here users preferably position one or more thermal diluent perforated distribution tubes 14 outside of the motor to spray coolant fluid onto the rotor 602. They similarly place a cooling jacket 485 within the stator 608 to cool it.

Such configurations permit cooling both external and internal rotors (with corresponding internal or external stators.) Users preferably select a coolant fluid with low conductivity and a high dielectric constant. Various configurations may use high purity water, fluorocarbons, or similar coolants. For example, the 3M company of St. Paul, Minn. makes the "Fluorinert™" fluorocarbons.

In some embodiments, the rotor is preferably oriented vertically to assist the coolant to flow off or out of the rotor. Alternatively the rotor may be oriented horizontally or at intermediate orientations as desired or needed.

In other embodiments, users enclose the high performance rotor with a diluent collector 346 and fill the enclosure with a low viscosity gas to significantly improve the heat transfer rate while reducing the parasitic windage. Users preferably use hydrogen as the coolant gas, or alternatively helium. This coolant gas is preferably directed at the rotor 602 through a distributed contactor 14 as above. The heat absorbed by the hydrogen gas is then removed by contact with a heat exchange system 470. The heated diluent fluid is preferably passed through this heat exchanger to recover much of this parasitic pump heat. Another method of improving cooling rate is to provide a blower to increase the air flow across the conductive rotor.

These improved methods of cooling cylindrical rotors are readily scaled to larger or smaller sizes to improve the response rate at higher or lower power motors. These methods are similarly applicable to other types of conductor motors such as disc motors.

The primary torque limitation with such conductive cylinders or disks is the temperature limit caused by resistive heating of the rotor and stator conductors themselves. Relevant art motors utilize common air cooling. The thin-gap cylinder motor reportedly has a maximum operating temperature of about 616 K (343° C., 650° F.)

To improve the response rate in the relevant art, users preferably use the cooling methods described herein to increase the rate of cooling provided to the rotor 602 and/or stator 608. More preferably they use liquid diluent to cool the rotor and also the stator. Such direct contact liquid cooling substantially increases the rate of cooling compared to relevant gas cooling.

With such improved cooling methods, the actuating currents can be substantially increased without increasing the conductor temperatures. Correspondingly, the motor's achievable torque/inertia ratio may be substantially increased by increasing the cooling, while maintaining the same maximum operating temperature of about 343° C. (650° F.).

Heat generation increases as the square of the current assuming constant resistance. I.e., by quadrupling the cooling rate, the current and correspondingly the torque/inertia might be doubled. For example, by using liquid cooling instead of air cooling, users expect to obtain substantially greater torque/inertia than 25,000 sec-2, preferably by 20% or more. I.e., by 30,000 sec-2 or more. Using such improved cooling methods, users may improve the combined motor/pump response rate, preferably by 10% or more. This preferably results in increasing the combined motor/pump response rate to greater than 1.7 kHz and more preferably greater than 3.2 kHz.

The fluid injection response depends on the fluid inertia between the motor and orifices, the compressibility of the fluids and the stiffness or flexibility of the manifolds 240 and distribution tubes. With reference to FIG. 77, users preferably mount the pump head near the center of the distribution array and to reduce fluid inertia and lag time. The pump head is preferably located near the center of the array to improve fluid response symmetry. They preferably use short manifolds 240 to connect a rotary pump head 376 to the distribution tubes. E.g., The pump head may be located near the center within a distance of half the outer dimension of the contactor array.

When combined with high performance actuator as described herein, users expect such methods to achieve liquid injection response rates greater than 800 Hz assuming the liquid inertia is similar or less than the motor/pump inertia.

Such improved flow response rates are beneficial to improving fuel fluid and diluent flow control in work engines such as liquid fueled turbines and internal combustion reciprocating engines. Such faster fluid control is also beneficial to hydraulic actuation and control, such as for robotic manipulators.

Such improved cooling methodology is further extended to super conducting motors as super conducting materials become available, where superconducting conductors replace the copper conductors such as taught in U.S. Pat. No. 6,111, 329. With superconducting conductors, users use cooled hydrogen, helium, nitrogen or other suitable cooled fluid with a temperature and flow rate sufficient to maintain the motors temperature below the superconducting point.

With reference to FIG. 77, users may provide two pumps within a combined pump head 376, one for each fluid. These may be used to deliver two types of fuel, or both fuel fluid and diluent fluid, or two types of diluent. The two pump rotors 377 may be driven together by the motor 600. This may be used to provide rapid control over delivering diluent fluid and fuel fluid about in proportion to each other. This enables users to provide rapid control over fuel and diluent while keeping the temperature of the energetic fluid relatively constant. They may further provide two motors 600 and two shafts 606 to drive the two pumps separately. E.g., the motor shafts 606 may be concentric. This configuration provides rapid control over the total excess diluent to excess heat capacity and thus the temperature.

The improved cooling rates enable higher currents and potentially higher speeds. However, increasing the rotational speed further increases the centripetal accelerations on the rotor (outward "inertial forces".) With reference to FIG. 78, strengthening wraps of reinforcing material 604 may be provided to constrain the rotor 602 conductors at higher speeds. For the reinforcing material, users preferably use material with a high tensile strength and low density which gives a high strength to density ratio. For example, the reinforcing material may be fiberglass, graphite, single crystal sapphire, and carbon nano-tubes.

With reference to FIG. 79, users preferably configure the motor with an outer rotor 602 and an inner stator 608. Here the strengthening wraps 602 are outside the rotor with coolant diluent being sprayed with a contactor 14 onto the strengthening wraps 602 to cool the rotor 602. The strengthening wraps 602 are more preferably configured as bands exposing the rotor conductors in between the reinforcing bands. The orifices in the diluent contactor 14 are preferably configured to primarily align with these gaps between reinforcing bands to achieve the greatest cooling. This enables direct contact liquid cooling of the rotor conductors while still reinforcing the rotor conductors for higher speed operation. It further eliminates the need for a stiffening wrap between the stator and rotor such as shown in FIG. 77. This configuration enables users to achieve equal or more strengthening wraps 604 for the same or thinner rotor stator gap. It enables them to effectively cool both the rotor and stator.

With reference to FIG. 77, users preferably configure a motor 600 and pump head 376 together. The motor's rotor itself provides significant inertia, variously including the rotor conductors, contactors, rotor ends, flywheels and shaft. In using the motor to drive a pump, the pump rotor provides further inertia.

Users may further reduce inertia by minimizing and preferably eliminating the joining shaft by close coupling the motor rotor and pump rotor. With reference to FIG. 79, users preferably configure the motor's rotor 602 to mount directly onto the pump's rotor 377 as a combined unit. They preferably eliminate the rotor end (shown in FIG. 77) by configuring the pump head rotor 377 and the motor rotor end as a single combined unit. This provides direct torque transfer from the conductive bands to the pump rotor 377 without having to transfer the torque generated to a rotor end, then to a common shaft and then to the pump rotor. This simplifies construction and costs. It reduces inertia where high performance is desired. The pump rotor is preferably formed from a material with a high thermal conductivity to strength ratio to improve cooling of the rotor conductors by the pumped fluid.

The motor and pump rotors may also be connected by a thin cylinder. Similarly thin cylinders may used to replace some of the solid disks at the motor and pump ends to reduce the inertia of the respective connecting end disks (such as shown in FIG. 77.)

In such embodiments, the pump head provides the small amount of inertia previously conventionally provided by a flywheel on the motor. (E.g., users preferably minimize a flywheel connected to a rotor and corresponding motor shaft, such as taught in U.S. Pat. No. 6,111,329. E.g., by providing a thin supporting cylinder in its place.) Such methods substantially improve motor pump responsivity while reducing costs and complexity.

To complement this configuration, users may locate the electrical contactors or commutators at the Users preferably keep the commutator near the pump rotor which assists in cooling by enabling a diluent duct up the center of the rotor as shown in FIG. 77. It further provides liquid cooling through the pump rotor. Alternatively the commutator may be positioned at the other end of the rotor from the pump rotor end, with similar means provided to deliver diluent to cool the rotor and stator. E.g., by ducting through the pump into and around the motor.

Users commonly desire to deliver both fuel and diluent through contactor arrays. They preferably form hybrid pump head with two pump rotors stacked on each other. i.e., one for each of the fuel and the diluent. As shown in FIG. 77, this includes two sets of manifolds entering and exiting the pump head for the fuel fluid 901 and diluent fluid 907.

In a similar embodiment, users may configure the pump head around the rotor to provide a more compact system while still providing rotor cooling through the pump to the fluid being pumped.

In modified embodiments, users control a high resolution stepper motor to actuate the pump to deliver fluid at a desired or needed rate (or to deliver discrete quantities of fluid.) Users preferably use a stepper motor with 200 steps or more per revolution (1.8 deg per step or less) to drive the pump. These are available from a variety of suppliers.

In some embodiments, users preferably drive a high resolution stepper motor with a high resolution micro-stepper controller 590 with a capability of multiple micro-steps per controller step to further improve resolution as needed or desired. For example, a number of companies provide micro-stepper controllers 590 for stepper motors with ten to fifty micro-steps per step. E.g., using about a 50 micro-step per step controller with about a 200 step per revolution stepper motor provides about 10,000 micro-steps per revolution.

Linear Actuator/Solenoid

In some embodiments, users provide one or more linear actuators 378 or a solenoid actuators 379 to dynamically vary the pressure of a flowing fluid. The linear actuator 378 or solenoid 379 preferably actuates a flexible wall of the manifold 240. This dynamic pressure modulation changes the liquid droplet delivery rate through the perforated distribution tubes. Users preferably provide flow modulator position, motion or displacement sensors 586 to monitor the linear actuator 378 or solenoid 379 or other pressure or flow modulator 370. (See, e.g., FIG. 76.) In other configurations, the linear actuator 378 or solenoid 379 is applied to a flexible membrane wall or is used like a hydraulic piston in a cylinder with packing to reduce fluid leakage.

Controller

In some embodiments, users preferably use a high speed controller 590 capable of rapidly driving the desired rotary and/or linear actuators 374, 378 with a high time resolution. Users preferably use one or more such controllers 590 as a fuel controller 529, thermal diluent controller 596, and/or oxidant fluid controller 594.

In various embodiments, users preferably set the maximum micro-step control rate of the linear actuator 378 to the maximum design motor step rate based on the design pump speed times the number of steps per pump stroke or pump revolution. Alternatively, if the micro-stepper control electronics bandwidth is limited, users adjust the combined micro-step per revolution to the maximum micro-step control bandwidth divided by the micro-steps per revolution of the stepper motor and micro-stepper. With a micro-step controller 590, users nominally achieve a practical control frequency of about one quarter the step frequency (less than the ideal half the step frequency by the Nyquist theorem.)

Users preferably select the high speed controller 590 to have a command cycle time significantly shorter than the desired control response time. For example, Parker Acroloop of Chaska Minn., provides a high speed 8 axis motion controller Model ACR8020 using the Texas Instrument TMS320C3X Digital Signal Processor (DSP) with a 150 MHz clock speed. Digital to analog converters are available from many companies with more than 100,000 settings per second at 16 bit resolution (i.e., with about parts per 65,000 resolution.)

With such processors and clock speeds, such boards register a change in a servo feedback loop within about 50 µs and update to new control parameters about every 150 µs. Such control and actuator systems nominally have a closed loop control bandwidth of the order of 5 kHz (excluding the pump and liquid inertias.)

Such systems can similarly update a new control rate or complex pattern about every 150 µs or less. These in turn can drive a stepper motor at a stepper output rate of up to about 4 MHz. With a 4 MHz stepper rate, this controller 590 will nominally control a high 10,000 micro-step/revolution stepper motor system up to a rotational speed of about 400 Hz (24,000 RPM.) With a 4 MHz stepper output rate, the controller 590 nominally has an excitation system nominally capable of better than 1 MHz open loop control.

Texas Instruments and other companies are developing higher performance DSPs. High power electronics are available with sub-nanosecond response times. Thus, users expect the speed of such precision motion controllers 590 and drivers will increase with the application of higher performance electronics.

Users preferably use a fluid delivery motion sensing rate that is substantially greater than the acoustic pressure oscillation frequencies typically observed, preferably by an more order of magnitude greater. For example, users assume an average design speed of about 90% of maximum design speed with a variation of about +−10%. I.e., operating from about 81% to 99% of maximum design speed. E.g., with the 4 MHz maximum stepper pulse rate, this results in a pulse rate from about 3.20 MHz to 3.96 MHz. I.e., a range of 760 kHz (+/− 360 kHz about 3.6 MHz.)

Improved Feedback Resolution

Users preferably improve the control resolution of the fluid delivery system(s) 360, 361, 400 by attaching a high speed high resolution motion encoder or speed meter 580 (e.g., pump rotary encoder 582 and/or compressor rotary encoder 584.) (See, for example, FIG. 76.) Users preferably use an encoder electronic system capable of operating at least as fast as the actuation rate of the controller 590, preferably and even number or more times faster. E.g., use a 4, 8 or 16 MHz encoder electronic system with a 4 MHz micro-stepper actuator.

Users then preferably select the encoder resolution by the highest reliable operating frequency of the encoder processing electronics divided by the maximum speed of the motor and pump combination. E.g., when using a motor/pump with a maximum design operating speed of 400 Hz (24,000 RPM), users preferably use a rotary encoder pump speed meter 582 capable of 10,000 pulses per revolution together with encoder electronics capable of 4 MHz output. A similar motion encoder 584 would preferably be used for a high speed microturbine compressor/turbine system. In larger configurations, the encoder would preferably have about 66,667 pulses per revolution for a 4 MHz output for a compressor 407 with a design speed of 60 Hz (3600 RPM).

High Torque/Inertia Actuator

In some embodiments, users preferably use a pressure/flow modulator 370 or fluid delivery rotary actuator 374 capable of effecting rapid micro-increment or micro-step movement within the desired time frame in some embodiments. (e.g., within 5 microseconds or better.) (See, e.g., FIG. 76.) To do so, users preferably begin with a high response rotary actuator 374 having a very high ratio of torque to rotary inertia (or force/inertia for solenoids 372 or other linear actuators.) This permits very rapid accelerations and changes in velocity. E.g., for this fluid delivery actuator users preferably use thin conductor servo rotors which have a very high ratio of torque to inertia.

Low Inertia Fluid Propulsion Equipment

In some embodiments, users preferably use fluid pressurizing equipment with low inertia/flow. Users preferably combine the High Torque/Inertia Actuator with low inertia/flow fluid pressurizing equipment such as a very low inertia rotary pump head 376. Thus users preferably a rotary pump head 376 with a high pumping torque/inertia. E.g., with a small diameter and long axial length. This may be further improved by using a high strength/density material for the pump head, preferably with a low density. E.g., users preferably form rotary pump components from magnesium or magnesium alloys. Alternatively they may use aluminum alloys or stainless steel alloys as needed or desired. Users preferably coat the pump components with suitable hard surfaces to reduce pump wear and potential cavitation damage. E.g., they may use a diamond surface coating to increase durability or use other suitable hard surfacing materials.

Low Fluid Inertia Delivery Systems

Users preferably use short fluid delivery tubes between the fluid pressurizing system and the fluid delivery location(s), in some embodiments. Users preferably locate the fluid pump near the center of the fluid distribution arrays to reduce fluid tube lengths and the inertia of the fluid(s) that must be overcome to accelerate and deliver the fluid(s).

Similarly, users also preferably select relatively short delivery lines from the fluid source to the pressurizing equipment. Such measures significantly reduce the mechanical inertia of the fluid being delivered.

Multi-Stage Fluid Pressurizing Systems in Series

Where higher delivery pressures are required, users preferably provide one or more conventional fluid propulsion systems to provide the bulk of the delivery pressure required. Users then use one or more low differential pressure delivery system for high precision and/or high performance control of the fluid being delivered through one or more direct contactors.

In some embodiments, users preferably deliver the fuel fluid and/or thermal diluent fluids or reactants with primary and secondary pressure systems to reduce the torque required to deliver the fluid pressurizing equipment and improve delivery performance. Users preferably provide the fluids at a base pressure such that there is a low differential pressure across the final fluid pressurizing and delivery equipment. For example users use high performance and/or high precision pump heads. Such dual pressure systems substantially reduce the pressure and torque required to deliver liquids in high pressure combustion or reaction systems.

To do so, users preferably provide one or more of these fluids to the final fluid delivery equipment at a mean pressure preferably near to the mean pressure needed to deliver the fluid into the oxidant fluid in the combustor (or reactor) as it flows across the direct fluid contactor. In other configurations, users deliver the primary fluid pressure in the range from near the pressure of the oxidant fluid to near the minimum pressure required to deliver fluid through the direct contactors.

This primary fluid/fuel delivery systems 360, 361 preferably incorporate an accumulators suitably sized to buffer some of the fluid pulsations from the primary pressure pumps, while providing an average response rate as desired or needed. Users generally configure the fluid accumulators and main fluid pump control systems with a response rate faster than the main oxidant fluid delivery system 400.

In other embodiments, users provide an intermediate delivery line with sufficient capacity and/or flexibility to buffer the pressure fluctuations between the primary and secondary delivery pumps such that the differential pressure across the direct contactor is less than the control capacity of the secondary delivery pumps.

Users preferably provide the secondary fuel fluid delivery system to provide the rapid high frequency response rates and control the differential pressure fluctuations across the direct contactors as desired or needed.

Precision Pump Head Resolution

In some embodiments, users utilize high resolution stepper motors to drive final fluid delivery pumps. With such stepper motors users achieve a high resolution position sensing and actuation per pump pulse. Users preferably use a compound pump with multiple heads and multiple lobes giving multiple smaller pulses per revolution.

For instance, users provide a high precision position encoder with 40,000 pulses per revolution or similar high resolution position transducer with a 10,000 micro-step per revolution stepper motor-controller combination with a compound pump head. Similarly, using three gear heads in phased relationship to each other, each with 6 gear lobes will give eighteen pulses per revolution.

With such 18 flow pulses per pump motor revolution, users obtain a nominal resolution of about 2,222 encoder pulses per compound flow pulse cycle (=40,000/18). With such configurations users obtain about 555 encoder pulses per 90 deg of each flow pulse cycle. This gives a rotary measurement resolution of about 0.05% of each fluid pulse equivalent to about 0.2% of each fluid pulse amplitude.

Precision Pulse Control Resolution

With such an compound pump head, and a micro-stepper motor with about 200 kHz response, users obtain about 555 micro-steps per fluid pulse. This gives a nominal resolution in the controller 590 of less than 0.2% of a fluid pulse period. Users thus anticipate controlling fluid pulses to within about +/−0.2% of the uncontrolled fluid pulse variation. By calibrating the pump head flow characteristics and the phase delay between the micro-stepper controller 590 and the fluid actuator, users provide such improvements in flow control on an open cycle basis.

Low Pulse Metering Pump

Users preferably use a metering pump with a relatively smooth flow delivery and low peak flow pulse level in some embodiments. Some companies provide multi-lobed positive gear head pump with a peak flow pulsation level of about 3% of the design flow. By combining such a high precision low pulsation positive displacement pump with the high response motors and rapid controllers 590, users expect to control the fluid flow rate on an open cycle basis without dampers to at least +/−1% of the full flow rate, preferably to at least +/−0.1% and potentially to about +/−0.01% or better.

Frequency Modulated Control

By dynamically controlling the rate at which the pump is driven within each revolution, users preferably reduce the magnitude of the pulses from the compound pump. Users preferably use a control method of providing a frequency modulated signal with incremental actuation of the micro-stepping motor controller 590 at each pulse. The mean flow will correspond to the mean frequency. The high and low frequencies are adjusted to the pulse minimum and maximum to smooth out the pulses from the pumped flow. The relative phase of the frequency minima and maxima can be shifted relative to the pulses to account for phase delays in sensing and actuation to anti-synchronize the pulses with the controls.

Non-Linear Compound Pump Control

Users preferably characterize the pump discharge rate as a function of fluid displacement per rotary motion through the full shaft revolution. E.g., liters/degree of revolution. Users preferably do so with the desired micro-stepper actuator, high resolution stepper motor and precision rotary encoder speed meter 582 in place. E.g., users obtain cumulative ml flow for each micro-step transition over the full rotation.

Users preferably refine the motor control, increasing it to account for the fluid leakage bypassing the positive displacement pump as a function of fluid viscosity, pump speed and differential pressure across the pump. Users further refine the control to take into account the non-sinusoidal nature of the fluid pulses generated (with continuous speed), adjusting the actuation pulse rate to drive the micro-stepper motor control in a manner to compensate for the non-sinusoidal actuation and to further smooth the flow rate.

Prescribed Non-Linear Flow

In some embodiments, using the methods described herein to generate the excitation for a smooth flow, users preferably modulate that base compensation rate with another non-linear flow as desired or needed. Users preferably modify the pump motor actuation rate or stepper pulse rate to achieve the flow rate desired. For example, users control the rate of change of the prescribed stepper motor control rate to achieve a smooth ramp up the flow rate in a linear fashion to a prescribed mean flow rate and hold it there. Users similarly further ramp flow rate down to a desired value. Users then adjust the rate of flow in any desired non-linear fashion by calculating the desired actuation rate or micro-stepper rate and provide that to the controller 590.

Combined High & Low Flow Pumps in Parallel

In other configurations, users improve the precision and turndown ratio of flow control achievable by placing two or more pumps in parallel. Users provide a large compound pump in parallel with a small compound pump where the range of flow control with the small pump exceeds the maximum difference in rate of flow from the mean flow rate of the large pump. E.g., select the small pump flow control at least 33% of the main flow variation or smaller, preferably 10% or less. Assuming the pulse variation of the main flow is 33% to 3%, users achieve control through the smaller pump of about 10% to 0.3% of the main flow.

In some configurations, users preferably provide a flow homogenizer and/or straightener 394 between the compound pump heads and a downstream pressure sensor 552. Users preferably provide a second compound pump with a design capacity greater than the maximum pulse fluctuation range of the primary pump system. They preferably control this smaller compound pump to within a small fraction of its flow. These measures significantly improve the flow rate uniformity and control.

Users preferably introduce this fine tuning trim fluid flow into the main fluid flow through a distributed contactor about and flush with the wall of the main fluid passage to reduce turbulence in some configurations. Alternatively, if the trim flow needs to be uniformly mixed with the main flow, users introduce the trim flow through a distributed contactor positioned across the flow.

For example, users preferably select a group of three large pumps in parallel each capable of delivering about 20 kg/s for a total of about 60 kg/s. Users preferably combine these pumps in parallel with a phased offset and control them as above. If the pulse variation of this three pump head combination is about +/−2%, this will give flow fluctuations of about 1.4 kg/s.

User generally control the small compound pump by at least about +/−10% and preferably about +/−0.2% of its flow. E.g., to about +/−150 g/s and preferably to about +/−3 g/s relative to 60 kg/s. The frequency control of the smaller compound pump is preferably substantially faster than that on the main compound pump control and further downstream. (e.g., at least twice and preferably an order of magnitude faster.) With such methods, users expect a combined control resolution of the order of at least +/−0.1% and preferably +/−0.01% of the maximum design flow, possibly to +/−0.002%.

Combination Pump Systems

In other embodiments, users further increase the pressure of the flow while retaining precise control by providing one or more pumps in series to increase pressure provided to the parallel pumps. The first compound pump provides the bulk of the pressure increase. The second pair of pumps provides a small fraction of the pressure increase with correspondingly more precise control as described above. In other configurations, the first pumps generally provide the mean delivery pressure while the second set of pumps provide the differential pressure as desired or needed.

Fluid Delivery to Pilot Flame & Flame Holders

In various configurations, users preferably provide controllable fluid delivery systems 360, 361 sized to provide fuel fluid and diluent fluid to a pilot flame and/or a flame holder 100. These fluid delivery systems 360, 361 preferably include variable speed drives 468 or variable flow control valves 230 or similar systems to control the pressure and flow rates of the fuel fluid and diluent fluid to at least one of the pilot flame and flame holder 100 in some embodiments.

In some configurations, the pilot fluid delivery systems utilize a pressurized tank or accumulator for fuel fluid and/or diluent fluid. (E.g., a propane tank, a pressurized accumulator containing diesel fuel, or a pressurized accumulator containing filtered water.)

Precision Pressure Sensing

To accurately sense the mean pressure of the fluid flow, users preferably use a high precision pressure sensor 552. (See, for example, FIG. 76.) E.g., a quartz resonance pressure sensor with an uncertainty of about +/−0.1% and preferably about +/−0.01% and preferably with a resolution at least an order of magnitude better, potentially on the order of parts per million. (For example, Paroscientific, Inc. of Redmond Wash. provides the Digiquartz pressure transducers.) Such a pressure sensor 552 provides the ultra-precision pressure signal for integral control of the flow in a feedback controller. To sense rapid fluctuations in flow, users preferably provide a fluid with a static pressure similar to the mean pressure of the flow and position a rapid pressure sensor 552 between that reference fluid and the desired flow. This provides the signal for rapid differential feedback control.

Precision Pressurizing Equipment Control

By controlling a compound pump with a 20 kHz to 200 kHz signal rate as described, users preferably adjust the mean flow rate to parts per 10,000 and preferably parts per 100,000 or better than +/−0.002%. Users thus expect to be able to control the mean flow in real time at least within +/−1%, preferably within +/−0.1% to most preferably within +/−0.01% of a set flow rate based on the flow pressure with a stable flow constriction. Users preferably actively control the flow amplitude fluctuations to better than +/−1% of the gross flow, preferably better than +/−0.1%, and most preferably to better than +/−0.01%.

Pulsation Buffers and Dampers

Where users desire or need to reduce fluid pressure and flow pulsations, they preferably duct the flow by relatively thin-walled elliptical tubes which act as flexible expansion chambers in some embodiments. This provides a high frequency buffer. Alternatively, users can further reduce a portion of the fluid pulsation or the residual pulses by providing a series of flexible expansion chambers with some fluid resistance in the connecting passages.

For example, in some configurations, they may be used between a pump system and a fluid contactor to reduce fluid pulsations and variations in delivery rates. In other configurations for example, these pulsation moderating systems are preferably used between a primary pressurizing fluid pump and a secondary fluid control pump.

Oxidant Fluid Delivery Systems

Users preferably provide oxidant fluid delivery systems 400 corresponding to the flow rates and fluid parameters desired or needed. (See, for example, FIG. 76.) With combustion systems, compressed air is the common fluid used to delivery oxygen as the oxidant. Oxygen enriched air or oxygen are provided in some systems. In some chemical reactions, other gaseous or liquid fluid oxidants are provided.

In many embodiments, users use turbomachinery for gaseous compressors 407, commonly axial, radial or centrifugal compressors. These are preferably used for applications operating over fairly narrow speed and flow ranges.

Users preferably provide a moving cavity compressor 407 to improve linearity and/or extend the system turndown ratio. For example, Kobelco Compressors (America), Inc. of Elkhart, Ind., provides compressors with high efficiency and linearity over a wide turndown ratio. (E.g., reportedly about +/−1% linearity, over a turn down range of 100% down to about 10% or less).

In some embodiments, users combine types of compressors 407 similar to the measures described herein for fuel fluid and thermal diluent fluid delivery. In some embodiments, they preferably combine a small moving cavity compressor with a large turbo compressor 407. When users desire or need low flow rates, they preferably provide a flow control valve 230 to vary the intake or the vanes to the turbo compressor 407. Such combinations provide moderate costs for large systems while higher efficiency and controllability at lower flow rates.

Users preferably provide a suitably sized controllable fluid delivery system to provide oxidant fluid to at least one flame holder 100 or pilot light in some embodiments. Users preferably deliver the pilot oxidant fluid to one or more pilot tubes or ducts in the flame holder 100 or to near the pilot flame. (See, for example, FIG. 28 and FIG. 44.)

With high pressure combustion systems, users preferably provide a suitable compressor 407, buffer tank and a variable flow control system in some embodiments. In some configurations they use at least one variable flow control valve 230 to control the oxidant flow. E.g., needle valve or other adjustable valve. In other configurations, they use variable speed moving cavity or positive displacement pumps, preferably with pulsation damping.

In other embodiments users may provide variable speed pumps or compressors 407 to provide the varying oxidant flow rate to the flame holder 100 at the desired pressure. In other configurations, they utilize a common pressurizing system combined with control over the flow rates to the flame holder 100 and combustor 56 or control over the ratio of the flow between them.

In some embodiments users provide liquid oxidants. They preferably use oxidant fluid delivery systems similar to those described herein for fuel fluids 360 and diluent fluids 361.

Oxidant Delivery Speed Sensors

Users preferably provide suitable high resolution speed transducers or encoders 584 for the oxidant delivery systems (e.g., blowers 406 or compressors 407) in various embodiments, similar to those described herein for the fuel fluid and thermal diluent delivery systems. They preferably provide absolute precision pressure sensors 552 to monitor the fluid pressure at the intake and exit to the compressor(s) 407. Alternatively they provide gauge or differential pressure sensors 554.

Controls

In some embodiments, users preferably provide a control system capable of precise control of one or more of the fuel fluid, oxidant fluid, and diluent fluid. (See, for example, FIG. 76.) Users preferably provide a variety of physical parameter sensors 550 to monitor parameters, such as described herein.

Fuel Control

Users preferably deliver fuel fluid at a rate sufficient to generate a flow rate in the energetic fluid 920 that provides a desired combination of mechanical and thermal energy flow rates ("power"). Liquid fuel delivery systems have a high efficiency. In some embodiments, users control the fuel fluid delivery system speed by the desired fuel mass flow rate divided by the delivery system efficiency at those conditions. Users preferably monitor the fuel fluid flow rate with high precision first fluid/fuel flow rate sensors 560.

In some embodiments, users preferably adjust the liquid fuel delivery rate efficiency by the small influences of differential pressure across the pump, pump speed, fluid viscosity, fluid density and fluid heat of combustion.

With gaseous fuels, moving cavity pumps such as those by Kobelco, provide fairly linear delivery with speed over a wide range.

In other embodiments, users use feedback measures relating to the mechanical and thermal power rates delivered. They use these feedback measures to adjust the fuel fluid feed rates to achieve the desired or needed system output parameters within desired probabilities.

In some configurations, users preferably adjust the fuel fluid delivery rate to compensate for variations in fuel fluid density to deliver a constant or prescribed enthalpy increase. Users preferably provide a high resolution inline density measurement system to dynamically measure fuel fluid density on a continuous or semi-continuous basis.

Users preferably provide coreolis meters or resonant density chambers capable of evaluating fluid density to at least 0.1% and preferably better than 0.01%. E.g., by using resonant chamber densitometers that measure density to five significant figures.

In some configurations, users monitor fuel fluid parameters that correlate with the heat of combustion sufficiently with desired uncertainty. They then preferably adjust the fuel fluid delivery rates to compensate for variations in the fuel heat of combustion to deliver fuel, oxidant and diluent with a constant or prescribed increase in enthalpy and consequent increase in the useable energy and/or temperature of the energetic fluid 920 formed.

For example, in addition to adjusting for density variations, users preferably provide in-line high resolution refractive index monitors. By combining density and refractive index, users preferably adjust for the major variations in heat of combustion.

As needed or desired, users preferably provide in-line or sampling spectroscopic instruments to measure the fuel-fluid composition to periodically evaluate the fuel fluid heat of combustion to the uncertainty desired. E.g., using Near Infra-Red ("NIR"), Fourier Transform InfraRed ("FTIR"), Mass Spectroscopic methods or similar methods. Such equipment is now commercially available claiming uncertainties of about +/−0.1% or better.

In modified embodiments, users combine several or more of these measurement and control measures. By combining such spectroscopic measurements methods with density and/or refractive index measurements, users preferably evaluate the heat of combustion and adjust the fuel fluid delivery rates accordingly. E.g., evaluating and adjusting the fuel fluid delivery rates to achieve enthalpy increase rates to about +/−0.1%, and preferably to the order of +/−0.01% or better.

Weighted Gas and Temperature Measurements

Users preferably average the temperature across the flow by sampling the temperature at multiple points across the flow. The results are preferably weighted relative to the mass flow velocity and corresponding areas to arrive at appropriately averaged mass flow results.

The transverse distribution in the oxygen/fuel ratio and consequent oxygen/energetic gas ratio is poorly controlled and poorly known in conventional systems. Similarly the fluid velocity and pressure distributions across the combustor are poorly known in conventional systems.

Users preferably measure the temperature and sample the energetic fluid 920 from multiple locations across the combustor 56 in some embodiments. Users preferably provide at least one composition sensor 570 to evaluate the composition of the energetic fluid 920 in some embodiments. (See, for example, FIG. 76.) The energetic gas 920 is preferably sampled with short lines using instruments located close to the combustion system to reduce measurement delay.

In some embodiments, users preferably calibrate the static pressure and velocity distributions in the energetic fluid 920 exiting the combustor 56. They preferably select gas sample locations and temperature measurement locations in proportion to the mass flow of the energetic fluid 920. They further preferably calibrate and weight the results to obtain mean measures of the temperature and gas flow that correlate closely with the corresponding the mass weighted flow rates in the energetic fluid 920.

In some embodiments, users preferably position a fluid sampling tube 94 across the duct within the energetic fluid near the combustor exit 136. This sampling tube 94 is preferably formed from a high temperature material capable of handling the temperature and drag caused by the energetic fluid. E.g., users preferably form the sampling tube 94 from a crystalline sapphire tube (preferably single crystal, or else polycrystalline). The sampler tube 94 is preferably streamlined. In modified configurations, the sampler tube 94 is combined with a thermal diluent distribution tube 14 to form a composite sampling-diluent contactor tube 96. Upstream orifices are preferably used to sample the gas while downstream transversely to axially oriented orifices deliver the diluent fluid. Orifices are preferably laser drilled through the sapphire tube wall 30 with laser frequencies that are fairly well absorbed by the sapphire. (E.g., Bird Precision of Waltham Mass. laser drills orifices through sapphire disks down to 7.5 microns or 0.0003" in diameter).

In modified configurations, the sampler tube 94 or sampling-diluent contactor tube 96 is formed from a high temperature alloy covered by a thermal barrier coating and cooled within by thermal diluent passage.

The sampling tube 94 is perforated with orifices distributed across the duct to sample the energetic fluid so that the net sampling orifice area per transverse distance is in proportion to the circumference at that radius multiplied by the fluid velocity at that radius. e.g., by making the spatial density of uniform orifices in proportion to the circumference multiplied by a turbulent velocity profile for a linear tube. Similarly by making the spatial density of uniform orifices in proportion to the velocity profile for a circumferential sampler array or helical sampler array.

Such embodiments further reduce or eliminate the need to introduce diluent fluid in though the combustor liner 60 by reducing radiation incident on the liner. They further preferably use diluent channels or ducts about the combustor liner 60 to cool the combustor liner. They preferably introduce the heated diluent fairly uniformly across the combustor 56 through direct fluid contactors 14.

Such methods substantially improve the uniformity of the static pressure and the fluid velocity across the combustor 56. Embodiments using distributed fluid contactors substantially improve the spatial distribution of the oxygen/fuel ratio and the thermal diluent/fuel ratios across the combustor 56.

These methods very significantly improve the linearity and accuracy of the correlation of the oxygen concentration measured in the energetic fluid 920 with the true mass flow rates exiting the combustor 56. They similarly improve the correlation between the measured temperatures and the true mean temperature or peak temperature of energetic fluid 920 exiting the combustor 56.

Oxidant Control

In the VAST cycle, users preferably deliver sufficient oxygen to effectively combust the fuel fluid and oxidize most residual carbon monoxide. (See, for example, FIG. 76.) (Similarly, users provide sufficient oxidant for the reaction.)

Users preferably maintain the oxygen to fuel ratio near a desired value, or within a desired or needed range to within a desired probability in some embodiments. These methods provide various benefits of reducing emissions of carbon monoxide and unburned fuel, and/or improving thermal system efficiency.

In some embodiments, users preferably control the oxidant/fuel ratio by precisely controlling one or both of the oxidant and fuel fluid delivery rates. The primary limitation in such control is the sensitivity and stability of measuring the oxygen/fuel ratio. In the present invention, users preferably operate and control the oxygen/fuel ratio near to the stoichiometric ratio. This results in a substantial reduction in the oxidant as it reacts with the fuel or reactant.

For example, in some embodiments, with about a 10% excess oxidant, users expect the oxygen concentration after combustion to drop about 91% in the combustion gases resulting from combustion when using standard air. (E.g., to about 2.1% as 10% of the 20.9% oxygen in air. See Table 1 herein.) This portion will be diluted by the steam or water vapor formed from the water provided as a diluent fluid and formed by combustion.

To benefit from this, users preferably scale the oxygen full scale range to moderately above the resulting oxygen concentration in the energetic fluid 920. E.g., reducing full scale oxygen concentration from about 22% to about 2.2%. Such scaling provides substantially better resolution in measurements of the oxygen concentration. Correspondingly this improves measurement of the oxygen/fuel ratio compared to conventional methods where combustion is diluted using excess oxygen containing air as the diluent fluid.

To adequately control and burn off Carbon Monoxide (CO), in some embodiments, users preferably control the Oxidant/Fuel ratio within the range of about 101% to about 120% of the stoichiometric ratio near full scale operation. Such low excess oxidant portions are usable because of the effective controlled delivery and mixing of oxygen and fuel fluid by the distributed fluid contactors.

For example, when using about 110% of the stoichiometric oxidant flow rate, users preferably use an instrument scaled to about 2.2% or 2.5% O2 full scale, with a sensitivity of about +/−1% of full scale, preferably to +/−0.1%. With such configurations, users preferably achieve a relative sensitivity in sensing better than about +/−0.03% of the stoichiometric Oxidant/Fuel ratio.

In some embodiments, users preferably use a high resolution oxygen sensor 572 to monitor the energetic fluid 920 exiting the combustor 56 in some configurations. (See, for example, FIG. 76.) (For example, Sable Systems International, of Henderson Nev., provides paramagnetic based Oxygen Analyzers. Sable Systems claim their model PA-1B measures the oxygen concentration with an uncertainty of better than about 0.1% at 0-100% full scale. It reportedly has a resolution of about a part per million. i.e., 0.000,1%. The response rate is relatively rapid, reaching about 95% of reading in about 0.15 sec.) In modified configurations, users obtain similar resolution with zirconia oxygen sensors at low oxygen concentrations but with slower response rates.

Present technology enables users to control and calibrate liquid flow rates much more precisely and accurately than gaseous flow rates. (E.g., liquid fuel and water flows compared to air flows.) By the scaling methods described herein, users preferably measure the residual oxygen concentration much more precisely than the intake oxygen flow rates in some embodiments. E.g., with an output oxygen resolution of about 0.01% of full flow in the energetic fluid 920 or expanded fluids 924 compared with 0.1% oxygen concentration and about 0.5% flow rate uncertainty on the oxidant fluid delivered to the combustor 56.

Users preferably control the speed of one or more pressurizers in the oxidant fluid delivery system 400 to adjust the delivery rate of oxidant fluid so as to control the residual oxygen concentration in the energetic fluid 920 or expanded fluid 924 in some embodiments. E.g., the speed of one or more compressors (e.g., axial compressors, radial compressors, moving cavity compressors, blowers 406 or fans.) Alternatively, users control the dampers or baffles to adjust the draft when using chimneys or similar flow controlling systems.

The oxidant flow rate is preferably controlled to maintain the residual oxidant concentration to near a prescribed value within a preferred probability or uncertainty. In other embodiments, the oxidant concentration is maintained within a desired or needed range. The rapidity of adjusting such control is constrained by the delay in reactant flow from the oxidant fluid delivery system 400 through the combustion system, and through the utilization system, depending on where the residual oxidant concentration is measured.

Liquid and residual measurements to improve gas flow rates: In some embodiments, users deliver liquid fuels and liquid thermal diluents (e.g., water) and measure those fluid flows and calibrate instruments substantially more accurately than using gaseous oxidant fluids or gaseous fuel fluid. (E.g., methanol and water instead of air and natural gas.) Similarly, by using near stoichiometric combustion with diluent fluid like water and steam instead of an oxidant fluid like excess air, users preferably achieve residual oxidant concentrations in an energetic fluid that are substantially smaller than input oxidant concentrations in oxidant fluid flows. (E.g., 1.5% compared to 15%). Users preferably measure oxidant concentrations with instruments that provide an uncertainty that is proportional to oxidant concentration. (E.g., 1% of reading.) By mass continuity, users then improve or "correct" the uncertainty and resolution in measuring the balance of incoming gaseous fluid flow rates. Users preferably use such measures to improve system control, equipment calibration and to monitor performance degradation.

Pump and compressor speeds: In such configurations, users preferably use modern speed sensors and pressure sensors 552 to precisely measure the fluid delivery speeds and relative delivery pressures. (E.g., measure average pump and compressor speeds to about parts per 10,000 and preferably to about 100,000 or better using rotary encoders, and measure absolute and differential pressures in the delivery systems with resonant quartz pressure sensors 552 to similar resolution.)

Mass flow rates: Similarly, they preferably calibrate the liquid flow rates using high precision mass balances as described herein. (E.g., by measuring delivery rates of about 200 kg of fuel fluid or water with a resolution of about 2 g and preferably of about 0.2 g.) They preferably measure liquid and gaseous densities, pressures and temperatures before the delivery systems and in the combustor 56 before the direct fluid contactors as needed to evaluate relative flow rates substantially better than present technology.

(For example, by measuring parameters to about parts per 10,000 and preferably to about parts per 100,000 or better. A number of companies provide resonant chamber densitometers that measure liquid densities with resolution of this order. E.g., Solartron Mobrey provides a liquid density transducer model 7835 with a repeatability of about 0.02 kg/m3 and accuracy of about 0.15 kg/m3, and gas density meter model 7812 with about 0.01% repeatability and about 0.15% accuracy with natural gas. Other companies provide even higher resolution in laboratory equipment.)

Power Rate Control: In some embodiments, users adjust the fuel fluid flow rate to control the time varying power with a response rate corresponding to about at least twice the rate of change of power desired.

Acoustic Fluid Rate Control: To control acoustic pressure oscillations within the combustor, users preferably achieve fluid delivery rates of at least about 200 Hz, preferably by about 700 Hz or better., and most preferably by about 1.5 kHz or better.

Fuel fluid parameters: Users preferably continually monitor fuel fluid input using spectroscopic methods (such as Near Infra Red or NIR systems) to evaluate its composition using parameters relating to heat of combustion. (E.g., at least the relative carbon, hydrogen, oxygen composition, and preferably fuel bound nitrogen, sulfur, water, and varying carbon-carbon, carbon-hydrogen, and carbon-oxygen, oxygen-hydrogen components.) Fuel fluid density and composition is preferably used to evaluate variations in the heat of combustion and delivered enthalpy rate.

Oxidant fluid composition: The composition of dry air is well known. In such embodiments, users preferably refine the composition of intake air by measuring known minor variables, primarily the humidity and carbon dioxide which vary with ambient temperature, pressure, the growing season and time of day. This is further modified for delivery and evaporation of water delivered as a diluent fluid into the fluid delivery paths and into the combustor 56.

Fuel and combustion products: Users preferably use measured rates of liquid fuel delivery and fuel fluid composition to derive the rates of formation of carbon dioxide and steam from chemical reaction stoichiometry. They correspondingly calculate the decrease in the oxygen flows in the energetic fluid 920. Users similarly preferably measure delivery rates of diluent fluid and obtain the consequent delivery rate of gaseous diluent. (E.g., water and steam.)

Residual oxidant: Users preferably provide an oxygen sensor 572 to measure the residual oxygen concentration in at least one location in the energetic fluid 920 leaving the combustor 56 and/or the expanded fluid 924 to high precision as described herein. (See, for example, FIG. 76.) In modified embodiments, this residual concentration is complimented by measuring the oxygen concentration in the flow into the combustor 56.

Oxidant to fuel ratio: Users preferably derive the rate of oxidant to fuel provided using standard chemical stoichiometry and physiochemistry methods with the mass flow rates of fuel, diluent and oxidant together with the measured oxygen concentration in the energetic fluids 920 or expanded fluids 924. Multiple measures are preferably used to obtain improved flow rates by least squares methods.

Oxidant flow rate: Users preferably evaluate the oxidant flow rate from the fuel flow rate times this evaluated oxidant to fuel ratio.

Oxidant fluid flow rate: Users similarly preferably derive the flow rate of oxidant fluid (e.g., oxygen containing fluid) from the intake fluid composition relative to the evaluated intake oxidant flow rate. They further preferably account for the noble gases and other minor components in the intake fluids. These derived oxidant and oxidant fluid flow rates are substantially more precise and accurate than conventional gaseous fluid flow measurement methods. They also have lower uncertainties (i.e., they are more "accurate".) In some configurations, they also provide an second fluid/oxidant fluid flow sensor 562 as an alternative measure and/or to improve measurement uncertainty.

Refinements: In some embodiments, users preferably refine these procedures by measuring the emissions of unburned fuel (or unreacted reactant), and byproducts. E.g carbon monoxide (CO) and/or nitrogen oxides (NOx) as described herein. Users preferably provide a Carbon Monoxide Sensor 576 and/or a NOx Sensor 574 to monitor the energetic gas 920 exiting the combustor 56 in some configurations. (See, for example, FIG. 76.) These refinements preferably include the nitrogen composition within the intake fuel fluid, and possibly sulfur and sulfur oxide emissions and inert components when these are significant.

Carbon Monoxide Emissions

Rapid changes in fuel fluid flow rate affect the oxidant/fuel ratio and consequently the emissions carbon monoxide and unburned fuels. Users then preferably adjust the speed of the compressor 407 to restore the oxidant/Fuel ratio to within a desired range to maintain the emissions of unoxidized components within a desired range.

Measuring the CO emissions also provide a sensitive relative measure of the desired Oxidant/Fuel ratio when above or below the desired range of the oxidant fluid. E.g., The CO emissions increase as the excess oxidant portion delivered goes substantially above or below a desired range of about 3% to 15% of the stoichiometric ratio in some embodiments. With such combinations of such precise Oxygen and CO sensors, users expect to dynamically and rapidly control the Oxidant/Fuel ratio to commonly within +/−1%, preferably within about +/−0.1% and more preferably by +/−0.01%.

Nitrogen Oxides Emissions (NOx)

Rates of thermal formation of oxides of Nitrogen (NOx) are proportional to both oxygen concentration and nitrogen concentration, and exponentially proportional to the absolute temperature. The NOx formation mechanisms are strongly affected by the concentrations of Oxygen and OH radicals. In various embodiments described, users preferably replace excess oxygen containing fluid with other diluent fluids such as water. Users thus substantially reduce the oxygen and oxygen ion concentrations in the hot combustion gas and energetic fluid 920. They also increase OH ion concentrations. These lower oxygen ion and higher OH concentrations substantially reduce the NOx production rate compared to conventional systems at the same temperature.

These method of displacing excess oxygen fluid correspondingly also reduce the nitrogen concentrations. In some embodiments, users further use oxygen enriched air or even fairly pure oxygen for the oxidant fluid. With these methods of providing diluent fluid, users further substantially reduce the concentration of nitrogen in the combusting gases and energetic fluid 920. This lower nitrogen correspondingly reduces the NOx production rate compared to conventional systems using excess air as diluent fluid at the same temperature.

By combining these effects, users are able to reduce the product of oxygen and nitrogen concentrations for a given temperature, whereby further reducing the rate of formation of NOx. Users preferably provide NOx composition sensors to monitor the energetic gas 920 exiting the combustor 56 in some configurations. (See, for example, FIG. 76.)

Combined Fuel Fluid and Oxidant Fluid Control

In some embodiments, users preferably monitor and dynamically control both the fuel delivery rate and the oxidant delivery rate together to maintain the Oxidant/Fuel ratio within a desired or needed range that is narrower than commonly achieved by conventional controls. Using such embodiments, users preferably control the Oxidant/Fuel ratio within a desired range with an uncertainty of +/−1% or better, and with a sensitivity of about +/−0.1% and preferably of about +/−0.01% or better.

Users preferably control the mol oxidant fluid delivery speed proportional to the stoichiometric mol oxidant fluid delivery rate requirement for complete combustion of the fuel fluid at the fuel fluid delivery rate. Where low emissions and efficiency are important, users preferably control these rates together at the slower of the oxidant delivery and the fuel fluid delivery control rates in some embodiments.

Since gaseous flows vary about as the orifice area and the square root of differential pressure across an orifice, users preferably adjust the ratio of fuel fluid pressure to oxidant fluid pressure to control the air/fuel ratio, particularly for gaseous fuels in some embodiments. Users preferably vary the speed of the electrical or mechanical drives and turbine compressors 407, and monitor differential pressure sensors 554 and motion sensors (e.g., rotational speed sensors 582, 584 and flow modulator position/motion sensors 586) to precisely control the pressure ratio of oxidant fluid to fuel fluid and the corresponding delivery mol ratio of oxidant to fuel fluid.

Thermal Diluent Flow Control

Users preferably control the temperature of the reactant gases exiting the reactor by precisely controlling the rate of delivery of diluent fluid. (See, for example, FIG. 76.) As described herein, users generally control the ratio of oxidant to fuel fluid to within a narrow range in various embodiments. Users preferably provide a high precision third fluid/thermal diluent flow sensor 564 to monitor the diluent flow.

Consequently, in some embodiments, users preferably control the ratio of diluent fluid to fuel fluid within a narrow range, thereby controlling the temperature of the energetic fluid 920 within a correspondingly narrow range.

Users preferably provide high resolution optical or linear encoders or corresponding rotational or linear transducers or similar methods to provide very precise feedback on liquid pump operating speeds in some embodiments. Such measures substantially improve controls of fuel fluid and thermal diluent liquid flow rates.

Users preferably select a "normal" or desired design operating speed at some portion of the maximum safe operating speed to provide greater reliability and further control flexibility to increase speed under extreme operating conditions. They then use suitable high speed measurement systems to monitor pump performance.

Users preferably divide the maximum operating frequency of the selected encoder or transducer system by the maximum speed of the pump to give the maximum resolution per revolution in some embodiments. E.g., for an optical encoder electronics capable of about 1 MHz with a maximum safe pump operating speed of about 100 Hz, (i.e., at 6,000 RPM) users select an encoder resolution of about 10,000 pulses per revolution. Users preferably calibrate the pump flow rates as a function of pump speed, fluid viscosity and pressure difference. By using such resolution and calibration, users obtain very rapid precise measures of pump speed and consequently faster and more precise control over changes in fluid delivery rates.

To further improve integral control in some embodiments, users preferably provide high resolution measurement systems to measure the changes in mass of containers holding one or more of the fluids being delivered.

For example, high accuracy industrial mass weighing systems with a resolution of about parts per 1,500,000 are commercially available. I.e., A resolution of 0.1 g in 150 kg or 0.2 g in 300 kg. (See e.g., Sartorius Ag). Users preferably weigh about 200 kg or more of fuel fluid in a light weight tank or drum to 0.2 g at a dynamic rate of 50 readings per second. (i.e., 0.1 g per 100 kg=parts per million or about 0.000,1%.) This provides a flow rate of about 50 g/s for more than an hour before the fuel fluid or liquid diluent tank must be refilled. Users preferably use this system to calibrate the fuel fluid and thermal diluent pumps (e.g., using high purity water at constant temperature to calibrate pumps. Then applying such to delivering diesel or methanol fuel.) They preferably monitor the temperature of the fluid being delivered to compensate for changes in fluid density with temperature.

Flexibly coupled delivery tubes: Users preferably provide two symmetric low stiffness flexible tube couplings on either end of a substantially horizontal delivery tube between a liquid supply container and downstream delivery system. This assists in isolating the effects of gravity. Fluid outflow rate and the stiffness of such fluid coupling on the mass measurement system. Users preferably use a measurement system that compensates for weight to maintain the mass balance platform at a substantially constant level.

In some embodiments, users preferably monitor and correct for factors affecting mass measurements. E.g., the relative height of the tube ends or the inclination of the tube and the impact of bending the couplings; the barometric pressure and humidity to compensate measured weight for atmospheric buoyancy; liquid mean height and local gravity. (E.g., The diurnal and tidal variation in gravity is about 250 µGal or 0.25 parts per million. A 3 mm difference in elevation changes local gravity by about 1 µGal out of 980 Gal. A nominal mass resolution of parts per 1.5 million is equivalent to a variation of about 2 m in average liquid height.)

Users preferably mix and equilibrate fuel fluid and diluent fluids in well insulated tanks. They preferably provide large insulated tanks of hot and cold water. Hot and cold water flows are preferably mixed in well controlled proportions through liquid-liquid heat exchangers against the fuel fluid and diluent flows to more precisely control the temperature of the liquids delivered. These measures provide substantially better control of the fuel fluid and diluent densities. This further improves the stability and uncertainty of the fuel fluid and diluent delivery rates compared to conventional technology.

Delivering about 50 g/s with a pump operating at about 100 Hz gives a pump resolution of about 0.5 g/revolution. With an encoder resolution and control of about 10,000 micro-steps per revolution, users nominally achieve an incremental dynamic flow rate resolution of the order of 20 micrograms per micro-step. This gives a dynamic resolution about 4,000 times greater than the nominal resolution of the integral control (i.e., 0.01% or 20 micrograms compared to a resolution of about 0.2 g in 300 kg by mass.)

Users preferably control the fuel fluid delivery rate with a dynamic response of at least 250 Hz, and preferably greater than 1 kHz or better. For example, using a pump operating at about 100 Hz (about 6,000 RPM) and preferably using encoders with about 1 MHz frequency response, they provide about 10,000 micro-steps per revolution, and obtain about 100 micro-steps per 1% of a revolution. This suggests a dynamic resolution of 0.01% of the flow rate or 40 times the nominal mass resolution per second. Using a combination of high resolution pump control with a high resolution mass measurement system, users preferably achieve a dynamic flow control resolution of the order of parts per 40 million in the integral control measure (i.e., 25 ppb or about 50 mg/200 kg or better.)

By using such high resolution high speed measurement and pumping systems users achieve dynamic response of at least 250 Hz, preferably 1 kHz or better. They also preferably obtain a cumulative or integral resolution with at least 0.01% of full scale, and probably about 0.001% of full scale or more.

In some embodiments, users preferably monitor the differential pressure across the precision flow control pump. They preferably calibrate the pump leakage as a function of this differential pressure. Correcting for such leakage substantially improves the repeatability and accuracy of the pump calibration when used with high accuracy pump speed measurements and the high accuracy fluid mass flow measurements.

With the high resolution dynamic measurement or encoder systems, users preferably take differences in the encoder rate to evaluate accelerations and decelerations. If needed, the arrival times of the encoder pulses can be monitored and differentiated to provide even faster and higher resolution differential control. Users thus preferably achieve precise differential control as well proportional and integral control. The combination of parameters provides highly responsive PID control.

In some embodiments, users use the NOx emission concentrations together with oxygen and nitrogen concentrations in the energetic fluid 920 with the exponential dependence on absolute temperature to monitor the exponentially weighted effective axial temperature profile within the combustor 56. The distributed fluid contactors provide fairly uniform fluid distributions and combustion rates across the combustor 56. For a given oxidant/fuel ratio, the mean temperature of the energetic fluid 920 varies generally in proportion to the diluent fluid/fuel ratio.

Users preferably correlate at least one of the variation in NOx emissions and temperatures of the combustor exit 136 against the measured diluent/fuel ratio in some embodiments. These correlations are preferably refined by separately accounting for the NOx and temperatures resulting from the main flame (fuel fluid, oxidant fluid and diluent flow) and the flame holder 100 (pilot fuel 902, pilot oxidant 906, and pilot diluent 908 flows). They preferably evaluate the NOx emissions about two thirds of the way from the flame holder out to the combustor wall. Users preferably further model the combustion using CFD models and calibrate these models with measured parameters.

Users preferably use these correlations to provide an alternative measure of the temperature of the energetic fluid 920. For example, NOx emissions in premixed flames reportedly vary about 10 ppb/K to 30 ppb/K in the range 1300° C. to 1500° C. (2372° F. to 2732° F.) (e.g., See Bhargava, Colket & Sowa et al. 1999). Equipment is available offering NOx emission measurement systems with 5 ppm full scale and claiming a resolution of about 1% of full scale or 50 ppb. (e.g., see ABB.) This apparently provides a nominal resolution of about 5 K to 1.6 K.

Users preferably use arrays of high resolution temperature measurement systems to evaluate the temperature of the combustor exit 136 (or the Turbine Inlet Temperature—TIT.) For example, sapphire fiber multifrequency temperature measurement systems are available claiming about 0.01° C. resolution up to 2000° C. (e.g., see Luxtron Corp.)

Sets of turbine blades 450 in large power turbines commonly cost millions of dollars. Some hold that a mean temperature change of about +/−10° C. typically doubles or halves the mean life of the high temperature blades. Users preferably use the embodiments described herein to control the combustor exit temperature to a desired combustor exit temperature profile particularly in larger systems, with an uncertainty better than +/−5° C. This provides substantially better control and uniformity of the energetic fluid 920 exiting the combustor 56 compared to relevant conventional technology. (E.g., possibly by a factor of two or more.) The improved temperature control provided by embodiments herein substantially reduces the costs of replacing turbine blades 450, the costs of generating power, and the risks of unplanned outages.

Turbomachinery Calibration

With the improved direct contact fluid distribution, measurement and control methods described herein, in some embodiments users preferably use the improved fuel fluid, diluent fluid and oxidant fluid flow rates and pressure measurements to improve turbomachinery calibration.

In some embodiments, users preferably use methanol as a fuel fluid to further improve the uncertainty of calibrating the power and efficiency of turbomachinery. The heat of combustion of methanol has been measured with much lower uncertainty than diesel fuel. Methanol has been used in power level combustion in boilers. Users preferably measure the temperature, density and composition of the fuel grade methanol to correct the heat of combustion for minor fuel components.

With such calibration, users preferably use the improved flow composition with detailed component heat capacity data to derive the composite heat capacities at constant volume and constant pressure for the fluid flows with temperature. They then use these improved values to derive the polytropic efficiency as a function of with improved uncertainties. These values are then preferably adjusted for variations in water composition and pressure as such data become available or to fit the data obtained herein.

Users preferably calibrate the parasitic losses in generators 500 to improve system calibration as needed or desired. E.g., users preferably spin a generator 500 up and use a clutch to disconnect the generator 500 and conduct a spin down test to monitor windage and friction versus speed and component temperature. They similarly monitor coolant flow rates and temperature changes to evaluate heat losses. They may also carefully measure the torque required to maintain the speed of the generator 500 versus bearing temperature, coolant flow and temperature and other appropriate parameters.

Similarly users preferably provide a high accuracy torque tube to measure the torque between the expander 440 and generator 500. Along with this they provide a high resolution power meter to measuring the generator output, optionally including the corresponding voltage and current wave forms for each phase, calculate the corresponding power factors and real and reactive power.

To calibrate a expander 440 in such embodiments, users preferably equilibrate the compressor 407, combustor 56 and expander 440 to a desired operating temperature. They then conduct a calibration run, adjusting the fuel, diluent and oxidant fluid flow rates to the desired power level, Turbine Inlet Temperature, and excess oxidant concentrations.

Users preferably use the precision mass flow measurement methods described herein to improve the uncertainty in flow measurements. They similarly preferably measure the residual exhaust oxidant levels, flow velocities, temperatures, pressures and cross sectional areas across the combustor exit and/or turbine entrance/exit. They then preferably use these parameters to improve the uncertainty of oxidant fluid flow rates. These measures significantly reduce the uncertainties in the mass flow rates, enthalpy generation rates, and turbine efficiencies.

In some applications, users preferably apply the turbine calibration methods described herein to similarly calibrate the flow through the compressor 407 and the compressor efficiency.

Drop Size & Evaporation

In modified embodiments, users may control parameters affecting fluid delivery to adjust drop size and velocity for one or both of fuel containing fluid and diluent containing fluid. Users may control the fluid temperature to adjust fluid viscosity. Fluid composition and additives may be adjusted to further adjust viscosity.

In some configurations, users adjust the frequency at which the distribution tubes are excited to adjust drop size. Users similarly adjust the fluid pulsation frequency and amplitude to adjust drop size and ejection rate. These factors affect drop size, ejection velocity and delivery rates. These in turn affect the drop evaporation rate.

Rapid Oxidant Flow Control

In some embodiments, users preferably use the improved efficiency, together with highly accurate input and output pressure measurements, compressor speed measurements and diluent fluid intake composition, to calculate the desired compressor speed to achieve the desired or needed oxidant flow rate. (See, for example, FIG. 76.) Users preferably vary the power to the compressor 407 to rapidly achieve this desired speed and deliver the oxidant flow desired.

This method substantially increases the rate at which the compressor 407 can be reliably and accurately controlled. It avoids the long delays for fluid flow through the power system and for the time to sample and accurately measure the composition in the exhaust or expanded fluid 924.

Compressor Efficiency/Fouling

The oxidant flow rate actually achieved is then preferably evaluated and refined using the residual oxidant composition and associated methods described herein, in some embodiments. Users then preferably use these revised results to extract the current compressor efficiency at the current conditions, flow parameters and compressor speed with a compressor speed meter 584.

Users further preferably monitor the power used to drive the compressor. The power required to deliver the oxidant flow rate provides another measure of compressor mechanical efficiency.

Users preferably use these methods to monitor changes in compressor efficiency. From these changes, users preferably evaluate the relative revenues and operating costs to decide when to clean or replace the compressor 407.

Turbine Efficiency/Fouling/Erosion

Liquid drops impacting turbine blades 450 with sufficient velocity and size can erode the surface, reducing blade mechanical efficiency.

To limit erosion rates of turbine vanes 448 and/or turbine blades 450, users preferably adjust diluent orifice size and location such that diluent droplets evaporate until they substantially decrease to below a desired size before impacting turbine vanes 448 and/or blades. This size is preferably chosen such that the peak pressure created when the droplets impact a surface is less than the impact strength of that surface. By creating numerous distributed orifices with a uniform or known size distribution in the distributed contactors, users create droplets with much more uniform size distribution compared to the relevant art. This substantially reduces the probability of forming drops greater than the desired size.

Users preferably control the rate of diluent injection such that the combustion gases have sufficient temperature to evaporate the drops to below the desired size before they impact downstream surfaces in the expander 440.

In some configurations, to restore the efficiency of compressors 407 and expander 440 (e.g., turbine blades 450), users preferably provide periodic washing periods. During these periods, users increase delivery pressures to the maximum and deliver liquid diluent at the maximum rate with minimal or no fuel delivery. This reduces evaporation rates, increases residual diluent drop size and delivery rates. This provides significant liquid impact on blades. This will remove significant surface accumulation of foulants.

This method is preferably combined with additional spray tubes as needed, depending on the hardness or attachment of the foulants. Users preferably increase the diluent (water/steam or "humidity") concentration in energetic fluid 920 by maximizing diluent delivery. This substantially reduces evaporation of the injected wash spray, increasing the drop impact and cleaning effectiveness compared to conventional cleaning methods.

Where the separate downstream diluent spray contactor is provided, users preferably combine this high diluent ratio with strong diluent spray through the downstream diluent spray contactor. This combination provides online cleaning under reduced operating conditions without fully taking the power system off-line.

In some configurations, users preferably utilize the cleaning methods described herein and in the '191 patent application. The combustor is preferably purged and a slow continuing flow provided to reduce the risk of explosion. The heat rate applied is carefully controlled to avoid excessive pressure buildup from evaporation of any residual diluent fluid and/or fuel. The temperature is further controlled to avoid, reduce or control damage to the combustor.

When users attach micro-swirlers 290 to the direct fluid contactors, then the micro-swirlers are also cleaned by the high temperature thermal treatment. Similarly the fuel fluid tubes and orifices are preferably cleaned with the high temperature cleaning methods.

Orifice Cleaning

With some fuels tend to carbonize or polymerize under certain temperatures. E.g., large molecular weight petroleum fuels and unsaturated hydrocarbons in the range of 100° C. to 300° C. Users preferably provide measures to remove buildup of residues which can prevent free flow of fuels through orifices. E.g., of "coke" or "glaze".

Figure 10:
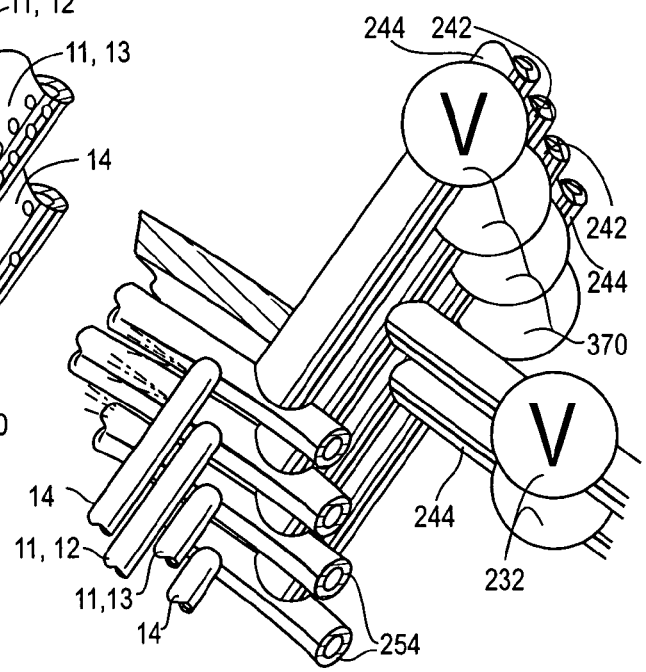
FIG. 10 is an expanded schematic view of multiple fluid delivery manifolds with purge ducts and valves.

With reference to FIG. 10, in some configurations users may provide a purge system by which to direct diluent fluid through the fuel manifolds 242 and fuel distribution tubes 11, in some configurations. E.g., they provide a diluent manifold 244 and connect it to the fuel manifold 242 with a purge valve 232. The diluent manifold may deliver water, steam, or similar diluent to blow or purge fuel, especially liquid fuel, out of the fuel fluid manifolds 242, fuel fluid distribution tubes 11 and respective orifices, preferably prior to system shutdown or when liquid fuel fluid is turned off, or a larger. In modified configurations, users provide a purge valve 232 by which to direct blow oxidant fluid to expel the liquid fuel fluid.

With such configurations, users preferably use valves that provide continuous fluid flow as the valve is changed from flowing one fluid to flowing the second fluid. This assists in avoiding the impact of transients where fuel fluid is not flowing in the fuel fluid passages and heats to within coking or polymerizing temperatures.

In some configurations, users may provide to deliver superheated diluent vapor through the fuel fluid delivery system to remove hydrocarbon components by chemical and/or mechanical action. E.g., generate superheated steam and deliver it through the fuel fluid delivery system. These methods preferably use the oxidation reactions between steam and carbon or carbonaceous materials to chemically react and gasify any residual fuel components such as coke or polymerized fuel with superheated steam, in addition to mechanical pressure cleaning of the orifices.

In modified configurations, users provide an auxiliary heater to heat the diluent vapor and deliver it through the fuel contactor tubes 12 or upstream of those tubes. Care is taken to ensure the pressure drop across the tubes does not exceed the design conditions. Users may also combine such superheated diluent cleaning with electrical resistive heating, or use the latter to form the superheated diluent.

During shut down, users preferably provide diluent fluid to cool fluid delivery tubes and manifolds, especially the fuel fluid tubes, to prevent or reduce over heating and fuel coking, polymerization or damage to the delivery tubes as needed or desired in some configurations. The diluent is preferably delivered through adjacent thermal diluent passages and/or through the fuel fluid passages until there is no danger of overheating the fuel fluid and/or tubes. Similarly on startup, users preferably provide diluent fluid along with fuel fluid in sufficient proportions to prevent or avoid overheating of fuel fluid and/or tubes.

Fluid Manifolds

In some embodiments, users preferably provide one or more fluid delivery manifolds 240 to which numerous medium to short perforated distribution tubes are connected. (See, for example, FIG. 55, FIG. 56, and FIG. 69.) This reduces the time delays and phase delays in delivering droplets across a distribution array. It also reduces the cumulative pressure drops along the distribution tubes such as caused by progressive fluid delivery along the distribution tube and fluid flow friction within the distribution tube. This provides more uniform drop distribution.

In some embodiments, users control and modulate the fuel fluid delivery through the distributed perforated tube arrays per one or more of the methods described herein and in the '191 patent application.

In some embodiments, users control and modulate the diluent fluid delivery through the distributed perforated tube arrays per one or more of the methods described to modulate fuel fluids herein. In users preferably control the delivery rates of one or more of the fuel fluid, oxidant fluid and diluent fluid to control one or more of the power, system efficiency and emissions.

Users further preferably control the modulation phase or time relationship between the diluent fluid and the fuel fluid delivery to control one or more of fuel combustion efficiency, fuel combustion stability, fuel-oxidant-diluent mixing, residual emissions, and pressure oscillation frequency and magnitude.

In some configurations, users preferably adjust the delivery phase to alternately deliver pulses of fuel fluid and diluent in rapid succession. This improves flame combustion stability and fuel fluid and carbon monoxide burnout while closely intermixing with diluent to rapidly reduce combustion temperatures. The distribution tubes generate parallel vortices that rapidly mix the combusting gases and diluent fluid. Users preferably control the modulation frequency to reduce acoustic resonances in the combustor.

A fluid pulse delivered to a tube takes time to travel down a distribution tube according to the speed of sound for that fluid. In some embodiments, users preferably adjust the longitudinal position of the distribution tube relative to the duct, to compensate for delays in the fluid pulse reaching that portion of the distribution tube. Where the internal fluid pressure changes significantly along a the distribution tube, users preferably adjust to account for the corresponding increase in time to deliver fluid through the orifices.

In embodiments where users desire or need to decrease the longitudinal coherence of active fluid distribution control, users preferably bend the distribution tubes upstream with increasing distance from the fluid manifold 240. This increases the time delay of fluid pulses and increases the relative phase of fluid delivery about or across a distribution tube array from the fluid manifold(s) 240. This reduces the thermochemical coherence within the combustion chamber.

To further reduce thermochemical coherence, users preferably provide an odd number of fluid manifolds 240 in some embodiments. They further preferably provide an odd number of distribution tube upstream/downstream axial adjustments about the duct axis. Fuel fluid and diluent distribution tubes are preferably adjusted together to preserve mixing control.

In other embodiments where users desire or need to increase the longitudinal coherence of active fluid distribution control, users preferably bend the distribution tubes downstream in proportion to the delay in the internal fluid being delivered through those tubes. For example, to increase axial (E.g., "planar" or "conical") coherence of fluid combustion or evaporation when desiring to form a thermo-chemical speaker.

In the relevant art, pattern factors of 1.05 to 1.15 are common with typical values of 1.10. (I.e., the difference of maximum to mean combustor exit temperature divided by the mean temperature increase across the combustor.) This suggests a range of temperatures of about 75 K to 225 K (about 135° F. to 405° F.) for an increase in temperature of 1500 K (e.g., for the H series turbines).

With the improved temperature control methods described, users preferably significantly improve the temperature distributions across the combustor exit, thereby significantly improving the Pattern Factor and consequently the life of downstream hot components.

In such embodiments, users preferably provide high resolution high accuracy temperature sensors 558 to monitor the downstream fluid temperature in some embodiments. E.g., users use thermal sensors positioned within the energetic fluid flow with a resolution of at least about 1° C., and preferably with a resolution of about 0.1° C. and a response time of 100 ms in some configurations. They most preferably use thermal sensors with response of about 10 ms and a precision of about 0.01° C. E.g., thin film thermocouples or resisters, or multifrequency sapphire or quartz fiber thermal sensors. (e.g., QuinetiQ in the UK developed high speed surface thermal sensors.) Sapphire fiber thermal sensing systems are available with a nominal resolution 0.01° C. with a nominal range to about 2,000° C. (Luxtron Corporation of Santa Clara Calif.) Users preferably use arrays of such precision temperature sensors 558 and averaged results to improve thermal feedback resolution and stability in the control system. E.g., The temperature sensitivity of about 0.01° C. provides feedback to control the temperatures of the combustor exit 136 to about the 0.02° C. level of temperature control. Measurement resolution can be further increased as needed.

In other embodiments, users preferably position at least one temperature sensor 558 on thermally sensitive surfaces. E.g., on the combustor liner, on the inner wall of the transition zone liner at high velocity regions such as the outer radius of a curvature bend. Similarly on the upstream side of a turbine vane near the location of maximum heat transfer and temperature. Another preferred location is on the upstream surface of the first stage turbine blade about midway to ⅔rds of the way from hub to tip near where the surface is hottest. These temperature sensors may further include thermocouples, optical pyrometry scanning, thermo resistive sensors, etc.

The major limitations in temperature control uncertainty are in the absolute repeatability and calibration of the temperature sensors 552, the number of sensors used to evaluate the temperature profile or "pattern factor", the fluid turbulence and eddy currents, and the frequency response.

With such improved control embodiments, users substantially improve temperature control within the combustor compared to control of about +/−10° C. used in conventional turbine combustion systems. By using such improved mixture ratio and temperature control, users substantially improve control over temperature life of hot section components and over the energy conversion system's efficiency and power. E.g., including combustor liner, transition zone liner, turbine vanes, and turbine blades 450.

Oxidant Delivery Control

In various embodiments, users preferably control the oxidant containing fluid and/or the fuel fluid delivery rates to control the delivered oxidant to fuel ratio. This ratio significantly influences combustion, formation of emissions, power and efficiency.

Reducing excess air reduces the parasitic pumping losses in a turbine combustion system required to pump the nitrogen and excess oxygen. However, at or near the theoretical stoichiometric ratio, incomplete mixing and combustion inhomogeneities hinder complete CO combustion, in some embodiments, users preferably control the Oxidant/Fuel ratio at about 101% to about 120% of the stoichiometric ratio. Such low excess oxidant portions are usable because of the highly uniform delivery and mixing of oxygen and fuel by the distributed fluid contactors.

With the improved uniformity, mixing and combustion created with the present invention, users preferably provide about 3% to about 12% excess oxygen to ensure carbon monoxide and other unburned fuel components are sufficiently oxidized in some embodiments. This jointly reduces pumping losses and improves efficiency.

Reducing the excess oxygen containing fluid from about 10% oxygen to about 5% excess oxygen improves the thermodynamic efficiency of a power system by about 1.4 percentage points in a full VAST cycle (assuming an expander with turbine blades 450 cooled to about 1200° C.).

Physical factors limit the range of oxidant/fuel ratios which will combust. In the embodiments described, the fuel fluid delivery system typically responds significantly faster than the oxidant delivery system. In some embodiments, users preferably establish operating bounds on the oxidant/fuel ratio as desired or needed. They preferably provide a reliability margin between the upper and lower physical combustion limits to establish the upper and lower oxidant/fuel reliable operating limits.

In keeping with good operating practice, users purge the combustor and power system of any potentially explosive mixtures by flowing oxidant fluid through them. They purge for at least a minimum time based on a prudent number of volume exchanges based on the combustibility of the desired fuel fluid. In some embodiments, users monitor the fuel concentrations with volatile fuels to check that the oxidant/fuel ratio within the combustor is above the physical bounds of the "lower" fuel concentration combustion limits.

In some embodiments, users preferably deliver oxidant fluid to at least one of the pilot flame or the flame holder(s) 100 sufficient to purge and provide controlled flows to facilitate safe ignition.

In some embodiments, systems may have a minimum power required to overcome friction and provide other parasitic losses and accommodate lower conversion efficiencies at low power. In such situations, users preferably establish fuel fluid delivery rates to sustain the power at least at such minimum power levels. In modified embodiments, users preferably set a minimum efficient power level to maintain a minimum profitability or return on investment as desired or needed.

Efficiencies

Users preferably evaluate the efficiencies of the fluid delivery systems, expansion and recompression systems in some configurations. The precision of methods detailed enable users to better monitor efficiencies compared conventional methods.

With some of these embodiments, users more precisely evaluate efficiency degradation and rate of efficiency degradation. From these parameters users better evaluate when and how thoroughly clean the compressors and/or expanders 440 relative to downtime, availability revenues and operating costs to increase net present system value.

They preferably control the delivery system to deliver the fuel fluid, oxidant fluid and diluent fluid at rates to achieve the desired or needed efficiency within the working range. These rates are fine tuned by feedback from the resulting mechanical, electrical, heat and/or cooling powers compared to those desired. Such combined measures provide faster and more accurate control over the energetic fluid 920 generated in the power system.

Power

Users preferably control the fuel flow rate relative to the system operating efficiency to deliver the desired or needed power. Users correspondingly preferably control the diluent/fuel ratio to control the mean temperature of the energetic fluid 920 to the desired or needed temperature. They then preferably adjust the oxidant/fuel ratio to improve efficiency and reduce emissions at those power conditions.

Under emergency or near blackout conditions, users preferably increase the compressor pressure ratio and/or the temperature of the energetic fluid 920 delivered by the combustor 56 to maximize power through the expander 440. They preferably operate near the choke limit of the expander 440 imposed by fluid velocity and temperature limits i.e., near Mach 1 at the first stage blade. Users preferably balance the degradation in life of turbine blades 450 and plant availability with the increased revenues from generating emergency power.

Controlling Emissions

High temperature variations strongly effect emissions in combustors, and correspondingly form byproducts or result in unreacted chemicals in chemical reactors. Accordingly, users seek to increase the uniformity of temperature profiles in one or both transverse directions in the combustor. They seek to do this along the combustor axis to provide more uniform reactions and thermal residence times.

Thermal Residence Time

In some embodiments, users preferably configure an array of perforated fuel distribution tubes to provide a well controlled mixture of oxidant to fuel across the combustor 56. They correspondingly configure one or more arrays of perforated diluent distribution tubes and/or control the thermal diluent flow rates to control the diluent/fuel ratio and constrain the temperature profiles of the energetic fluid 920 across the combustor 56 to a substantially uniform temperature near the combustor exit. By these methods, users preferably provide controlled evaporation, mixing about the combustor 56.

In some configurations, users preferably provide substantially uniform fuel fluid evaporation, uniform mixing across the combustor 56 and uniform temperature profiles. By positioning fuel fluid delivery upstream of the diluent delivery and configuring relative fuel fluid and diluent orifice sizes, users adjust the axial temperature profile. They preferably permit combustion to increase average temperatures to a certain level. They then rapidly increase one or more of diluent delivery, evaporation rate and cooling rate to constrain the axial temperature profiles within the combustor 56.

By the extended Zeldovich mechanism, Nitrogen Oxides further form in proportion to exponential absolute temperature by the Ahrenius equation, divided by the square root of absolute temperature. By the methods, described herein, users preferably constrain the degree to which temperatures exceed the desired temperature at the combustor exit 136. Furthermore, they constrain the residence time that the combusting gases remain above those temperature. Both these factors substantially reduce the rate of formation of Nitrogen Oxides (NOx).

Through the extended Zeldovich mechanism Nitrogen Oxides form in proportion to the square root of the oxygen concentration times the nitrogen concentration. By providing diluent fluid users preferably reduce excess oxidant after combustion to about 5% of the energetic fluid mixture, and preferably less, instead of the 15% or more for conventional ultra lean combustion. The nitrogen concentration is also significantly reduced by presence of the diluent fluid. These concentration parameters alone result in about 40% or more reduction in Zeldovich NOx formation rates compared to conventional lean combustion at the same temperature.

By these preferred uniform distribution, mixing, temperature profile and residence time control methods, users typically reduce NOx formation to below stringent legislated limits not just with gaseous fuels but even with liquid fuels. (E.g., below 2 ppmv NOx equivalent at 15% O2 with #2 Diesel according to CFD calculations using StarCD).

Unburned Component Residence Time

Users preferably configure the fluid flow velocity within the combustor and volume of the combustor to provide sufficient residence time above a given minimum temperature to combust any residual fuel and any Carbon Monoxide (CO) formed to below the degree of emissions desired or needed.

With such configurations, there are few cool areas in the combustor where unburned fuel and Carbon Monoxide (CO) formed that is not reacted with oxidant. The more uniform mixing, more uniform temperature profiles and minimum temperature result in faster combustion reaction rates. These enable users to use substantially shorter residence times to reduce CO and unburned hydrocarbons than in the relevant art.

Temporal Temperature Profiles

In some configurations, users preferably control the fluid flow rates and rate of change of fluid flows to change the mixture composition and/or the temperature profiles within the combustor with time.

Temporal Temperature Control

Users similarly control the ratio of diluent fluid to fuel with time to at least about 1%, preferably about 0.1% and most preferably to about 0.01% (e.g., to about 15 K, 1.5 K or 0.15 K out of about 1,500 K) relative to temperature sensors 552 reading to about 1°, preferably 0.1° and most preferably about 0.01° at about 1500° C. Users nominally achieve this degree of control for at least about 100 seconds, preferably about 1000 seconds or more (about 17 minutes) and most preferably over about 10,000 seconds or more (about 3 hours). Users thus preferably control mean temperatures with a stability of better than 1 K per 10,000 sec. With such configurations, users preferably achieve a dynamic range in temperature control of about four to five orders of magnitude and preferably substantially higher.

In some configurations, users preferably use the distributed contactor temperature control methods described herein to provide a desired or needed temperature profile. For example, in crystal pulling, the location of the desired melting point temperature of the material being crystalized and drawn is preferably adjusted to the desired vertical crystalization location. E.g., quartz near 1500° C. or sapphire near 2050° C. Similarly the curvilinear thermal profile from a preferred range above the melting point to a preferred range below the melting point is preferably adjusted to the desired temperature gradients.

The thermal gradient orientation is preferably symmetric about a vertical axis or axis in-line with the acceleration vector e.g., gravity. This provides high degree of temperature control at high temperature without the inefficiencies of converting heat to electricity and back to heat.

During operations, in some configurations, users dynamically control the fuel fluid and diluent fluid flow rates relative to the oxidant flow rate. With the methods described herein, liquid delivery control of at least 10 Hz to 100 Hz, and preferably about 1 kHz or greater is preferably provided in some configurations. With the previous example, this indicates the potential to adjust the temperature of the energetic fluid 920 downstream of the combustion and evaporation across a temperature range of at least 10 K to 100 K within 100 ms or 10 ms, and preferably of about 1500 K within about 1 ms in some configurations. Users thus preferably control temperature profiles in time with rates of about 100 K/s to 10,000 K/s or higher and preferably about 1 million K/s.

With such dynamic control capability, users preferably use such configurations to hold temperatures fairly constant to anneal materials. e.g., alloys, glass, ceramic products. They similarly rapidly quench materials. E.g., to temper glass or alloys.

Control Fuel and Diluent Combustion Electrical Excitation

Users preferably apply and modulate a transverse electric field in some configurations. The oscillating field accelerates ionized gas, charged fuel fluid drops and/or charged diluent drops transversely to the fluid flow. This assists mixing of the evaporating and combusting fluids. Users preferably control the electric field amplitude and frequency to control mixing, combustion efficiency, emission reduction, flame stability and system availability. They preferably control parameters to reduce system net present value.

Combustor Pressure Oscillation Control

By deploying arrays of perforated distribution tubes, users preferably provide very many fuel orifices 82 and fuel fluid micro-jets. These are preferably configured in downstream opening concave arrays 261. These provide a very uniformly distributed staged combustion. Users thus provide a passive means of substantially reducing pressure oscillations within the combustor.

In some configurations, users apply open cycle control of combustion frequencies. Users first preferably measure the combustion pressure oscillation frequencies without active fluid delivery excitation. As described herein, to form this excitation signal, users preferably create a "pink" noise formed by removing (or reducing) the resonant frequencies in a "white" or random noise by Fourier convolution, extraction and then deconvolution. Users then preferably acoustically excite the fuel fluid and/or diluent fluid delivery rates with the "pink" noise. I.e., at frequencies other than the resonant frequencies within the combustion chamber including any associated ducting and work engine. This reduces the acoustic fields and resonances within the combustor.

Combusting gases have a maximum surface area. Applying acoustic excitation at frequencies other than the resonant frequencies utilize the available surface area, preventing or reducing oscillation at the resonant frequencies that were removed in the "pink" noise.

In modified configurations, users preferably extend this open cycle control to include acoustic feedback from the combustor. The dynamic resonant frequencies are monitored by pressure oscillation sensors. These frequencies are then removed to form a dynamic "pink" noise as described herein. This "pink" noise signal is applied to the fuel fluid and/or diluent fluid to actively reduce combustion resonance. The relative time delay (or phase) is adjusted to deliver the fuel fluid and/or diluent fluid out of phase to reduce the pressure oscillations.

In some embodiments, users identify the oscillation periods for natural resonances and the characteristic droplet-heating time for the combustor. Users then preferably adjust one or both of the orifice size and differential fluid pressure across the orifice in the distributed perforated tubes such that the ratio of oscillation period to characteristic droplet-heating time avoids the maximum response function of oscillation period to characteristic droplet-heating time. I.e., this ratio is preferably away from 0.6, and is preferably below 0.3 or above 0.9. Users thus preferably adjust the drop size and vaporization time to de-tune longitudinal or radial resonance in the combustor.

Distributing the sources of fuel fluid is a key means of reducing combustion feedback. By our preferred perforated distributed tube arrays, users provide a means of very effectively distributing the fuel fluid spatially within the combustor.

If the perforated tubing is formed into a planar tube array 266 within the combustor, there is potential for significant axial combustion feedback. Accordingly, users preferably distribute the fuel fluid supply axially as well as radially in some embodiments. To reduce combustion feedback, users preferably form the perforated fuel distribution tubing into a downstream concave fuel distribution array 261 such as a downstream increasing conical, elliptical, parabolic or other concave surface. (See, for example, FIG. 28.)

Conventional combustors have substantial changes in temperature across and along the combustor. Flames impinging on combustor sections cause high temperatures and thermal gradients. Radiant flames create significant rapid radiant energy transfer back to the fuel fluid droplets creating combustion feedback. Conventional mixing with diluent gas then eventually reduces these high temperature to the average exit temperature. By deploying the distributed direct fluid contactor for both fuel fluid and diluent, users provide very uniform fuel, oxidant and diluent distribution together with very good vortex mixing. By increasing the temperature uniformity, users reduce the feedback loops driven by thermal fluctuations.

By distributing direct fluid contactor arrays for fuel fluid and diluent across the flow, users create a distributed fluid damper by forcing the oxidant fluid (air) to flow through the gaps between adjacent fluid distribution tubes. Pressure oscillations within the conically shaped direct fluid contactor within the combustor will create oscillating fluid flows between the perforated tubes forming the distributed contactor. The drag across the tubes created by such oscillations together with downstream turbulence passively damp the pressure oscillations. Users adjust the magnitude of damping versus parasitic pressure drop by adjusting the tube dimensions and tube to tube spacing H.

By generating drops of fuel fluid and vaporizable liquid through the distribution tubes, users uniformly mix drops in the fluid flow across the combustor. By entraining drop in the fluid users create acoustic damping by the drag created by gas flow around the droplets e.g., a heavy fog significantly damps sound. The fuel fluid and vaporizable diluent drops entrained in the fluid create a dispersed damping mechanism within the combustor. Users adjust the degree of damping by adjusting the drop size and temperature which affect the drag and drop duration.

By deploying these distributed vaporizable diluent liquid drops, users provide damping for dynamic fluctuations in fuel heat release and flame temperature by a corresponding counteracting change in the evaporation rate and cooling rate of these droplets. This reduces the dynamic combustion gas temperature increase or decrease and reduces the dynamic change in heat radiated or transferred back to the fuel fluid source.

By using our direct fluid contactor to distribute fuel, users dynamically and precisely control the rate of fuel fluid supply. By amplitude and/or frequency control of fuel fluid pulses, users control the phase of fuel fluid evaporation and combustion relative to pressure oscillations. Users sense the pressure oscillations with pressure, acoustic, vibration or acceleration sensors. Then users adjust the phase of fuel delivery and combustion to be effectively out of phase with the pressure oscillations and reduce them with feedback control.

Similarly users use a Direct Fluid Contactor to dynamically and precisely control the rate of supply and distribution of the vaporizable diluent liquid. As with the fuel fluid, users can dynamically increase or decrease the rate at which the fuel fluid issues from the combustor. At low differential pressures, users further achieve digital fluid flow control by controlling the differential pressure above and below the differential pressure required to overcome the fluids surface energy and form a drop.

In some embodiments, users preferably liquid fuel and/or liquid diluent through distributed contactors in a coordinated spatial manner with temporal control of at least twice the rate of the pressure oscillations so as to provide effective feedback with amplitude and phase control to control pressure oscillations within a combustor. I.e., with a response time of half the oscillation period.

For example, large turbine combustors 56 typically show pressure oscillations in a range of about 100 Hz to 600 Hz. Assuming a 600 Hz frequency resonant pressure oscillation, and at least two drops per pressure oscillation cycle, users preferably generate fuel fluid and/or diluent droplets with generation rates preferably at least 1,200 per second per orifice assuming orifices aligned across the combustor. If we assume delivering 50 g/s of diesel fuel at a density of 0.83 g/ml, through 1000 orifices, this results in about 50 nl/drop. This gives a drop diameter of about 0.5 mm or 500 microns or smaller. This appears achievable with distributed contactors and numerous orifices together with the high frequency pump control methods described herein.

Users further preferably adjust the drop size such that the drop evaporation time from the start of combustion is less than half the resonant frequency. E.g., adjust the Sauter Mean Diameter $S_{32}$ so that the evaporation time is less than about 0.8 ms for 600 Hz using a D squared type evaporation rate as the drop passes through a flame front. (E.g., See Thomas 2002.) With the ability to drill orifices of the order of 5 to 50 microns, this appears achievable.

Users further preferably adjust the effective orifice alignment in the direction of resonance to within about half a period. E.g for gas flow of about 10 m/s at an axial resonance of 600 Hz, users preferably align the orifices axially within about 8 mm. For large orifice arrays, users further refine the orifice axial location to account for time delays for fluid pressure pulses to travel across the distributed contactor array. E.g., assuming a speed of sound of 5000 m/s through a tube of 1 m this amounts to 0.2 ms. With a gas flow of 10 m/s, this requires an adjustment downstream of about 2 mm.

To complement these measures, users preferably monitor the combustor oscillation pressure and use closed loop feedback control methods to adjust both the fuel fluid and/or diluent amplitude delivery frequency and phase (timing) to reduce that oscillation. With suitable calibration, users may control these in an open loop fashion over some range of operating parameters.

In modified embodiments, users preferably deliver a controlled flow of liquid fuel and/or diluent fluid together with flows of gaseous fuel and/or diluent. E.g., using water or steam with ethanol, diesel fuel or natural gas, and flows of air or humid air.

Flame Limit Control by Axial Diluent/Fuel Profile

In some embodiments, users preferably control the diluent delivery axial profile to control the axial diluent/fuel profile as needed or desired. In modified embodiments, users control a portion of the diluent to control this diluent/fuel axial profile. E.g., users dynamically control a portion of the diluent, preferably less 50% of the total diluent flow, and more preferably less than 25% of the total diluent flow.

By controlling the axial Diluent/Fuel profile, users control whether humid oxidant and humid fuel mixture will ignite or not. Under startup conditions, users preferably reduce the upstream diluent/fuel profile to increase the combustibility of the oxidant fluid and fuel fluid mixture. After igniting the mixture, users preferably increase the upstream portion of the diluent/fuel axial profile to increase diluent content of the oxidant fluid and fuel fluid mixture to reduce NOx formation.

Where combustor pressure oscillation is significant issue, users preferably dynamically control the axial diluent/fuel profile near the axial start of combustion about the flame stability limit to reduce (or increase) the magnitude of combustion oscillations.

High Resolution Diluent/Fuel Ratio Control

In various embodiments, users preferably control the Diluent/Fuel ratio to control the temperature of the energetic fluid 920 exiting the combustor 56. (See, for example, FIG. 76.) E.g., controlling the water/fuel ratio to about 3.1:1 with diesel fuel #2 and about 110% of stoichiometric air, forms the energetic fluid 920 with a temperature of about 1,800 K (about 1,527° C. or 2,780° F.) This is similar to the upper range of "H-Class" turbine technology (where the "firing temperature" is up to about 1,487° C. assuming closed circuit steam cooling where the firing temperature after the vane and before the blade about 40° C. lower than the TIT). Similarly maintaining the water/fuel ratio at about 4.6:1 with about 110% of stoichiometric air controls the working temperature of the energetic fluid 920 to about 1,563 K (about 1,290° C. or 2,354° F.) This is similar to F-Class Turbine technology. (E.g., with a "firing temperature" after the vane and before the blade of about 1179° C. assuming air cooling where the "firing temperature" is about 111° C. below the TIT).

The fluid flow within the combustor is preferably about 10 m/s and generally in the range of about 0.5 m/s to about 200 m/s in various embodiments. In some embodiments, users preferably generate droplets of diluent at a rate proportional to droplets of fuel fluid, having adjusted the relative delivery pressures, orifice sizes and fluid temperatures to achieve the desired diluent to fuel fluid delivery ratio on a mass basis. They preferably further adjust the number and area of the fuel fluid and diluent orifices in proportion to the desired volumetric flow rate of liquid fuel and diluent. (I.e., about 3 to 6 droplets of diluent fluid per droplet of fuel fluid depending on the desired temperature.) Such ratios are preferably adjusted to accommodate combinations of liquid and gaseous fuel and/or diluent, and for humid fuel and humid oxidant.

With such capability of high precision fuel fluid delivery and such a high drop delivery rate, users preferably provide sufficient droplet delivery rates to control the Diluent/Fuel ratio to at least about 0.01%, and preferably they can adjust this ratio about 30 times per second on average.

With such dynamic flow controls described herein, users provide diluent fluid/fuel ratio control of at least about +/−0.3%, preferably of about +/−0.1% and most preferably of about +/−0.01% or better in some embodiments. For example, with such controls, in some configurations, users provide better than about +/−0.3% control over liquid diluent and liquid fuel flow rates, thereby achieving control within about +/−6° C. for a mean increase in temperature of the energetic fluid 920 of about 1,500K to about 1800K (to about 1,527° C. or 2,780° F.). This compares with conventional relevant control uncertainty of about +/−10° C. or about +/−1%.

Similarly by controlling to about +/−0.1% and preferably by +/−0.01% (e.g., water/diesel fuel.) Users achieve control of about +/−2° C. and most preferably by +/−0.2° C. at about 1800K at the combustor exit 136.

By providing high resolution speed transducers or encoders, users preferably monitor and control the diluent fluid and fuel fluid flow rates with high precision in some embodiments. For example, with some configurations, users provide high precision encoder control over fluid pumps sufficient to measure and provide control feedback on the mean diluent fluid/fuel ratio at a given location at the combustor exit 136 at least better than about 0.1%, preferably by about 0.01% and most preferably by about 0.001%.

Users further preferably monitor the density of the diluent fluid and the fuel fluid to improve control of the mass flow ratio. To complement the density measurement, the diluent and fuel fluid temperatures are preferably controlled sufficient to maintain the density with variations lower than at least 0.1%, preferably about 0.01% and most preferably lower than about 0.001% for longer than the time response time of the diluent and fuel fluid delivery controllers 592. In this example, with such control combinations, users preferably maintain the temperature stability of the energetic fluid 920 at a location in the combustor exit 136 within at least +/−2° C., preferably about 0.2° C. and most preferably by about 0.02° C.

The motion control actuator described is expected to have a nominal control response rate significantly greater than about 250 Hz, and possibly over 700 Hz for the water and/or liquid fuel injection pressures in some embodiments. (e.g., possibly upward of 1 kHz). Immediate reaction rates can nominally occur much faster than one second, and possibly faster than about one millisecond or less.

A fluid flow of about 10 m/s or faster will have a residence time of about 0.1 s (100 ms) or less assuming a nominal reactor length of about 1 m. The improved flow delivery profiles as described herein and improve mixing rates provided by these distributed combustors are likely to enable combustors substantially shorter than about 1 m and flow rates faster than about 10 m/s in some embodiments. These factors correspondingly reduce the residence time within the combustor substantially below 100 ms.

With commonly available pumps and compressors 407, the rate at which liquid fuel and liquid diluent delivery can be changed is substantially greater than the rate at which oxidant fluid delivery can be changed. In some situations, users desire or need to increase or decrease the fuel delivery rate (I.e., the power) faster than the rate at which the rate of oxidant delivery can be correspondingly changed. To provide faster rates of change, users preferably provide a buffer oxidant/fuel ratio within which to operate.

Users preferably set the minimum oxidant/fuel ratio at about the ratio desired or needed to oxidize the fuel and fuel byproducts and effectively reduce emissions. They similarly set the maximum oxidant/fuel ratio at about a lower efficiency level above which they desire or need to work.

When a rapid change in power is desired or needed, users rapidly change the fuel delivery rate within this desired excess oxidant/fuel range. They then preferably adjust the delivery rate of oxidant fluid to return the oxidant/fuel ratio to a preferred value within the excess oxidant/fuel range.

When users anticipate rapid changes, they preferably increase the oxidant/fuel ratio towards the upper end of this range to increase the range for rapid change in modified embodiments. When they anticipate few changes, they similarly preferably decrease the oxidant/fuel ratio to improve system efficiency.

In configurations using predominantly gaseous fuel where rapid control is desired, users preferably use a dual fuel contactor and deliver a second liquid fuel using liquid pumps capable of rapid control.

The relative frequency, amplitude and phase of formation of the diluent and fuel fluid droplets will affect the acoustic excitation and acoustic amplification within the combustion zone and the combustor. (See, for example, FIG. 76.) Users adjust the frequency, amplitude and/or phase of the diluent excitation relative to the liquid fuel excitation to influence and control this acoustic excitation and feedback. This will reduce or increase the influence of the diluent on the sonic generation. I.e., users can amplify or dampen it depending on the application. By modulating the fuel fluid and/or diluent excitation, the acoustic amplification can be reduced or increased. This excitation can be randomized to reduce acoustic amplification.

Fluid Delivery Profile Control

In some configurations, users provide numerous orifices distributed transversely across the duct users control one or preferably both transverse profiles of fluid delivery. Similarly, users preferably distribute numerous orifices axially along the fluid duct 130. Accordingly they provide control over the axial fluid delivery profiles as well as transverse profiles within the fluid duct. Users further preferably provide temporal control over the fluid delivery.

Fuel Fluid Profile

By the measures described herein, users preferably use numerous orifices and fluid control to control the delivery of drops or micro-jets of a fuel fluid 901 and the corresponding drop size distributions or distribution of fluid micro-jet size and penetration They further control one or more of the transverse and axial spatial profiles of delivering fuel fluid 901 in the combustor in some configurations.

Oxidant Fluid Profile

By the measures described herein, users preferably use numerous orifices and fluid control to control the delivery of the oxidant fluid 904. By use of one or more of splitter vanes and oxidant distributed contactor arrays 260, users preferably control one or more of the transverse and axial spatial profiles of delivering the oxidant fluid in the combustor in some configurations.

Diluent Fluid Profile

By the measures described herein, users preferably use numerous orifices and fluid control to control the delivery of drops or micro-jets of the diluent fluid 907 and the corresponding drop size distributions or size and penetration distributions of fluid micro-jets. They further control one or more of the transverse and axial spatial profiles of delivering diluent fluid 907 in the combustor in some configurations.

Control Total Diluent to Excess Heat Generation

Users preferably control the axial profiles of the fuel fluid 901, oxidant fluid 904 and diluent fluid 907 within the fluid duct 130. They consequently control the axial profiles of the total diluent to excess heat generation within the fluid duct 130. By such control, users preferably control the axial temperature profile along the fluid duct 130.

By providing numerous orifices 80 transversely distributed across the fluid duct 130 through which these fluids are delivered, users control the fluid profiles in one or both transverse directions. By controlling the transverse profiles of the total diluent to excess heat generation within the combustor, users preferably control the temperature profiles across the exit of the combustor 136 in one or both directions transverse to the fluid duct 130.

In some configurations, users further provide one or more temperature transducers 558 to measure temperatures at desired locations across the energetic fluid flow within combustor near the combustor exit. Similarly these temperature transducers 558 may measure temperatures at desired locations across the energetic fluid flow downstream of the combustor exit. E.g., on the surface of a downstream utilization device such as on the turbine vanes or turbine blades. Users preferably use such temperature measurements to further control one or more of the peak temperature, mean temperature, or temperature profile in one or both directions transverse to the fluid duct 130.

Similarly users provide temperature transducers 558 to measure the temperatures at two or more axial locations within the combustor. By combining these methods, users control the axial temperature profile as well as transverse profiles in one or both transverse directions within the combustor. This effectively provides three dimensional temperature profile control within the combustor.

Control Variability of Total Diluent to Excess Heat Generation

By controlling the temporal variability of delivery of one or more of the fuel fluid, oxidant fluid and diluent fluid, users preferably control the variability in the total diluent to excess heat generation ratio and consequently temporal variability in the mean fluid temperature of the energetic fluid delivered to the combustor exit 136. By combining this with numerous orifices to control the spatial variability of total diluent to excess heat generation, users further control the spatial and temporal variability of total diluent to excess heat generation. Consequently they preferably control both the spatial and temporal variability of temperature in the energetic fluid exiting the combustor.

Exothermic Chemical Reactions

In some embodiments, the trifluid reactors and direct contact heat exchangers described under combustion and heat exchangers may similarly be used to more uniformly manage and moderate in a wide variety of exothermic chemical reactions.

Exothermic Reactors

As with combustion, in some embodiments, at least one distributed direct contactor across a duct is used to mix at least two reactant fluids that react exothermically. The better mixing and control over temperature significantly constrain local rises in temperature within the reaction. This in turn improves product quality and reduces the frequency of byproducts.

In modified configurations, one or more reactants may be mixed and delivered through one or more passages in the distributed contactor into a second reactant flowing across that contactor. In other embodiments, one or more distributed contactors may be positioned downstream of the first contactor to fairly uniformly distribute and mix in one or more additional reactants.

Direct Contact Cooling

As with combustion, users preferably position at least one more diluent distributed contactor 14 downstream of the first contactor to distribute and mix in cool thermal diluent. The diluent fluid absorbs some of the exothermic heat released in the reaction, thereby constraining the rise in temperature of the reacting mixture and products. Controlling the temperature helps reduce or avoid byproduct reactions and improves product quality.

Mixing Elements

The direct fluid contactors provide distributed mixing across the second fluid flow by the turbulence generated downstream of each of the perforated tubes as well as from manifolds 240 and stiffeners 36 and ribs 38. In modified configurations, mixing elements are added downstream to further improve the reactant mixing. Users preferably use inert spheres, fibers, or other more complex mixing elements such as used in the chemical industry.

Expander

The heat of reaction in the hot fluid is preferably further recovered in some embodiments. Where the pressure and temperature of the energetic fluid are sufficient, the heat of reaction is preferably first recovered by expanding through one or more turbines 440, 444.

Direct Contact Condensation & Heat Recovery

The residual heat in expanded fluids and/or cooler fluids is preferably recovered by using a condenser 480 in some embodiments. Users preferably use a direct contact condenser 484—heat exchanger in a vertical counter flow configuration as described herein. The heat from the hot gas is recovered into heated thermal coolant or diluent. This heated thermal liquid is then used to heat various other endothermic reaction systems through direct contact heaters, to generate steam, for district heating, or used for other thermal needs as desired or needed.

In other configurations users use a surface heat exchanger. With corrosive fluid components, the heat exchangers and ducting are formed or coated by corrosive resistant materials such as stainless steel, epoxy, glass or sapphire.

Typical Exothermic Reactions

Various embodiments of the invention are used to conduct reactions across the full range of chemical and biochemical reactions. These may include, but are not limited to: alkylations, carbonylations, carbamylations, chlorinations, direct oxidations, ethoxylations, halogenations, hydroformylations, hydrogenations, nitrations, solution polymerizations, sulfations, sulfonations.

Such reactions may be used to prepare a wide variety of chemicals, biochemicals and foods. These may include, but are not limited to: a surfactant, a demulsifying agent, an emulsifying agent, a hydrocarbon fuel, a synthetic lubricant, a halogenated hydrocarbon, a hydrocarbon solvent, an organic polymer, a fire retardant, a fabric treatment agent, an antibiotic, an antiviral agent, an anti-pathogenic agent, a fungicide, a herbicide, an insecticide, a pesticide, a rodenticide, a food product, and the like.

Various embodiments can be used to prepare the following chemicals: ethanol from ethylene, ethylene oxide by oxidation of ethylene, ethylene amines from ethylene oxide, ethylene glycol by oxygenating, ethylene, ethanol amines from ethylene dichloride, hydrogen peroxide using anthraquinone, maleic anhydride, n-butanephenol from propylene and benzene, adipic acid from phenol, caprolactam from cyclohexane, cyclohexanol from benzene, ethylene glycol ethyl ethers, chloroacetic acid from acetic acid, propylene oxide, n-Butanol from propylene, acrylic acid from propylene, tetrahydrofuran from maleic acid, and n-Butyl acrylate by esterfying acrylic acid.

The emulsifying agents or surfactants may include: alkyl benzene sulfonates, linear alkylbenezene sulfonates, secondary alkane sulfonates, ester sulfonates, alpha olefin sulfonates, alkyl glyceryl ether sulfonates, alkyl glyceryl sulfonates, methyl ester sulfonates, natural fat sulfonates, natural oil sulfonates, alcohol sulfates, alcohol ether sulfates and the like.

Mixing and Heating Endothermic Reactions

Besides exothermic reactions, other embodiments preferably utilize the direct distributed contactors to fairly uniformly mix fluids to conduct endothermic reactions. Endothermic reactions commonly involve adding heat to the system to increase the temperature of the reactants and promote the reaction.

Direct Contact Heaters

In some embodiments, users preferably use one or more direct distributed contactors as direct contact heat exchangers. These fairly uniformly add a third fluid to the reaction system to heat the reacting fluid 912. This third fluid is preferably heated by using it as the heat exchange fluid or thermal diluent fluid in a distributed direct contact combustor to cool hot fluids heated by combustion or other thermal source elsewhere in the system.

Hybrid Cooling & Reactant

In some configurations, users provide water both to provide heat and as one of the endothermic or exothermic reactants in the system. E.g., in water shift reactions to gasify or reform methane, heavy oils, coal or other hydrocarbons to carbon monoxide and hydrogen. In modified configurations, users adjust the portion of oxidant fluid to water to achieve the desired rate of reaction, cooling relative to the desired pressure and products.

Indirect—Hybrid Heat Recovery

In some modified embodiments, the heated liquid used to recover heat from the hot combustion fluid is then used in a surface heat exchanger to heat at least one of the reactants and/or products of a desired endothermic reaction. One or more of such heated fluid(s) are delivered using further distributed contactors to uniformly mix and react them. In another modification, another heated fluid may be also used to further heat the reacting fluids 912. Such combinations of distributed direct contactors provide benefits of more uniform mixing, lower pressure drops and pumping costs, and more efficient heat exchange and heat recovery.

Fluid Fuels, Reactants & Diluents/Heaters

Various embodiments of trifluid reactor-combustors use one or more fuel fluids comprising one or more of a wide variety of fluid fuels or fluidized fuels detailed as follows. Some embodiments preferably provide for multiple fuel fluids selected from both liquid and gaseous fuels. E.g., natural gas and diesel fuel. This provides benefits of reducing economic risks from fluctuations in fuel price or availability.

Liquid Fuels

In some embodiments of the invention the fluid fuel may comprise one or more of a wide variety of liquid fuels. For example:

Liquid petroleum fuels and distillate fuels, including aviation fuel, gasoline, kerosene, diesel fuels, fuel oils, bunker oil, crude oils, tar sand oils, shale oils, heavy fossil liquids, coal derived fuel fluids, and liquefied natural gas (LNG).

Vegetable oils, including palm oil, coconut oil, soybean oil, rape seed oil, canola oil, and peanut oil.

Esters of such vegetable oils.

Pyrolysis fuels formed by heating biomass or fossil hydrocarbons.

Oxygenated fuel fluids, including methanol, ethanol, and MTBE.

Non-carbon liquid fuels, including liquid hydrogen, liquid ammonia.

Gaseous Fuels

Some embodiments of the invention one or more fuel fluids may comprise one or more of a wide variety of gaseous fuels. For example:

Any fossil or petroleum based gas including natural gas, coal bed methane, propane, and butane.

Producer gas (comprising carbon monoxide, hydrogen and nitrogen), or synthesis gas (comprising carbon monoxide and hydrogen) made by gasifying fossil fuels with air, oxygen enriched air or oxygen, including gasifying coal, tar sands, and heavy fuels. These gaseous fuels comprise varying quantities of carbon monoxide and hydrogen according to fluid feeds, reaction pressures and temperatures. They commonly contain various additional portions of methane and other hydrocarbons, and optionally residual unreacted fuels and/or diluents including nitrogen and carbon dioxide.

Producer gas or synthesis gas from gasifying biomass in air, oxygen enriched air or oxygen, with similar ranges of compositions.

Hydrogen, ammonia or other non-carbon gaseous fuel etc.

Fuel with Water

In some embodiments one or more fluid fuels comprise fluid water. For example:

Fuel water emulsions, including water emulsified with any of the above liquid fuels, optionally with emulsifiers or surfactants, e.g., "Orimulsion"®.

Water mixed with a fuel, including water droplets within fuel, and fuel droplets within water.

Gaseous fuel mixed with water mist, water vapor or steam.

Mixtures of the above fuel fluids.

Fluidized Solid Fuels

In some embodiments one or more fluid fuels comprise methods to suspend, entrain or fluidize solid fuel particles with diluent fluid and deliver that fluidized diluted fuel into the combustor. These may use superheated diluent to fluidize a powdered fuel such as coal. Then the hot diluted fuel is preferably mixed with diluted oxidant where both are delivered into a common chamber through orifices or passages sufficiently large to readily permit flow of the fluidized fuel. The diluted fuel ducts are preferably insulated and optionally heated to prevent condensation and clogging. The mixture of diluted fuel and diluted oxidant is then passed by a flame holder to ignite it, and the rest of the diluent fluid is added. The energetic fluid is then cleaned up as required by subsequent applications.

Such configurations include providing fuels such as: Any finely comminuted coal entrained or fluidized in air or fluid fuel including pulverized brown coal, bituminous coal dust, anthracite coal dust.

Any finely comminuted biomass entrained or fluidized in air or fluid fuel comprising sawdust, wood powder, activated carbon dust, flour, comminuted agricultural residues including from rice husks, corn, wheat, oats, sugarcane, coconut palms, and oil palms.

Oxidant

Corresponding to the variety of fuel fluids or reactants, users provide a reactant or oxidant fluid to deliver one or more of oxidants comprising oxygen, or a variety of oxidants or complementary reactants in various embodiments. Some oxidant fluids further comprise one or more diluent fluids, such as nitrogen, water, carbon dioxide, and noble gases such as argon etc.

Air

Many embodiments utilize air as the oxidant fluid to provide oxygen to the combustor or reactor. Users preferably compensate for variations in the air humidity, temperature and pressure when controlling the oxidant fluid flow in some embodiments.

In some embodiments, users preferably use a spray direct fluid contactor filter 392 to spray liquid diluent fluid to remove dust and fibers from the oxidant fluid. E.g., filtering the intake air. This is preferably instead of or may be in addition to a gas/air filter 390. In some configurations, users preferably provide a differential pressure sensor 554 to monitor the pressure drop across the intake gas/air filter 390 to decide when to clean or replace the air filter 390.

Users preferably use cold liquid diluent to both cool and filter the air. Such filtering reduces the rate of fiber accumulation in the compressor 407 (e.g., on compressor vanes and blades), and in the expander 440 (e.g., on expander vanes and blades.) Cooling the air gives compressors greater capacity, particularly on hot days. Filtering reduces the rate of compressor and expander fouling, thus reducing downtime, cleanup costs, and average compressor and efficiency. It further reduces the pressure drop across the fluid (gas/air) filters 390, reducing the pumping power of the compressor.

When using water sprays with a direct contact filter 392 to filter the air, users preferably control diluent delivery prior to combustion to compensate for variations in moisture composition from variations in humidity and from using diluent through a spray direct contact filter 392.

In some embodiments, users deliver an oxidant fluid comprising one or more of liquid oxygen, oxygen prepared by vaporizing liquid oxygen, oxygen formed by electrolysis, membrane or solid electrolyte oxygen separation, or oxygen prepared by other methods.

Conventional undiluted oxygen fuel combustion produces a very hot energetic fluid 920. The very high temperature makes it difficult to form durable long lasting combustor liners 60. In some embodiments, thermal diluent distribution tube arrays distribute fuel fluid and diluent fluid in close proximity. This substantially constrains the temperature of the hot energetic fluid 920. In configurations using liquid oxygen, users preferably deliver the oxygen through direct contactor tubes 10 to improve effective mixing of fuel fluid, oxidant and diluent with controlled spatial distribution of the composition. E.g., a fairly uniform composition may be configured across the duct.

Lower peak fluid temperatures obtained by such embodiments make it much simpler to make combustors that will reliably tolerate the combustion. Similarly, the thermal diluent distribution tubes and radiation shielding fins strongly reduce the heat fluxes experienced by the fuel fluid distribution tubes. Users preferably control the temperature near the walls cooler than nearer the center.

In some embodiments users delivery oxidant fluid comprising oxygen "enriched" air where the oxygen concentration is increased over standard air by one or more of a variety of methods. These may include pressure swing zeolite concentration systems and vacuum pressure swing concentration systems. Membrane oxygen enrichment methods may also be used. As with oxygen combustion, the perforated fuel fluid and oxidant fluid distribution tube arrays substantially constrain the combustion temperatures and simplify combustor design.

In some embodiments performing other chemical reactions, operators preferably deliver one or more oxidant fluids comprising a wide range of suitable oxidants including chlorine, ethylene oxide and hydrogen peroxide.

Thermal Diluent/Coolant Fluid/Heating Fluid

Many embodiments deliver diluent fluid comprising fluid water through the direct contact distributors to cool the reacting fluid 912 and constrain the temperature of the energetic fluid 920.

Cool water is preferably used to first cool thermally sensitive components such as the pressure vessel 170 and/or the combustion liner. Users preferably design the pressure vessel cooling system 178 to maintain the temperature of the pressure vessel 170 below about 533 K (about 260° C. or 500° F.) to utilize less expensive pressure vessel components that comply with common ASME standards.

Users then preferably use direct fluid contactors to deliver the heated water as the diluent fluid into the combustor. This significantly reduces the thermal losses from the combustor.

Users preferably use heat exchangers to recover heat from the expanded fluids into cooler diluent fluid. The heated diluent is preferably delivered back into the combustor. This increases the thermal efficiency of the VAST system.

Users preferably cool the gases exiting the expander 440 sufficient to condense the diluent fluid and recover liquid thermal diluent. E.g condense at least a portion of the steam fraction to form water. They preferably recover at least as much water as is delivered into the energy conversion system upstream of the exit of the combustor.

Some embodiments deliver a diluent fluid comprising a portion of the carbon dioxide formed by the combustion to constrain the combustion temperature.

Relevant art lean combustion power systems commonly use excess air as diluent fluid. The present embodiments preferably reduce the excess air used as diluent fluid to improve thermal efficiency. In some configurations, users deliver diluent fluid comprising some recirculated combustion gases or expanded gases 924 comprising nitrogen, carbon dioxide, water vapor and some excess oxygen.

Some embodiments deliver thermal diluent comprising a low vapor pressure natural or synthetic oil as the diluent fluid in one or more of the distributed direct contactors. Synthetic fluids such as fluorocarbons are used in some configurations as desired or needed for their special thermal properties and/or fairly inert chemical properties by some applications.

In some embodiments, distributed contactors deliver one or more first and/or second fluids comprising at least one cooled (or heated) reactant and/or product to the reacting components and further mix them to constrain (or boost) the temperature. In particular some measures recirculate a portion of the expanded or exhaust gas including at least a portion of the carbon dioxide, water vapor, nitrogen and/or associated noble gases. Such measures substantially simplify the product separation and purification system as well as the reactant recycling system.

Forming Recoverable Carbon Dioxide

In some embodiments, users desire to prepare an energetic fluid from which carbon dioxide is separated after the energetic fluid is used and expanded. For such applications, users preferably control the spatial relative oxidant to fuel ratio lambda in the range of about 100% to 150%, preferably in the range 101% to 120%, and more preferably within the range of 102% to 110% for peak design operating conditions. These compositions are preferably provided in numerous regions near the start of combustion, distributed about the upstream combustion surface. Such control enables users to achieve efficient combustion with low levels of carbon monoxide and unburnt hydrocarbons in the energetic fluid across the combustor. E.g., in 375 regions or more. A thermal diluent is similarly configured to achieve the desired spatial temperature control in the energetic fluid. Such control over composition and efficient mixing enables users to achieve both very low levels of excess oxidant containing fluid together with low pollutant levels.

E.g., Carbon monoxide levels of the order of 50 ppm, or preferably 15 ppm, and more preferably less than 5 ppm.

The embodiments described herein are believed to create the highest concentration of carbon dioxide in the cooled exhaust gas of all relevant technology that does not use oxygen enriched air or oxygen for combustion. For example, see Table 1 which shows the residual oxygen and carbon in energetic fluid that has been cooled and dried.

TABLE 1

Residual Dry Oxygen and Carbon Dioxide versus Inlet Air

| Inlet Air % of Stoichiometric | Exhaust Non-condensable Residual Gas Concentrations - Dry | | | |
|---|---|---|---|---|
| | $O_2$ mol % (volume %) | $CO_2$ mol % (volume %) | $O_2$ mass % | $CO_2$ mass % |
| 334% | 15.00% | 4.26% | 16.39% | 6.40% |
| 300% | 14.31% | 4.74% | 15.61% | 7.11% |
| 250% | 12.94% | 5.70% | 14.07% | 8.52% |
| 200% | 10.87% | 7.15% | 11.75% | 10.64% |
| 150% | 7.34% | 9.63% | 7.87% | 14.20% |
| 110% | 2.04% | 13.34% | 2.16% | 19.42% |
| 105% | 1.07% | 14.02% | 1.13% | 20.36% |
| 100% | 0% | 14.77% | 0% | 21.40% |

For example, combusting diesel fuel with 110% of stoichiometric oxidant in the oxidant fluid, (e.g., the oxygen in standard compressed air) the resulting carbon dioxide (CO2) forms about 13.34% of the non-condensables by volume in the condensed expanded fluid (dry basis excluding water vapor, assuming Diesel#2 can be represented by C12H26— or 19.42% by mass.) This compares with about 4.26% carbon dioxide by volume (6.40% by mass) using lean combustion with intake air at 334% of stoichiometric air, where oxygen forms 15% by volume of the residual non-condensable gases on a dry basis (16.39% by mass.)

Thus, with the Diesel #2 combustion in about 110% of stoichiometric air, users obtain about 303% of the concentration of carbon dioxide by mass that is obtained by conventional lean combustion systems operating with about 334% of stoichiometric air. The higher concentration of carbon dioxide in the cooled expanded fluid downstream of these embodiments results in significantly lower energy use and costs to separate out the carbon dioxide compared to conventional processes operating with ultra-lean combustion.

In many configurations, users preferably reduce the excess oxidant containing fluid and may further reduce the non-oxidant diluents within the oxidant fluid. Such combustion with oxygen or oxygen enriched air eliminates some or substantially all nitrogen and other non-condensable gaseous thermal diluents in some embodiments. Reducing or removing nitrogen and other diluents in air in some embodiments similarly reduces the energy, equipment, and costs of separating out the carbon dioxide formed by combustion from the expanded energetic fluid 924.

Carbon Dioxide Exhaust Gas Applications

Some embodiments utilize the carbon dioxide rich exhaust gas as a carbon feed product food production, energy crop production, aquaculture, or mariculture. The very low NOx concentrations formed from in these embodiments provide a highly desirable carbon feed for such applications. This significantly reduces the action of NOx on accelerating ripening of vegetables, fruit or other horticultural products. In other configurations, users preferably increase the temperatures in the combustor to actively increase NOx production when there is a need actively enhance and accelerate ripening.

In other embodiments, users separate the carbon dioxide from the exit gas and provide a carbon dioxide enriched gas for pharmaceutical production, biosynthetic processes, or other high carbon applications. The embodiments described provide more efficient and cost effective methods to recover and utilize or sequester the carbon dioxide.

Trifluid Combustor-Drier

In some embodiments, the trifluid reactor is used as a combined combustor and drier. The first distributed contactor 11 distributes a fuel fluid and mixes it with an oxidant fluid within the duct (such as air). Users preferably combust the combustible mixture in the combustor to generate a hot energetic fluid. Users preferably use second distributed contactor 14 to deliver sufficient diluent fluid to cool the energetic fluid to the temperature desired to dry the desired fluid or material.

Drying to Powders

Users preferably use a third distributed contactor 14 to deliver a solution, suspension or emulsion in a fairly uniformly manner into the energetic fluid. The hot gases then rapidly evaporate and dry the uniform droplets of the liquid containing the material to be dried to form the desired powder.

Trifluid reactor-driers preferably use continuous combustion and flow. Such trifluid reactor-driers are believed to provide substantially more uniform powders more rapidly and in more compact equipment than conventional driers. In modified embodiments, the fuel fluid flow and optionally the flow of the oxygen containing fluid may be modulated to form a fluctuating or pulsed combustion.

The energetic fluid formed by embodiments herein is preferably cooled using diluent fluid through direct contactors to the maximum temperatures tolerable by the desired dried product.

Where the material being dried can tolerate high combustion temperatures, the product containing fluid is preferably delivered through a direct fluid contactor 10 prior to combustion. In this configuration, this energetic fluid acts as a diluent fluid for the combustion as well as a carrier for the material to be dried. In some cases, this can displace the second thermal diluent direct contactor 14.

Product Separation

In variations of such embodiments, the powder product is separated by various separation methods, including gravity, impingement, and electrostatic precipitation as described under the distributed direct contactor.

In further embodiments, some fluid material may be dried with the hot combustion fluid and that product recovered. Then another distributed contactor may be used to distribute further material containing fluid across the fairly hot gas remaining to further evaporate the fluid and form further powder. This is similarly recovered.

In some embodiments, the hot gas is used to dry a wet or moist fuel. The dried fuel is then used within the combustion system as a primary or auxiliary fuel fluid.

Drying Fiber Slurries

In some embodiments, users form the energetic fluid and direct jets of energetic fluid through a slurry of fibers to dry the fibers. E.g., in making paper, tissue and fiberboard. Where the fibers are formed into a mat on a screen, the energetic fluid is directed against or across the matt to dry the fibers and mat.

Recycling Liquid Carrier & Diluent

To recover the heat in the remaining exhausted hot gas after drying, a third distributed contactor is preferably used to form a direct contact heat exchanger. A cold fluid, preferably water, is used to contact the hot fluid, preferably in a vertical counterflow configuration. Such preferred heat recovery configurations result in exhausting a cool gas and recovering the residual heat in hot fluid. It also preferably condenses and recovers the diluent fluid and liquid carrier used.

When water is used to recover the heat, the heated water is then preferably recycled and used as the carrier to dissolve, suspend or emulsify further material to be dried. When hydrocarbons are used as carriers, the hydrocarbon and water are separated and separately recycled.

Alternative Direct Contact Distribution Tubes

In some embodiments, the direct contact distribution tubes described herein may further be constructed and/or assembled by other means which provide some of the advantages of one or more of the embodiments described herein.

Porous Distribution Tubes

In some embodiments, the direct contact distribution tubes described herein are constructed with tube walls 30 formed from porous materials in place of the perforated materials detailed. E.g., from sintered metal, open cell ceramics or plastic foam, or materials having an appropriate crystal structure providing inherent porosity, or using metallic or non-metallic fibers. Using such porous tubes in streamlined forms in the various arrays described improves the spatial uniformity of fluid delivery across the duct compared to conventional injection methods. Porous tubes may need less stringent filtering compared to perforated tubes.

Multi Nozzle Distribution Tubes

In modified embodiments, users position multiple nozzles along and/or about the streamlined distribution tubes 10 described herein. Users preferably provide multiple orifices on the nozzles and orient them in multiple directions, preferably to improve spatial coverage across the duct. In some configurations, the nozzles are extended out from the distribution tubes. The distribution tubes, nozzles and orifices are preferably configured to spray micro-jets or mini-jets fairly uniformly across the duct.

Multi Nozzle Manifolds

In modified embodiments, users position multiple nozzles along and/or about the streamlined manifolds 240 described in the various embodiments to obtain some of the benefits of the distributed orifices and multiple micro-jets. Users preferably provide multiple orifices on the nozzles and orient them in multiple directions. The multiple manifolds 240 are configured radially or transversely as preferred according to the duct orientation. In some configurations, users extend nozzles out from the manifolds 240 on extension tubes.

Such methods create multiple fluid jets in multiple locations distributed across the duct. This improves spray spatial distribution and oxidant/fuel and diluent/fuel ratio distributions compared to the relevant art.

Micro-Swirlers and Mini-Swirlers

In modified embodiments, the micro-swirlers 290 as described herein are preferably positioned along or between distribution tubes to increase the turbulence of the second flow and increase mixing. Larger mini-swirlers 299 are alternatively provided to generate larger scale turbulence.

Mixing Elements

In modified embodiments, users provide mixing elements about and/or downstream of the perforated distribution tubes 10 to increase turbulence and mixing. These mixing elements may be formed of spheres, fibers, fibrous media, porous media, and/or complex mixing shapes formed from metallic, ceramic or other non-metallic materials.

Hybrid Delivery Systems

In some configurations, users combine methods of delivering diluent fluid and/or fuel fluid (or one or more corresponding reactants). Users provide a substantial portion of the diluent fluid after the compressor 407 and before turbine using one or more distributed contactors or other methods as described herein. The balance of the diluent fluid delivery rate is preferably provided by one or more of the other delivery methods described herein.

This includes providing direct contactors for water spray filtering and/or fogging into the air upstream of the compressor 407. Users similarly preferably streamlined arrays of direct contactors to provide water entrainment into the intake 409 of the compressor 407, 408 or blower 406. This provide more uniform spray distribution with lower pressure drop than relevant art.

In modified configurations, users provide distributed contactors 10 to more uniformly control combustion and temperature profiles together with one or more other diluent delivery systems. For example, providing distributed contactors with one or more water or steam delivery systems such as pre-compressor fogging, water spray entrainment into the compressor 407, water spray compressor water, intra-compressor water spray, inter-compressor spray, after-compressor water spray (after-cooler), water saturator, spray into a recuperator, or water or steam injection systems within the combustor 56.

Control of Reacting Mixture and Energetic Fluid

In some embodiments, users preferably add a direct contactor in the thermal system to increase control over mixture composition and temperature profiles.

Displacing Gaseous Diluent

In some embodiments, users utilize the distributed contactor delivery methods to provide fairly uniform mixing of fuel fuel, oxidant fluid and diluent fluid. With these mixing methods, users preferably operate fairly close to the stoichiometric oxidant/fuel ratio while maintaining oxidant/fuel ratios substantially greater than a desired or needed portion leaner than the stoichiometric ratio across most of the fluid mixture.

In some embodiments, users preferably displace some to most of the gaseous diluent fluid or excess oxidant fluid (e.g., excess air) conventionally used as diluent fluid. E.g., users provide diluent in this controlled fashion to reduce the oxidant fluid from about 334% oxidant/fuel conventionally used to thermally dilute the combustion (i.e., 15% O2 on volume basis in dry exhaust). Users preferably displace excess oxidant fluid with diluent fluid, and operate within the oxidant/fuel range of about 100% to 150% of the stoichiometric ratio. Users more preferably provide total compressed oxidant fluid with oxidant delivered in the range of about 102% to about 115% of the stoichiometric ratio.

Temperature Control

Users preferably control the temperature profile of the combustion fluids and/or of the energetic gas leaving the combustor by adding diluent fluid. They preferably pumping it into the thermal system as liquid diluent. User preferably deliver liquid and/or vaporized or superheated thermal diluent through one or more distributed contactors as described herein. Users preferably create water/fuel and air/fuel spatial distributions using the present embodiments that are significantly more uniform than conventional technologies. This results in significant reduction in spatial temperature variations.

In some configurations, users provide additional nozzles about, along and within the combustor downstream of the flame to increase the water or steam delivery.

Users preferably control the proportions of diluent fluid delivered to fuel delivered to control the temperature of the resultant reacted mixture or energetic fluid. Users preferably account for any excess oxidant and/or gaseous thermal diluent or other reactant, and the temperatures, pressures and heat capacities of each of the fluids that change the temperature of reaction or of the energetic fluids.

For example, Table 2 shows the typical temperatures achieved by delivering water as diluent fluid at various water/fuel ratios when burning #2 Diesel fuel provided at about 350 K (about 77° C. or 171° F.) with about 110% of the stoichiometric ratio of compressed air at a pressure ratio of about 10 (e.g.,10 bar) at about 788 K (about 515° C. or about 959° F.) with about 60% relative humidity in the intake air. The inlet water is provided at ambient conditions of about 300 K (about 27° C. or 81° F.).

TABLE 2

Reacted Mixture Temperature Control By Diluent to Fuel Ratio Diesel Fuel at 350 K, 110% of stoichiometric air at 10 bar 60% RH 788 K, water at 300 K

| Water/Fuel mass/mass | Water/Fuel mol/mol | Temperature EK | Temperature EC | Temperature EF |
|---|---|---|---|---|
| 0 | 0.176 | 2,230 | 1,957 | 3,555 |
| 1 | 1.658 | 2,102 | 1,829 | 3,323 |
| 1.5 | 2.588 | 1,993 | 1,719 | 3,127 |
| 2 | 3.168 | 1,884 | 1,611 | 2,931 |
| 2.67 | 4.428 | 1,752 | 1,479 | 2,695 |
| 3 | 4.975 | 1,692 | 1,419 | 2,586 |
| 4 | 6.633 | 1,524 | 1,251 | 2,284 |
| 5 | 8.292 | 1,367 | 1,094 | 2,001 |
| 6 | 9.95 | 1,236 | 963 | 1,765 |
| 7 | 11.61 | 1,119 | 846 | 1,555 |

For example, at about 110% excess air, users preferably provide about 7:1 water/fuel m/m with Diesel#2 to control the temperature to about 846° C. Similarly, users preferably provide about 2:1 water/fuel m/m to control the exit temperature to about 1611° C. This range of 7:1 to 2:1 covers the range of Turbine Inlet Temperatures of most commercial gas turbines (i.e., about 900° C. for uncooled blades to about 1525° C. for the GE H class technology).

In another example, users preferably provide a ratio of about 1.5:1 water/fuel with Diesel#2 at about 110% excess air to achieve a temperature in the energetic fluid of about 1720° C. This is similar to Turbine Inlet Temperatures used in high temperature experimental ceramic turbines. A ratio of about 1:1 water/fuel with Diesel#2 achieves an energetic fluid temperature of about 1829° C.

Users readily calculate similar water/fuel ratios for other temperatures, for other ratios of excess oxidant or excess gaseous diluent, differing inlet conditions or heat recovery, or for natural gas or other fuel fluids, using commonly available thermochemical reaction or computational fluid dynamics programs.

With the embodiments described herein, users deliver diluent fluid to control the temperature of the energetic fluid exiting the combustor to below about 2073 K (about 1800° C., or about 3272° F.). Users control the temperature above the temperature of cooled fluid diluent. (E.g., about 1° C. or about 34° F. for water.)

In many configurations, the mass flow rate of diluent fluid is preferably higher than the mass flow of fuel. E.g., users provide diluent to fuel ratios of about 2:1 to about 7:1 for water/Diesel#2 to control the temperature of the energetic fluid to the range of about 1611° C. to about 846° C. This covers the preferred design Turbine Inlet Temperature range of most commercial gas turbines.

Conventional technologies are limited in the amount of water they can deliver without quenching the flame or causing high CO emissions or pressure oscillations in the combustor. E.g., typically less than about 1.1:1 water/fuel by mass. In the present embodiments, users preferably achieve at least about 1.5:1 water/fuel by mass. Users may provide additional diluent preferably using contactor arrays to reduce the temperature of the energetic fluid to whatever temperatures needed.

By the methods described herein, users may control the temperature of the energetic fluid over the full range of lower temperatures down to 100° C. The steam may be further condensed by using coolant down to ambient conditions e.g., 15° C. With cooled water, users may similarly control the temperature down to about 1° C. With other diluents they may further cool the temperature of the resultant cooled and dried fluid to lower temperatures as desired, such as the boiling point of nitrogen or oxygen.

Generalization

From the foregoing description, it will be appreciated that a novel approach for distributed contacting, mixing and/or reacting of three or more fluids has been disclosed using one or more methods described herein. While the components, techniques and aspects of the invention have been described with a certain degree of particularity, it is manifest that many changes may be made in the specific designs, constructions and methodology herein above described without departing from the spirit and scope of this disclosure.

Where dimensions are given they are generally for illustrative purpose and are not prescriptive. Of course, as the skilled artisan will appreciate, other suitable sizes, orientations, configurations and distributions of fluid delivery orifices, fluid passages, and other components may be efficaciously utilized, as needed or desired, giving due consideration to the goals of achieving one or more of the benefits and advantages as taught or suggested herein.

Where tube or array configurations are provided, similar two or three dimensional configurations or combinations of those configurations may be efficaciously utilized, including varying the nominal thicknesses, diameters, cross sectional shapes, spacings, orientations, and other dimensions and parameters for perforated tubes, manifolds, sub-manifolds and tube arrays.

Where the terms fuel, diluent, water, air, oxygen, and oxidant have been used, the methods are generally applicable to other combinations of those fluids or to other combinations of other reacting and non-reacting fluids. Where fluid quantities are referred to, these methods are generally applicable to include quantities delivered at multiple times, and to continuous fluid flows. Where assembly methods are described, various alternative assembly methods may be efficaciously utilized to achieve configurations to achieve the benefits and advantages of one or more of the embodiments as taught or suggested herein.

Where transverse, axial, radial, circumferential or other directions are referred to, it will be appreciated that any general coordinate system using curvilinear coordinates may be utilized including Cartesian, cylindrical, spherical or other specialized system such as an annular system. Similarly when one or more transverse or axial distributions or profiles are referred to, it will be appreciated that the configurations and methods similarly apply to spatial control in one or more curvilinear directions as desired or prescribed. Similarly, the contactor, array, device or duct orientations may be generally rearranged to achieve other beneficial combinations of the features and methods described.

Where fluid delivery controls refer to controlling the size and flow rate of ejecting drops or micro-jets, it will be appreciated that the control measures may utilize one or more measures to control the differential ejection pressure distributions across the orifices 80, vibrate the orifices, and/or control the electromagnetic field outside the orifices 80 using one or more measures described herein or using similar means of modulating the orifices location, the fluid pressure and the surrounding electromagnetic field.

While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but includes the full range of equivalency to which each element is entitled.

What is claimed is:

1. A method of reacting reactants in the presence of diluent, the method comprising:
    configuring a reactor comprising a reaction chamber with an outlet; the reaction chamber having a streamwise curvilinear primary flow direction and a first and a second transverse directions mutually distinct and transverse to the primary flow direction, the first and second transverse directions defining a surface through a reaction chamber location;
    configuring a reactant delivery system and delivering a reactant fluid comprising reactant to the reaction chamber;
    configuring a co-reactant delivery system and delivering a co-reactant fluid comprising an oxidizing co-reactant to the reaction chamber;
    controlling a spatial delivery distribution of the reactant fluid into the reaction chamber,
    wherein controlling a spatial transverse reactant distribution in the surface along the first transverse direction;
    configuring a diluent delivery system and delivering a diluent fluid comprising diluent into one of reactant fluid, co-reactant fluid, and product fluid, upstream of the reactor outlet;
    controlling a spatial distribution of the diluent fluid comprising diluent upstream of the reactor outlet,
    wherein controlling a spatial transverse diluent distribution in the surface along the first transverse direction;
    reacting reactant with co-reactant to form a reaction product, and mixing diluent with at least one of reactant, co-reactant and reaction product upstream of the reactor outlet, and
    delivering to the reactor outlet a product fluid comprising reaction product, diluent and a residual component comprising one of reactant and co-reactant; and
    wherein controlling the spatial distribution of each of the reactant fluid and the diluent fluid in the first transverse directions controls a spatial transverse distribution of one of the composition, temperature, pressure, and streamwise velocity of the product fluid, at a plurality of outlet locations along an outlet transverse direction through an outlet location near the reactor outlet, to one of:
    greater than a plurality of prescribed lower limits, and less than a plurality of prescribed upper limits at the respective outlet locations.

2. The method of claim 1 wherein the diluent fluid comprises at least one of fluid water and carbon dioxide.

3. The method of claim 1 further including controlling the mean outlet temperature of the product fluid exiting the reactor by controlling the amount of diluent delivered through the diluent delivery system to control the total enthalpy change relative to the heat of reaction and the fluid delivery temperatures.

4. The method of claim 1 further including acoustically modulating the delivery of at least one of the delivered fluids thereby acoustically modulating the reacting fluid within the reaction chamber with a frequency greater than 10 Hz.

5. The method of claim 4 further including modulating the delivery of one of liquid fluid to at least 100 Hz, wherein reducing fluid pressure oscillation within the reaction chamber.

6. The method of claim 1 further including electrically exciting at least a portion of the reaction product within the reaction chamber.

7. The method of claim 6 further including modulating the reaction product to at least 2 kHz.

8. The method of claim 1 wherein at least a portion of the diluent delivered by the diluent delivery system comprises one of liquid diluent and liquid water, and is delivered as a liquid into the reactor; wherein controlling the liquid spatial distribution to be non-uniform at a plurality of locations on the surface, the plurality of locations being taken along the first transverse direction.

9. The method of claim 1 further including delivering liquid and vapor diluent to the reactor and wherein at least a portion of the liquid diluent is delivered to the reaction chamber streamwise downstream of the vapor diluent delivery.

10. The method of claim 1 wherein the reactant delivery system and the diluent delivery system are configured to form interspersed reactable and non-reactable regions and further comprising providing a traversing region of reactable fluid traversing at least one of the non-reactable regions from one reactable region to another.

11. The method of claim 1 wherein the co-reactant comprises oxygen containing fluid, the reactant comprises a combustible fuel, and the diluent comprises at least one of a vaporizable liquid, and liquid water.

12. The method of claim 2 further including combusting the reactant with the co-reactant within the reaction chamber.

13. The method of claim 1 wherein at least a portion of the diluent is delivered streamwise downstream of a rapid reaction front.

14. The method of claim 1 further including controlling the evaporation of a vaporizable portion of diluent by controlling a streamwise primary flow direction velocity distribution of the diluent as delivered from the diluent delivery system evaluated along a first transverse direction.

15. The method of claim 1 further including controlling the streamwise evaporation distance of the diluent in the reaction chamber with respect to one of the transverse directions.

16. The method of claim 1 further including providing at least a portion of the reaction chamber with coolant passages, cooling at least a portion of the reaction chamber with diluent, and delivering at least a portion of the heated diluent to the reaction chamber.

17. The method of claim 1 further including controlling the temperature of the product fluid exiting the reactor by controlling the total diluent enthalpy change comprising vaporizable diluent being delivered to the reactor.

18. The method of claim 1 further comprising controlling the delivery of diluent fluid and reactant fluid to the reactor to control the pressure within the reactor to within at least one specified safe operating bound of the co-reactant fluid delivery system.

19. The method of claim 18 further comprising controlling the spatial transverse distribution of the product fluid temperature at a plurality of outlet locations along an outlet transverse direction through an outlet location near the reactor outlet, to greater than a plurality of prescribed lower limits, and less than a plurality of prescribed upper limits at the respective outlet locations.

20. The control method of claim 1, wherein controlling one of the reactant and diluent transverse spatial distributions to be non-uniform at a plurality of locations on the surface, the spatial distribution being taken along the first transverse direction.

21. A method of reacting a reactant with a co-reactant and mixing a diluent with at least one of the reactant, the co-reactants, and a reaction product to form a product fluid; the method comprising:
 configuring a pressurized reactor comprising an upstream diffuser and a downstream reaction chamber in fluid communication, with a streamwise primary flow direction from a reactor inlet to outlet, and with a first and a second transverse directions mutually-distinct and transverse to the primary flow direction;
 delivering a reactant fluid comprising the reactant with a spatial reactant distribution into the reaction chamber through a reactant delivery system;
 delivering a co-reactant fluid comprising the co-reactant into the primary upstream reaction chamber inlet with a spatial co-reactant distribution; the delivery comprising diffusing the co-reactant fluid into the reaction chamber through a plurality of co-reactant diffuser passages through a co-reactant delivery system;
 delivering a diluent fluid comprising the diluent with a spatial diluent distribution, upstream of the reactor outlet through a diluent delivery system;
 wherein controlling one of the spatial distribution of the co-reactant fluid and of the diluent fluid, the distribution being taken along the first transverse direction through a reactor location along the primary flow in one of the diffuser and the reaction chamber; and
 wherein controlling the transverse distribution of one of the composition, temperature, pressure, and velocity of the reaction product, to a prescribed spatial distribution, the transverse distribution being taken along the first transverse direction through a control location near the outlet of the reactor.

22. The method of claim 21 further including modulating the spatial delivery of the reactant fluid into the reaction chamber a frequency greater than 10 Hz, thereby reducing fluid pressure oscillation within the reaction chamber.

23. The method of claim 21 further including modulating the spatial delivery of the diluent fluid into the reactor at a frequency greater than 10 Hz, thereby reducing fluid pressure oscillation within the reaction chamber.

24. The method of claim 21 further including configuring a diffuser and diffusing the co-reactant into the reaction chamber and delivering a portion of the diluent as one of diluent vapor and steam, near the diffuser outlet.

25. The method of claim 21 further including configuring a diffuser, diffusing the co-reactant into the reaction chamber and delivering a portion of the diluent as liquid near the diffuser outlet.

26. The method of claim 21 further including configuring a high voltage power supply for at least one of the reactant delivery system or the diluent delivery system and generating a high voltage electric field within the reaction chamber.

27. The method of claim 26 further including modulating the high voltage electric fields.

28. The method of claim 21 further comprising controlling the spatial distributions of the delivery of diluent fluid and of reactant fluid to the reaction chamber wherein controlling the spatial distribution of pressure within the reactor in at least one of the transverse directions to within the at least one specified safe operating bound, and controlling the distribution of temperature of the product fluid in at least one of the transverse directions.

29. The reaction method of claim 21 wherein controlling one of the transverse reactant distribution and the transverse diluent distributions to be non-uniform, the spatial distribution being taken along the first transverse direction.

30. The method of claim 21 wherein at least a portion of the diluent delivered by the diluent delivery system comprises one of liquid diluent, and is delivered as a liquid into the reactor; wherein controlling the liquid spatial distribution to be non-uniform at a plurality of locations on the surface, the plurality of locations being taken along the first transverse direction.

* * * * *